United States Patent [19]

Mackelburg et al.

[11] Patent Number: 5,018,114
[45] Date of Patent: May 21, 1991

[54] ADJUSTABLE FREQUENCY DIVERSITY ACOUSTIC COMMUNICATIONS SYSTEM

[75] Inventors: Gerald R. Mackelburg; Leon J. Bodzin; Howard B. McCracken; Anthony E. Diamond, all of San Diego, Calif.

[73] Assignee: The United States of America as represented by the Secretary of the Navy, Washington, D.C.

[21] Appl. No.: 284,004

[22] Filed: Dec. 13, 1988

[51] Int. Cl.⁵ .............................................. H04B 11/00
[52] U.S. Cl. ...................................................... 367/134
[58] Field of Search ...................... 367/134, 904; 375/6, 375/38, 40, 100; 455/40, 65

[56] References Cited

U.S. PATENT DOCUMENTS 4,001,692  1/1977  Fenwick et al. ......................... 371/5
4,349,915  9/1982  Costas .................................. 367/904

Primary Examiner—Thomas H. Tarcza
Assistant Examiner—Daniel T. Pihulic
Attorney, Agent, or Firm—Harvey Fendelman; Thomas Glenn Keough; Peter A. Lipovsky

[57] ABSTRACT

An underwater acoustic communication system provides an operator with adjustable frequency diversity so that data rates may be tailored to specific multipath environments. Transmitted messages are sent with precursor transmission/reception synchronization data and transmission parameter data so that the receiving communication end will recognize when message data starts, tone length as-well-as the frequency diversity of the transmitted message. Timing is extracted from the data to compensate for Doppler shift.

22 Claims, 9 Drawing Sheets

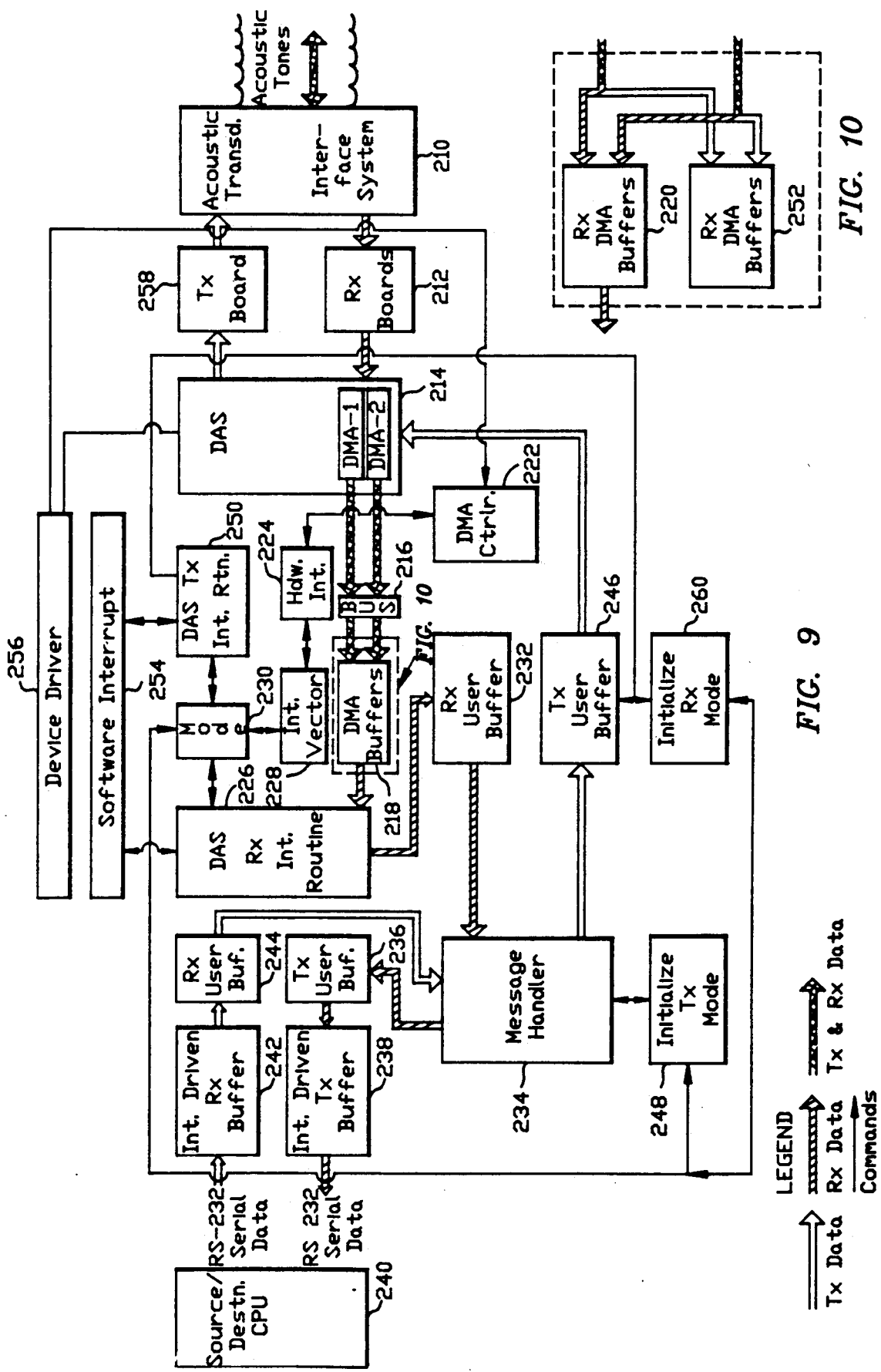

ADJUSTABLE FREQUENCY DIVERSITY ACOUSTIC COMMUNICATIONS SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention pertains broadly to the field of telecommunications. More particularly, the invention pertains to underwater communications. In still greater particularity, the invention relates to underwater acoustic communications in multipath environments.

2. Description of the Prior Art

As acoustic engineers know, underwater acoustic communication in shallow operating depths is often hampered by what is known as multipath. Multipath disrupts transmission and reception of acoustic signals sent underwater.

This phenomenon can be generally explained as follows: acoustic propagations from an underwater transmission point may travel directly to an underwater receiver yet, these propagations often reflect from the ocean surface and ocean floor to create cancellation and distortion of the directly propagated transmission. Signal cancellation and distortion due to multipath has been minimized by the use of directional receivers. Further, frequency diversity transmission and reception has been utilized.

In this latter method, transmission of identical signals is done simultaneously over a number of different or diverse frequencies. Depending upon the multipath structure of the environment through which the signals are propagated, some of the transmission frequencies will be more vulnerable to being cancelled or distorted by multipath. Transmitting the same message simultaneously over a broad spectrum of frequency diverse channels improves chances of clear communication, as one or more of the transmitted signals may ultimately be received without severe multipath disruption.

Methods of transmitting a message simultaneously over a number of frequency diverse channels are not new. Yet, heretofore, these methods were not readily adaptable to the environment in which they were used. Simultaneous redundant transmissions appreciably slow data transmission rates. If the efficiency of underwater acoustic communications could be readily observed, an operator could make efforts to tailor a system to provide data rate transmittals commensurate with the multipath environment.

SUMMARY OF THE INVENTION

The invention provides an adjustable diversity underwater communication system that permits an operator of the system to observe the efficiency of underwater acoustic transmissions and to adjust the system to provide maximum data rate transmittals.

The system interfaces an ocean-surface-located data source computer with a remote, below-surface-located data destination computer to provide a two-way acoustic pathway for binary data transmission. At each communication end, the system employs a combination transmitter/receiver computer programmed to utilize frequency shift keying to provide frequency diverse communications. The acoustic communication system of the invention runs autonomously to send data from the surface-located source computer to the below-surface-located destination computer and to send, when requested, data from the destination computer back to the source computer. Acoustic tones are projected by omnidirectional transducers used in conjunction with the system's transmitter/receiver computers.

Operator interaction is provided by way of a keyboard and monitor located at the system's transmitter/receiver computer used in conjunction with the surface-located data source computer. This interaction permits an operator to selectively adjust frequency diversity mode and acoustic tone transmission times so that data transmission rates may be maximized.

In either operator or automatic mode, synchronization of a string of binary data with reception of the string is provided by overhead bytes in the precursor of the next acoustic transmission. These overhead bytes are added by the transmitting transmitter/receiver computer to be transmitted acoustically along with message data to the receiving transmitter/receiver computer of the system. The overhead bytes include a detection header that the receiving transmitter/receiver computer attempts to correlate with stored signal patterns. If a correlation is not made, the receiving transmitter/receiver computer does not accept the data string and continues in its attempt to make a correlation between a transmission and reception.

If however a correlation between the detection header and a stored signal pattern is made, then the receiving transmitter/receiver computer learns the individual tone times within the data string as well as when the start of message data will occur. A prediction will be made as to when individual tones will begin and this is compared to when tones actually begin. The difference is added, with some averaging, to the next predicted tone thereby compensating for shifts in tone timing due to the Doppler effect.

Correlation triggers the receiving transmitter/receiver computer to switch from the correlate mode into a receive mode to thereby accept the remaining overhead bytes and any following message data. These remaining overhead bytes include a "start" header that is pattern-matched to derive the diversity of the transmitted data string, a "length" header that is used by the receiving transmitter/receiver computer to know how many data bytes to collect before indicating that a reception has been completed, and a "checksum" header used to provide an error reference. Finally, topside and downside headers are provided to configure the surface-located transmitter/receiver computer of the system as well as the below-surface-located transmitter/receiver of the system. The topside and downside headers contain command control bits that indicate to the receiving transmit/receive computer, among other things, what diversity level to transmit out at.

If a transmission-reception correlation is made, the receiving transmitter/receiver computer of the system uses the checksum header to determine if an error occurred in the transmission. It then strips off the remaining overhead bytes and attempts to reconstruct the transmitted message.

Each transmission and reception is tagged with time and operating mode information and written to two files which are later copied to floppy disks to be printed out. One of the files or logfiles contains the time and operating mode information as-well-as the length of each transmission and reception and, in the case of reception, whether a transmission checksum error was detected. This latter file is used for system performance evaluation. The second logfile contains a copy of each binary message that was transmitted and received.

A surface located monitor is programmed to display the most recent messages received and transmitted, the time at which they occurred, and the current state of the operator controllable parameters for both communication ends.

Eight operating modes are available to enable the operator to adjust the data rates to the maximum that the operating geometry, multipath structure, will allow.

In operation, an operator may transmit out at a high diversity/redundancy, low data rate level and instruct the receiving transmitter/receiver computer of the system to transmit back at a lower diversity/redundancy higher data rate. If the operator's monitor displays a checksum error and a garbled message, the operator knows that at least the return data rate was too high for the particular multipath environment, requiring an increase in frequency diversity/redundancy. If however the operator does not witness a checksum error or garbled message, the operator knows that the multipath environment was able to stand the higher data rate thereby encouraging the operator to up transmission rates even higher. By this iterative technique, the operator can push his communication system to the highest data rate that the particular multipath environment will allow.

OBJECTS OF THE INVENTION

It is an object of the invention to improve telecommunications.

Another object in improved acoustic communication.

Another object of the invention is to improve acoustic communications in multipath environments.

Yet another object of the invention is to improve underwater acoustic communications in multipath environments so that data transmission rates are commensurate with multipath structure.

Other objects, advantages and new features of the invention will become apparent from the following detailed description of the invention when considered in conjunction with the accompanied drawings.

BRIEF DESCRIPTION OF THE DRAWINGS

FIG. 9 depicts the software architecture of the computing system incorporated with the invention.

FIG. 10 is a detail view of a portion of FIG. 9.

DESCRIPTION OF THE PREFERRED EMBODIMENT

Figure 1:
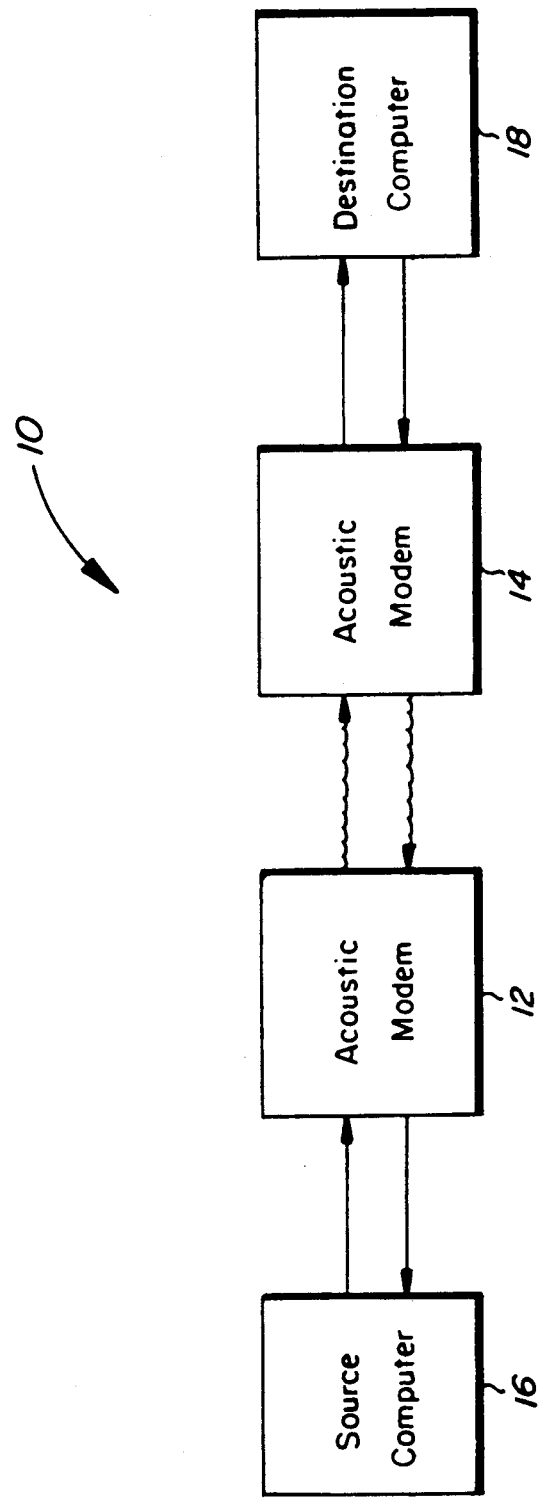
FIG. 1 is a block diagram in which the invention is shown to provide an acoustic link between data source and destination computers.

Referring to FIG. 1 there is shown an adjustable diversity acoustic communication system 10 of the invention. Communication system 10 includes a surface-located acoustic modem 12 incorporating an operator interactive programmable transmitter/receiver computer and subsurface acoustic projectors or transducers. Communication system 10 also includes a subsurface-located acoustic modem 14 that includes a programmable transmitter/receiver used in conjunction with acoustic transducers.

In operation, data source computer 16 sends a string of serial binary data by way of a standard communications cable to surface-located acoustic modem 12. Acoustic modem 12 converts the binary data into a string of acoustic tones that are projected through the aquatic medium. Subsurface-located acoustic modem 14 receives the transmitted tones and reconverts these tones into a string of binary data that is passed to destination computer 18 by way of a conventional communications cable. In this sense a remote unmanned computer can receive communications through the acoustic medium and, when commanded, return communications back to the communication source.

Figure 2A:
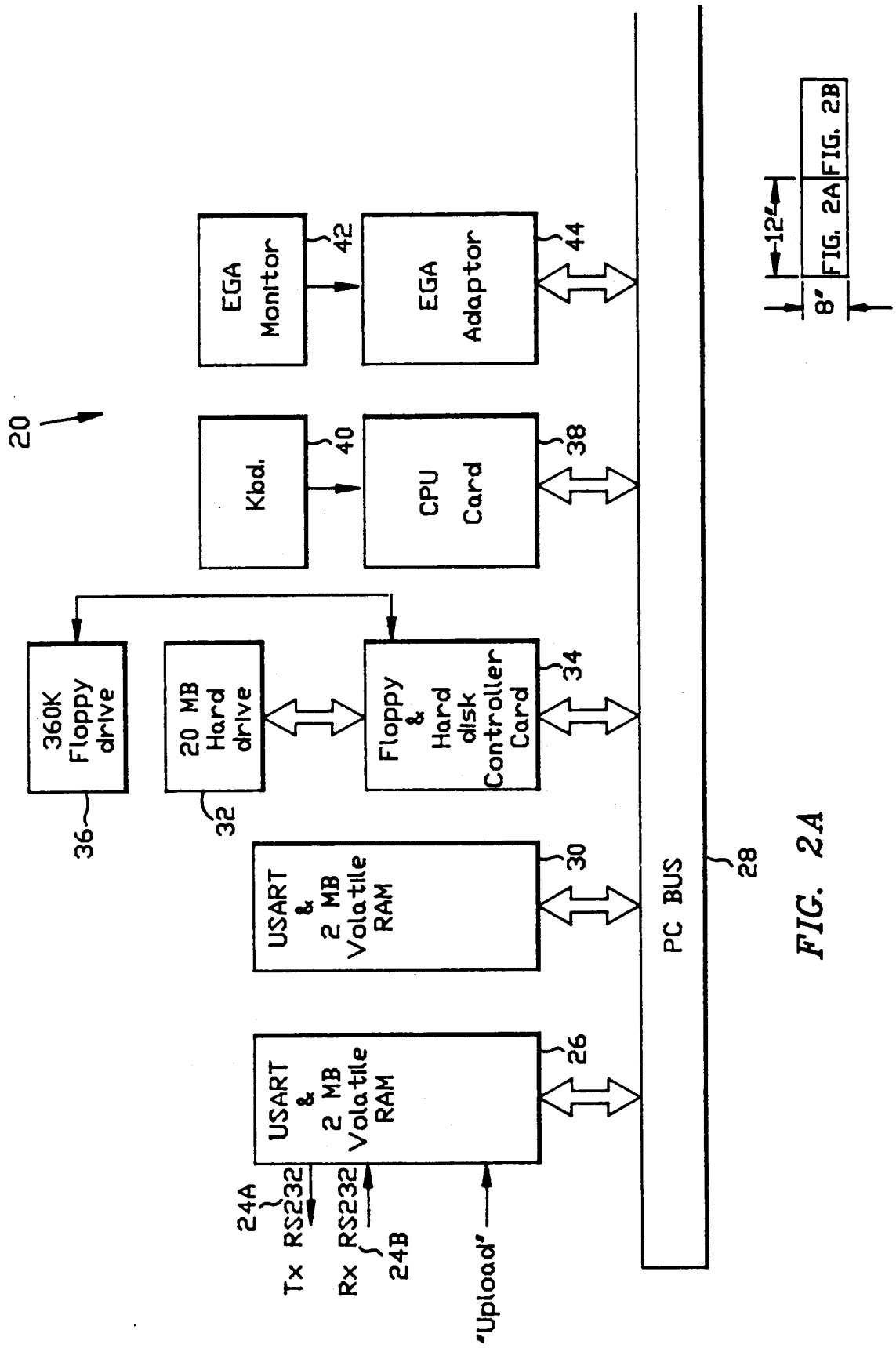
FIGS. 2A and 2B show a representative system configuration of an operator interactive acoustic modem of the invention as is utilized with an ocean-surface-located data source computer.
Figure 2B:
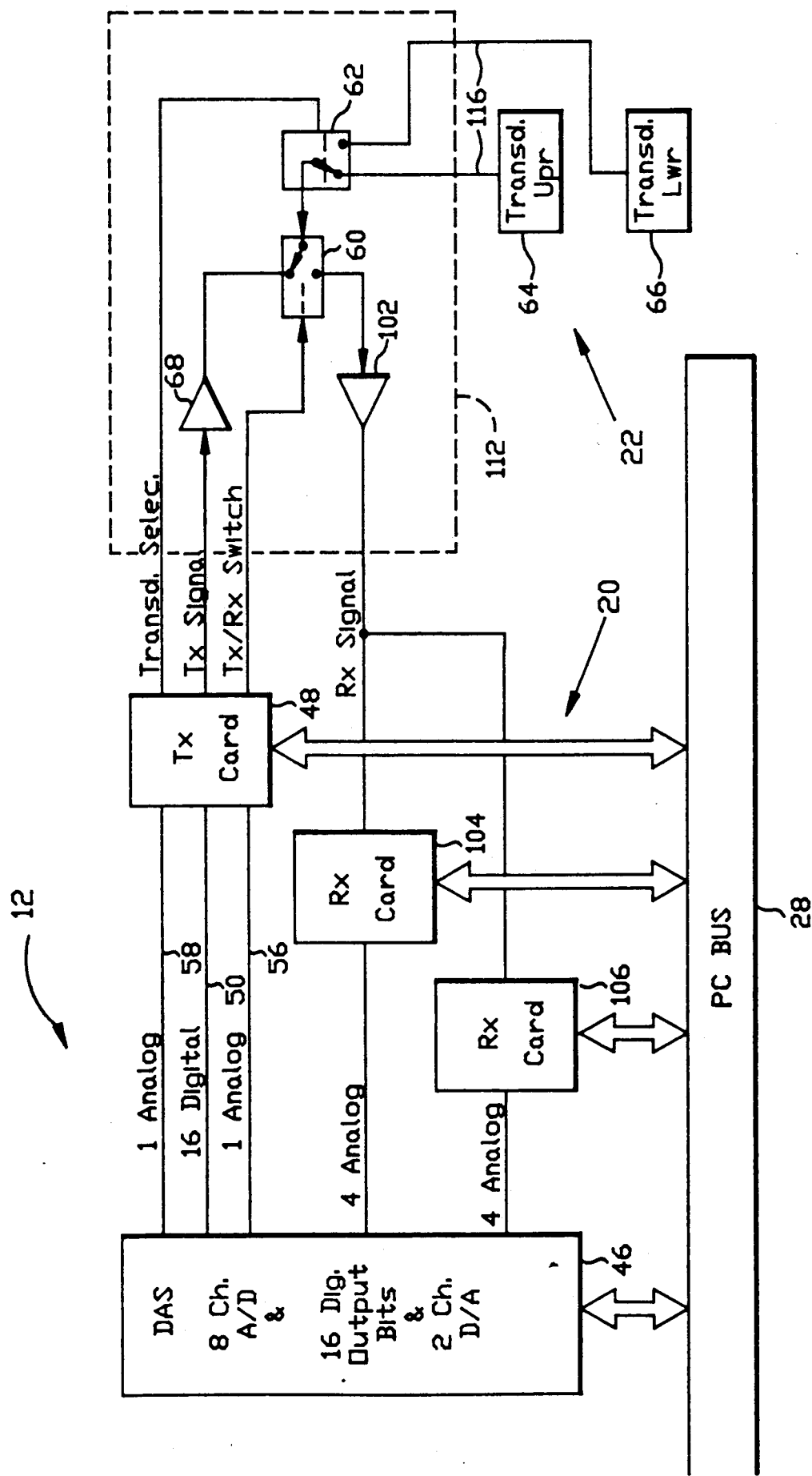

Referring to FIGS. 2A and 2B, the system configuration of surface-located operator interactive acoustic modem 12 is shown. Modem 12 incorporates a programmable transmitter/receiver computer 20, such as an International Business Machines (IBM) AT personal computer (PC) or compatible, that is used in conjunction with subsurface located transducers 22. The modem functions as a half duplex transmitter/receiver and utilizes the same transducers for both transmitting and receiving. Focusing on FIGS. 2A and 2B with reference to FIG. 1, modem 12 is linked to data source computer 16 by way of conventional RS-232 communication cables 24A and 24B. Received serial data from source computer 16 is converted into a parallel data string by a conventional universal synchronous asynchronous receiver/transmitter (USART), a part of a combination USART and RAM card 26. A commercially available card that has worked satisfactory for this purpose is a model JRAM-AT-3 2MB EMS memory with serial/parallel module. This card features one RS-232 serial port and one Centronics type parallel port. The card has two megabytes of RAM installed. Combination USART and RAM card 26 is tied into a PC bus 28 to permit a flow of data between itself and the other computer components. A second combination USART and RAM card 30 is tied into bus 28 to provide additional memory storage space. For engineering efficiency, card 30 was chosen to be the same as card 26, however card 30 was used solely for its additional memory storage capability. The RAM storage of cards 26 and 30 were incorporated in the invention to provide additional storage space as needed.

Touching briefly upon the function of modem 12, modem 12 is programmed upon transmission to add a message precursor, in the form of overhead bytes, to the source computer's message data string and to convert the precursor and string into acoustic tones to be projected into the aqueous medium. In a receive mode, modem 12 will seek to correlate incoming transmitted data with the reception of the data by utilizing a portion of the transmitted message precursor. When correlation is made, the receiving acoustic modem will learn when message data begins, the length of individual transmitted tones, the transmission diversity and the message length. A "C" language program suitable for implementing these functions is attached to the specification as Appendix I. This program, to be discussed in greater detail, resides within a 20 megabyte hard disk 32 incorporated within acoustic modem 12. Besides containing this program, hard disk 32 provides logfile storage space for transmission and reception data to be used for archival and evaluation purposes. Hard disk 32 is coupled to PC bus 28 by way of a conventional floppy and hard disk controller card 34. A conventional 360 kilobyte floppy drive 36 ties into controller card 34 to access and print out logfiles within hard disk 32. A conventional central processing unit (CPU) card 38 connects with bus 28 to control interpretation and execution of computer functions. Keyboard 40 permits operator interaction with modem 12 by way of CPU card 38. An enhanced graphics adapter (EGA) monitor 42 is used in conjunction with an EGA adapter card 44 to present an operator with a menu for selectively tuning transmission diversity and data rates. This monitor is also programmed to display the most recent messages received and transmitted, the time at which these messages occurred, and the current status of operator selected controllable system parameters.

CPU card 38 is commercially available in the form of model B286-1MEG REV.D IBM-AT compatible CPU card. This card features an IBM-AT compatible 80286 CPU with one megabyte RAM on board and an 80287 math co-processor installed. Hard disk 32, floppy and hard disk controller card 34, floppy drive 36, EGA monitor 42 and EGA adapter card 44 are all commercially available. These elements may be acquired as a unit such as the model 8531-20 EGA/AT rack mount industrial chassis with monitor featuring an IBM-EGA compatible 9-inch diagonal internal RGB code display with passive IBM-AT compatible backplane, a 20 megabyte internal 3.5 inch hard disk drive, a 360 kilobyte double-sided double-density (DSDD) 5.25 inch floppy disk drive with combination floppy diagonal hard disk controller card.

Modem 12 includes a data acquisition system (DAS) in the form of an 8-channel analog to digital (A/D), 16-digital output bit, and 2-channel digital to analog (D/A) card 46. A commercially available DAS is a model DT2821-G-16SE IBM-AT compatible analog and digital input/output (I/O) board. The programming residing on hard disk 32 is executed by central processing unit 38, routing signals to data acquisition system 46 to switch individual channels within a transmit card 48 to an off, 0 or 1 position.

Figure 3:
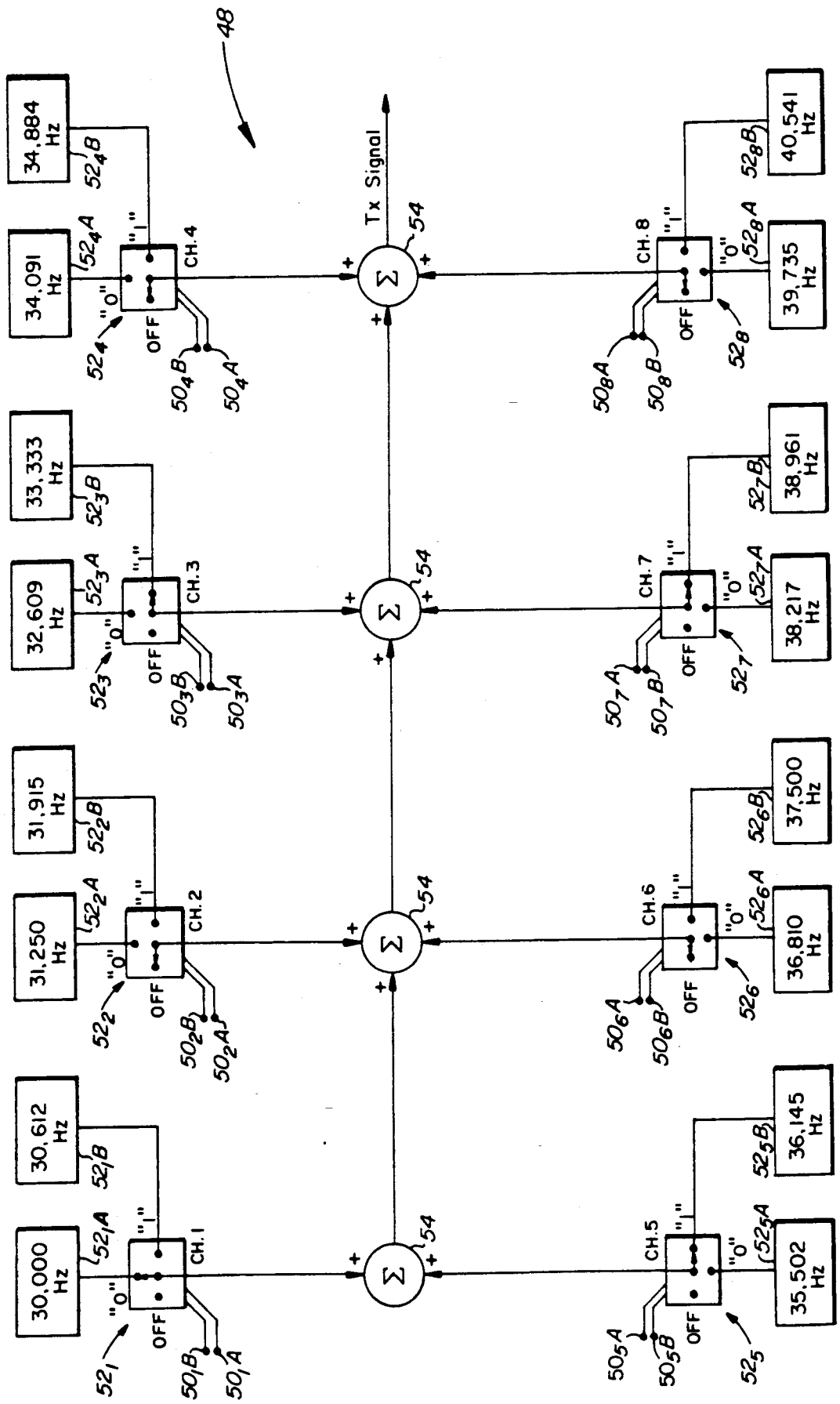
FIG. 3 is a block diagram of the frequency shift keyed transmitter incorporated within the transmitter/receiver computers of the invention.

Referring now to FIG. 3, a functional block diagram of frequency shift keyed transmitter card 48 is shown.

Referring to FIGS. 2A, 2B and 3, the 16-digital output bits of DAS 46 are routed to transmit card 48 by way of input 50. Input 50 is divided evenly amongst channels 1 through 8, to provide frequency shift keying of the channels.

Specifically, if it is desired that channel 1 generate a "0" binary digit to be transmitted, a control bit from DAS 46 will be sent to switch $52_1$ of channel 1 by way of input $50_1A$. Channel 1 would generate a 30,000 Hz tone in tone generator $52_1A$ that the receiving acoustic modem of the invention will recognize as a "0" binary digit. Alternatively, if it was desired that channel 1 transmit a "1" binary digit, a binary digit output from DAS 46 to switch $52_1$ of channel 1 would be input by way of $50_1B$. This would result in a 30,612 Hz tone being generated by tone generator $52_1B$. Further, where neither a "0" or a "1" binary digit is desired to be generated from channel 1, switch $52_1$ remains in an off position.

In a like manner, channels 2 through 8 function similarly to generate tone frequencies of preselected binary designations. Summers 54 collect the generated tones to be forwarded for amplification.

In a preferred embodiment of the invention, eight operating modes are available to enable the system operator to adjust data rates to the maximum that the operating geometry (channel multipath structure) will allow. Table I indicates what operating modes, diversities (frequency redundancy levels), tone length (T) and data rates have been programmed to be available to an operator of the acoustic communication system 10 of the invention.

TABLE I

| Mode | Diversity | T(MSEC) | Data Rate (BPS) |
| --- | --- | --- | --- |
| 7 | 0 | 9.6 | 833.00 |
| 6 | 0 | 9.6 | 416.60 |
| 5 | 2 | 9.6 | 208.30 |
| 4 | 4 | 9.6 | 104.20 |
| 3 | 4 | 19.2 | 52.10 |
| 2 | 4 | 38.4 | 26.04 |
| 1 | 4 | 76.8 | 13.02 |
| 0 | 4 | 153.6 | 6.51 |

Table I is given by way of example, as it should be noted that the diversities and transmission tone times (T) for particular modes may be altered by way of minor software changes should operating experience indicate a necessity. In a prototype of the invention, tone transmission times (T) of 9.6 milliseconds and data rate of 833 bytes per second (BPS) were limitations caused by the specific computer speed of the computer incorporated with the invention. Those skilled in the applicable arts will realize that other commercially available computers of faster speed could be incorporated with the invention to permit shorter tone times (T) with corresponding faster data rates.

Figure 4:
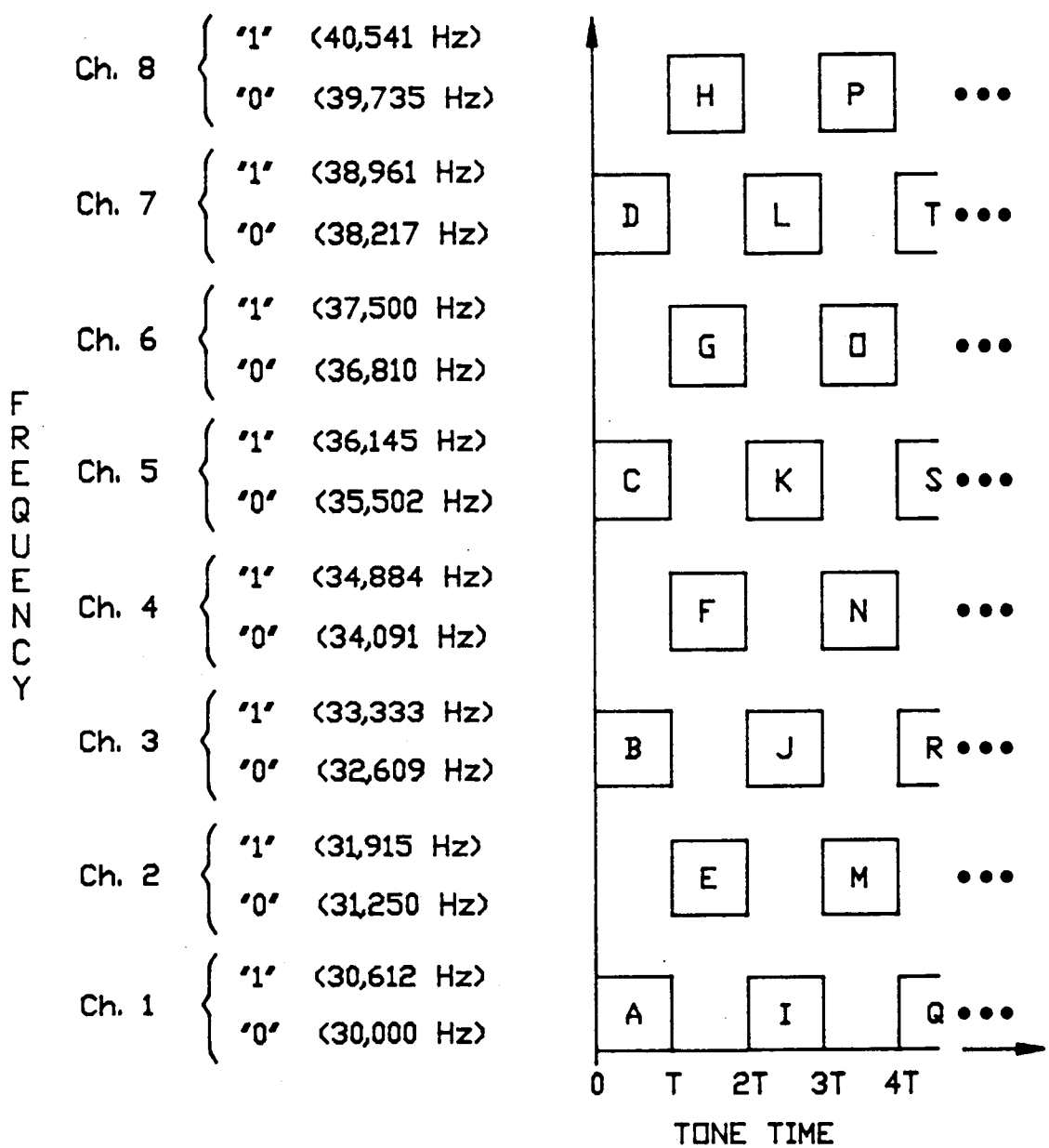
FIG. 4 is a graph of the specific frequency shift keyed channel utilization as is incorporated with the invention.

"Mode" operation can be better understood by referring to FIG. 4. The operating mode determines how the data to be transmitted is allocated to the eight available frequency shift keyed channels, shown in FIG. 3. With the exception of mode 7, at any given time during a transmission, starting at time T=0, only four of the eight channels are programmed to be active. During the next transmission interval, starting at time T, when a new piece of data is being transmitted, the inactive four channels are programmed to become active, and the previously active channels become inactive.

Referring again to FIG. 4, individual blocks such as A, B, C and D indicate tone transmissions for tone transmission time T=0 to T=T. These transmissions correspond to an output of channels 1, 3, 5 and 7 respectively wherein each transmission is of a preselected frequency designated either as a "0" or a "1". In accordance with the invention, from time period 0 to T channels 1, 3, 5 and 7 are active. From time period T to time period 2T channels 1, 3, 5 and 7 become inactive and channels 2, 4, 6 and 8 become active.

The tone time, parameter T, is controlled by way of the operating mode. It is used to insure that multipath echo (surface reflection) on any given channel dies out before that channel is reused, thereby preventing intersymbol interference.

The other parameter controlled by way of the operating mode is the diversity or frequency redundancy level of the transmission. With 0 or no diversity, four independent bits are transmitted on four active channels for a data rate of 4/T, mode 7 excepted. With a diversity of 2, each data bit is transmitted on two of the four active channels during the same tone transmission time, for a data rate of 2/T. With a diversity of 4, each data bit is transmitted on all four active channels for a data rate of 1/T. This is illustrated in FIG. 4 and the following.

For diversity=4, data rate=1/T (modes 0-4).
Bit 1→tones A, B, C, D
Bit 2→tones E, F, G, H
Bit 3→tones I, J, K, L etc.

For diversity=2, data rate=2/T (mode 5).
Bit 1→tones A, C
Bit 2→tones B, D
Bit 3→tones E, G
Bit 4→tones F, H
Bit 5→tones I, K
Bit 6→tones J, L etc.

For diversity=0, data rate=4/T (modes 6, 7).
Bit 1→tone A
Bit 2→tone B
Bit 3→tone C
Bit 4→tone D
Bit 5→tone E
Bit 6→tone F
Bit 7→tone G etc.

Transmitting the same bit simultaneously over frequency diverse channels insures that even if there is a fade on one channel, due to destructive interference of the direct and reflected transmissions, another channel carrying the same bit will most likely succeed in getting through to the receiving acoustic modem.

Mode 7 is unique in that all eight frequency shift keyed channels are active at all times with independent bits being transmitted on all eight of these channels. As mode 7 has no diversity nor intersymbol interference rejection capability, its usefulness is limited to instances where no multipath exists and where there is little relative motion between the transmitting acoustic modem and the receiving acoustic modem.

Referring once again to FIG. 2, transmit card 48 receives power supply voltages from PC bus 28. In addition to the 16-digital output bits (input 50) that are input into transmit card 48, there are analog control inputs 56 and 58 that pass through card 48 to exercise a transmit/receive mode switch 60 and a transducer selection switch 62, respectively. Card 48 does not effectuate signals over inputs 56 and 58 but merely provides a connection for passing the inputs on. Transducer selection switch 62 is operator controllable by way of overhead bytes in the precursor of a transmission data string. In a preferred embodiment of the invention, an operator of the communication system of the invention could select from either upper or lower transducers 64 and 66 respectively.

A transmit signal outputted from transmit card 48 is amplified in a power amplifier 68 to be passed through the transmit/receive mode switch 60, here shown in transmit mode, through transducer selection switch 62 to a transducer, in this instance upper transducer 64, to be broadcast as acoustic tones through the aqueous medium. Upper transducer 64 and lower transducer 66 are placed generally one above the other to allow an operator of the acoustic communication system of the invention a choice of acoustic emanation points.

Referring again to FIG. 1 to reiterate the scheme of the invention, surface-located data source computer 16 passes serial data to acoustic modem 12 to be transmitted acoustically through the aqueous medium. At the receiving end is subsurface located acoustic modem 14 that receives the acoustic data and converts it to a serial data string to be passed onto destination computer 18.

Figure 5:
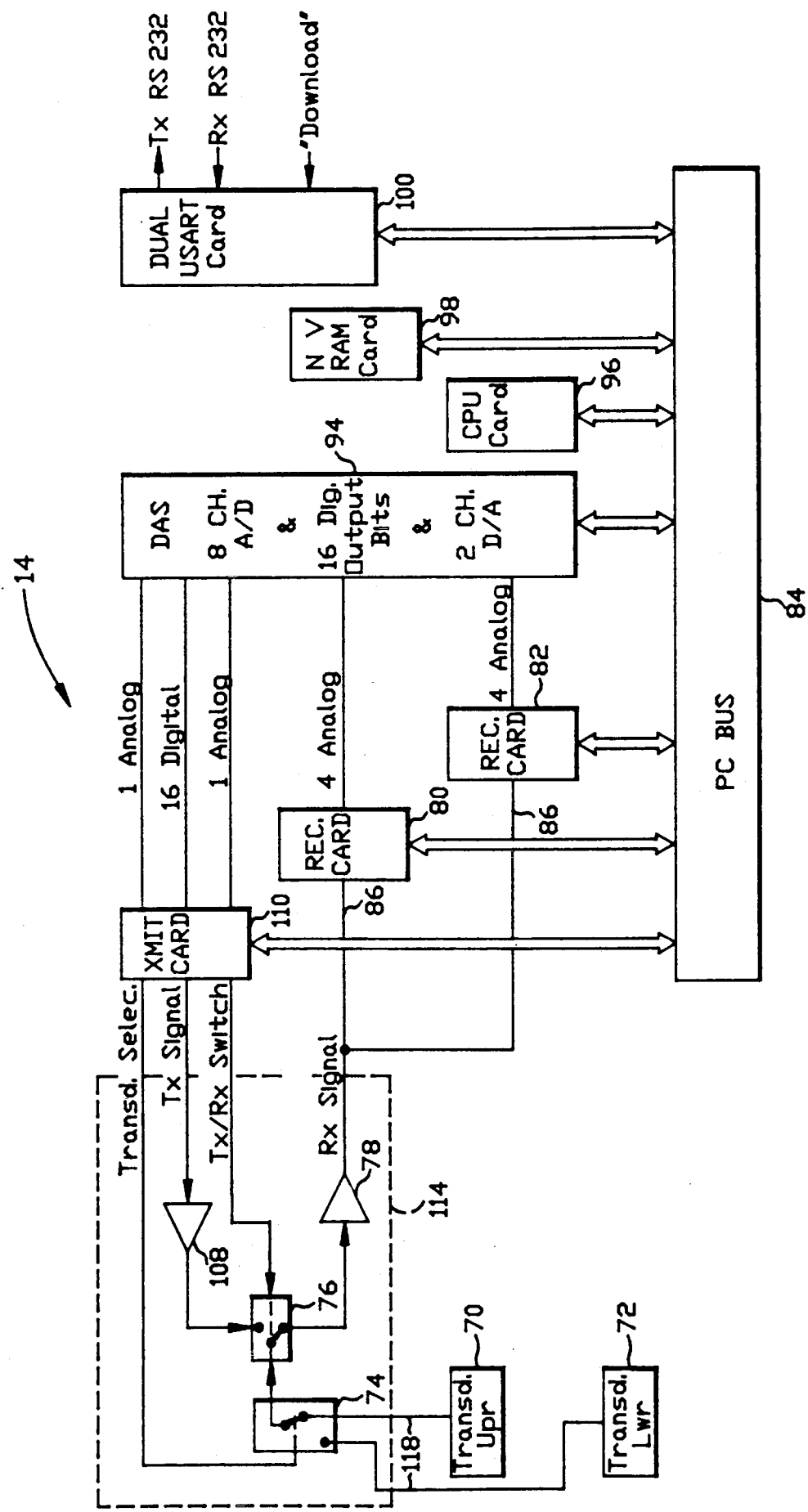
FIG. 5 is a system configuration of an acoustic modem of the invention as is utilized with a remote, underwater located destination computer.

Referring now to FIG. 5, the system configuration of the remote subsurface located acoustic modem 14 is shown. Like surface located acoustic modem 12, shown in FIG. 2, the remote subsurface located modem 14 has an upper transducer 70 and a lower transducer 72 to receive acoustic emanations from the aqueous medium. Also like surface-located modem 12, subsurface modem 14 has a transducer selection switch 74 shown switched to receive acoustic tones by way of upper transducer 70 to be passed through transmit/receive mode switch 76, shown in a receive mode.

As will be explained further both modems 12 and 14 are programmed to receive by default, that is each modem will be in a receive mode unless it is transmitting.

Referring again to FIG. 5, the received tones are passed from transmit/receive mode switch 76 into a preamplifier 78. The low level acoustic signals are upgraded in preamp 78 so that the signals may be further processed without appreciable degradation.

The eight channels of received acoustic transmissions are passed from preamp 78 and split amongst two receiver cards 80 and 82. Channels 1 through 4 are received by receiver card 80 with channels 5 through 8 being received by receiver card 82. Receiver cards 80 and 82 tie into PC bus 84 to receive system power supply voltages.

Figure 6:
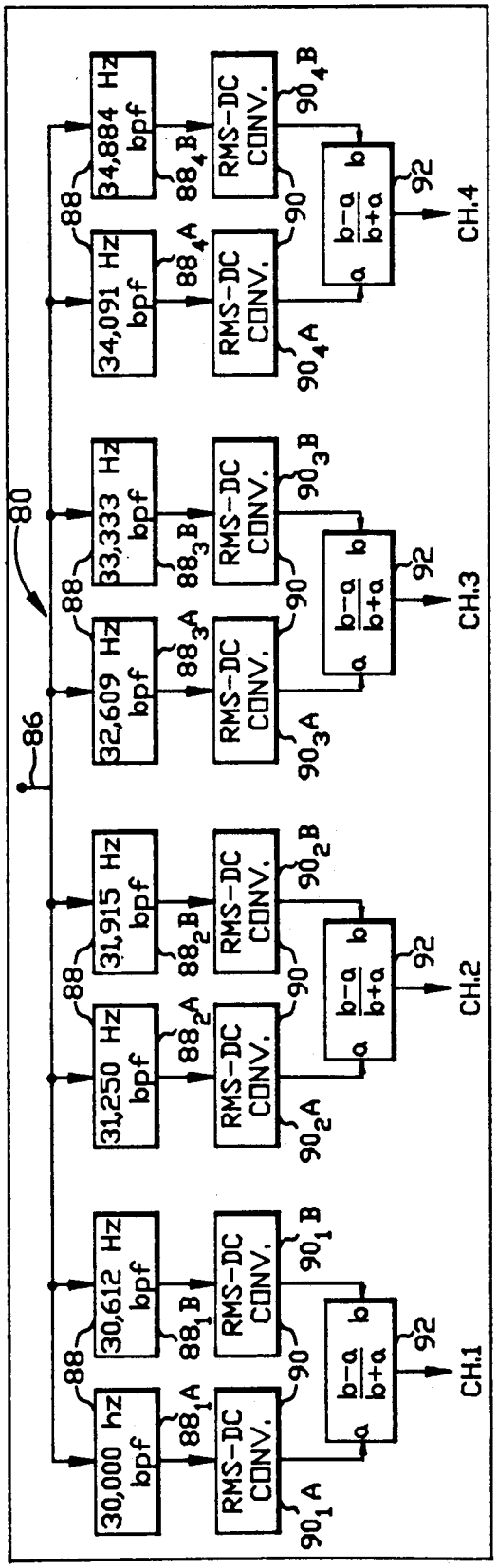
FIGS. 6 and 7 are schematic diagrams of the receivers incorporated within the transmitter/receiver computers of the invention.
Figure 7:
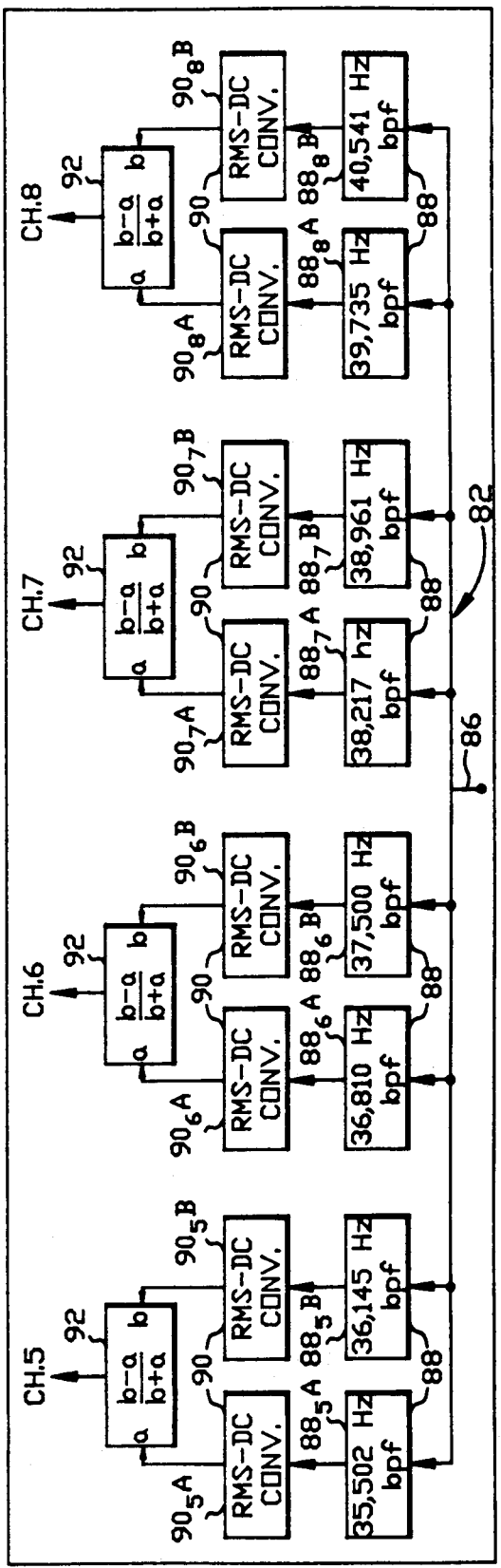

Referring to FIGS. 6 and 7, receiver cards 80 and 82 are shown respectively. The received string of data signals are input into receiver cards 80 and 82 by wa of shared input 86. The transmissions are passed by input 86 to a series of bandpass filters (bpf) 88. Each channel has two bandpass filters, 88A and 88B, for passing received transmissions of preselected frequencies to individual route-mean-square (RMS)-direct current (DC) converters 90A and 90B, respectively. The output of each channel's RMS-DC converters 90 are subtracted and averaged by a normalizer 92, individual to the channels.

To illustrate further, with reference to FIG. 6, a reception over channel 1 would filter signals of 30,000 Hz in bandpass filter $88_1A$ and signals of 30,612 Hz in bandpass filter $88_1B$. These signals would be converted into an analog RMS-DC voltage whose magnitude depends upon the amplitude of the filtered signal. The difference of these analog voltages would then be determined and averaged over the sum of the voltages to produce an analog output for channel 1. In a multipath environment, it is quite possible that acoustic tones of 30,000 Hz and 30,612 Hz will be present. However if a transmission at 30,000 Hz has been made, the amplitude of this tone should be significantly higher than background tones at 30,612 Hz. This would produce a negative value in normalizer 92 indicating to other system elements that a dominant tone of 30,000 Hz was received by the receiving acoustic modem.

Where a tone 30,000 Hz had been designated as a "0" binary data bit and a tone of 30,612 Hz had been designated as a "1" binary data bit, the output of channel 1 would reflect that a "0" had been transmitted. In this instance, the more negative the analog output of normalizer 92 is, then the more likely it was that a 30,000 Hz "0" binary data bit was transmitted. Conversely, the more positive the analog output of normalizer 92 is the more likely it was that a 30,612 Hz "1" was transmitted on that channel.

Returning to FIG. 5 the four analog outputs of receiver cards 80 and 82 are passed to a data acquisition card (DAS) card 94 for further system processing. Data acquisition system card 94 is identical to DAS card 46 of surface located acoustic modem 12. Card 94 of modem 14 ties in with PC bus 84 to communicate with other modem 14 elements. Acoustic modem 14 also contains a CPU card 96 for interpretation and execution of system functions. Central processing unit card 96 is identical to CPU card 38 of surface-located acoustic modem 12. Card 96 communicates with other modem elements by way of PC bus 84. Subsurface-located acoustic modem 14 also contains a nonvolatile RAM card 98 to provide system programming storage space as-well-as logfile storage. Elements of acoustic modem 14 access nonvolatile RAM card 98 by way of PC bus 84.

Nonvolatile RAM card 98 of subsurface-located acoustic modem 14 has its counterpart in the 20 megabyte hard disk 32 of surface-located acoustic modem 12. A commercially available nonvolatile RAM card such as that utilized in the invention is a model BCMOS1-AT CMOS RAM/ROM disk card with 512 kilobytes CMOS static RAM. This commercially available card emulates a fixed disk and two floppy disks. The 512 kilobytes memory storage are battery backed static RAM to provide constant memory. To provide additional memory space, a model BCMOS2-AT CMOS RAM/ROM expansion card with one megabyte CMOS static RAM was installed.

The final element of subsurface-located acoustic modem 14 is a dual USART card 100. USART card 100 such as a model 6I23 CMOS dual serial interface card provides parallel-to-serial data conversion for interfacing with a computer such as destination computer 18 shown in FIG. 1. USART card 100 communicates with other system elements by way of PC bus 84.

Referring now to FIGS. 2A, 2B and 5, it is apparent that the system configurations of surface-located acoustic modem 12 and subsurface-located acoustic modem 14 share a number of elements. Like the preamp 78 of acoustic modem 14, acoustic modem 12 has a preamp 102 to drive receiver cards 104 and 106. Receiver cards 104 and 106 of acoustic modem 12 are identical to corresponding receiver cards 80 and 82 of acoustic modem 14. Likewise subsurface-located acoustic modem 14 has a power amp 108 identical to power amp 68 of surface-located acoustic modem 12. Power amp 108 of acoustic modem 14 is used to up transmit signals leaving a transmit card 110 of the modem. Transmit card 110 is identical to transmit card 48 of acoustic modem 12.

In a preferred embodiment of the invention, power amps 68 and 108, transmit/receive mode switches 60 and 76, transducer selection switches 62 and 74, and preamps 102 and 78 were contained, respectively, within pressure bottles 112 and 114 that were submerged within the aqueous medium. The upper/lower transducers of modems 12 and 14 were connected to the elements within pressure bottles 112 and 114 by conventional underwater pressure resistant cables 116 and 118, respectively. Elements within each of the pressure bottles are linked by conventional means to the remaining modem elements housed within their own environmentally protective enclosures, not shown. It can now be seen that the incorporation of both transmitting and receiving functions within each modem permit either modem to operate in either a transmitting or receiving capacity.

By referring once again to FIG. 1, operation of acoustic communication system 10 of the invention can be more readily understood. Communication system 10 is designed to operate in the multipath environment. When data source computer 16 has a message to present to remote located destination computer 18, acoustic modems 12 and 14 are employed to transmit the message acoustically through the aqueous medium. A return message from destination computer 18 to source computer 16 is accomplished the same way.

As previously stated, though acoustic communication system 10 is designed to run autonomously, surface located acoustic modem 12 provides for direct operator interaction by way of the aforementioned operator keyboard.

Turning to Table I, the various transmission modes available to the operator are shown. These modes have unique diversities and tone lengths for transmitting data at specific predetermined rates. The mode options are made available to the operator by way of a menu programmed to be displayed on color monitor 42 of the surface-located acoustic modem 12 shown in FIG. 2.

Referring to FIG. 1, the operator may choose the transmission mode from source computer 16 to destination computer 18 as-well-as a return transmission from destination computer 18 to source computer 16. The operator of the communication system 10 of the invention may further command the receiving modem to "echo back" messages transmitted from the transmitting modem so that the operator may check whether transmitted messages are being received as sent. An additional operator option permits an air test mode to be utilized in which the acoustic modems of the invention may be tested in air before their utilization in water.

Referring to FIGS. 2A, 2B and 5 an operator may also "up load" and "down load" memory so that new operating programs may be down loaded to subsurface-located acoustic modem 14 and so that memory stored within subsurface-located acoustic modem 14 may be up loaded to surface-located acoustic modem 12. A final operator option is the selection of upper or lower transducers for both modems 12 and 14.

These operator entered transmission parameters are transmitted to the receiving acoustic modem in "topside" and "downside" headers forming a portion of the overhead bytes/message precursor that precedes message data. These transmission parameters are themselves preceded by other transmission parameters such as a "checksum" header that provides a reference for error check purposes and a "length" header that indicates to the receiving acoustic modem the length of a transmitted data string. A "start" header provides the receiving modem with the frequency diversity of a transmitted message.

These transmission parameters make up the majority of the transmitted overhead bytes that precede message data. The remainder is a header at the beginning of the message precursor. This header is a detection sequence that contains transmission/reception synchronization data. The detection sequence provides the receiving acoustic modem with information as to when message data begins and as to the length of individual transmitted tone times. Each transmitted data string has the following header format that precedes message data:

detection, start, length, checksum, topside, downside
... message data

Figure 8:
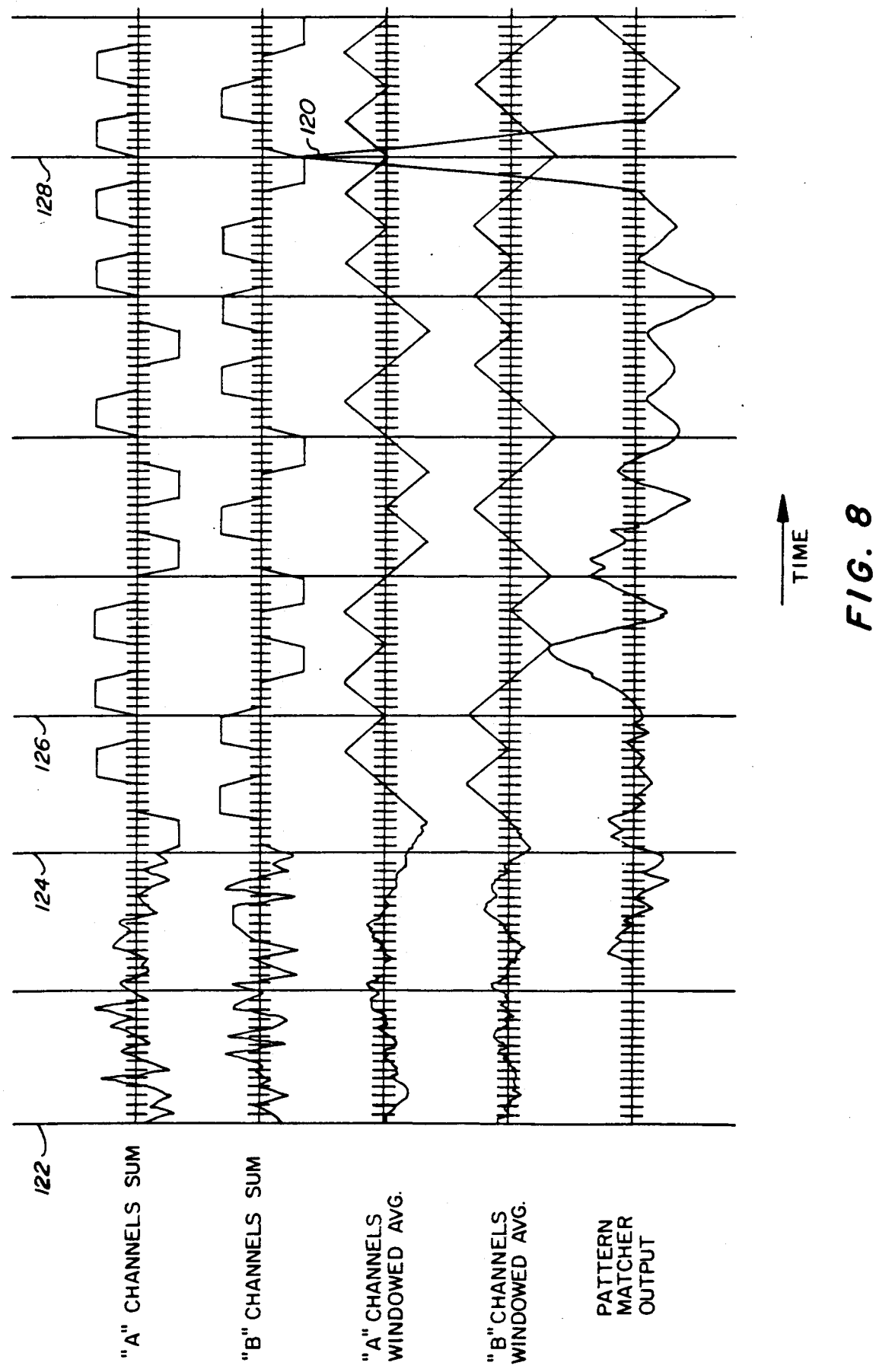
FIG. 8 depicts computer generated graphs showing a correlation between a transmitted data string and reception of the string.

Referring to FIG. 8, graphs are shown to depict a temporal correlation of a transmitted data string and with reception of the string. During a receipt of a detection sequence, the output of two groups of sampled receiver channels are individually summed. Each of these channel groups, A and B, are then "windowed" averaged for a preselected time interval. Each channel's window average is then matched to an "a priori" pattern imbedded within the program utilized with the communication system of the invention.

A correlation between the "a priori" "A" channel group pattern and the "A" channel group windowed average simultaneous with a correlation between the "a priori" "B" channel group pattern with the "B" channel group windowed average causes a peak 120 to be generated on a pattern matcher output. Generation of peak 120 causes the receiving acoustic modem to switch from a correlation mode into a receive mode to receive the remaining message precursor data as-well-as following message data. When a pattern correlation has been made, tone length and the start of data will be known.

In FIG. 8, receiver noise is experienced from ordinate 122 to ordinate 124. Transmission begins at ordinate 124 and the detection sequence begins at ordinate 126. At ordinate 128 the detection sequence ends and since a pattern correlation was made, indicated by peak 120, the receiving acoustic modem switches from correlate to receive mode to accept remaining precursor information and message data.

If however a correlation was not made, the receiving acoustic modem would continue to look for a pattern synchronization or correlation.

When a transmission/reception data correlation has been made, programming within the receiving acoustic modem causes a second pattern matching with the "start" header of the message precursor. A match of the "start" header will indicate to the receiving acoustic modem the frequency diversity of the transmitted message.

During the course of receiving transmitted message data, the "A" channel group windowed average and the "B" channel group windowed average are continuously computed to give peaks to be used as time shift references. Since the start of the message data is known and the tone transmission lengths are known, a prediction is made where the "A" channel group windowed average peaks and "B" channeled group windowed average peaks will occur. If the actual peaks of the "A" channel group windowed average and "B" channel group windowed average are not where predicted, an error is generated based upon the time difference between the predicted peaks and the actual peaks. This error is averaged with any previous errors to calculate the temporal location of a new predicted peak. Doppler effects imparted upon the acoustic transmissions is thus taken into affect to apprise the receiver of precise tone transmission starting and ending times.

Thus if the distance between the transmitting and receiving acoustic modem changes, or if an operator changes transmitting modes, the receiving acoustic modem will recognize these changes and compensate accordingly.

Referring to FIG. 1 and Table I, as touched upon briefly before, an operator of surface-located acoustic modem 12 may transmit a message received from source computer 16 to destination computer 18 at mode 4. By transmission parameter commands within the precursor of the next transmitted message, the operator may instruct subsurface-located acoustic modem 14 to transmit message data back at faster data rate mode 5. If the operator receives a checksum error and a garbled message on his monitor, he knows that at least the return data rate was too fast for the multipath environment. This may cause the operator to require surface-located acoustic modem 12 to transmit out at mode 4 and receiving subsurface-located acoustic modem 14 to transmit back at mode 4.

If, however, the operator did not receive the checksum error and a garbled message, he may choose to increase transmission data rates by switching to higher transmission modes.

Attached to this specification is Appendix I which is a source code listing of computer programming suitable for implementing the described acoustic modem functions. This "C" language program is given by way example and it is to be understood that other programs may be utilized within the scope of the present invention. In Appendix I, source files are listed within ".C". Headers are in the ".h" extension and are included in the source files. Each file is compiled and then linked into one program. At the front end of the program are utilities including "make file".

a

Referring now to FIG. 9 the software architecture of the programming utilized with the invention is shown. The architecture shown in FIG. 9 is applicable to either acoustic modem of the invention as either modem has both transmit and receive capabilities. The communication system of the invention utilizes a real-time, single-tasking data driven system having three main operations: direct memory access (DMA) data collection activities; RS-232 Serial port interrupt driven data collection activities; and main program activities.

Referring to FIG. 9, receive mode will be discussed first with transmit mode following. It should be noted that receive mode requires an initialization that will be discussed during the description of transmit mode architecture.

In the receive mode, a string of acoustical tones propagated through the aqueous medium impinges upon an acoustic transducer interface system 210. Acoustic transducer interface system 210 includes upper and lower transducers as those disclosed in FIGS. 2B and 5.

The acoustical tones are transferred to multi-filter receiver boards 212 such as the aforementioned receiver cards shown in FIGS. 2B and 5. The analog output of receiver boards 212 is sampled in a data acquisition system (DAS) 214 being one and the same as DAS card 46 and DAS card 94 of FIGS. 2 and 5, respectively. Data acquisition system 214 includes two direct memory access (DMA) channels, channels 1 and 2. While one of the two DMA channels remains active, the second DMA channel remains inactive. The active DMA channel routes the sampled, now digital, signal to a bus 216. Bus 216 is one and the same as PC buses 28 and 84 shown in FIGS. 2 and 5, respectively. The now digital samples are passed to DMA buffers 218.

FIG. 10 shows a detailed view of DMA buffers 218.

Referring to both FIGS. 9 and 10, when the received digital signals fill a receive DMA buffer 220, a DMA controller 222 issues a hardware interrupt 224. Hardware interrupt 224 causes a data acquisition system receive interrupt routine 226 to execute by way of an interrupt vector 228 and receive/transmit mode switch 230. In the receiving phase, mode switch 230 is set to a receive position by default. Within DAS receive interrupt routine 226, transmit-reception correlation is attempted on the data from the filled receive DMA buffer 220.

As discussed in a general sense before, successful correlation will switch DAS receive interrupt routine 226 from a correlation to a receive function thereby accepting the message precursor, minus the transmission/reception correlation detection sequence, and the message data. Transmission diversity is then determined in interrupt routine 226. Successful correlation causes the remaining message precursor and message data to be passed to a receive user buffer 232 for temporary storage. The remaining message precursor and message data is then passed to a message handler 234. Message handler 234 extracts the remaining message precursor including length, checksum, topside and downside headers. As touched upon briefly before, the length and checksum headers are used for error determination while the topside and downside headers are for control functions.

Upon extraction of the message precursor, message handler 234 routes the message data to a "foreground" transmit user buffer 236. "Foreground" transmit user buffer 236 then passes the digital message to a "background" interrupt driven transmit buffer 238. The digital message flows from interrupt driven transmit buffer 238 as conventional RS-232 serial data to be input into source/destination computer 240 thus completing the data reception phase.

In the transmission phase, RS-232 serial data is passed from source/destination computer 240 to an "background" interrupt driven receive buffer 242. When the message stops coming in from source/destination computer 240, it is transferred from interrupt driven receive buffer 242 to a "foreground" receive user buffer 244. The serial binary data is passed from receiver user buffer 244 to message handler 234. Message handler 23 routes the serial binary data from receiver user buffer 244 to an assemble routine incorporated within the handler. This assemble routine assembles the overhead byte, message precursor with the message data and converts this data string into code words used to control DAS 214. The code words are stored within a transmit user buffer 246 until message handler 234 initializes the transmit mode. Initialization of the transmit mode 248 causes mode switch 230 to switch to transmit mode and causes the installation of data acquisition system transmit interrupt routine 250 and installation of interrupt vector 228. Message handler 234 then initiates data acquisition system 214.

Referring to both FIGS. 9 and 10 initialization of data acquisition system 214 causes a sampling. These samples go into a transmit DMA buffer 252. When transmit DMA buffer 252 is filled, DMA controller 222 causes a hardware interrupt 224. Hardware interrupt 224 in turn causes DAS transmit interrupt routine 250 to execute by way of the mode 230 and interrupt vector 228 path. During execution of the transmit interrupt routine, a software interrupt 254 is generated to cause execution of a device driver routine within a device driver 256. Device driver 256 causes a switching of the DMA channels within DAS 214 and reprograms DMA controller 222 for the next transmit DMA buffer 252. Continuing within the data acquisition system transmit interrupt routine 250, code word data contained within transmit user buffer 246 will be passed to data acquisition system 214 one code word per hardware interrupt. This process continues until transmit user buffer 246 is emptied. The code words are converted into analog signals by data acquisition system 214 which controls transmit board 258. Transmit board 258 is one and the same as transmit cards 42 and 104 shown respectively in FIGS. 2 and 5. Transmit board 258 outputs an analog acoustic signal to the acoustic transducer interface system 210 to cause the propagation of acoustic tones through the aqueous medium.

Emptying of transmit user buffer 246 causes the system to reinitialize receive mode 260.

Initialization of the receive mode 260 causes DAS receive interrupt routine 226 and interrupt vector 228 to be installed. Mode switch 230 is set to the receive mode. Upon switching mode switch 230 to receive mode, DAS 214 is initiated and samples analog signals from receive boards 212. As receive DMA buffers 220, shown in FIG. 10, become filled, DMA controller 222 generates hardware interrupt 224. Hardware interrupt 224 causes DAS receive interrupt routine 226 to execute by way of interrupt vector 228 and mode switch 230. Data acquisition system receive interrupt routine 226 generates a software interrupt 254 which causes a device driver routine within device drive 256 to execute. This device driver routine causes a switching of DMA channels within DAS 214 and programs DMA controller 222 for the next receive DMA buffer 220, shown in FIG. 10. Data within receive DMA buffer 220 is accessed by DAS receive interrupt routine 226 for correlation/receive functions.

Commercially available software used in the conjunction with the IBM AT compatible computers utilized with the acoustic communication system of the invention are as follows:

1. The Greenleaf Comm Library, version 2.1 (c) by Greenleaf Software, Inc.

This software provides over 120 functions for controlling input/output lines, setting up and managing independent buffers, and allowing protocol transfers.

2. The Greenleaf Functions Library, Version 3.0 (c) by Greenleaf Software, Inc.

This software provides routines for video, graphics, disk operations, string manipulation, keyboard, time and day, printer interface, equipment determination, polled serial input/output (I/O), and additional functions.

3. ATLAB Version 01.00 (c) by Data Translation, Inc.

ATLAB is a real-time software package which supports Data Translation's DT2821 series high-performance analog and digital I/O boards for use with the IBM PC/AT or compatible micro computer system.

4. Microsoft C Compiler and Utilities, Version 5.00 (c) by Microsoft Corporation.

This package contains a "C" compiler.

5. Turbo C Compiler and Utilities, Version 1.00 (c) by Boreland International Corporation.

This package contains a "C" compiler, and utilities used to create interrupt service routines.

6. JET.COM Version 3.51 (c) 1982–1986 by Tall Tree Systems.

This is a high speed file transfer utility.

7. Microsoft Disk Operating System (MS-DOS) Version 3.1 (c).

This is a management operating system.

This software, of course, is offered by way of example as other software, other computer architecture or other computer types could be utilized in order to implement the functions of the adjustable diversity acoustic communication system of the invention. Furthermore, though the present embodiment of the invention requires operator interaction for mode adjustment, those skilled in the art will realize that these adjustments could be automated.

In the same regard, other acoustic transmission frequencies could be used. In a preferred embodiment of the invention frequencies within the 30,000 to 40,000 Hz range were selected to provide a large degree of attenuation of bottom reflected rays. Of course, other acoustic frequencies could be used. Further, though eight frequency shift key transmission channels, more or less channels could be used.

Obviously, those skilled in the art will realize that these and other modifications and variations of the invention are possible in light of the above teachings. Therefore, it is to be understood that within the scope of the following claims the invention may be practiced otherwise than is specifically described.

Navy Case No. 71243

APPENDIX I

ADATS_17.WSD

Tuesday, November 22, 1988
File Created: Tuesday, November 22, 1988 at 3:04 pm

---

OFF-THE-SHELF SOFTWARE USED FOR ADATS DEVELOPMENT

---

The Greenleaf Comm Library, Version 2.1 by Greenleaf Software Inc.

This library is a group of "C" functions designed for interrupt-driven communications over RS-232C serial channels. It provides over 120 functions for controlling the I/O lines on the ports, setting up and managing independent transmitter and receiver buffers, and allowing protocol transfers such as XMODEM and others.

The Greenleaf Functions Library, Version 3.0 by Greenleaf Software Inc.

This library is a group of over 200 "C" functions designed to allow the software designer to skip the task of writing the mundane routines and to concentrate on the higher-level application code. Routines are provided for video, graphics, disk operations, string manipulation, keyboard, time and date, printer interface, equipment determination, polled serial I/O, and additional functions.

ATLAB, Version 01.00 by Data Translation, Inc.

ATLAB is a real-time software package which supports Data Translation's DT2821 series high-performance analog and digital I/O boards designed for use with the IBM PC/AT or compatible microcomputer system. It runs under the Microsoft MSDOS operating system and consists of routines that can be called from the "C" programming language. ATLAB is a collection of functions which provide control of the I/O subsystems (A/D, D/A, and digital I/O) via DOS calls to the installable device driver which comes with the ATLAB package. Routines provided by ATLAB perform the following functions:

1. Single-value, non-DMA A/D, D/A and DIO transfers.
        2. Multiple-value, non-DMA A/D, D/A transfers to and from memory.
        3. DMA A/D and D/A transfers to and from memory.
        4. Allocation and management of the IBM PC/AT extended memory space.
        5. Data buffer management.
        6. On-board clock setup.
        7. Error Handling.

Microsoft C Compiler and Utilities, Version 5.00 by Microsoft Corp.

This package contains the "C" compiler used for all but the turbo.c module. The utilities contained in this package are also used in the creation of the executive (see the "MAKE" description file).

Turbo C Compiler and Utilities, Version 1.00 by Borland International Corp.

This package contains the "C" compiler, and utilities used to create the interrupt service routines in the file named "turbo.c". The libraries contained in this package are used in the creation of the executive (see the "LINK" description file).

JET.COM Version 3.51 (c)1982-1986 by Tall Tree Systems

This is a high speed file transfer utility. JET looks at the time and date of each file, and can transfer just those files whose times and dates meet your criteria: those that are more recent on the source diskette, those more recent than a certain date, and so on.

---

ADATS_16.WSD  Tuesday, November 22, 1988
File Created: Tuesday, November 22, 1988 at 10:43 am

---

OFF-THE-SHELF COMPONENTS FOR LOCAL ADATS SYSTEM

---

Model 8531-20 EGA/AT Rack-Mount Industrial Chassis w/Monitor
    Features: IBM-EGA Compatible, 9 Inch Diagonal Internal RGB Color Display
          Passive IBM-AT Compatible Backplane (7 16-Bit, 3 8-Bit Slots)
          External Keyswitch for Power, Reset, and Degaussing
          21 Megabyte Internal, 3.5 Inch Hard Disk Drive
          360 Kilobyte DSDD, 5.25 Inch Floppy Disk Drive
          Combination Floppy/Hard Disk Controller Card
          Utilizes 8.5 Inches of Rack Space
          Front Panel Keyboard Connector
          250 Watt Power Supply
          Light Pen Model B286-1MEG REV.D IBM-AT Compatible CPU Card
    Features: IBM-AT Compatible 80286 CPU w/One Megabyte RAM On-Board
          6 MHz and 10 MHz Software Selectable Clock Speeds
          Bootable w/o Keyboard or Monitor Connected
          Battery Backed Clock and Calendar
          80287 Math Co-Processor Installed
          External Push Button Reset Switch
          External Speaker Interface Jack
          16 Bit IBM-AT Bus Connectors
          One Megabyte RAM On-Board Model DT2821-G-16SE IBM-AT Compatible Analog and Digital I/O Board
    Features: 16SE Analog Inputs w/12-Bit Resolution w/250kHz Throughput
          Two 12-Bit Deglitched D/A Converters w/130kHz Throughput
          16 Digital Lines Configurable for I/O in Two 8-Bit Ports
          A/D, D/A, Digital I/O, and On-Board Pacer Clock Model JRAM-AT-3 2MB EMS Memory w/Serial/Parallel Module
    Features: One RS-232 Serial Port
          One Centronics Type Parallel Port
          Two Megabytes RAM Installed Model JRAM-AT-3 2MB EMS Memory w/Serial/Parallel Module
    Features: One RS-232 Serial Port
          One Centronics Type Parallel Port
          Two Megabytes RAM Installed Model AICP-KBRD03 Industrial Style Keyboard
    Features: Industrial IBM-AT Compatible Keyboard
          101 Full-Travel Keys Model AICP-6024 Keyboard Rack Mounting Drawer
    Features: Requires AICP-6023 Slides
          Utilizes 3.5 Inches of Rack Space Model AICP-6023 Rack Mounting Kit
    Features: Rack Mounting Slides for AICP-6024 Keyboard Drawer ADATS_16.WSD                                              Tuesday, November 22, 1988
                                      File Created: Tuesday, November 22, 1988 at 10:43 am

---

OFF-THE-SHELF COMPONENTS FOR REMOTE ADATS SYSTEM

---

Model FECC-8S  Card Cage w/Eight Slot Backplane Assembly
     Features: IBM-AT Passive Backplane (6-AT, 2-XT Slots)
               Dimensions: 14.375" x 8.875" x 6.3125"
               100% IBM-AT Bus Hardware Compatible
               Card Spacing on 0.8" Centers
               5 Stand Up Card Guides
               Perforated Top Cover
               Industrial Grade
               Fan Bracket Model B286-1MEG REV.D IBM-AT Compatible CPU Card
     Features: IBM-AT Compatible 80286 CPU w/One Megabyte RAM On-Board
               6 MHz and 10 MHz Software Selectable Clock Speeds
               Bootable w/o Keyboard or Monitor Connected
               Battery Backed Clock and Calendar
               80287 Math Co-Processor Installed
               External Push Button Reset Switch
               External Speaker Interface Jack
               16 Bit IBM-AT Bus Connectors
               One Megabyte RAM On-Board Model DT2821-G-16SE IBM-AT Compatible Analog and Digital I/O Board
     Features: 16SE Analog Inputs w/12-Bit Resolution w/250kHz Throughput
               Two 12-Bit Deglitched D/A Converters w/130kHz Throughput
               16 Digital Lines Configurable for I/O in Two 8-Bit Ports
               A/D, D/A, Digital I/O, and On-Board Pacer Clock Model BCMOS1-AT CMOS RAM/ROM Disk Card w/512 KB CMOS Static RAM
     Features: Permits Mixture of 28 Pin CMOS RAM, CMOS EPROM or EEPROM Chips
               RAM Expansion to 1.5 Megabytes w/Piggyback Module
               Emulates a Fixed Disk and Two Floppy Disks
               512 Kilobytes Battery-Backed Static RAM
               IBM-AT 16-Bit External Data Bus
               On-Board PROM Programmer Model BCMOS2-AT CMOS RAM/ROM Expansion Card w/1MB CMOS Static RAM
     Features: Provides One Megabyte of Additional CMOS Static RAM
               Connects to BCMOS1-AT Card Model 6123      CMOS Dual Serial Interface Card
     Features: Provides Two RS-232C Serial Interface Ports

---

Navy Case No. 71243

UTILITIES

MAKEFILE                                                  Tuesday, November 22, 1988
                                       File Created: Tuesday, November 22, 1988 at 1:18 pm

```
#          Adjustable Diversity Acoustic Telemetry System

#                            A D A T S

# Macros

SOURCE_DIR = \
     E:\ADATS\SRC

OBJECT_DIR = \
     C:\ADATS\OBJ

GL_OBJECTS = \
     $(OBJECT_DIR)\asixrecv.obj

TC_OBJECTS = \
     $(OBJECT_DIR)\turboc.obj

MSC_OBJECTS1 = \
     $(OBJECT_DIR)\acoustic.obj  $(OBJECT_DIR)\assemble.obj\
     $(OBJECT_DIR)\atlab.obj     $(OBJECT_DIR)\display.obj \
```

```
    $(OBJECT_DIR)\download.obj $(OBJECT_DIR)\erreport.obj\
    $(OBJECT_DIR)\events.obj   $(OBJECT_DIR)\formcode.obj\
    $(OBJECT_DIR)\globals.obj  $(OBJECT_DIR)\intrxint.obj\
    $(OBJECT_DIR)\inttxint.obj $(OBJECT_DIR)\keyboard.obj MSC_OBJECTS2 = \
    $(OBJECT_DIR)\logfiles.obj $(OBJECT_DIR)\main.obj    \
    $(OBJECT_DIR)\message.obj  $(OBJECT_DIR)\network.obj \
    $(OBJECT_DIR)\picinit.obj  $(OBJECT_DIR)\receive.obj \
    $(OBJECT_DIR)\transfer.obj $(OBJECT_DIR)\transmit.obj\
    $(OBJECT_DIR)\upload.obj 286_OBJECTS = \
    $(OBJECT_DIR)\support.286 $(OBJECT_DIR)\sysinit.286

386_OBJECTS = \
    $(OBJECT_DIR)\support.386 $(OBJECT_DIR)\sysinit.386

# -AL = Large model.
# -FPi = Floating Point emulator (uses 80287 if present)
# -G2  = Generates 80286 instructions.
# -Gs  = Removes calls to the stack-checking routine.
# -Gt  = Place items larger than "number" bytes in new segment
#        NOTE: -Gt8192 will correct stack overflow conditions.
# -Oi  = Enable intrinsic functions.
# -Ol  = Enable loop optimizations (use only on acoustic receiver).
# -Ot  = Optimize in favor of execution time.
# -W3  = Highest level of warning messages.
# -Zl  = Removes default library information.
# -Zp  = Pack structure members (required for Greenleaf functions).
# -c   = Compiles without linking.

COMPILER_FLAGS = \
    -AL -FPi -G2 -Gs -Gt8192 -Oit -W3 -Zl -Zp -c -DLINT_ARGS

# Dependencies

$(OBJECT_DIR)\acoustic.obj : $(SOURCE_DIR)\acoustic.c
cl -Fo$(OBJECT_DIR)\acoustic.obj $(COMPILER_FLAGS) -Ol $(SOURCE_DIR)\acoustic.c $(OBJECT_DIR)\asixrecv.obj : $(SOURCE_DIR)\asixrecv.c
cl -Fo$(OBJECT_DIR)\asixrecv.obj $(COMPILER_FLAGS) $(SOURCE_DIR)\asixrecv.c $(OBJECT_DIR)\assemble.obj : $(SOURCE_DIR)\assemble.c
cl -Fo$(OBJECT_DIR)\assemble.obj $(COMPILER_FLAGS) $(SOURCE_DIR)\assemble.c $(OBJECT_DIR)\atlab.obj    : $(SOURCE_DIR)\atlab.c
cl -Fo$(OBJECT_DIR)\atlab.obj $(COMPILER_FLAGS) $(SOURCE_DIR)\atlab.c $(OBJECT_DIR)\display.obj  : $(SOURCE_DIR)\display.c
cl -Fo$(OBJECT_DIR)\display.obj $(COMPILER_FLAGS) $(SOURCE_DIR)\display.c $(OBJECT_DIR)\download.obj : $(SOURCE_DIR)\download.c
cl -Fo$(OBJECT_DIR)\download.obj $(COMPILER_FLAGS) $(SOURCE_DIR)\download.c $(OBJECT_DIR)\erreport.obj : $(SOURCE_DIR)\erreport.c $(SOURCE_DIR)\errstrgs.h
cl -Fo$(OBJECT_DIR)\erreport.obj $(COMPILER_FLAGS) $(SOURCE_DIR)\erreport.c $(OBJECT_DIR)\events.obj   : $(SOURCE_DIR)\events.c
cl -Fo$(OBJECT_DIR)\events.obj $(COMPILER_FLAGS) $(SOURCE_DIR)\events.c $(OBJECT_DIR)\formcode.obj : $(SOURCE_DIR)\formcode.c
cl -Fo$(OBJECT_DIR)\formcode.obj $(COMPILER_FLAGS) $(SOURCE_DIR)\formcode.c $(OBJECT_DIR)\globals.obj  : $(SOURCE_DIR)\globals.c $(SOURCE_DIR)\buffers.h
cl -Fo$(OBJECT_DIR)\globals.obj $(COMPILER_FLAGS) $(SOURCE_DIR)\globals.c $(OBJECT_DIR)\intrxint.obj : $(SOURCE_DIR)\intrxint.c
cl -Fo$(OBJECT_DIR)\intrxint.obj $(COMPILER_FLAGS) $(SOURCE_DIR)\intrxint.c $(OBJECT_DIR)\inttxint.obj : $(SOURCE_DIR)\inttxint.c
cl -Fo$(OBJECT_DIR)\inttxint.obj $(COMPILER_FLAGS) $(SOURCE_DIR)\inttxint.c $(OBJECT_DIR)\keyboard.obj : $(SOURCE_DIR)\keyboard.c
cl -Fo$(OBJECT_DIR)\keyboard.obj $(COMPILER_FLAGS) $(SOURCE_DIR)\keyboard.c
```

```
$(OBJECT_DIR)\logfiles.obj : $(SOURCE_DIR)\logfiles.c
cl -Fo$(OBJECT_DIR)\logfiles.obj $(COMPILER_FLAGS) -D_360KB $(SOURCE_DIR)\logfiles.c $(OBJECT_DIR)\main.obj     : $(SOURCE_DIR)\main.c
cl -Fo$(OBJECT_DIR)\main.obj $(COMPILER_FLAGS) $(SOURCE_DIR)\main.c $(OBJECT_DIR)\message.obj  : $(SOURCE_DIR)\message.c
cl -Fo$(OBJECT_DIR)\message.obj $(COMPILER_FLAGS) $(SOURCE_DIR)\message.c $(OBJECT_DIR)\network.obj  : $(SOURCE_DIR)\network.c
cl -Fo$(OBJECT_DIR)\network.obj $(COMPILER_FLAGS) $(SOURCE_DIR)\network.c $(OBJECT_DIR)\picinit.obj  : $(SOURCE_DIR)\picinit.c
cl -Fo$(OBJECT_DIR)\picinit.obj $(COMPILER_FLAGS) $(SOURCE_DIR)\picinit.c $(OBJECT_DIR)\receive.obj  : $(SOURCE_DIR)\receive.c
cl -Fo$(OBJECT_DIR)\receive.obj $(COMPILER_FLAGS) $(SOURCE_DIR)\receive.c $(OBJECT_DIR)\support.286  : $(SOURCE_DIR)\support.c
cl -Fo$(OBJECT_DIR)\support.286 $(COMPILER_FLAGS) -D_80286 $(SOURCE_DIR)\support.c $(OBJECT_DIR)\support.386  : $(SOURCE_DIR)\support.c
cl -Fo$(OBJECT_DIR)\support.386 $(COMPILER_FLAGS) -D_80386 $(SOURCE_DIR)\support.c $(OBJECT_DIR)\sysinit.286  : $(SOURCE_DIR)\sysinit.c
cl -Fo$(OBJECT_DIR)\sysinit.286 $(COMPILER_FLAGS) -D_80286 $(SOURCE_DIR)\sysinit.c $(OBJECT_DIR)\sysinit.386  : $(SOURCE_DIR)\sysinit.c
cl -Fo$(OBJECT_DIR)\sysinit.386 $(COMPILER_FLAGS) -D_80386 $(SOURCE_DIR)\sysinit.c $(OBJECT_DIR)\transfer.obj : $(SOURCE_DIR)\transfer.c
cl -Fo$(OBJECT_DIR)\transfer.obj $(COMPILER_FLAGS) $(SOURCE_DIR)\transfer.c $(OBJECT_DIR)\transmit.obj : $(SOURCE_DIR)\transmit.c
cl -Fo$(OBJECT_DIR)\transmit.obj $(COMPILER_FLAGS) $(SOURCE_DIR)\transmit.c $(OBJECT_DIR)\upload.obj   : $(SOURCE_DIR)\upload.c
cl -Fo$(OBJECT_DIR)\upload.obj $(COMPILER_FLAGS) $(SOURCE_DIR)\upload.c

#     NOTE: turboc.c is compiled by Borland TurboC

# -1  = 80286 code generation.
# -G  = Optimize for speed.
# -I  = Include path.
# -O  = Optimize jumps.
# -c  = Compile without linking.
# -d  = Merge duplicate strings.
# -ml = Large model.
# -o  = Output filename.
# -w  = Enable warnings.

$(OBJECT_DIR)\turboc.obj : $(SOURCE_DIR)\turboc.c $(SOURCE_DIR)\tc.h
    echo Turbo C Version 1.0 Copyright (c) 1987 Borland International>con:
    tcc -ml -G -1 -w -c -O -d -o$(OBJECT_DIR)\turboc.obj -Ic:\turboc\include \
        -Ic:\gl\msc4 -I$(SOURCE_DIR) $(SOURCE_DIR)\turboc.c

# Link

#     NOTE: TURBOC.OBJ must be the last object file in link list.

c:\adats\adats.286: $(MSC_OBJECTS1) $(MSC_OBJECTS2) $(286_OBJECTS) $(GL_OBJECTS) $(TC_OBJECTS)
    echo Microsoft (R) Overlay Linker Version 3.61>con:
    echo Copyright (C) Microsoft Corp 1983-1987. All rights reserved.>con:
    link @c:\adats\util\linkfile.286
    exemod c:\adats\adats.exe -stack FFF
    copy c:\adats\adats.exe c:\adats\adats.286 c:\adats\adats.386: $(MSC_OBJECTS1) $(MSC_OBJECTS2) $(386_OBJECTS) $(GL_OBJECTS) $(TC_OBJECTS)
    echo Microsoft (R) Overlay Linker Version 3.61>con:
    echo Copyright (C) Microsoft Corp 1983-1987. All rights reserved.>con:
    link @c:\adats\util\linkfile.386
    exemod c:\adats\adats.exe -stack FFF
    copy c:\adats\adats.exe c:\adats\adats.386
```

LINKFILE.286

Tuesday, November 22, 1988
File Created: Thursday, August 11, 1988 at 7:44 pm

```
c:\adats\obj\acoustic.obj  +
c:\adats\obj\asixrecv.obj  +
c:\adats\obj\assemble.obj  +
c:\adats\obj\atlab.obj     +
c:\adats\obj\display.obj   +
c:\adats\obj\download.obj  +
c:\adats\obj\erreport.obj  +
c:\adats\obj\events.obj    +
c:\adats\obj\formcode.obj  +
c:\adats\obj\globals.obj   +
c:\adats\obj\intrxint.obj  +
c:\adats\obj\inttxint.obj  +
c:\adats\obj\keyboard.obj  +
c:\adats\obj\logfiles.obj  +
c:\adats\obj\main.obj      +
c:\adats\obj\message.obj   +
c:\adats\obj\network.obj   +
c:\adats\obj\picinit.obj   +
c:\adats\obj\receive.obj   +
c:\adats\obj\support.286   +
c:\adats\obj\sysinit.286   +
c:\adats\obj\transfer.obj  +
c:\adats\obj\transmit.obj  +
c:\adats\obj\upload.obj    +
c:\adats\obj\turboc.obj    +
/NODEFAULTLIBRARYSEARCH    +
/EXEPACK                   +
/SEGMENTS:256
c:\adats\adats.exe
nul.map
e:\lib\gfcl.lib    +
e:\lib\gfl.lib     +
e:\lib\atlcl.lib   +
e:\lib\llibce.lib  +
e:\lib\cl.lib
```

LINKFILE.386

Tuesday, November 22, 1988
File Created: Thursday, August 11, 1988 at 7:44 pm

```
c:\adats\obj\acoustic.obj  +
c:\adats\obj\asixrecv.obj  +
c:\adats\obj\assemble.obj  +
c:\adats\obj\atlab.obj     +
c:\adats\obj\display.obj   +
c:\adats\obj\download.obj  +
c:\adats\obj\erreport.obj  +
c:\adats\obj\events.obj    +
c:\adats\obj\formcode.obj  +
c:\adats\obj\globals.obj   +
c:\adats\obj\intrxint.obj  +
c:\adats\obj\inttxint.obj  +
c:\adats\obj\keyboard.obj  +
c:\adats\obj\logfiles.obj  +
c:\adats\obj\main.obj      +
c:\adats\obj\message.obj   +
c:\adats\obj\network.obj   +
c:\adats\obj\picinit.obj   +
c:\adats\obj\receive.obj   +
c:\adats\obj\support.386   +
c:\adats\obj\sysinit.386   +
c:\adats\obj\transfer.obj  +
c:\adats\obj\transmit.obj  +
c:\adats\obj\upload.obj    +
c:\adats\obj\turboc.obj    +
/NODEFAULTLIBRARYSEARCH    +
/EXEPACK                   +
/SEGMENTS:256
c:\adats\adats.exe
nul.map
e:\lib\gfcl.lib    +
e:\lib\gfl.lib     +
e:\lib\atlcl.lib   +
e:\lib\llibce.lib  +
e:\lib\cl.lib
```

```
CONFIG.BOT                                    Tuesday, November 22, 1988
                          File Created: Thursday, August 11, 1988 at 7:44 pm DEVICE=C:\dos\vdisk.sys 384 512 512 /E:1
DEVICE=C:\dos\ansi.sys
DEVICE=C:\adats\util\atldrv.sys
BUFFERS=40
FILES=20

CONFIG.TOP                                    Tuesday, November 22, 1988
                          File Created: Thursday, August 11, 1988 at 7:44 pm DEVICE=C:\dos\vdisk.sys 1481 512 512 /E:1
DEVICE=C:\dos\vdisk.sys 3639 512 512 /E:8
DEVICE=C:\dos\ansi.sys
DEVICE=C:\adats\util\atldrv.sys
BUFFERS=40
FILES=20

AUTOEXEC.BOT                                  Tuesday, November 22, 1988
                          File Created: Thursday, August 11, 1988 at 7:44 pm BREAK on
VERIFY on
PROMPT $t$h$h$h$h$h$h $p$g
PATH C:;C:\;C:\util\jram;C:\dos;C:\adats\bat;C:\norton
COMMAND /C JET_UP
COMMAND /C SET_DIR
ADATS dwn 7 5 1 off
COMMAND /C JET_DN
C:\AUTOEXEC AUTOEXEC.TOP                                  Tuesday, November 22, 1988
                          File Created: Thursday, August 11, 1988 at 7:44 pm BREAK on
VERIFY on
PROMPT $t$h$h$h$h$h$h $p$g
PATH E:\bin;C:;C:\;C:\util\jram;C:\dos;C:\adats\bat;C:\norton
MD E:\bin
COPY C:\util\jram\jet.com   E:\bin
COPY C:\util\misc\d.com     E:\bin
COPY C:\norton\beep.exe     E:\bin
SA bright yellow on blue
COMMAND /C JET_UP
COMMAND /C SET_DIR
ADATS top 7 5 0 on
COMMAND /C JET_DN MAKE_LOG.BAT                                  Tuesday, November 22, 1988
                          File Created: Thursday, August 11, 1988 at 7:44 pm ECHO off
BREAK off
VERIFY on
CLS
TYPE C:\adats\util\make_log.1
TYPE C:\adats\util\make_log.2
TYPE C:\adats\util\make_log.3
TYPE C:\adats\util\make_log.4
BEEP /D2 /F700
FORMAT A:
CLS
TYPE C:\adats\util\make_log.1
TYPE C:\adats\util\make_log.5
COPY C:\adats\%1.top A:\
COPY C:\adats\%1.ssc A:\
TYPE C:\adats\util\make_log.6
D A:\
TYPE C:\adats\util\make_log.7
DEL C:\adats\%1.top
DEL C:\adats\%1.ssc
BEEP /D2 /F700
```

SET_DIR.BAT                                    Tuesday, November 22, 1988
                              File Created: Thursday, August 11, 1988 at 7:44 pm

```
ECHO off
CLS
CD C:\adats
CD D:\adats
D:
ECHO on
```

JET_DN.BAT                                     Tuesday, November 22, 1988
                              File Created: Thursday, August 11, 1988 at 7:44 pm

```
MD  C:\adats
JET D:\adats C:\ C:\adats\util\jet_dn.lst /F
JET D:\adats C:\adats
```

JET_UP.BAT                                     Tuesday, November 22, 1988
                              File Created: Thursday, August 11, 1988 at 7:44 pm

```
MD  D:\adats
JET C:\adats D:\adats C:\adats\util\jet_up.lst /F
```

ROSETTA.DLD                                    Tuesday, November 22, 1988
                              File Created: Thursday, August 11, 1988 at 7:44 pm

```
D:config
D:autoexec
D:rosetta.uld
D:rosetta.dlt
D:adats
```

ROSETTA.DLT                                    Tuesday, November 22, 1988
                              File Created: Thursday, August 11, 1988 at 7:44 pm

```
C:logfile.dwn
```

ROSETTA.ULD                                    Tuesday, November 22, 1988
                              File Created: Thursday, August 11, 1988 at 7:44 pm

```
C:rosetta.dlt
C:logfile.dwn
```

ROSETTA.ULT                                    Tuesday, November 22, 1988
                              File Created: Wednesday, August 17, 1988 at 2:02 pm

```
C:rosetta.dld
C:config.bot
C:autoexec.bot
C:rosetta.uld
C:rosetta.dlt
C:adats.286
```

JET_DN.LST                                     Tuesday, November 22, 1988
                              File Created: Thursday, August 11, 1988 at 7:44 pm

```
AUTOEXECBAT
CONFIG  SYS
```

JET_UP.LST                              Tuesday, November 22, 1988
                         File Created: Thursday, August 11, 1988 at 7:44 pm

```
ADATS   EXE
ROSETTA DLD
ROSETTA DLT
ROSETTA ULD
ROSETTA ULT
```

JET_1.LST                               Tuesday, November 22, 1988
                         File Created: Thursday, August 11, 1988 at 7:44 pm

```
ADATS   EXE
AUTOEXECBOT
AUTOEXECTOP
CONFIG  BOT
CONFIG  TOP
ROSETTA DLD
ROSETTA DLT
ROSETTA ULD
ROSETTA ULT
```

JET_2.LST                               Tuesday, November 22, 1988
                         File Created: Thursday, August 11, 1988 at 7:44 pm

```
JET_DN  BAT
JET_UP  BAT
SET_DIR BAT
SET_ENV BAT
```

JET_3.LST                               Tuesday, November 22, 1988
                         File Created: Thursday, August 11, 1988 at 7:44 pm

```
ATLDRV  SYS
JET_DN  LST
JET_UP  LST
```

ADLBOT.BAT                              Tuesday, November 22, 1988
                         File Created: Thursday, August 11, 1988 at 7:44 pm

```
COMMAND /C JET_UP
COMMAND /C SET_DIR
REM ADATS dwn 7 5 1 off
ADATS dwn 7 5 1 on
COMMAND /C JET_DN
ADLBOT
```

ADLTOP.BAT                              Tuesday, November 22, 1988
                         File Created: Thursday, August 11, 1988 at 7:44 pm

```
COMMAND /C JET_UP
COMMAND /C SET_DIR
ADATS top 7 5 0 on
COMMAND /C JET_DN
```

M.BAT                                   Tuesday, November 22, 1988
                         File Created: Thursday, August 11, 1988 at 7:44 pm

```
ECHO off
CLS
JET C:\adats\src\*.c E:\adats\src /128
IF ERRORLEVEL 1 GOTO JETERROR
JET C:\adats\src\*.h E:\adats\src /128
IF ERRORLEVEL 1 GOTO JETERROR
MAKE C:\adats\util\makefile>E:out
```

```
IF ERRORLEVEL 1 GOTO MAKERROR
GOTO END
:JETERROR
ECHO ERROR JET: Did not update ramdisc!
BEEP /D2 /F3000
GOTO END
:MAKERROR
ECHO ERROR make: did not make ADATS.EXE
BEEP /D2 /F3000
GOTO END
:END
BEEP /D2 /F2500
```

PRTADATS.BAT                                       Tuesday, November 22, 1988
                                  File Created: Tuesday, November 22, 1988 at 7:28 am

```
REM
REM ********************* SOURCE *********************
REM
COMMAND /C C:\bat\lphp C:\adats\src\ACOUSTIC.C
COMMAND /C C:\bat\lphp C:\adats\src\ASSEMBLE.C
COMMAND /C C:\bat\lphp C:\adats\src\ATLAB.C
COMMAND /C C:\bat\lphp C:\adats\src\DISPLAY.C
COMMAND /C C:\bat\lphp C:\adats\src\DOWNLOAD.C
COMMAND /C C:\bat\lphp C:\adats\src\ERREPORT.C
COMMAND /C C:\bat\lphp C:\adats\src\EVENTS.C
COMMAND /C C:\bat\lphp C:\adats\src\FORMCODE.C
COMMAND /C C:\bat\lphp C:\adats\src\GLOBALS.C
COMMAND /C C:\bat\lphp C:\adats\src\INTRXINT.C
COMMAND /C C:\bat\lphp C:\adats\src\INTTXINT.C
COMMAND /C C:\bat\lphp C:\adats\src\KEYBOARD.C
COMMAND /C C:\bat\lphp C:\adats\src\LOGFILES.C
COMMAND /C C:\bat\lphp C:\adats\src\MAIN.C
COMMAND /C C:\bat\lphp C:\adats\src\MESSAGE.C
COMMAND /C C:\bat\lphp C:\adats\src\NETWORK.C
COMMAND /C C:\bat\lphp C:\adats\src\PICINIT.C
COMMAND /C C:\bat\lphp C:\adats\src\RECEIVE.C
COMMAND /C C:\bat\lphp C:\adats\src\SUPPORT.C
COMMAND /C C:\bat\lphp C:\adats\src\SYSINIT.C
COMMAND /C C:\bat\lphp C:\adats\src\TRANSFER.C
COMMAND /C C:\bat\lphp C:\adats\src\TRANSMIT.C
COMMAND /C C:\bat\lphp C:\adats\src\TURBOC.C
COMMAND /C C:\bat\lphp C:\adats\src\UPLOAD.C
REM
REM ********************* HEADERS *********************
REM
COMMAND /C C:\bat\lphp C:\adats\src\ATLAB.H
COMMAND /C C:\bat\lphp C:\adats\src\BUFFERS.H
COMMAND /C C:\bat\lphp C:\adats\src\ERRCODES.H
COMMAND /C C:\bat\lphp C:\adats\src\ERRSTRGS.H
COMMAND /C C:\bat\lphp C:\adats\src\EXTERNS.H
COMMAND /C C:\bat\lphp C:\adats\src\GLC.H
COMMAND /C C:\bat\lphp C:\adats\src\GLF.H
COMMAND /C C:\bat\lphp C:\adats\src\MS.H
COMMAND /C C:\bat\lphp C:\adats\src\SYSTEM.H
COMMAND /C C:\bat\lphp C:\adats\src\TC.H
COMMAND /C C:\bat\lphp C:\adats\src\USRDEFS.H
REM
REM ********************* SUPPORT *********************
REM
COMMAND /C C:\bat\lphp C:\adats\util\JET_1.LST
COMMAND /C C:\bat\lphp C:\adats\util\JET_2.LST
COMMAND /C C:\bat\lphp C:\adats\util\JET_3.LST
COMMAND /C C:\bat\lphp C:\adats\util\JET_DN.LST
COMMAND /C C:\bat\lphp C:\adats\util\JET_UP.LST
COMMAND /C C:\bat\lphp C:\adats\util\LINKFILE.286
COMMAND /C C:\bat\lphp C:\adats\util\LINKFILE.386
COMMAND /C C:\bat\lphp C:\adats\util\MAKEFILE
COMMAND /C C:\bat\lphp C:\adats\util\MAKE_MSG.1
COMMAND /C C:\bat\lphp C:\adats\util\MAKE_MSG.2
COMMAND /C C:\bat\lphp C:\adats\util\MAKE_MSG.3
COMMAND /C C:\bat\lphp C:\adats\util\MAKE_MSG.4
COMMAND /C C:\bat\lphp C:\adats\util\MAKE_MSG.5
COMMAND /C C:\bat\lphp C:\adats\util\MAKE_MSG.6
COMMAND /C C:\bat\lphp C:\adats\util\MAKE_MSG.7
COMMAND /C C:\bat\lphp C:\adats\util\MAKE_MSG.LOG
REM
REM ***************** RUN-TIME FILES *******************
REM
```

```
COMMAND /C C:\bat\lphp C:\adats\AUTOEXEC.BOT
COMMAND /C C:\bat\lphp C:\adats\AUTOEXEC.TOP
COMMAND /C C:\bat\lphp C:\adats\CONFIG.BOT
COMMAND /C C:\bat\lphp C:\adats\CONFIG.TOP
COMMAND /C C:\bat\lphp C:\adats\ROSETTA.DLD
COMMAND /C C:\bat\lphp C:\adats\ROSETTA.DLT
COMMAND /C C:\bat\lphp C:\adats\ROSETTA.ULD
COMMAND /C C:\bat\lphp C:\adats\ROSETTA.ULT
REM
REM ******************* BATCH FILES *******************
REM
COMMAND /C C:\bat\lphp C:\adats\bat\ADLBOT.BAT
COMMAND /C C:\bat\lphp C:\adats\bat\ADLTOP.BAT
COMMAND /C C:\bat\lphp C:\adats\bat\JET_DN.BAT
COMMAND /C C:\bat\lphp C:\adats\bat\JET_UP.BAT
COMMAND /C C:\bat\lphp C:\adats\bat\M.BAT
COMMAND /C C:\bat\lphp C:\adats\bat\MAKE_LOG.BAT
COMMAND /C C:\bat\lphp C:\adats\bat\PRTADATS.BAT
COMMAND /C C:\bat\lphp C:\adats\bat\SET_DIR.BAT
COMMAND /C C:\bat\lphp C:\adats\bat\STATIC.BAT
```

PRTADATS.BAT                                     Tuesday, November 22, 1988
                                  File Created: Tuesday, November 22, 1988 at 7:28 am

```
REM
REM ********************** MISC ************************
REM
COMMAND /C C:\bat\lphp C:\CONFIG.SYS
COMMAND /C C:\bat\lphp C:\AUTOEXEC.BAT
COMMAND /C C:\bat\lphp C:\bat\ADLENV.BAT
```

STATIC.BAT                                       Tuesday, November 22, 1988
                                  File Created: Wednesday, August 17, 1988 at 1:57 pm

```
ECHO off
CLS
WIPEDISK D:
FORMAT D:/V/S
CLS
MD    D:\adats
MD    D:\adats\bat
MD    D:\adats\util
MD    D:\dos
MD    D:\norton
MD    D:\sidekick
MD    D:\util
MD    D:\util\jram
DEL   C:\adats\*.bak
COPY  C:\command.com            D:\
COPY  C:\adats\autoexec.bot     D:\autoexec.bat
COPY  C:\adats\config.bot       D:\config.sys
JET   C:\adats                  D:\adats       C:\adats\util\jet_up.lst /F
JET   C:\adats\bat              D:\adats\bat   C:\adats\util\jet_2.lst  /F
JET   C:\adats\util             D:\adats\util  C:\adats\util\jet_3.lst  /F
JET   C:\dos\ansi.sys           D:\dos
JET   C:\dos\assign.com         D:\dos
JET   C:\dos\chkdsk.com         D:\dos
JET   C:\dos\comp.com           D:\dos
JET   C:\dos\fdisk.com          D:\dos
JET   C:\dos\format.com         D:\dos
JET   C:\dos\mode.com           D:\dos
JET   C:\dos\vdisk.sys          D:\dos
JET   C:\norton\beep.exe        D:\norton
JET   C:\norton\sd.exe          D:\norton
JET   C:\norton\si.exe          D:\norton
JET   C:\norton\wipedisk.exe    D:\norton
JET   C:\sidekick\skn.com       D:\sidekick
JET   C:\util\jram\jet.com      D:\util\jram
COMP  D:\adats                  C:\adats
COMP  D:\adats\util             C:\adats\util
COMP  D:\autoexec.bat           C:\adats\autoexec.bot
COMP  D:\command.com            C:\command.com
COMP  D:\config.sys             C:\adats\config.bot
COMP  D:\dos                    C:\dos
COMP  D:\norton                 C:\norton
COMP  D:\sidekick               C:\sidekick
COMP  D:\util\jram              C:\util\jram
SD D:
ECHO on
CLS
```

```
CONFIG.SYS                                              Tuesday, November 22, 1988
                                      File Created: Friday, October 28, 1988 at 7:42 am DEVICE=C:\dos\vdisk.sys 1481 512 512 /E:1
DEVICE=C:\dos\vdisk.sys 3639 512 512 /E:8
DEVICE=C:\dos\ansi.sys
DEVICE=C:\adats\util\atldrv.sys
DEVICE=C:\msmouse\msmouse.sys /1
BUFFERS=40
FILES=20

AUTOEXEC.BAT                                            Tuesday, November 22, 1988
                                       File Created: Tuesday, April 26, 1988 at 8:30 am CLS
REM ..... INSTALL AUTOEXEC ENVIRONMENT
PATH=E:\BIN;C:\DOS;C:\BAT
BREAK ON
VERIFY ON
GRAPHICS
REM ..... INSTALL SCREEN COLORS
CD C:\NORTON
SA BRIGHT WHITE ON BLUE
CLS
REM ..... INSTALL WORDFINDER
CD C:\WORDFIND
WF
CLS
REM ..... INSTALL SIDEKICK
CD C:\SIDEKICK
SK
CLS
REM ..... JET REGULARLY USED UTILITIES TO RAMDISC - E:\BIN
ECHO OFF
MD  E:\BIN
COPY C:\UTIL\JRAM\JET.COM       E:\BIN
JET C:\MSC5\BIN\C?.EXE          E:\BIN /128
JET C:\MSC5\BIN\LINK.EXE        E:\BIN
JET C:\MSC5\BIN\MAKE.EXE        E:\BIN
JET C:\NORTON\BEEP.EXE          E:\BIN
JET C:\NORTON\LP.EXE            E:\BIN
JET C:\NORTON\TS.EXE            E:\BIN
JET C:\TURBOC\TCC.EXE           E:\BIN
JET C:\TURBOC\TOUCH.COM         E:\BIN
JET C:\UTIL\MISC\*.COM          E:\BIN
JET C:\UTIL\SETUP\SHUTDOWN.EXE  E:\BIN
JET C:\WS4\W*.OVR               E:\BIN
JET C:\WS4\WS.EXE               E:\BIN
ECHO ON
CLS
REM ..... JET REGULARLY USED HEADERS TO RAMDISC - E:\INCLUDE
ECHO OFF
MD  E:\INCLUDE
MD  E:\INCLUDE\SYS
JET C:\ATLAB\atlerrs.c      E:\INCLUDE /128
JET C:\GL\MSC4\*.h          E:\INCLUDE
JET C:\MSC5\INCLUDE\*.h     E:\INCLUDE
JET C:\MSC5\INCLUDE\SYS\*.h E:\INCLUDE\SYS /32
ECHO ON
CLS
REM ..... JET REGULARLY USED LIBRARIES TO RAMDISC - E:\LIB
ECHO OFF
MD  E:\LIB
JET C:\ATLAB\atlcl.lib      E:\LIB /32
JET C:\GL\MSC4\*.lib        E:\LIB
JET C:\MSC5\LIB\llibce.lib  E:\LIB
JET C:\TURBOC\LIB\cl.lib    E:\LIB
ECHO ON
CLS
REM ..... CHECK HARD DISC & RAM DISC INTEGRITY
CHKDSK C:\*.* /F
CHKDSK D:\*.* /F
CHKDSK E:\*.* /F
CD C:\
CLS
REM ..... INSTALL PERMANENT SYSTEM ENVIRONMENT
SYSENV
```

ADLENV.BAT                                              Tuesday, November 22, 1988
                                    File Created: Tuesday, April 26, 1988 at 8:38 am

```
ECHO off
CLS
C:
MD E:\ADATS
MD E:\ADATS\SRC
CD E:\ADATS\SRC
CD C:\ADATS\SRC
PATH E:;E:\BIN;E:\ADATS\SRC;C:\ADATS\BAT;C:;C:\;C:\DOS;C:\BAT;C:\MSC5\BIN;C:\PC-LINT;C:\TURBOC;C:\MASM;C:\NORTON
SPATH E:;E:\BIN;E:\ADATS\SRC;C:\ADATS\BAT;C:;C:\;C:\DOS;C:\BAT;C:\MSC5\BIN;C:\PC-LINT;C:\TURBOC;C:\MASM;C:\NORTON
SET INCLUDE=E:\INCLUDE;E:\ADATS\SRC
SET ENV=ADL
BREAK on
ECHO on
CLS
D
VER
```

Navy Case No. 71243

SOURCE

ACOUSTIC.C                                              Tuesday, November 22, 1988
                                    File Created: Monday, August 29, 1988 at 6:16 pm

```
            /**** ADATS SYNC/RECEIVER CODE ****/

/***************************************************************************
*                                                                          *
*           CREATED by H.B. McCRACKEN      8/27/87                         *
*                                                                          *
*   The Sync/Receiver code has 2 basic mode of of operation:               *
*   1. Sync Mode and 2. Receive Mode                                       *
*                                                                          *
*   In the sync mode the data received from the A/D interrupt routine      *
*   is check for the start of transmission sync sequences. When the        *
*   sync sequences is received the Receive mode is entered.                *
*                                                                          *
*   Sync - Data from the 2 hope groups is sum and then window averaged     *
*   The average of the 2 hope groups is then correlated with the 8 bit     *
*   sync sequence.                                                         *
*                                                                          *
*   Receive - Receive mode is broken in the 4 diversity levels. Each       *
*   of which operates on the data in the same basic manner. The channels   *
*   with the same data bits are summed and then window averaged over       *
*   the number of samples per tone. The average of the data channels       *
*   is then sampled at the expected peck value to determine the value      *
*   of the bit. The data bits are then assembled to form the data bites.   *
*   Because of the doppler shift the location actual peak may vary from    *
*   the expected location. These location difference are averaged over     *
*   a number of bits and used to corrected the expected location.          *
*                                                                          *
****************************************************************************
*                                                                          *
*   8/27/87 comments added to code.  HBM                                   *
*   8/31/87 initial integration with ADATS system.  LJB                    *
*   9/18/87 Implement correlation to determine "n".  LJB                   *
*   9/22/87 changed implemention of "n" correlation   HBM                  *
*   9/22/87 Implemented code for dertermenation of "d"  HBM                *
*   9/23/87 Changed Master and DMA Buffer Sizes to 8192/2048 LJB           *
*   10/5/87 Modularized code into procedures LJB                           *
*    1/4/88 Set _getacousticrx = EMPTY and _acoustic_rxcount = 0           *
*           for mismatched length bytes LJB                                *
*   2/22/88 Added call to ATLAB (al_stop) after byte buffer is FULL to     *
*           cause DMA opeations to shut down as soon as possible LJB       *
*   3/16/88 Removed call to ATLAB (al_stop) after suspecting trouble       *
*           interfacing with shutdown_atlab(). LJB                         *
*   8/18/88 Replaced printf() calls with sprintf() and putmsg(). LJB       *
*                                                                          *
****************************************************************************/ include <system.h> define CORRELATE          1
define CORRSIZ           16
#define COR THRESHOLD   9000
```

```
#define DIFFSIZ              64
#define GROUPSIZ             256
#define HISTORICAL_LIMIT     (GROUPSIZ - MAX_N)
#define MAX_N                64
#define MIN_COR_THRESHOLD    1000
#define NGROUPS              5
#define THRESHOLD            0
#define TIME_INTERVALS       32
#define WINDOWSIZ            1024
define WORDSIZ              16 static void acoustic_receive     (void);
static void assemble_bit         (int diversity);
static void assemble_byte        (int diversity);
static void avg_data_groups      (int diversity);
static void calc_peak_time_diff  (void);
static void correlate            (void);
static void initialize_recd      (int diversity);
static void recd                 (int diversity);
static void reset_AB             (void);
static void sample_adjust        (void);
static void sum_data_groups      (int diversity);

static BOOL display_flag;       /* request flag for display */
static BYTE bix;                /* bit index */
static BYTE j;                  /* sample group index "*/
static BYTE j_1;                /* "j-1" */
static BYTE j_n;                /* "j-n" */
static BYTE j_old;              /* old copy of j */
static char end_of_msg;         /* is the flag used to signal end of msg. */
static char first_buffer_after_sync;
static char ixc[NGROUPS];       /* temporary index for correlation */

ACOUSTIC.C                              Tuesday, November 22, 1988
                           File Created: Monday, August 29, 1988 at 6:16 pm static char ixca;               /* temporary index for cor_avg array */
static char sync_det;           /* is the flag used to signal sync det. */
static int  *mb;                /* master data buffer */ static int  ACavg[NGROUPS][WINDOWSIZ]; /* window of "n" averages of "a" correlation group */
static int  ACsum[NGROUPS][GROUPSIZ];  /* the sum of the "a" correlation group */
static int  BCavg[NGROUPS][WINDOWSIZ]; /* window of "n" averages of "b" correlation group */
static int  BCsum[NGROUPS][GROUPSIZ];  /* the sum of the "b" correlation group */ static int  Aavg[GROUPSIZ];     /* is a window of "n" averages of "a" group */
static int  Bavg[GROUPSIZ];     /* is a window of "n" averages of "b" group */
static int  Cavg[GROUPSIZ];     /* is a window of "n" averages of "c" group */
static int  Davg[GROUPSIZ];     /* is a window of "n" averages of "d" group */
static int  Eavg[GROUPSIZ];     /* is a window of "n" averages of "e" group */
static int  Favg[GROUPSIZ];     /* is a window of "n" averages of "f" group */
static int  Gavg[GROUPSIZ];     /* is a window of "n" averages of "g" group */
static int  Havg[GROUPSIZ];     /* is a window of "n" averages of "h" group */ static int  Asum[GROUPSIZ];     /* "Asum" is the sum of the "a" group */
static int  Bsum[GROUPSIZ];     /* "Bsum" is the sum of the "b" group */
static int  Csum[GROUPSIZ];     /* "Csum" is the sum of the "c" group */
static int  Dsum[GROUPSIZ];     /* "Dsum" is the sum of the "d" group */
static int  Esum[GROUPSIZ];     /* "Esum" is the sum of the "e" group */
static int  Fsum[GROUPSIZ];     /* "Fsum" is the sum of the "f" group */
static int  Gsum[GROUPSIZ];     /* "Gsum" is the sum of the "g" group */
static int  Hsum[GROUPSIZ];     /* "Hsum" is the sum of the "h" group */ static int  T[4];               /* temporary for correlation */
static int  avg_tdiff;          /* "tdiff/TIME_INTERVALS" */
static int  bitavg[WORDSIZ];    /* bit accumulator for assembling into bytes */
static int  cor;                /* correlation value in the sync mode */
static int  cor_avg[NGROUPS][CORRSIZ]; /* array for finding cor. threshold */
static int  cor_thres_hold;     /* correlation threshold */
static int  cor_thres_hold_trip[NGROUPS];
static int  coridx[CORRSIZ];    /* array use as an index for the correlation */
static int  d;                  /* diversity level */
static int  diff[DIFFSIZ];      /* differences between the expected and */
                                /* actual location of the Aavg bit peaks */
static int  end_of_data;        /* defined the end of valid data in "mb" */
static int  expa;               /* expected value of "j" of the "a" hop */
                                /* group at peak */
static int  expb;               /* expected value of "j" of the "b" hop */
                                /* group at peak */
static int  i;                  /* master buffer index */
static int  ix;                 /* temp. index used in initalization */
```

```
static int  ixjn;               /* temporary index used in the correlation */
static int  jalt;               /* alternate "j" index used in A&Bavg */
static int  jalt_1;             /* "jalt-1" */
static int  jalt_old;           /* old copy of jalt */
static int  jx;                 /* temp index used in initialization */
static int  maxpeak;            /* used to store max. peak in cor. */
static int  min_cor_thres_hold; /* minimum correlation threshold */
static int  n;                  /* number of samples per tone */
static int  n_index;            /* index into Aavg/Bavg arrays */
static int  q;                  /* bite index for "_byteb" */
static int  qrx;                /* used as a temporary index */
static int  t;                  /* used to store "j" at max bite peak */
static int  tdiff;              /* total difference */ static int  time[NGROUPS];      /* used to store "i" at cor. maxpeak */
static int  tmpmax;             /* maximum cor threshold and sample adjust */

/****************************************************************************
 *                                                                          *
 *                            R E C                                         *
 *                                                                          *
 ****************************************************************************/
void rec()
{
    /*
     * Initialize.
     */
    _system_flags.end_of_data += (TOTAL_REC_SCANS / REC_BUFFERS);
    end_of_data = (int)_system_flags.end_of_data;
    i = (end_of_data - ((TOTAL_REC_SCANS / REC_BUFFERS) - 1));

if(sync_det == FALSE) {
        n = 2;
        d = 0;
        n_index = (-1);
        j_old = j;
        jalt_old = jalt;
    }
    while((sync_det == FALSE) && (n < 64)) {
        n *= 2;
        n_index++;
        j = j_old;
        jalt = jalt_old;
        i = (end_of_data - ((TOTAL_REC_SCANS / REC_BUFFERS) - 1));
        correlate();
    }
    acoustic_receive();
}

/****************************************************************************
 *                                                                          *
 *                         C O R R E L A T E                                *
 *                                                                          *
 ****************************************************************************/
static void correlate()
{
    if(display_flag == CORRELATE) {
        clrcrt(CORRELATE_LOC);
        putbox(CORRELATE_LOC);
        sprintf((char*)_display[CORRELATE_LOC].buffer
            ,"Listening... Press Home for menu.");
        putmsg(CORRELATE_LOC,NONE,STRNG);
        display_flag = THRESHOLD;
    } while(((i + 8) <= (end_of_data + 1)) && (sync_det == FALSE)) {
        /*
         * Sum the data channel groups in to the respected hope groups.
         */
        if(n_index == 0) {
            ACsum[n_index][j] = (mb[i+0] + mb[i+2] + mb[i+4] + mb[i+6]);
            BCsum[n_index][j] = (mb[i+1] + mb[i+3] + mb[i+5] + mb[i+7]);
        }
        else {
            ACsum[n_index][j] = ACsum[n_index - 1][j];
            BCsum[n_index][j] = BCsum[n_index - 1][j];
        }
        i += 8;

/*
         * Find the average of the hope groups over the tone period.
         *
```

```
 *  NOTE:   required because j-X changes form to int and it
 *          must remain a BYTE (0-255)
 */
j_n = (j - n);

/*
 * required for end around of A&Bsum because WINDOWSIZ length.
 */
jalt_1 = (jalt - 1);
if(jalt_1 < 0)
     jalt_1 = (WINDOWSIZ + jalt_1);

ACavg[n_index][jalt] = ACavg[n_index][jalt_1]
                    + ((ACsum[n_index][j] - ACsum[n_index][j_n])/n);
BCavg[n_index][jalt] = BCavg[n_index][jalt_1]
                    + ((BCsum[n_index][j] - BCsum[n_index][j_n])/n);
/*
 * find cor_thres_hold.
 *
 * find the maximum value of Aavg over a period of 2n and
 * then average the last 4 of then to fine the threshold.
 */
if((j % (2 * n)) != 0) {
     if(abs(ACavg[n_index][jalt]) > tmpmax)
          tmpmax = abs(ACavg[n_index][jalt]);
     if(abs(BCavg[n_index][jalt]) > tmpmax)
          tmpmax = abs(BCavg[n_index][jalt]);
}
else {
     if(abs(ACavg[n_index][jalt]) > tmpmax)
          tmpmax = abs(ACavg[n_index][jalt]);
     if(abs(BCavg[n_index][jalt]) > tmpmax)
          tmpmax = abs(BCavg[n_index][jalt]);
     cor_avg[n_index][ixc[n_index]] = tmpmax;
     tmpmax = 0;
     cor_thres_hold = 0;
     ixc[n_index] = ((ixc[n_index] + 1) % 4);

for(ixca = 0; ixca < 4; ixca++)
          cor_thres_hold = (cor_thres_hold
                          + (cor_avg[n_index][ixca] / 4));

cor_thres_hold = (cor_thres_hold - (cor_thres_hold / 3));
     if(cor_thres_hold < min_cor_thres_hold)
          cor_thres_hold = min_cor_thres_hold;

}
/*
 * CORRELATION FOR SYNC
 *
 * Compute the indexes required to index the Aavg & Bavg
 * for the correlation.
 */
for(ixjn = 0; ixjn < CORRSIZ; ixjn++) {
     coridx[ixjn] = jalt - (ixjn * n);
     if(coridx[ixjn] < 0)
          coridx[ixjn] = (WINDOWSIZ + coridx[ixjn]);
}
/*
 * do the bit correlation of A&B looking of sync.
 */
T[0] =((-BCavg[n_index][coridx[0]]  + ACavg[n_index][coridx[1]]) >>2)
    +(( BCavg[n_index][coridx[2]]  + ACavg[n_index][coridx[3]]) >>2);

T[1] =(( BCavg[n_index][coridx[4]]  - ACavg[n_index][coridx[5]]) >>2)
    +(( BCavg[n_index][coridx[6]]  + ACavg[n_index][coridx[7]]) >>2);

T[2] =((-BCavg[n_index][coridx[8]]  - ACavg[n_index][coridx[9]]) >>2)
    +(( BCavg[n_index][coridx[10]] - ACavg[n_index][coridx[11]])>>2);

T[3] =((-BCavg[n_index][coridx[12]] + ACavg[n_index][coridx[13]])>>2)
    +((-BCavg[n_index][coridx[14]] + ACavg[n_index][coridx[15]])>>2);

cor = ((T[0] + T[1]) >> 2) + ((T[2] + T[3]) >> 2);

/*
 * check the correlation peak for greater than the threshold and
 * then find the location of the peck which set the sync_det.
 */
if(cor > cor_thres_hold) {
     if(cor > maxpeak) {
          maxpeak = cor;
          time[n_index] = i;
```

```
                }
                if(!cor_thres_hold_trip[n_index]) {
                    clrcrt(CORRELATE_LOC);
                    sprintf((char*)_display[CORRELATE_LOC].buffer
                        ,"Peak Correlation = %4.4d   Threshold = %4.4d",maxpeak
                        ,cor_thres_hold);
                    putmsg(CORRELATE_LOC,NONE,STRNG);
                    display_flag = CORRELATE;
                }
                cor_thres_hold_trip[n_index] = TRUE;
            }
            else {
                if(cor_thres_hold_trip[n_index]) {
                    sync_det = TRUE;
                    i = time[n_index];
                    maxpeak = 0;
                    first_buffer_after_sync = TRUE;
                    /*clrcrt(CORRELATE_LOC);
                    sprintf((char*)_display[CORRELATE_LOC].buffer
                        ,"Samples_per_tone = %d",n);
                    putmsg(CORRELATE_LOC,NONE,STRNG);*/
                }
            }
            /*
             * increment "j" and "altj" for the next sample group.
             */
            j++;
            jalt = ((jalt + 1) % WINDOWSIZ);
        }
}

/*****************************************************************************
 *                                                                           *
 *                    A C O U S T I C   R E C E I V E                        *
 *                                                                           *
 *****************************************************************************/
static void acoustic_receive()
{
    /*
     * Based on diversity level select the correct receiver code.
     */
    if(n > 4)
        d = 4;

if((sync_det == TRUE) && (i < (end_of_data + 1))) {
        /*clrcrt(CORRELATE_LOC);
        sprintf((char*)_display[CORRELATE_LOC].buffer
            ,"Sync = %d Samples_per_tone = %d Diversity = %d i = %d"
            ,sync_det,n,d,i);
        putmsg(CORRELATE_LOC,NONE,STRNG);*/ switch(d) {
        case 0:
            recd(0);
            if(sync_det != WRONG_d)
              break;
        case 1:
            recd(1);
            if(sync_det != WRONG_d)
                break;
        case 2:
            recd(2);
            if(sync_det != WRONG_d)
                break;
        case 4:
            recd(4);
            break;

default:
            d = 4;
            n = 4;
            recd(4);
            break;
        }
    }
}

/*****************************************************************************
 *                                                                           *
 *                            R E C D                                        *
 *                                                                           *
 *****************************************************************************/
static void recd(diversity)
int diversity;
{
```

```
/*
 * Check for the first buffer sync_det.
 * Initialize the required buffers and index.
 * Reset "i" if at the end of buffer.
 */
if(first_buffer_after_sync) {
    initialize_recd(diversity);
    t = expa = (int)(j + n - 1);
    expb = (expa * n);
}
i %= TOTAL_REC_SCANS;

/*
 * Sum the data channel groups in to their respective bit groups.
 */
while((i + 8) != (end_of_data + 9) && (sync_det == TRUE) && !end_of_msg) {
    /*
     * Sum the data channel data groups together
     * Find the average of the data groups over the tone period.
     */
    sum_data_groups(diversity);
    i += 8;
    j_n = (j - n);
    j_1 = (j - 1);
    avg_data_groups(diversity);
    if (d != 0)
        sample_adjust();
    assemble_bit(diversity);
    assemble_byte(diversity);
    j++;
    }
}

/****************************************************************************
 *                                                                          *
 *                    I N I T I A L I Z E   R E C D                         *
 *                                                                          *
 ****************************************************************************/
static void initialize_recd(diversity)
int diversity;
{
    for(ix = 0; ix < DIFFSIZ; ix++)
        diff[ix] = 0;

switch(diversity) {
    case 0:
        for(jx = 0; jx < GROUPSIZ; jx++) {
            Asum[jx] = Aavg[jx] = 0;
            Bsum[jx] = Bavg[jx] = 0;
            Csum[jx] = Cavg[jx] = 0;
            Dsum[jx] = Davg[jx] = 0;
            Esum[jx] = Eavg[jx] = 0;
            Fsum[jx] = Favg[jx] = 0;
            Gsum[jx] = Gavg[jx] = 0;
            Hsum[jx] = Havg[jx] = 0;
        }
        break;
    case 1:
        for(jx = 0; jx < GROUPSIZ; jx++) {
            Asum[jx] = Aavg[jx] = 0;
            Bsum[jx] = Bavg[jx] = 0;
            Csum[jx] = Cavg[jx] = 0;
            Dsum[jx] = Davg[jx] = 0;
            Esum[jx] = Eavg[jx] = 0;
            Fsum[jx] = Favg[jx] = 0;
            Gsum[jx] = Gavg[jx] = 0;
            Hsum[jx] = Havg[jx] = 0;
        }
        break;
    case 2:
        for(jx = 0; jx < GROUPSIZ; jx++) {
            Asum[jx] = Aavg[jx] = 0;
            Bsum[jx] = Bavg[jx] = 0;
            Csum[jx] = Cavg[jx] = 0;
            Dsum[jx] = Davg[jx] = 0;
        }
        break;
    case 4:
        for(jx = 0; jx < GROUPSIZ; jx++) {
            Asum[jx] = Aavg[jx] = 0;
            Bsum[jx] = Bavg[jx] = 0;
        }
        break;
```

```
            }
            j = 0;
            q = 0;
            ix = 0;
            bix = 0;
            sync_det = TRUE;
            end_of_msg = FALSE;
            cor_thres_hold_trip[n_index] = FALSE;
            first_buffer_after_sync = FALSE;
}

/****************************************************************************
*                                                                           *
*                       S U M   D A T A   G R O U P S                       *
*                                                                           *
****************************************************************************/
static void sum_data_groups(diversity)
int diversity;
{
    /*
     * Sum the data channel data groups together
     */
    switch(diversity) {
    case 0:
        Asum[j] = mb[i+0];
        Bsum[j] = mb[i+1];
        Csum[j] = mb[i+2];
        Dsum[j] = mb[i+3];
        Esum[j] = mb[i+4];
        Fsum[j] = mb[i+5];
        Gsum[j] = mb[i+6];
        Hsum[j] = mb[i+7];
        break;
    case 1:
        Asum[j] = mb[i+0];
        Bsum[j] = mb[i+2];
        Csum[j] = mb[i+4];
        Dsum[j] = mb[i+6];
        Esum[j] = mb[i+1];
        Fsum[j] = mb[i+3];
        Gsum[j] = mb[i+5];
        Hsum[j] = mb[i+7];

break;
    case 2:
        Asum[j] = mb[i+0] + mb[i+2];
        Bsum[j] = mb[i+4] + mb[i+6];
        Csum[j] = mb[i+1] + mb[i+3];
        Dsum[j] = mb[i+5] + mb[i+7];
        break;
    case 4:
        Asum[j] = (mb[i+0] + mb[i+2] + mb[i+4] + mb[i+6]) >> 1;
        Bsum[j] = (mb[i+1] + mb[i+3] + mb[i+5] + mb[i+7]) >> 1;
        break;
    }
}

/****************************************************************************
*                                                                           *
*                   A V E R A G E   D A T A   G R O U P S                   *
*                                                                           *
****************************************************************************/
static void avg_data_groups(diversity)
int diversity;
{
    /*
     * Find the average of the data groups over the tone period.
     */
    switch(diversity) {
    case 0:
        Aavg[j] = Aavg[j_1] + ((Asum[j] - Asum[j_n]) / n);
        Bavg[j] = Bavg[j_1] + ((Bsum[j] - Bsum[j_n]) / n);
        Cavg[j] = Cavg[j_1] + ((Csum[j] - Csum[j_n]) / n);
        Davg[j] = Davg[j_1] + ((Dsum[j] - Dsum[j_n]) / n);
        Eavg[j] = Eavg[j_1] + ((Esum[j] - Esum[j_n]) / n);
        Favg[j] = Favg[j_1] + ((Fsum[j] - Fsum[j_n]) / n);
        Gavg[j] = Gavg[j_1] + ((Gsum[j] - Gsum[j_n]) / n);
        Havg[j] = Havg[j_1] + ((Hsum[j] - Hsum[j_n]) / n);
        break;
    case 1:
        Aavg[j] = Aavg[j_1] + ((Asum[j] - Asum[j_n]) / n);
        Bavg[j] = Bavg[j_1] + ((Bsum[j] - Bsum[j_n]) / n);
```

```
            Cavg[j] = Cavg[j_1] + ((Csum[j] - Csum[j_n]) / n);
            Davg[j] = Davg[j_1] + ((Dsum[j] - Dsum[j_n]) / n);
            Eavg[j] = Eavg[j_1] + ((Esum[j] - Esum[j_n]) / n);
            Favg[j] = Favg[j_1] + ((Fsum[j] - Fsum[j_n]) / n);
            Gavg[j] = Gavg[j_1] + ((Gsum[j] - Gsum[j_n]) / n);
            Havg[j] = Havg[j_1] + ((Hsum[j] - Hsum[j_n]) / n);
            break;
        case 2:
            Aavg[j] = Aavg[j_1] + ((Asum[j] - Asum[j_n]) / n);
            Bavg[j] = Bavg[j_1] + ((Bsum[j] - Bsum[j_n]) / n);
            Cavg[j] = Cavg[j_1] + ((Csum[j] - Csum[j_n]) / n);
            Davg[j] = Davg[j_1] + ((Dsum[j] - Dsum[j_n]) / n);
            break;
        case 4:
            Aavg[j] = Aavg[j_1] + ((Asum[j] - Asum[j_n]) / n);
            Bavg[j] = Bavg[j_1] + ((Bsum[j] - Bsum[j_n]) / n);
            break;
    }
}

/****************************************************************************
 *                                                                          *
 *                      A S S E M B L E   B I T                             *
 *                                                                          *
 ****************************************************************************/
static void assemble_bit(diversity)
int diversity;
{
    /*
     * START BIT ASSEMBLY
     * When "j" = "expa":
     *      Save the respective bit samples averages for later
     *      conversion into the data bytes.
     */
    switch(diversity) {
    case 0:
        if(j == (BYTE)expa) {
            bitavg[bix] = Aavg[j];
            bix++;
            bitavg[bix] = Bavg[j];
            bix++;
            bitavg[bix] = Cavg[j];
            bix++;
            bitavg[bix] = Davg[j];
            bix++;
            bitavg[bix] = Eavg[j];
            bix++;
            bitavg[bix] = Favg[j];
            bix++;
            bitavg[bix] = Gavg[j];
            bix++;
            bitavg[bix] = Havg[j];
            bix++;
            expa = ((expa + n) % GROUPSIZ);
        }
        break;

case 1:
        if(j == (BYTE)expa) {
            bitavg[bix] = Aavg[j];
            bix++;
            bitavg[bix] = Bavg[j];
            bix++;
            bitavg[bix] = Cavg[j];
            bix++;
            bitavg[bix] = Davg[j];
            bix++;
            expb = ((expa + n) % GROUPSIZ);
        }
        if(j == (BYTE)expb) {
            bitavg[bix] = Eavg[j];
            bix++;
            bitavg[bix] = Favg[j];
            bix++;
            bitavg[bix] = Gavg[j];
            bix++;
            bitavg[bix] = Havg[j];
            bix++;
        }
        break;
    case 2:
        if(j == (BYTE)expa) {
```

```
                bitavg[bix] = Aavg[j];
                bix++;
                bitavg[bix] = Bavg[j];
                bix++;

expb = ((expa + n) % GROUPSIZ);
            }
            if(j == (BYTE)expb) {
                bitavg[bix] = Cavg[j];
                bix++;
                bitavg[bix] = Davg[j];
                bix++;
            }
            break;

case 4:
            if(j == (BYTE)expa) {
                bitavg[bix] = Aavg[j];
                bix++;
                expb = ((expa + n) % GROUPSIZ);
            }
            if(j == (BYTE)expb) {
                bitavg[bix] = Bavg[j];
                bix++;
            }
            break;
        }
}

/****************************************************************************
 *                                                                          *
 *                      A S S E M B L E   B Y T E                           *
 *                                                                          *
 ****************************************************************************/
static void assemble_byte(diversity)
int diversity;
{
    int next_diversity;

/*
     * Initialize the next diversity to try.
     */
    switch(diversity) {
    case 0:
        next_diversity = 1;
        break;
    case 1:
        next_diversity = 2;
        break;
    case 2:
        next_diversity = 4;
        break;
    case 4:
        next_diversity = 0;
        break;
    }

/*
     * Start byte assembly.
     * When all 8 bit of a byte are saved then assemble the bits into
     * the data bytes ( where "bix" is the bit index and "q" is the
     * byte index.
     */
    if(bix >= 8) {
        bix = 0;
        _byteb[q] = 0;
        while(bix < 8) {
            if(bitavg[bix] > 0)
                _byteb[q] |= 128;
            if(bix < 7)
                _byteb[q] >>= 1;
            bix++;
        }
        bix = 0;

/*
         * Check the first byte for the first start byte.
         * If correct: the diversity is correct.
         * If incorrect: try the next diversity.
         */
```

```c
    /*
     * Check the third and fourth bytes for the two Length bytes.
     * Verify that they are the same.
     *      If not the same - trash the message.
     */
    if(q == 3) {
        if(_byteb[2] != _byteb[3]) {
            /*clrcrt(CORRELATE_LOC);
            sprintf((char*)_display[CORRELATE_LOC].buffer
                    ,"Length 1 = %d  Length 2 = %d",_byteb[2],_byteb[3]);
            putmsg(CORRELATE_LOC,NONE,STRNG);*/ reset_AB();
            _acoustic_rxcount = 0;
            _getacousticrx = EMPTY;
        }
    }
    /*
     * If sync_det and q == 3 set fill_flag for filling.
     */
    if((q == 3) && (sync_det == TRUE)) {
        /*clrcrt(CORRELATE_LOC);
        sprintf((char*)_display[CORRELATE_LOC].buffer,"FILLING");
        putmsg(CORRELATE_LOC,NONE,STRNG);*/
        _getacousticrx = FILLING;
    }

/*
     * check for the finish of the data message and set the
     * _getacousticrx = FULL
     */
    if((q > 3) && (q == (_byteb[2] + (HEADER_BYTES - 1)))) {
        end_of_msg = TRUE;
        /*
         * Send message to main routine
         * NOTE: checksum not included in count
         */
        reset_AB();
        _acoustic_rxcount = (int)_byteb[3];
        _getacousticrx = FULL;
    }
    /*clrcrt(CORRELATE_LOC);
    sprintf((char*)_display[CORRELATE_LOC].buffer
            ,"_byteb[q] = %X q = %d j = %d tdiff = %d",_byteb[q],q,j,tdiff);
    putmsg(CORRELATE_LOC,NONE,STRNG);*/
    q++;
    }
}
```

```
/*************************************************************************
 *                                                                       *
 *                      S A M P L E   A D J U S T                        *
 *                                                                       *
 *************************************************************************/
static void sample_adjust()
{
    /*
     * Start the sample adjust.
     * The sample adjust finds the actual location of the average
     * peak of Aavg and compares it with the predicted location of
     * of the peak and finds the the difference and averages the
     * difference over the number of TIME_INTERVALS for the adjustment
     * to the new predicted peak.
     */
    if((j > (BYTE)((n / 2) + 1)) && (j < (BYTE)((GROUPSIZ - 1) - (n / 2)))) {
        if((j > (BYTE)(expa - (n / 2))) && (j < (BYTE)(expa + (n / 2)))) {
            if(abs(Aavg[j]) > tmpmax) {
                tmpmax = abs(Aavg[j]); /* new max value */
                t = (int)j;  /* t is the time at which max occurred */
            }
        }
    }
    if(j == (BYTE)((expa + (n / 2)) % GROUPSIZ))
        calc_peak_time_diff();
}

/*************************************************************************
 *                                                                       *
 *                          R E S E T   A B                              *
 *                                                                       *
 *************************************************************************/
```

```c
static void reset_AB()
{
    for(n_index = 0; n_index < NGROUPS; n_index++) {
        for(jalt = 0; jalt < WINDOWSIZ; jalt++) {
            ACavg[n_index][jalt] = 0;
            BCavg[n_index][jalt] = 0;
        }
    }
    for(n_index = 0; n_index < NGROUPS; n_index++) {
        for(jalt = HISTORICAL_LIMIT; jalt < GROUPSIZ; jalt++) {
            ACsum[n_index][jalt] = 0;
            BCsum[n_index][jalt] = 0;
        }
    }
    for(jalt = 0; jalt < WINDOWSIZ; jalt++) {
        Aavg[jalt] = 0;
        Bavg[jalt] = 0;
    }
    for(jalt = HISTORICAL_LIMIT; jalt < GROUPSIZ; jalt++) {
        Asum[jalt] = 0;
        Bsum[jalt] = 0;
    }
    sync_det = FALSE;
    jalt = 0;
    j = (GROUPSIZ - 1);
    d = 0;
}

/****************************************************************************
 *                                                                          *
 *        C A L C U L A T E   P E A K   T I M E   D I F F E R E N C E       *
 *                                                                          *
 ****************************************************************************/
static void calc_peak_time_diff()
{
    diff[ix] = (t - expa);
    tdiff = 0;
    for(qrx = 0; qrx < TIME_INTERVALS; qrx++)
        tdiff = (tdiff + diff[qrx]);
    ix = ((ix + 1) % TIME_INTERVALS);
    avg_tdiff = (tdiff / TIME_INTERVALS);
    expa = ((expa + (2 * n) + avg_tdiff) % GROUPSIZ);
    t = expa;
    tmpmax = 0;
}

/****************************************************************************
 *                                                                          *
 *                      I N I T I A L I Z E   R E C                         *
 *                                                                          *
 ****************************************************************************/
void initialize_rec()
{
    mb = (int*)_master_dma_buffer;
    reset_AB();
    min_cor_thres_hold      = MIN_COR_THRESHOLD;
    cor_thres_hold          = COR_THRESHOLD;
    _system_flags.end_of_data = (TOTAL_REC_SCANS - 1);
    display_flag            = CORRELATE;

end_of_msg              = FALSE;
    first_buffer_after_sync = FALSE;
    sync_det                = FALSE;

ixc[0]   = 0;
    jalt     = 0;
    jalt_old = 0;
    j        = 0;
    j_old    = 0;
    i        = 0;
    q        = 0;
}
```

```
/*
┌─────────────────────────────────────────────────────────────────────┐
│                           - A D A T S -                              │
│              Adjustable Diversity Acoustic Telemetry System          │
├──────────────────────────────────────┬──────────────────────────────┤
│ Module Name: ASSEMBLE.C              │ Written By: Leon J. Bodzin   │
├──────────────────────────────────────┴──────────────────────────────┤
│                                                                      │
│   Synopsis:  This module contains functions used for building the   │
│              transmission data string. The string has the following format: │
│                                                                      │
│             ┌─────────┬─────┬──────┬────────┬───────┬────────┬───────┐│
│             │Detection│Start│Length│Checksum│Topside│Downside│Message...│
│             └─────────┴─────┴──────┴────────┴───────┴────────┴───────┘│
│             |<- DET ->|<------------- HEADER ------------>|<-- DAT -->|│
│                                                                      │
│             Detection ... Used to form a signal pattern which will trigger │
│                           the acoustic receiver from the 'correlate' mode │
│                           into a 'receive' mode. These bytes are always │
│                           converted to D/A control codes using diversity 2 │
│                           (see the detection_block[] array & FORMCODE.C). │
│                                                                      │
│             Start ....... Used by the acoustic receiver to indicate the │
│                           'start' of incoming data.                  │
│                                                                      │
│             Length ...... Used by the acoustic receiver to collect this │
│                           number of data bytes before indicating that a │
│                           reception has been completed.              │
│                                                                      │
│             Checksum .... Calculated checksum value of the 'Topside', │
│                           'Downside', and 'Message' bytes of the data │
│                           string. Used by main application program to │
│                           validate the incoming message.             │
│                                                                      │
│             Topside ..... Contains command/control bit fields mostly │
│                           representing the Topside ADATS configuration │
│                           (see build_transmission()).                │
│                                                                      │
│             Downside .... Contains command/control bit fields mostly │
│                           representing the Downside ADATS configuration │
│                           (see build_transmission()).                │
│                                                                      │
│             Message ..... Variable length field containing the data which │
│                           originated from the source computer.       │
│                                                                      │
│   Revisions: 26APR88 ... Added documentation headers.               │
│                                                                      │
└─────────────────────────────────────────────────────────────────────┘
*/
#include <system.h>

/*
┌─────────────────────────────────────────────────────────────────────┐
│                    S T A T I C   F U N C T I O N S                   │
└─────────────────────────────────────────────────────────────────────┘
*/
static int  build_transmission     (BYTE *data,WORD bytes);
static void construct_control_byte (BYTE type);

/*
┌─────────────────────────────────────────────────────────────────────┐
│                    S T A T I C   V A R I A B L E S                   │
└─────────────────────────────────────────────────────────────────────┘
*/

/*
┌─────────────────────────────────────────────────────────────────────┐
│                      S T A T I C   A R R A Y S                       │
└─────────────────────────────────────────────────────────────────────┘
*/
static BYTE transmission [DETECTION_BYTES + HEADER_BYTES + MESSAGE_LIMIT];

static BYTE detection_block [] = {
     0xFC,
     0x33,
     0x0C,
     0xCF,
     0x3F
};

static BYTE start_block [] = {
     START_BYTE_1,
     START_BYTE_2
};
```

```
/*
```

| Function Name: assemble | Type: EXTERN |
|---|---|

| Definition: | BYTE *assemble(outport,inport,message_length) |
|---|---|
| | int    outport;       the port to assemble the message for |
| | int    inport;        the port from which data originated |
| | WORD *message_length; passed in: # bytes in message |
| |                           returned: # bytes in transmission |
| Description: | assemble() builds a 'transmission'. The 'transmission' is an array of BYTES containing the entire string of data to be sent to the outport. |
| | When the outport header flag is ON - the 'transmission' contains the acoustic detection bytes (DET), the header bytes (HEADER), and the message bytes (DAT). |
| | When the outport header flag is OFF - the 'transmission' contains the message bytes (DAT) only. |
| Return Value: | assemble() returns a pointer to the 'transmission'. The length of the transmission is returned via 'message_length'. |
| | Value                    Meaning |
| | NULL                     Transmission was not assembled |
| Side Effects: | None. |

```
*/
BYTE *assemble(outport,inport,message_length)
int    outport;
int    inport;
WORD *message_length;
{
    /*
     * Verify that the inport is valid before using it.
     * Build a transmission data string.
     * Verify that the outport is valid before using it.
     * If outport headers are ON:
     *      Adjust the message length to reflect the total length.
     * If outport headers are OFF:
     *      Strip the DET and HEADER bytes from the transmission by moving
     *          the message (DAT) to the start of the transmission buffer.
     * Return the transmission pointer.
     */
    if(is_port_valid(inport) != TRUE) {
        _status = ERR_INVALID_PORT;
        error_report(ERR_ASSEMBLE,USR1,ERRCODE);
        return(NULL);
    }
    if((_status = build_transmission(_port_stuff[inport].buffer
    ,*message_length)) != ERR_NONE) {
        error_report(ERR_ASSEMBLE,inport,ERRCODE);
        return(NULL);
    }
    if(is_port_valid(outport) != TRUE) {
        _status = ERR_INVALID_PORT;
        error_report(ERR_ASSEMBLE,inport,ERRCODE);
        return(NULL);
    }
    if(_port_stuff[outport].header == ON)
        *message_length += (DETECTION_BYTES + HEADER_BYTES);
    else {
        if((*message_length < 0)
        || (*message_length > sizeof(transmission))) {
            _status = ERR_MEMMOVE;
            error_report(ERR_ASSEMBLE,outport,ERRCODE);
            return(NULL);
        }
        memmove((char*)transmission
            ,(char*)&transmission[DETECTION_BYTES + HEADER_BYTES]
            ,*message_length);
    }
    return(transmission);
}
```

/*

| Function Name: build_transmission | Type: STATIC |
|---|---|

Definition:   int build_transmission(data,bytes)
              BYTE *data;  message (DAT) in transmission string
              WORD  bytes; number of bytes in message Description:  build_transmission() builds the transmission data string
              by inserting the detection bytes, header bytes and message
              bytes into the transmission buffer.

The detection bytes are static values defined in the array:
              detection_block[]. The header bytes consist of start bytes,
              block length bytes, the checksum byte, and the topside &
              downside control bytes.

The start bytes are static values. The block length bytes
              are copies of each other and have a value from 0 to 255
              inclusive. The block length value is the number of bytes
              which makes up the message data only. The checksum byte is
              calculated on the topside byte, the downside byte, and the
              message bytes. The topside and downside command bytes are
              bit fields formed from various control bits.

Return Value: build_transmission() returns a status code indicating
              success or failure.

| Value | Meaning |
|---|---|
| ERR_NONE | Transmission was built |
| ERR_BUILD_TRANSMISSION | Transmission was not built |

Side Effects: None.

*/

```
static int build_transmission(data,bytes)
BYTE *data;
WORD  bytes;
{
    BYTE checksum_index;  /* index into transmission for start of checksum */
    BYTE offset;          /* offset index into sub-arrays of transmission  */
    BYTE total_checksum;  /* checksum value of topside, downside & message */
    WORD checksum_length; /* number of bytes to checksum                   */
    WORD message_index;   /* index into transmission buffer                */

/*
     * Initialize the transmission buffer index.
     * Copy the detection bytes into the transmission block.
     * Copy the header bytes into the transmission block.
     */
    message_index = 0;

for(offset = 0; offset < DETECTION_BYTES; offset++)
        transmission[message_index + offset] = detection_block[offset];
    message_index += DETECTION_BYTES;

for(offset = 0; offset < START_BYTES; offset++)
        transmission[message_index + offset] = start_block[offset];
    message_index += START_BYTES;

for(offset = 0; offset < BLKLENGTH_BYTES; offset++)
        transmission[message_index + offset] = (BYTE)bytes;
    message_index += (BLKLENGTH_BYTES + CHECKSUM_BYTES);

/*
     * Construct the topside byte with system configuration data:
     * Insert the topside byte into the transmission.
     */
    construct_control_byte(TOPSIDE);
    transmission[message_index] = _topside_byte;
    message_index += TOPSIDE_BYTES;

/*
     * Construct the downside byte with system configuration data:
     * Insert the downside byte into the transmission.
     */
    construct_control_byte(DOWNSIDE);
```

```c
        transmission[message_index] = _downside_byte;
        message_index += DOWNSIDE_BYTES;

/*
         * Insert the message bytes into the transmission buffer.
         * Calculate the checksum on the topside, downside and the message bytes.
         * Insert the checksum value into the transmission.
         */
        if((bytes < 0) || (bytes > (sizeof(transmission) - message_index))) {
                _status = ERR_MEMCPY;
                error_report(ERR_BUILD_TRANSMISSION,USR1,ERRCODE);
                return(ERR_BUILD_TRANSMISSION);
        }
        memcpy((char*)&transmission[message_index],(char*)data,bytes);

checksum_length = (TOPSIDE_BYTES + DOWNSIDE_BYTES + bytes);
        checksum_index  = (DETECTION_BYTES + START_BYTES + BLKLENGTH_BYTES
                        + CHECKSUM_BYTES);

if((_status = checksum(&transmission[checksum_index],checksum_length
        ,&total_checksum)) != ERR_NONE) {
                error_report(ERR_BUILD_TRANSMISSION,USR1,ERRCODE);
                return(ERR_BUILD_TRANSMISSION);
        }
        transmission[checksum_index - CHECKSUM_BYTES] = total_checksum;
        return(ERR_NONE);
}
```

/*

| Function Name: construct_control_byte | Type: STATIC |
|---|---|

| Definition: | void construct_control_byte(type) BYTE type; type of control byte to construct |
|---|---|
| Description: | construct_control_byte() assembles the TOPSIDE or DOWNSIDE control byte from the various control bits. The bytes have the following format: |

| Diversity Control Code | Echo/Channel | Dnload | Upload | Xducer |
|---|---|---|---|---|

| Return Value: | None. |
|---|---|
| Side Effects: | The global variables: _topside_byte & _downside_byte are assigned values by setting their bit fields according to their definition. |

*/

```c
static void construct_control_byte(type)
BYTE type;
{
        /*
         * Based on the type of control byte:
         *      Assign the diversity control_code bits.
         *      Assign the echo/channel command bits.
         *      Assign the dnload command bits.
         *      Assign the upload command bits.
         *      Assign the transducer selection bit.
         */
        switch(type) {
        case TOPSIDE:
                _topside_byte = 0;
                _topside_byte |= _topside_link_flags.control_code;
                _topside_byte <<= ECHO_BITS;
                _topside_byte |= _system_flags.echo;
                _topside_byte <<= DNLOAD_BITS;
                _topside_byte |= _topside_link_flags.dnload_mode;
                _topside_byte <<= UPLOAD_BITS;
                _topside_byte |= _topside_link_flags.upload_mode;
                _topside_byte <<= XDUCER_BITS;
                _topside_byte |= _topside_link_flags.transducer;
                break;
        case DOWNSIDE:
                _downside_byte = 0;
                _downside_byte |= _downside_link_flags.control_code;
                _downside_byte <<= CHANNEL_BITS;
```

```
            _downside_byte |= _system_flags.channel;
            _downside_byte <<= DNLOAD_BITS;
            _downside_byte |= _downside_link_flags.dnload_mode;
            _downside_byte <<= UPLOAD_BITS;
            _downside_byte |= _downside_link_flags.upload_mode;
            _downside_byte <<= XDUCER_BITS;
            _downside_byte |= _downside_link_flags.transducer;
            break;
        }
} include <system.h> static WORD *make_dma_buffer      (WORD requested_dma_buffer_size);
static int  calc_atlab_timeout    (WORD sizeof_dma_buffer,double sample_rate
                                  ,WORD ad_channels,long *timeout);
static int  reset_transmitter     (void);
static int  unlink_atlab_buffers  (BYTE number_to_unlink);
static void clear_atlab_buffers   (void);
static void wait_for_go_ahead     (void);

static BOOL atlab_buffers_opened = CLOSED;
static WORD sizeof_rec_dma_buffer;
static WORD sizeof_xmit_dma_buffer;

static WORD *dma_buffer    [XMIT_BUFFERS];
static int   al_rxbuffer   [REC_BUFFERS];
static int   al_txbuffer   [XMIT_BUFFERS];
static int   channel_array [REC_AD_CHANNELS] = {0,2,4,6,8,10,12,14};
static int   gain_array    [REC_AD_CHANNELS] = {1,1,1,1,1, 1, 1, 1};

/**************************************************************************
 *                                                                        *
 *            I N I T I A L I Z E   A T L A B   B U F F E R S             *
 *                                                                        *
 **************************************************************************/
int initialize_atlab_buffers()
{
    BYTE index;                 /* General use array index */
    WORD sizeof_master_dma_buffer; /* Number of bytes in Master buffer */

/*
     * Calculate the size of a TRANSMIT DMA buffer.
     * Make XMIT_BUFFERS each to hold TOTAL_XMT_SCANS scan.
     * Declare each XMIT DMA Buffer to ATLAB.
     */
    sizeof_xmit_dma_buffer = (TOTAL_XMT_SCANS * sizeof(WORD));

for(index = 0; index < XMIT_BUFFERS; index++) {
        if((dma_buffer[index] = make_dma_buffer(sizeof_xmit_dma_buffer))
           == NULL) {
            _status = ERR_MAKE_DMA;
            error_report(ERR_INITATLABUFFERS,DAS1,ERRCODE);
            return(ERR_INITATLABUFFERS);
        }
        if(_port_stuff[DAS1].installed == TRUE)
            if((_status = AL_DECLARE_BUFFER(&al_txbuffer[index]
               ,(unsigned*)dma_buffer[index],sizeof_xmit_dma_buffer))
               != ALE_NORMAL) {
                error_report(ERR_INITATLABUFFERS,DAS1,ALERR);
                return(ERR_INITATLABUFFERS);
            }
    }

/*
     * Calculate the size of the MASTER DMA buffer.
     * Calculate the size of a RECEIVE DMA buffer.
     * Make one Master DMA Buffer to hold TOTAL_REC_SCANS.
     *
     *      NOTE:The master Buffer is divided into Four smaller ones.
     *
     * Declare each DMA Buffer to ATLAB.
     * Indicate the buffers are opened.
     */
    sizeof_master_dma_buffer = (TOTAL_REC_SCANS * sizeof(WORD));
    sizeof_rec_dma_buffer = (TOTAL_REC_SCANS / REC_BUFFERS);

if((_master_dma_buffer = make_dma_buffer(sizeof_master_dma_buffer))
       == NULL) {
        _status = ERR_MAKE_DMA;
        error_report(ERR_INITATLABUFFERS,DAS1,ERRCODE);
        return(ERR_INITATLABUFFERS);
```

```c
        }
        if(_port_stuff[DAS1].installed == TRUE)
            for(index = 0; index < REC_BUFFERS; index++) {
                if((_status = AL_DECLARE_BUFFER(&al_rxbuffer[index]
                    ,(unsigned*)&_master_dma_buffer[index * sizeof_rec_dma_buffer]
                    ,sizeof_rec_dma_buffer)) != ALE_NORMAL) {
                    error_report(ERR_INITATLABUFFERS,DAS1,ALERR);
                    return(ERR_INITATLABUFFERS);
                }
            }
        atlab_buffers_opened = OPENED;
        return(ERR_NONE);
}

/******************************************************************************
 *                                                                            *
 *                       S E T U P    A T L A B    F O R                      *
 *                                                                            *
 ******************************************************************************/
int setup_atlab_for(process)
BYTE process;    /* type of process to setup for */
{
    BYTE    atlab_intr_number;  /* ATLAB interrupt number */
    BYTE    control_code;       /* control code from link flags */
    BYTE    das_intr_number;    /* DAS interrupt number */
    BYTE    index;              /* general purpose index */
    double  sample_rate;        /* effective sample rate of a channel */
    long    clock_ticks;        /* clocks ticks to cause sample rate */
    long    timeout;            /* timeout period for ATLAB I/O */

/*
     * Shutdown ATLAB before starting the DAS.
     */
    if((_status = shutdown_atlab()) != ERR_NONE) {
        error_report(ERR_SETUP_ATLAB,DAS1,ERRCODE);
        return(ERR_SETUP_ATLAB);
    } switch(process) {
    case ACOUSTIC_TRANSMISSION:
        /*
         * Initialize control_code to be used in setup routines.
         */
        switch(_system_flags.type) {
        default:
        case TOPSIDE:
            control_code = (BYTE)_topside_link_flags.control_code;
            break;
        case DOWNSIDE:
            control_code = (BYTE)_downside_link_flags.control_code;
            break;
        }

/*
         * Calculate the ATLAB timeout period.
         * Set ATLAB timeout period.
         * Determine the tone period (clock_ticks) as a function of diversity.
         * Set the pacer clock rate.
         * Setup the A/D system.
         */
        sample_rate
            = (_configuration[control_code].sample_rate / _speed_reduction_tx);

if((_status = calc_atlab_timeout(sizeof_xmit_dma_buffer,sample_rate
            ,XMIT_AD_CHANNELS,&timeout)) != ERR_NONE) {
            error_report(ERR_SETUP_ATLAB,DAS1,ERRCODE);
            return(ERR_SETUP_ATLAB);
        }
        if(_port_stuff[DAS1].installed == TRUE)
            if((_status = AL_SET_TIMEOUT((int)timeout)) != ALE_NORMAL) {
                error_report(ERR_SETUP_ATLAB,DAS1,ALERR);
                return(ERR_SETUP_ATLAB);
            } clock_ticks
            = (long)ceil((double)_configuration[control_code].clock_ticks
            * _speed_reduction_tx);

if(_port_stuff[DAS1].installed == TRUE) {
            if((_status = AL_SET_CLOCK(clock_ticks)) != ALE_NORMAL) {
                error_report(ERR_SETUP_ATLAB,DAS1,ALERR);
```

```
            return(ERR_SETUP_ATLAB);
        }
        if((_status = AL_SETUP_ADC(INTERNAL_CLOCK,XMIT_AD_CHANNELS
        ,channel_array,gain_array)) != ALE_NORMAL) {
            error_report(ERR_SETUP_ATLAB,DAS1,ALERR);
            return(ERR_SETUP_ATLAB);
        }
    }

/*
     * Determine the setup parameters for initializing the interrupt
     * handler with the acoustic transmission function.
     */
    das_intr_number = _irq_table[_das_irq_number].interrupt_number;
    atlab_intr_number = _irq_table[_atlab_irq_number].interrupt_number;
    setup_das_handler(TRANSMIT,das_intr_number,atlab_intr_number);

/*
     * Unlink All the ATLAB buffers before linking.
     * Link each XMIT buffer to the Buffer Transfer List.
     * Set transmitting flag in process (see NOTE).
     *
     *      NOTE: This must be done here to prvent the transmit routine
     *            from passing up the flag checking for transmit
     *            condition. The transmitter must wait for transmit
     *            complete before proceeding to assure proper deallocation
     *            of memory.
     *
     * Wait until its ok for interrupts.
     * Start A/D interrupts (this starts acoustic transmission).
     * Enable the DAS IRQ line to permit interrupts.
     */
    if((_status = unlink_atlab_buffers(ALL)) != ERR_NONE) {
        error_report(ERR_SETUP_ATLAB,DAS1,ERRCODE);
        return(ERR_SETUP_ATLAB);
    }
    if(_port_stuff[DAS1].installed == TRUE)
        for(index = 0; index < XMIT_BUFFERS; index++) {
            if((_status = AL_LINK_BUFFER(al_txbuffer[index]))
            != ALE_NORMAL) {
                error_report(ERR_SETUP_ATLAB,DAS1,ALERR);
                if((_status = unlink_atlab_buffers(index)) != ERR_NO
                    error_report(ERR_SETUP_ATLAB,DAS1,ERRCODE);
                return(ERR_SETUP_ATLAB);
            }
        }
    _getacoustictx        = TRANSMITTING;
    _system_flags.activated = ON;

show_das(OFF,ACOUSTIC_RECEPTION);
    show_das(ON,ACOUSTIC_TRANSMISSION);
    clrcrt(ERROR_LOC);

wait_for_go_ahead();
    if(_port_stuff[DAS1].installed == TRUE)
        if((_status = AL_CONTINUOUS_ADC()) != ALE_NORMAL) {
            error_report(ERR_SETUP_ATLAB,DAS1,ALERR);
            if((_status = shutdown_atlab()) != ERR_NONE)
                error_report(ERR_SETUP_ATLAB,DAS1,ERRCODE);
            return(ERR_SETUP_ATLAB);
        }
    enable_irq(_das_irq_number);
    break;
case ACOUSTIC_RECEPTION:
    /*
     * Calculate the ATLAB timeout period.
     * Set ATLAB timeout period.
     * Determine the tone period.
     * Set the pacer clock rate.
     * Setup the A/D system.
     */
    sample_rate = ((double)RECEIVE_SAMPLE_RATE / _speed_reduction_rx);

if((_status = calc_atlab_timeout(sizeof_rec_dma_buffer,sample_rate
    ,REC_AD_CHANNELS,&timeout)) != ERR_NONE) {
        error_report(ERR_SETUP_ATLAB,DAS1,ERRCODE);
        return(ERR_SETUP_ATLAB);
    }
    if(_port_stuff[DAS1].installed == TRUE)
        if((_status = AL_SET_TIMEOUT((int)timeout)) != ALE_NORMAL) {
            error_report(ERR_SETUP_ATLAB,DAS1,ALERR);
            return(ERR_SETUP_ATLAB);
        }
```

```c
        clock_ticks = (long)ceil((double)RECEIVE_TICKS * _speed_reduction_rx);

if(_port_stuff[DAS1].installed == TRUE) {
            if((_status = AL_SET_CLOCK(clock_ticks)) != ALE_NORMAL) {
                error_report(ERR_SETUP_ATLAB,DAS1,ALERR);
                return(ERR_SETUP_ATLAB);
            }
            if((_status = AL_SETUP_ADC(INTERNAL_CLOCK,REC_AD_CHANNELS
                ,channel_array,gain_array)) != ALE_NORMAL) {
                error_report(ERR_SETUP_ATLAB,DAS1,ALERR);
                return(ERR_SETUP_ATLAB);
            }
        }

/*
         * Determine the setup parameters for initializing the interrupt
         * handler with the acoustic reception function.
         */
        das_intr_number = _irq_table[_das_irq_number].interrupt_number;
        atlab_intr_number = _irq_table[_atlab_irq_number].interrupt_number;
        setup_das_handler(RECEIVE,das_intr_number,atlab_intr_number);

/*
         * Unlink All the ATLAB buffers before linking.
         * Link each REC buffer to the Buffer Transfer List.
         * Initialize the Acoustic Receiver Routine.
         * Wait until its ok for interrupts.
         * Start A/D interrupts (this starts acoustic reception).
         * Enable the DAS IRQ line to permit interrupts.
         */
        if((_status = unlink_atlab_buffers(ALL)) != ERR_NONE) {
            error_report(ERR_SETUP_ATLAB,DAS1,ERRCODE);
            return(ERR_SETUP_ATLAB);
        }
        if(_port_stuff[DAS1].installed == TRUE)
            for(index = 0; index < REC_BUFFERS; index++) {
                if((_status = AL_LINK_BUFFER(al_rxbuffer[index]))
                    != ALE_NORMAL) {
                    error_report(ERR_SETUP_ATLAB,DAS1,ALERR);
                    if((_status = unlink_atlab_buffers(index)) != ERR_NONE)
                        error_report(ERR_SETUP_ATLAB,DAS1,ERRCODE);
                    return(ERR_SETUP_ATLAB);
                }
            }
        initialize_rec();
        _system_flags.activated = ON;

show_das(ON,ACOUSTIC_RECEPTION);
        show_das(OFF,ACOUSTIC_TRANSMISSION);

wait_for_go_ahead();
        if(_port_stuff[DAS1].installed == TRUE)
            if((_status = AL_CONTINUOUS_ADC()) != ALE_NORMAL) {
                error_report(ERR_SETUP_ATLAB,DAS1,ALERR);
                if((_status = shutdown_atlab()) != ERR_NONE)
                    error_report(ERR_SETUP_ATLAB,DAS1,ERRCODE);
                return(ERR_SETUP_ATLAB);
            }
        enable_irq(_das_irq_number);
        break;

default:
        _status = ERR_INVALID_ARGUMENT;
        error_report(ERR_SETUP_ATLAB,DAS1,ERRCODE);
        return(ERR_SETUP_ATLAB);
    }
    return(ERR_NONE);
}

/*************************************************************************
 *                                                                       *
 *                    S H U T D O W N   A T L A B                        *
 *                                                                       *
 *************************************************************************/
int shutdown_atlab()
{
    /*
     * If the DAS is not running - don't shutdown.
     * Disable the DAS IRQ line to mask any latent DAS interrupts.
     *
```

```c
 *      NOTE: AL_STOP() does not mask the IRQ line of the DAS -
 *            it only stops DMA I/O on the ATLAB buffers.
 *
 * Stop DMA I/O operations (Stop Interrupts).
 * Reset the ATLAB buffers.
 * Clear out the ATLAB DMA buffers.
 * Reset the transmitter.
 */
    if(_system_flags.activated == OFF)
        return(ERR_NONE);
    disable_irq(_das_irq_number);

if(_port_stuff[DAS1].installed == TRUE)
        if((_status = AL_STOP()) != ALE_NORMAL) {
            error_report(ERR_SHUTDN_ATLAB,DAS1,ALERR);
            return(ERR_SHUTDN_ATLAB);
        }
    initialize_acoustics();
    _system_flags.activated = OFF;

show_das(OFF,ACOUSTIC_RECEPTION);
    show_das(OFF,ACOUSTIC_TRANSMISSION);

if(_port_stuff[DAS1].installed == TRUE)
        if((_status = AL_RESET_BUFFERS()) != ALE_NORMAL) {
            error_report(ERR_SHUTDN_ATLAB,DAS1,ALERR);
            return(ERR_SHUTDN_ATLAB);
        }
    clear_atlab_buffers();

if((_status = reset_transmitter()) != ERR_NONE) {
        error_report(ERR_SHUTDN_ATLAB,DAS1,ERRCODE);
        return(ERR_SHUTDN_ATLAB);
    }
    return(ERR_NONE);
}

/****************************************************************************
 *                                                                          *
 *                     S E T U P   C H A N N E L   F O R                    *
 *                                                                          *
 ****************************************************************************/
int setup_channel_for(process)
BYTE process;  /* process to set up channel for */
{
    WORD dac_values[DA_CHANNELS]; /* array of DAC D/A Channels to use */

/*
     * Set the Transducer selection (Upper/Lower or Forward/Aft) .
     */
    switch(_system_flags.type) {
    default:
    case TOPSIDE:
        dac_values[XDCER_CHANNEL]
            = (_topside_link_flags.transducer == FORWARD_XDUCER)
            ? DA_FORWARD_XDUCER : DA_AFT_XDUCER;
        break;
    case DOWNSIDE:
        dac_values[XDCER_CHANNEL]
            = (_downside_link_flags.transducer == LOWER_XDUCER)
            ? DA_LOWER_XDUCER : DA_UPPER_XDUCER;
        break;
    }

/*
     * Set Transmit-Receive Relay on the Acoustic subsystem.
     */
    switch(process) {
    case RECEIVE:
        dac_values[RELAY_CHANNEL] = RECEIVE_RELAY;
        break;
    case TRANSMIT:
        if(_system_flags.audio == ON)
            dac_values[RELAY_CHANNEL] = AUDIO_RELAY;
        else
            dac_values[RELAY_CHANNEL] = TRANSMIT_RELAY;
        break;
    default:
        _status = ERR_INVALID_ARGUMENT;
        error_report(ERR_SETUPCHANNEL,DAS1,ERRCODE);
        return(ERR_SETUPCHANNEL);
    }
```

```c
        if(_port_stuff[DAS1].installed == TRUE)
            if((_status = AL_DAC_VALUE(BOTHCHANNELS,(unsigned*)dac_values))
            != ALE_NORMAL) {
                error_report(ERR_SETUPCHANNEL,DAS1,ALERR);
                return(ERR_SETUPCHANNEL);
            }

/*
         * Delay to permit transmit relay to complete its switch.
         */
        if(process == TRANSMIT)
            timer(TENTH);

return(ERR_NONE);
}

/****************************************************************************
 *                                                                          *
 *                       M A K E   D M A   B U F F E R                      *
 *                                                                          *
 ****************************************************************************/
static WORD* make_dma_buffer(requested_dma_buffer_size)
WORD requested_dma_buffer_size; /* requested size of dma buffer (minimum) */
{
    WORD  requested_heap_buffer_size; /* requested size of heap memory */
    WORD* dma_buffer;                 /* memory pointer */
    WORD  actual_dma_buffer_size;     /* portion of heap memory suitably */
                                      /* alligned for dma operations */

/*
     * Make initial request for dma buffer memory.
     */
    requested_heap_buffer_size = requested_dma_buffer_size;
    if((dma_buffer = (WORD*)malloc(requested_heap_buffer_size)) == NULL) {
        _status = ERR_MALLOC;
        error_report(ERR_MAKE_DMA,DAS1,ERRCODE);
        return(NULL);
    }
    /*
     * Make additional requests for more heap memory until the requested
     * dma size buffer is obtained.
     * Return the buffer when successful.
     */
    actual_dma_buffer_size = 0;
    while(actual_dma_buffer_size < requested_dma_buffer_size) {
        if((dma_buffer = (WORD*)realloc((char*)dma_buffer
        ,requested_heap_buffer_size)) == NULL) {
            _status = ERR_REALLOC;
            error_report(ERR_MAKE_DMA,DAS1,ERRCODE);
            return(NULL);
        }
        requested_heap_buffer_size += sizeof(char);

if((_status = AL_FIND_DMA_LENGTH((unsigned*)dma_buffer
        ,(unsigned*)&actual_dma_buffer_size)) != ALE_NORMAL) {
            error_report(ERR_MAKE_DMA,DAS1,ALERR);
            return(NULL);
        }
    }
    return(dma_buffer);
}

/****************************************************************************
 *                                                                          *
 *                            S H O W   D A S                               *
 *                                                                          *
 ****************************************************************************/
void show_das(state,process)
int  state;   /* state of receiver/transmitter to show */
BYTE process; /* show receiver or transmitter */
{
    BYTE location; /* location to put messages */
    STRG msg;      /* message string to display */ static STRG recmsg [] = {
        "Acoustic RECEIVER is OFF.",
        "Acoustic RECEIVER is ON. "
    };
```

```c
    static STRG xmtmsg [] = {
        "Acoustic TRANSMITTER is OFF.",
        "Acoustic TRANSMITTER is ON. "
    };

/*
     * Depending on the process - determine which message to display and its
     *      location on the display.
     * Set the color for the state.
     */
    switch(process) {
    case ACOUSTIC_RECEPTION:
        msg      = recmsg[state];
        location = (BYTE)((_clrverbose_flag == ON)
                ? (RECINTR_LOC) : ((_menu_type == SHORT_MENU)
                ? (ALT_RECINTR_LOC) : (ADLLOG_LOC)));

break;
    case ACOUSTIC_TRANSMISSION:
        msg      = xmtmsg[state];
        location = (BYTE)((_clrverbose_flag == ON)
                ? (XMTINTR_LOC) : ((_menu_type == SHORT_MENU)
                ? (ALT_XMTINTR_LOC) : (EXTLOG_LOC)));
        break;
    }
    _display[location].color = ((state == ON) ? (LTGREEN) : (GREEN));

/*
     * Determine if the display location is to be cleared.
     * Display the message in the appropriate location.
     */
    switch(location) {
    case ADLLOG_LOC:
    case EXTLOG_LOC:
        clrcrt(location);
    }
    sprintf((char*)_display[location].buffer,(char*)msg);
    putmsg(location,NONE,STRNG);
}

/****************************************************************************
 *                                                                          *
 *           C A L C U L A T E   A T L A B   T I M E O U T                  *
 *                                                                          *
 ****************************************************************************/
static int calc_atlab_timeout(sizeof_dma_buffer,sample_rate,ad_channels,timeout)
WORD    sizeof_dma_buffer;  /* size of the dma buffer (in bytes) */
double  sample_rate;        /* effective sample rate of a channel */
WORD    ad_channels;        /* number of A/D channels to compensate for */
long*   timeout;            /* calculated timeout value (in ticks) */
{
    /*
     * Return the ATLAB TIMEOUT period for I/O routines.
     *      NOTE: The general formula is as follows:
     *
     * Timeout_per_dma_buffer = sizeof_dma_buffer (bytes)
     *      (in TICKS)       / sample_rate (Hz)
     *                       / channels_per_sample
     *                       / bytes_generated_per_channel (bytes)
     *                       * fudge_factor
     *                       * conversion_factor (SECS to TICKS)
     *
     *      NOTE: A multiplier (fudge factor) of 3 is used to
     *            allow for uncertainty.
     */
    if((sample_rate == 0.0L) || (ad_channels == 0)) {
        _status = ERR_ZERO_DENOMINATOR;
        error_report(ERR_ATLAB_TIMEOUT,USR1,ERRCODE);
        return(ERR_ATLAB_TIMEOUT);
    }
    *timeout = (long)ceil((double)((double)sizeof_dma_buffer / sample_rate
            / (double)ad_channels / BYTES_PER_CHANNEL * 3.0L
            / SECONDS_PER_TICK));
    /*
     * Do Not allow timeout to go to Zero - this will hang the system up!
     * Return the number of clock ticks.
     */
    if(*timeout < 1L)
        *timeout = 1L;
    return(ERR_NONE);
}
```

```c
/****************************************************************************
 *                                                                          *
 *                    C L E A R   A T L A B   B U F F E R S                 *
 *                                                                          *
 ****************************************************************************/
static void clear_atlab_buffers()
{
    BYTE index;    /* General use array index */
    WORD element;  /* General use array element */

/*
     * ATLAB buffers must be initialized before they can be cleared.
     * Clear the ATLAB DMA buffers.
     */
    if(atlab_buffers_opened != OPENED)
        return;
    for(index = 0; index < XMIT_BUFFERS; index++)
        for(element = 0; element < TOTAL_XMT_SCANS; element++)
            dma_buffer[index][element] = CLEAR;

for(element = 0; element < TOTAL_REC_SCANS; element++)
        _master_dma_buffer[element] = CLEAR;
}

/****************************************************************************
 *                                                                          *
 *                    U N L I N K   A T L A B   B U F F E R S               *
 *                                                                          *
 ****************************************************************************/
static int unlink_atlab_buffers(number_to_unlink)
BYTE number_to_unlink; /* number of ATLAB buffers to unlink */
{
    switch(number_to_unlink) {
    case 0:
        break;
    default:
    case ALL:
        if(_port_stuff[DAS1].installed == TRUE)
            if((_status = AL_UNLINK_BUFFERS()) != ALE_NORMAL) {
                error_report(ERR_UNLINK_BUFFERS,DAS1,ALERR);
                return(ERR_UNLINK_BUFFERS);
            }
        break;
    }
    return(ERR_NONE);
}

/****************************************************************************
 *                                                                          *
 *                    R E S E T   T R A N S M I T T E R                    *
 *                                                                          *
 ****************************************************************************/
static int reset_transmitter()
{
    /*
     * Turn OFF the Acoustic Transmitter by setting up channel for RECEIVER.
     */
    if(_port_stuff[DAS1].installed == TRUE)
        if((_status = AL_OUTPUT_DIGITAL_VALUE(BOTHPORTS,(int)ALLBITS,ZERO))
            != ALE_NORMAL) {
                error_report(ERR_RESETXMTR,DAS1,ALERR);
                return(ERR_RESETXMTR);
        }
    if((_status = setup_channel_for(RECEIVE)) != ERR_NONE) {
        error_report(ERR_RESETXMTR,DAS1,ERRCODE);
        return(ERR_RESETXMTR);
    }
    return(ERR_NONE);
}

/****************************************************************************
 *                                                                          *
 *                    W A I T   F O R   G O   A H E A D                    *
 *                                                                          *
 ****************************************************************************/
static void wait_for_go_ahead()
```

```c
{
    do {
        kbflush();
    }
    while(gfkbhit());
} include <system.h> static VIDEOCHAR (*_screen)[][80];

static STRG dwn_xducer [] = {"Upper","Lower"};
static STRG operation  [] = {"In-Air Test ","Towbody Test","Operational "};
static STRG top_xducer [] = {"Aft    ","Forward"};

static BYTE display_initialized = FALSE;

static void clrbuf          (BYTE location);
static void extract_rowcol  (unsigned *cursor_row,unsigned *cursor_col);
static void increment_cursor (void);

/****************************************************************************
 *                                                                          *
 *                          U P D A T E   D I S P L A Y                     *
 *                                                                          *
 ****************************************************************************/
void update_display(verbosity)
WORD verbosity; /* level of display verbosity */
{
    static STRG long_menu [] = {
"                                                                             \n",
"  ┌──────────────────────────────────────────────────────────────────────┐   \n",
"  │ Home│Esc ········ ACTIVATE│TERMINATE the ADL                         │   \n",
"  │ F1│F2 ··········· Select the TOWFISH or DUCK Transducer              │   \n",
"  │ F3│F4 ··········· Select the DNLINK│UPLINK Data Rate                 │   \n",
"  │ F5│sF5 ·········· Select the STATE│SPEED of Operation                │   \n",
"  │ F6│sF6 ·········· Enter the Future POWER ON Time│DESTINATION Port    │   \n",
"  │ F7│sF7│aF7 ······ Enter a Message to ECHO BACK via DAS1│COM1│COM2    │   \n",
"  │ F8│F9│sF9 ······· ANNOTATE│BACKUP a Logfile│Set System Date & Time   │   \n",
"  │ F10│sF10│aF10 ··· Set DAS1│COM1│COM2 Header Flag                     │   \n",
"  │ aA│aB│aC ········ Transmit the MAXIMUM TEST MESSAGE via DAS1│COM1│COM2│  \n",
"  │ aD│aE│aF ········ Enter a Message to PASS THROUGH via DAS1│COM1│COM2 │   \n",
"  │ aG│aH│aI ········ Command Remote via DAS1│COM1│COM2 to RECEIVE Files │   \n",
"  │ aJ│aK│aL ········ Command Remote via DAS1│COM1│COM2 to SEND Files    │   \n",
"  └──────────────────────────────────────────────────────────────────────┘   \n",
    };

static STRG short_menu [] = {
"                                                               \n",
"     ┌──────────────────────────────────────────────────────┐  \n",
"     │ Home ··· ACTIVATE the Acoustic Data Link Receiver    │  \n",
"     │ F1 ····· Select the TOWFISH Transducer               │  \n",
"     │ F2 ····· Select the DUCK Transducer                  │  \n",
"     │ F3 ····· Select the DNLINK Data Rate                 │  \n",
"     │ F4 ····· Select the UPLINK Data Rate                 │  \n",
"     │ F5 ····· Select the STATE of Operation               │  \n",
"     │ F6 ····· Enter the Future POWER ON Time              │  \n",
"     │ F7 ····· Enter a Message to ECHO BACK from the ADL   │  \n",
"     │ F8 ····· WRITE an Entry in the ADL Logfile           │  \n",
"     │ F9 ····· BACKUP the Logfiles to Floppy Diskettes     │  \n",
"     │ Esc ···· TERMINATE the Acoustic Data Link Program    │  \n",
"     └──────────────────────────────────────────────────────┘  \n",
"                                                               "
    };

WORD   line;
    static BOOL   verbose_flag   = OFF;
    static STRG   typeofsystem [] = {"Topside ","Downside","SSC","PAS"};
    static STRG*  menu []          = {long_menu,short_menu};
    static int    initial_mode;
    static int    initial_page;
    struct GFREGS video;

/*
     * Switch on the verbosity level.
     */
    switch(verbosity) {
    case INITIALIZE:
        initial_mode = (int)vstate(&video);
        initial_page = video.cx;

if(iscolor() == TRUE) {
            vmode(BW_80X25);
            _screen = (VIDEOCHAR(*)[][80])COLOR_SCREEN;
        }
```

```
        else if(ismono() == TRUE) {
            vmode(MONO_80X25);
            _screen = (VIDEOCHAR(*)[][80])MONO_SCREEN;
        }
        else
            _screen = (VIDEOCHAR(*)[][80])COLOR_SCREEN;
        _videomode = (int)vstate(&video);
        _videopage = video.cx;

vmode(_videomode);
        vpage(_videopage);

set_cursor(BLANK);
        update_display(CLSHOME);
        display_initialized = TRUE;
        break;
    case CLSHOME:
        cls();
        _clrverbose_flag = ON;
        verbose_flag    = OFF;
        putcur(HOME_LOC,ZERO_OFFSET);
        break;
    case MODE:
        if(_system_flags.type != DOWNSIDE)
            sprintf((char*)_display[HOME_LOC].buffer
                ,"%s%s  %s%s  %s%u;%-4u  %s%u;%-4u  %s%s"
                ,"TOWFISH:",top_xducer[_topside_link_flags.transducer]
                ,"DUCK:"   ,dwn_xducer[_downside_link_flags.transducer]
                ,"DNLINK:" ,_topside_link_flags.control_code
                ,(unsigned)ceil
                (_configuration[_topside_link_flags.control_code].bit_rate
                /  _speed_reduction_tx)
                ,"UPLINK:" ,_downside_link_flags.control_code
                ,(unsigned)ceil
                (_configuration[_downside_link_flags.control_code].bit_rate
                /  _speed_reduction_rx)
                ,"STATE:"  ,operation[_system_flags.mode]);
        else
            sprintf((char*)_display[HOME_LOC].buffer
                ,"%s%s  %s%s  %s%u;%-4u  %s%u;%-4u  %s%s"
                ,"TOWFISH:",top_xducer[_topside_link_flags.transducer]
                ,"DUCK:"   ,dwn_xducer[_downside_link_flags.transducer]
                ,"DNLINK:" ,_topside_link_flags.control_code
                ,(unsigned)ceil
                (_configuration[_topside_link_flags.control_code].bit_rate
                /  _speed_reduction_rx)
                ,"UPLINK:" ,_downside_link_flags.control_code
                ,(unsigned)ceil
                (_configuration[_downside_link_flags.control_code].bit_rate
                /  _speed_reduction_tx)
                ,"STATE:"  ,operation[_system_flags.mode]);
        putmsg(HOME_LOC,NONE,STRNG);
        break;
    case HOWTOUSEIT:
        clrcrt(RECINTR_LOC);
        clrcrt(XMTINTR_LOC);
        putcur(HOWTOUSEIT_LOC,ZERO_OFFSET);
        for(line = 0; line < (_display[HOWTOUSEIT_LOC].bufsiz / MAXCOLS);
        line++)
            rcprints(MAXCOLS,(_display[HOWTOUSEIT_LOC].color),_videopage
                ,menu[_menu_type][line]);
        break;
    case VERBOSE:
        if(verbose_flag == OFF) {
            update_display(HOWTOUSEIT);
            verbose_flag    = ON;
            _clrverbose_flag = OFF;
            show_das(OFF,ACOUSTIC_RECEPTION);
            show_das(OFF,ACOUSTIC_TRANSMISSION);
            update_display(FILESTATUS);
        }
        break;
    case CLRVERBOSE:
        if(_clrverbose_flag == OFF)
            update_display(CLSHOME);
        update_display(MODE);
        update_display(FILESTATUS);
        break;
    case FILESTATUS:
        show_file_status(_logfiles[_system_flags.type].logtype);
        if(_system_flags.type == DOWNSIDE)
            show_file_status(FTP_LOG);
```

```
                else
                    show_file_status(SSC_LOG);
                break;
            case SHUTDOWN:
                sound(NB4,TENTH);
                sound(NA4,TENTH);
                if(display_initialized == TRUE) {
                    update_display(CLSHOME);
                    sprintf((char*)_display[HOME_LOC].buffer
                        ,"< < < Exiting ADATS > > >");
                    putmsg(HOME_LOC,VBLINK,STRNG);
                    timer(2*SECOND);
                    vmode(initial_mode);
                    vpage(initial_page);
                    display_initialized = FALSE;
                }
                set_cursor(VNORMAL);
                break;
    }
}

/****************************************************************************
 *                                                                          *
 *                            P U T I M E                                   *
 *                                                                          *
 ****************************************************************************/
void putime()
{
    /*
     * Get the current time.
     * Show the Current Time.
     */
    fetchtime(&_current_time);

if(_getacoustictx != TRANSMITTING) {
        sprintf((char*)_display[TIME_LOC].buffer,"Time %2.2d:%2.2d:%2.2d"
            ,_current_time.hours,_current_time.minutes
            ,_current_time.seconds);
        putmsg(TIME_LOC,NONE,STRNG);
    }
}

/****************************************************************************
 *                                                                          *
 *                            P U T M S G                                   *
 *                                                                          *
 ****************************************************************************/
void putmsg(location,attribute,msgtype)
BYTE location;  /* screen location at which to put the message */
int  attribute; /* attribute to apply to color */
BYTE msgtype;   /* type of data to put on screen (STRNG/BINARY) */
{
    BYTE   centered_string[MAXCOLS]; /* buffer to hold centered string */
    BYTE   printable_character;      /* no side effect character       */
    WORD   index;                    /* general use index              */
    size_t string_length;            /* length of string               */

/*
     * Don't display stuff when display is not initialized.
     * Put the cursor at the location.
     * Check if the string associated with location needs centering.
     * Make a sound if required.
     */
    if(display_initialized == FALSE)
        return;

putcur(location,ZERO_OFFSET);
    switch(msgtype) {
    case STRNG:
        switch(_display[location].center) {
        case ON:
            for(index = 0; index < MAXCOLS; index++)
                centered_string[index] = BLANK;
            centers((char*)centered_string,(char*)_display[location].buffer
                ,_display[location].bufsiz);

string_length = strlen((char*)centered_string);
            for(index = 0; index < string_length; index++)
```

```
                    direct_putcinc(centered_string[index]
                            ,(BYTE)(_display[location].color|attribute));
                break;
            case OFF:
                string_length = strlen((char*)_display[location].buffer);
                for(index = 0; index < string_length; index++)
                    direct_putcinc(_display[location].buffer[index]
                            ,(BYTE)(_display[location].color|attribute));
                break;
            }
            break;
        case BINARY:
            for(index = 0; index < _display[location].bufsiz; index++) {
                printable_character = (_display[location].buffer[index]
                        & PRINT_MASK);
                if((printable_character != BELL) && (printable_character != CR)
                    && (printable_character != LF) && (printable_character != TAB))
                        direct_putcinc(printable_character
                                ,(BYTE)(_display[location].color|attribute));
            }
            break;
    }
    if(_display[location].duration != ZERO)
        sound(_display[location].frequency,_display[location].duration);
}

/***************************************************************************
 *                                                                         *
 *                          P U T C U R                                    *
 *                                                                         *
 ***************************************************************************/
void putcur(location,offset)
BYTE location; /* screen location at which to put the cursor */
int  offset;   /* number of columns to offset cursor from location column */
{
    /*
     * Flush the STDOUT stream to comply with Greenleaf recommendations.
     * Set the cursor in its location.
     */
    fflush(stdout);
    curset(_display[location].row,(_display[location].column + offset)
        ,_videopage);
}

/***************************************************************************
 *                                                                         *
 *                          P U T B O X                                    *
 *                                                                         *
 ***************************************************************************/
void putbox(location)
BYTE location; /* screen location to put box around */
{
    int col;        /* col counter */
    int row;        /* row counter */
    int lower_col;  /* column number for lower right corner of box */
    int lower_row;  /* row number for lower right corner of box */
    int upper_col;  /* column number for upper left corner of box */
    int upper_row;  /* row number for upper left corner of box */

/*
     * Initialize row and column values as a function of location.
     */
    lower_col = (_display[location].column + _display[location].bufsiz + 1);
    lower_row = (_display[location].row + 1);
    upper_col = (_display[location].column - 2);
    upper_row = (_display[location].row - 1);

/*
     * Draw the top of the box.
     */
    curset(upper_row,upper_col,_videopage);
    direct_putcinc(UPPER_LEFT_CORNER,RED);
    for(col = (upper_col + 1); col < lower_col; col++)
        direct_putcinc(LINE,RED);
    direct_putcinc(UPPER_RIGHT_CORNER,RED);

/*
```

```
     * Draw the middle of the box.
     */
    for(row = (upper_row + 1); row < lower_row; row++) {
        curset(row,upper_col,_videopage);
        direct_putcinc(SIDE,RED);
        curset(row,lower_col,_videopage);
        direct_putcinc(SIDE,RED);
    }

/*
     * Draw the bottom of the box.
     */
    curset(lower_row,upper_col,_videopage);
    direct_putcinc(LOWER_LEFT_CORNER,RED);
    for(col = (upper_col + 1); col < lower_col; col++)
        direct_putcinc(LINE,RED);
    direct_putcinc(LOWER_RIGHT_CORNER,RED);
}

/****************************************************************************
 *                                                                          *
 *                          P U T    F I E L D                              *
 *                                                                          *
 ****************************************************************************/
void put_field(location,length)
BYTE location; /* screen location to put field at */
int  length;   /* length of field to put on screen */
{
    int count; /* counter to compare to length */ for(count = 0; count < length; count++)
        direct_putcinc(BLOCK,(BYTE)_display[location].color);

putcur(location,(int)strlen((char*)_display[location].buffer));
}

/****************************************************************************
 *                                                                          *
 *                             C L R C R T                                  *
 *                                                                          *
 ****************************************************************************/
void clrcrt(location)
BYTE location; /* screen location to clear */
{
    WORD index; /* general use index */

/*
     * Don't display stuff when display is not initialized.
     * Put the cursor at the location.
     * Put BLANK characters in the location field.
     */
    if(display_initialized == FALSE)
        return;

putcur(location,ZERO_OFFSET);
    for(index = 0; index < _display[location].bufsiz; index++)
        direct_putcinc(BLANK,(BYTE)_display[location].color);
}

/****************************************************************************
 *                                                                          *
 *                         S H O W   M E S S A G E                          *
 *                                                                          *
 ****************************************************************************/
int showmsg(type,port,count)
BYTE type;  /* type of message (RECEIVE/TRANSMIT) */
int  port;  /* port containing message to show */
WORD count; /* number of bytes in message */
{
    BYTE  msg_loc;              /* location of message on screen */
    BYTE* msg;                  /* message pointer */
    WORD  title_length;         /* length of title string */
    BYTE  log_buffer [BUFSIZ];  /* buffer to hold log message */ static STRG msg_str [] = {
        "TRANSMIT",
        "RECEIVED"
```

```
};
/*
 * For Pass-Through type systems - don't display messages.
 * Check if port is valid before using it.
 */
if(_system_flags.type == PASS_THROUGH)
    return(ERR_NONE);
if(is_port_valid(port) == FALSE) {
    error_report(ERR_SHOWMESSAGE,USR1,ERRCODE);
    return(ERR_SHOWMESSAGE);
}

/*
 * Set location and message pointer for the type of message.
 * Update reception time for acoustic receptions.
 */
switch(type) {
case TRANSMIT:
    msg = _serial_broadcast;
    msg_loc = TRANSMIT_LOC;
    break;
case RECEIVE:
    msg = _port_stuff[port].buffer;
    msg_loc = RECEIVE_LOC;
    if(is_port_acoustic(port) == TRUE) {
        copytime(&_reception_time,&_current_time);
        logmsg(_display[CORRELATE_LOC].buffer
            ,_logfiles[_system_flags.type].logtype,STRNG);
    }
    break;
default:
    _status = ERR_INVALID_ARGUMENT;
    error_report(ERR_SHOWMESSAGE,port,ERRCODE);
    return(ERR_SHOWMESSAGE);
}

/*
 * Get the current timedate string.
 * Build a display string title.
 * Append the message to the display string and display it.
 */
copytime(&_current_time,sgettime(TIME_FORMAT));
clrbuf(msg_loc);
sprintf((char*)_display[msg_loc].buffer,"%s %s %s%s"
    ,_port_stuff[port].name,msg_str[type],_current_time.dateline,ARROW);
title_length = strlen((char*)_display[msg_loc].buffer);

/*
 * Check if count is valid before using it.
 */
if((count < 0)
|| (count > (_display[msg_loc].bufsiz - title_length))) {
    _status = ERR_MEMCPY;
    error_report(ERR_SHOWMESSAGE,port,ERRCODE);
    return(ERR_SHOWMESSAGE);
}
memcpy((char*)&_display[msg_loc].buffer[title_length],(char*)msg,count);

/*
 * Clear the crt and display the message.
 * Put the actual message in the SSC or FTP logfile.
 * Put a message in the system logfile about the transaction.
 */
clrcrt(msg_loc);
putmsg(msg_loc,NONE,BINARY);

if(_system_flags.type == DOWNSIDE)
    /*logmsg(_display[msg_loc].buffer,FTP_LOG,BINARY)*/;
else
    logmsg(_display[msg_loc].buffer,SSC_LOG,BINARY);

sprintf((char*)log_buffer,"%s a %3u byte message via %s"
    ,msg_str[type],count,_port_stuff[port].name);
logmsg((STRG)log_buffer,_logfiles[_system_flags.type].logtype,STRNG);

if(is_port_acoustic(port) == TRUE) {
    if(_system_flags.type != DOWNSIDE)
        sprintf(log_buffer,"%s%s %s%s %s%u;%-4u %s%u;%-4u %s%s"
            ,"FISH:",top_xducer[_topside_link_flags.transducer]
            ,"DUCK:",dwn_xducer[_downside_link_flags.transducer]
            ,"DN:",_topside_link_flags.control_code
            ,(unsigned)
```

```
                            ceil(_configuration[_topside_link_flags.control_code].bit_rate
                            /  _speed_reduction_tx)
                            ,"UP:",_downside_link_flags.control_code
                            ,(unsigned)
                            ceil(_configuration[_downside_link_flags.control_code].bit_rate
                            /  _speed_reduction_rx)
                            ,"ST:",operation[_system_flags.mode]);
            else
                    sprintf(log_buffer,"%s%s  %s%s  %s%u;%-4u  %s%u;%-4u  %s%s"
                            ,"FISH:",top_xducer[_topside_link_flags.transducer]
                            ,"DUCK:",dwn_xducer[_downside_link_flags.transducer]
                            ,"DN:",_topside_link_flags.control_code
                            ,(unsigned)
                            ceil(_configuration[_topside_link_flags.control_code].bit_rate
                            /  _speed_reduction_rx)
                            ,"UP:",_downside_link_flags.control_code
                            ,(unsigned)
                            ceil(_configuration[_downside_link_flags.control_code].bit_rate
                            /  _speed_reduction_tx)
                            ,"ST:",operation[_system_flags.mode]);
            logmsg((STRG)log_buffer,_logfiles[_system_flags.type].logtype,STRNG);
    }
    return(ERR_NONE);
}

/****************************************************************************
*                                                                           *
*                        D I R E C T   P U T C I N C                        *
*                                                                           *
****************************************************************************/
void direct_putcinc(character,attribute)
BYTE character; /* character to write */
BYTE attribute; /* color or monochrome attribute */
{
    direct_pch(character,attribute);
    increment_cursor();
}

/****************************************************************************
*                                                                           *
*                            D I R E C T   P C H                            *
*                                                                           *
****************************************************************************/
void direct_pch(character,attribute)
BYTE character; /* character to write */
BYTE attribute; /* color or monochrome attribute */
{
    unsigned cursor_col; /* cursor column position */
    unsigned cursor_row; /* cursor row position    */ extract_rowcol(&cursor_row,&cursor_col);
    (*_screen)[cursor_row][cursor_col].attribute = attribute;
    (*_screen)[cursor_row][cursor_col].character = character;
}

/****************************************************************************
*                                                                           *
*                    I N C R E M E N T   C U R S O R                        *
*                                                                           *
****************************************************************************/
static void increment_cursor()
{
    unsigned cursor_col; /* cursor column position */
    unsigned cursor_row; /* cursor row position    */ extract_rowcol(&cursor_row,&cursor_col);

if(++cursor_col > LAST_COL) {
        cursor_col = FIRST_COL;
        if(++cursor_row > LAST_ROW)
            cursor_row = FIRST_ROW;
    }
    curset(cursor_row,cursor_col,_videopage);
}
```

```
/************************************************************************
*                                                                       *
*                       E X T R A C T   R O W   C O L                   *
*                                                                       *
************************************************************************/
static void extract_rowcol(cursor_row,cursor_col)
unsigned *cursor_col; /* returned cursor column position */
unsigned *cursor_row; /* returned cursor row position    */
{
    unsigned cursor; /* current cursor position */ cursor = getcur(_videopage);
    *cursor_row = ((cursor & CURSOR_ROW) >> SHIFTS_PER_BYTE);
    *cursor_col = (cursor & CURSOR_COL);
}

/************************************************************************
*                                                                       *
*                              C L R B U F                              *
*                                                                       *
************************************************************************/
static void clrbuf(location)
BYTE location; /* buffer to clear associated with the screen location */
{
    WORD index; /* general use index */

/*
     * Put BLANK characters in the location buffer.
     */
    for(index = 0; index < _display[location].bufsiz; index++)
        _display[location].buffer[index] = BLANK;
} include <system.h> static int check_for_critical_files (int port);

/************************************************************************
*                                                                       *
*                       A T T E N D   D O W N L O A D                   *
*                                                                       *
************************************************************************/
int attend_download(port)
int port; /* port to attend for download */
{
    static STRG rosetta_dl [] = {
        "D:ROSETTA.DLT",
        "D:ROSETTA.DLD"
    };

/*
     * DOWNLOAD is only provided for ADATS computers.
     *
     * NOTE: DOWNLOAD can be triggered by a command message from any port
     *       or by the Ring Indicator on a serial port [see: is_dnload()].
     */
    if((is_adats_system() == FALSE) || (is_dnload(port) == FALSE))
        return(ERR_NONE);
    /*
     * Check for valid master serial port.
     * Check if calling function is using the master serial port.
     * Clear display for download messages.
     *
     * NOTE: When a Download is requested by means of a command message - the
     *       master serial port may not be configured.
     */
    if(is_port_serial(_master_serial_port) == FALSE) {
        _status = ERR_INVALID_MASTERPORT;
        error_report(ERR_ATTEND_DOWNLOAD,port,ERRCODE);
        return(ERR_ATTEND_DOWNLOAD);
    }
    if(port != _master_serial_port)
        return(ERR_NONE);

/*
     * Proceed to DOWNLOAD.
     *
     * Download the "d:rosetta.dl?" file.
     * DOWNLOAD all files listed in "d:rosetta.dl?".
     */
    if((_status = transfer(DOWNLOAD,rosetta_dl[_system_flags.type],port))
```

```c
        != ERR_NONE) {
            error_report(ERR_ATTEND_DOWNLOAD,port,ERRCODE);
            return(ERR_ATTEND_DOWNLOAD);
        }
        if((_status = network(DOWNLOAD,rosetta_dl[_system_flags.type],port))
        != ERR_NONE) {
            error_report(ERR_ATTEND_DOWNLOAD,port,ERRCODE);
            return(ERR_ATTEND_DOWNLOAD);
        }
        /*
         * DONE with Download.
         *
         * Turn Dnload Mode OFF.
         * Check for critical files to rename.
         * Request a program restart on Non-Downside systems.
         * Pause for final xmodem message to be read.
         */
        dnload_mode(OFF);
        if((_status = check_for_critical_files(port)) != ERR_NONE) {
            error_report(ERR_ATTEND_DOWNLOAD,port,ERRCODE);
            return(ERR_ATTEND_DOWNLOAD);
        }
        _restart = TRUE;
        timer(SECOND);
        return(ERR_NONE);
}

/****************************************************************************
 *                                                                          *
 *              C H E C K    F O R    C R I T I C A L    F I L E S          *
 *                                                                          *
 ****************************************************************************/
static int check_for_critical_files(port)
int port; /* port being attended */
{
    WORD critical_files;
    WORD index;

static STRG critical_file [] = {
        "d:config",
        "d:autoexec",
        "d:adats"
    };

static STRG actual_file [] = {
        "d:config.sys",
        "d:autoexec.bat",
        "d:adats.exe"
    };

/*
     * Check for the critical files existance.
     * If any of them exist.
     *      Rename them to the proper name.
     */
    critical_files = (sizeof(critical_file) / sizeof(STRG));
    for(index = 0; index < critical_files; index++) {
        if(access(critical_file[index],EXISTANCE) == 0) {
            unlink(actual_file[index]);
            if(rename(critical_file[index],actual_file[index]) != 0) {
                _status = errno;
                error_report(ERR_CHECKFORCRITICAL,port,ERRNO);
                return(ERR_CHECKFORCRITICAL);
            }
        }
    }
    return(ERR_NONE);
}

/****************************************************************************
 *                                                                          *
 *                      D O W N L O A D    M O D E                          *
 *                                                                          *
 ****************************************************************************/
int dnload_mode(state)
BOOL state; /* state of download process */
{
    /*
     * Generate error report for closed download/upload window.
```

```
 * Initialize variables to invoke mode.
 */
switch(_system_flags.type) {
default:
case TOPSIDE:
    switch(state) {
    case ON:
        if(_dnupload_window == CLOSED) {
            _status = ERR_DNLOAD_UPLOAD_CLOSED;
            error_report(ERR_DNLOAD_MODE,USR1,ERRCODE);
            return(ERR_DNLOAD_MODE);
        }
        _topside_link_flags.dnload_mode  = ON;
        _downside_link_flags.upload_mode = ON;
        break;
    case OFF:
        _topside_link_flags.dnload_mode  = OFF;
        _downside_link_flags.upload_mode = OFF;
        break;
    }
    break;
case DOWNSIDE:
    switch(state) {
    case ON:
        if(_dnupload_window == CLOSED) {
            _status = ERR_DNLOAD_UPLOAD_CLOSED;
            error_report(ERR_DNLOAD_MODE,USR1,ERRCODE);
            return(ERR_DNLOAD_MODE);
        }
        _downside_link_flags.dnload_mode = ON;
        _topside_link_flags.upload_mode  = ON;
        break;
    case OFF:
        _downside_link_flags.dnload_mode = OFF;
        _topside_link_flags.upload_mode  = OFF;
        break;
    }
    break;
}
return(ERR_NONE);
}

/****************************************************************************
 *                                                                          *
 *                        I S   D N L O A D                                 *
 *                                                                          *
 ****************************************************************************/
BOOL is_dnload(port)
int port; /* port to check for download */
{
    /*
     * The Master computer goes into an "upload mode" to send files to
     *      the Slave system.
     * The Slave system goes into a "download mode" to receive files
     *      from the Master system.
     *
     * DOWNLOAD is activated in either of two ways:
     *      (1) When this computers Ring Indicator [Line #22] is set ON.
     *      (2) When this computer receives a message with the DOWNLOAD
     *          command header.
     */

/*
     * Check for the command message header.
     */
    switch(_system_flags.type) {
    default:
    case TOPSIDE:
        if((_topside_link_flags.dnload_mode == ON)
        && (_downside_link_flags.upload_mode == ON)) {
            logmsg("Download Triggered By Command."
                ,_logfiles[_system_flags.type].logtype,STRNG);
            return(TRUE);
        }
        break;
    case DOWNSIDE:
        if((_downside_link_flags.dnload_mode == ON)
        && (_topside_link_flags.upload_mode == ON)) {
            logmsg("Download Triggered By Command."
                ,_logfiles[_system_flags.type].logtype,STRNG);
            return(TRUE);
```

```
            }
            break;
    }

/*
     * Only Serial ports can be checked.
     * Check for the Ring Indicator Trigger.
     *
     * NOTE:In case of noise on the Ring Indicator line,
     *      wait a couple of seconds and check again.
     *
     * Set master serial port just as if a message arrived.
     */
    if(is_port_serial(port) == FALSE)
        return(FALSE);

if(isri(port,DIRECT) == FALSE)
        return(FALSE);

timer(2*SECOND);
    if(isri(port,DIRECT) == FALSE)
        return(FALSE);

logmsg("Download Triggered By Discrete."
        ,_logfiles[_system_flags.type].logtype,STRNG);
    set_master_port(port);
    return(TRUE);
}
include <system.h>
#include <errstrgs.h>

/****************************************************************************
 *                                                                          *
 *                    E R R O R    R E P O R T                              *
 *                                                                          *
 ****************************************************************************/
void error_report(errcode,port,errtype)
int errcode;  /* error code of calling function */
int port;     /* port identified as related to error condition */
BYTE errtype; /* error type causing error condition (in _status) */
{
    int errtype_index;  /* index into string array associated with _sstatus */
    int errcode_index;  /* index into string array associated with errcode */
    int errcode_offset; /* offset into array associated with errtype */

/*
     * These are error string arrays ordered according to errtype.
     *
     *     NOTE: Do NOT change the order of this array unless the
     *           corresponding #defines are changed.
     *           ie., glcomm_strings --> GLCOMM.
     */
    static STRG* error_strings [] = {
        glcomm_strings,
        errno_strings,
        errcode_strings,
        alerr_strings,
    };

/*
     * Validate the port before using it.
     */
    if(is_port_valid(port) != TRUE) {
        _status = ERR_INVALID_PORT;
        error_report(ERR_ERROR_REPORT,USR1,ERRCODE);
        return;
    }

/*
     * Depending on the error type - set the array index parameters.
     */
    switch(errtype) {
    case GLCOMM:
        _status += GLCOMM_OFFSET;
        errcode_offset = GLCOMM_OFFSET;
        break;
    case ERRNO:
        errcode_offset = ERRNO_OFFSET;
        break;
    case ERRCODE:
        errcode_offset = ERRCODE_OFFSET;
        break;
```

```
            case ALERR:
                _status = abs(_status - ATLAB_STATUS_ADJUST);
                errcode_offset = ALERR_OFFSET;
                break;
        default:
                _status = ERR_INVALID_ARGUMENT;
                error_report(ERR_ERROR_REPORT,port,ERRCODE);
                return;
        }

/*
         * Calculate the index value into the ERRCODE array.
         * Calculate the index value into the errtype array.
         * Build a display string.
         * Show it.
         * Log it.
         */
        errcode_index = (abs(errcode) + ERRCODE_OFFSET - 1);
        errtype_index = (abs(_status) + errcode_offset - 1);

sprintf((char*)_display[ERROR_LOC].buffer,"%s %s %s"
                ,_port_stuff[port].name
                ,error_strings[ERRCODE][errcode_index]
                ,error_strings[errtype][errtype_index]);

clrcrt(ERROR_LOC);
        putmsg(ERROR_LOC,NONE,STRNG);
        timer(SECOND);
        clrcrt(ERROR_LOC);
        logmsg((STRG)_display[ERROR_LOC].buffer
                ,_logfiles[_system_flags.type].logtype,STRNG);
}
include <system.h> static int   attend_availability   (void);
static int   attend_download_window (void);
static int   attend_transducers    (void);
static int   reset_dnupload_state  (BYTE state);
static int   reset_powerup_state   (BYTE state);
static int   reset_transducer_state (BYTE state);
static long  long_abs              (long value);
static long  timecomp              (struct TIMEDATE* timedate_1
                                   ,struct TIMEDATE* timedate_2);
static void  attend_reply_window   (void);
static void  mark_event            (BYTE clock);
static void  show_event            (BYTE clock,long seconds_to_change);

static BOOL reply_window;

static struct TIMEDATE availability_time;
static struct TIMEDATE dnupload_time;
static struct TIMEDATE reply_time;
static struct TIMEDATE switch_time;

/****************************************************************************
 *                                                                          *
 *                    A T T E N D   E V E N T S                             *
 *                                                                          *
 ****************************************************************************/
int attend_events()
{
    /*
     * Evaluate whether the acoustic receiver system is currently activated.
     */
    switch(_system_flags.activated) {
    case OFF:
        /*
         * Check for keyboard input.
         * Evaluate acoustic receiver request.
         *      Clear the menu when the acoustic receiver is turned on.
         *      Display the menu when the acoustic receiver is turned off.
         * Attend to overhead functions.
         */
        if((_status = attend_keyboard()) != ERR_NONE) {
            error_report(ERR_ATTEND_EVENTS,USR1,ERRCODE);
            return(ERR_ATTEND_EVENTS);
        }
        switch(_das_receiver_request) {
        case ON:
            update_display(CLRVERBOSE);
            if((_status = initialize_acoustic_receive()) != ERR_NONE) {
                error_report(ERR_ATTEND_EVENTS,USR1,ERRCODE);
```

```
                    return(ERR_ATTEND_EVENTS);
                }
                return(ERR_NONE);
            case OFF:
                update_display(VERBOSE);
                break;
            }
            if((_status = attend_overhead()) != ERR_NONE) {
                error_report(ERR_ATTEND_EVENTS,USR1,ERRCODE);
                return(ERR_ATTEND_EVENTS);
            }
            break;
        case ON:
            /*
             * Evaluate acoustic receiver request.
             *      Acoustic receiver is already on - do nothing.
             *      Execute request for turning acoustic receiver off.
             */
            switch(_das_receiver_request) {
            case ON:
                break;
            case OFF:
                if((_status = shutdown_atlab()) != ERR_NONE) {
                    error_report(ERR_ATTEND_EVENTS,DAS1,ERRCODE);
                    return(ERR_ATTEND_EVENTS);
                }
                break;
            }
            break;
    }

/*
     * If a timedate request for reset is made - submit the time and date.
     */
    if(_timedate_request == ON) {
        if((_status = submit_timedate()) != ERR_NONE) {
            error_report(ERR_ATTEND_EVENTS,USR1,ERRCODE);
            return(ERR_ATTEND_EVENTS);
        }
        _timedate_request = OFF;
    }
    return(ERR_NONE);
}

/****************************************************************************
 *                                                                          *
 *                      A T T E N D   O V E R H E A D                       *
 *                                                                          *
 ****************************************************************************/
int attend_overhead()
{
    /*
     * Update the current time.
     * For Non-Downside systems only:
     *      Attend to the reply window.
     *      Attend to the Downside ADL power cycle.
     *      Attend to the Downside ADL availability.
     * Attend to the download window timeout.
     * Attend to the acoustic transducers.
     */
    putime();
    if(_system_flags.type != DOWNSIDE) {
        attend_reply_window();
        if((_status = attend_power_cycle()) != ERR_NONE) {
            error_report(ERR_ATTEND_OVERHEAD,USR1,ERRCODE);
            return(ERR_ATTEND_OVERHEAD);
        }
        if((_status = attend_availability()) != ERR_NONE) {
            error_report(ERR_ATTEND_OVERHEAD,USR1,ERRCODE);
            return(ERR_ATTEND_OVERHEAD);
        }
    }
    if((_status = attend_download_window()) != ERR_NONE) {
        error_report(ERR_ATTEND_OVERHEAD,USR1,ERRCODE);
        return(ERR_ATTEND_OVERHEAD);
    }
    if((_status = attend_transducers()) != ERR_NONE) {
        error_report(ERR_ATTEND_OVERHEAD,USR1,ERRCODE);
        return(ERR_ATTEND_OVERHEAD);
    }
    return(ERR_NONE);
}
```

```
/************************************************************************
*                                                                       *
*              ATTEND   DOWNLOAD   WINDOW                               *
*                                                                       *
************************************************************************/
static int attend_download_window()
{
    long seconds_since_last_event; /* seconds since last event state change */

/*
     * The download window can be checked only if system is available.
     */
    if(_probable_availability == OFF)
        return(ERR_NONE);

/*
     * Get the number of seconds since the last event state change.
     * NOTE: A Negative value = last event occurred in the past.
     *       A Zero value     = event is happening right now.
     *       A Positive value = last event occurred in the future.
     */
    seconds_since_last_event = timecomp(&_current_time,&dnupload_time);

/*
     * Based on the current event state.
     *     Reset the event state at time of trigger.
     */
    switch(_dnupload_window) {
    case OPENED:
        if(long_abs(seconds_since_last_event) >= DNUPLOAD_ON_PERIOD)
            if((_status = reset_dnupload_state(CLOSED)) != ERR_NONE) {
                error_report(ERR_ATTEND_DNUPLOAD,USR1,ERRCODE);
                return(ERR_ATTEND_DNUPLOAD);
            }
        break;
    case CLOSED:
        if(long_abs(seconds_since_last_event) >= DNUPLOAD_OFF_PERIOD)
            if((_status = reset_dnupload_state(OPENED)) != ERR_NONE) {
                error_report(ERR_ATTEND_DNUPLOAD,USR1,ERRCODE);
                return(ERR_ATTEND_DNUPLOAD);
            }
        break;
    }
    return(ERR_NONE);
}

/************************************************************************
*                                                                       *
*              RESET   DNUPLOAD   STATE                                 *
*                                                                       *
************************************************************************/
static int reset_dnupload_state(state)
BYTE state; /* state to put dnupload event in */
{
    static STRG event [] = {
        "Download/Upload Window is Closed.",
        "Download/Upload Window is Open."
    };

/*
     * Mark the event time.
     * Log a message to record the event.
     */
    mark_event(DNUPLOAD_CLOCK);
    logmsg(event[state],_logfiles[_system_flags.type].logtype,STRNG);

/*
     * Set/Reset the event state.
     */
    switch(state) {
    case OPENED:
        _display[AVAILABILITY_LOC].color = LTGREEN;
        _dnupload_window = OPENED;
        break;
    case CLOSED:
        _display[AVAILABILITY_LOC].color = GREEN;
        _dnupload_window = CLOSED;
        break;
    }
    /*
     * Reset the state related variables.
     */
```

```
    if((_status = dnload_mode(OFF)) != ERR_NONE) {
        error_report(ERR_RESET_DNUPLOAD,USR1,ERRCODE);
        return(ERR_RESET_DNUPLOAD);
    }
    if((_status = upload_mode(OFF)) != ERR_NONE) {
        error_report(ERR_RESET_DNUPLOAD,USR1,ERRCODE);
        return(ERR_RESET_DNUPLOAD);
    }
    return(ERR_NONE);
}

/*****************************************************************************
 *                                                                           *
 *                    A T T E N D   P O W E R   C Y C L E                    *
 *                                                                           *
 *****************************************************************************/
int attend_power_cycle()
{
    long seconds_since_last_event;      /* seconds since last event change */
    long seconds_since_programmed_time; /* seconds since programmed powerup */

/*
     * Get the number of seconds since the last event state change.
     * Get the number of seconds until the programmed event state change.
     * NOTE: A Negative value = last event occurred in the past.
     *       A Zero value     = event is happening right now.
     *       A Positive value = last event occurred in the future.
     *
     * Reset the event state at programmed time.
     */
    seconds_since_last_event      = timecomp(&_current_time,&switch_time);
    seconds_since_programmed_time = timecomp(&_current_time,&_programmed_time);

if(seconds_since_programmed_time == ZERO_SECONDS) {
        _first_power_on_event = TRUE;
        if((_status = reset_powerup_state(ON)) != ERR_NONE) {
            error_report(ERR_ATTEND_POWER,USR1,ERRCODE);
            return(ERR_ATTEND_POWER);
        }
        return(ERR_NONE);
    }

/*
     * Based on the current event state.
     *     Reset the event state at time of trigger.
     */
    switch(_probable_power_state) {
    case ON:
        if(long_abs(seconds_since_last_event) >= _power_on_period)
            if((_status = reset_powerup_state(OFF)) != ERR_NONE) {
                error_report(ERR_ATTEND_POWER,USR1,ERRCODE);
                return(ERR_ATTEND_POWER);
            }
        break;
    case OFF:
        if(long_abs(seconds_since_last_event) >= POWER_OFF_PERIOD)
            if((_status = reset_powerup_state(ON)) != ERR_NONE) {
                error_report(ERR_ATTEND_POWER,USR1,ERRCODE);
                return(ERR_ATTEND_POWER);
            }
        break;
    }
    return(ERR_NONE);
}

/*****************************************************************************
 *                                                                           *
 *                    R E S E T   P O W E R U P   S T A T E                  *
 *                                                                           *
 *****************************************************************************/
static int reset_powerup_state(state)
BYTE state; /* state to put powerup event in */
{
    long offset; /* offset to add to adjust times */ static STRG event [] = {
        "Downside ADL Power Switched Off.",
        "Downside ADL Power Switched On."
    };
```

```
    /*
     * Mark the event time.
     * Log a message to record the event.
     */
    mark_event(POWER_CLOCK);
    logmsg(event[state],_logfiles[_system_flags.type].logtype,STRNG);

/*
     * Set/Reset the event state.
     */
    switch(state) {
    case ON:
        /*
         * Reset the states defined at this state event.
         * Calculate the timing offset for each event timer.
         * Adjust timers to correspond with this state event.
         * Set the event state variable.
         * Delay to prevent multiple triggers of event.
         */
        if((_status = reset_availability_state(OFF)) != ERR_NONE) {
            error_report(ERR_RESET_POWER,USR1,ERRCODE);
            return(ERR_RESET_POWER);
        }
        offset = POWER_OFF_PERIOD;
        add_time(&availability_time,-offset);

_probable_power_state = ON;
        timer(SECOND);
        break;
    case OFF:
        /*
         * Reset the event state variable.
         */
        _probable_power_state = OFF;
        break;
    }
    return(ERR_NONE);
}

/****************************************************************************
 *                                                                          *
 *              ATTEND   AVAILABILITY                                       *
 *                                                                          *
 ****************************************************************************/
static int attend_availability()
{
    long seconds_since_last_event;      /* seconds since last event change */
    long seconds_since_programmed_time; /* seconds since programmed powerup */
    long seconds_to_change;             /* seconds until event occurs */
    long seconds_to_programmed_change;  /* seconds until programmed event */

/*
     * Get the number of seconds since the last event state change.
     * Get the number of seconds until the programmed event state change.
     * NOTE: A Negative value = last event occurred in the past.
     *       A Zero value     = event is happening right now.
     *       A Positive value = last event occurred in the future.
     */
    seconds_since_last_event      = timecomp(&_current_time,&availability_time);
    seconds_since_programmed_time = timecomp(&_current_time,&_programmed_time);

/*
     * Based on the current event state.
     *      Reset the event state at time of trigger.
     *      Calculate the number of seconds until next state change.
     */
    switch(_probable_availability) {
    case ON:
        if(long_abs(seconds_since_last_event) >= (_power_on_period
           - BOOTUP_PERIOD)) {
            if((_status = reset_availability_state(OFF)) != ERR_NONE) {
                error_report(ERR_ATTEND_AVAILABILITY,USR1,ERRCODE);
                return(ERR_ATTEND_AVAILABILITY);
            }
            return(ERR_NONE);
        }
        seconds_to_change = (seconds_since_last_event + _power_on_period
                            - BOOTUP_PERIOD);
        break;
    case OFF:
        if(long_abs(seconds_since_last_event) >= (POWER_OFF_PERIOD
           + BOOTUP_PERIOD)) {
```

```c
            if((_status = reset_availability_state(ON)) != ERR_NONE) {
                error_report(ERR_ATTEND_AVAILABILITY,USR1,ERRCODE);
                return(ERR_ATTEND_AVAILABILITY);
            }
            return(ERR_NONE);
        }
        seconds_to_change = (seconds_since_last_event + POWER_OFF_PERIOD
                    + BOOTUP_PERIOD);
        break;
    }

/*
     * Determine if programmed power up will occur in the future or
     *      if it already occured in the past.
     */
    if(seconds_since_programmed_time >= 0)
        seconds_to_programmed_change = seconds_since_programmed_time;
    else
        seconds_to_programmed_change
            = (SECONDS_PER_DAY + seconds_since_programmed_time);

if(seconds_to_programmed_change < seconds_to_change)
        seconds_to_change = seconds_to_programmed_change;

/*
     * Display the number of seconds until next state change.
     */
    show_event(AVAILABILITY_CLOCK,seconds_to_change);
    return(ERR_NONE);
}

/***********************************************************************
 *                                                                     *
 *            R E S E T   A V A I L A B I L T Y   S T A T E            *
 *                                                                     *
 ***********************************************************************/
int reset_availability_state(state)
BYTE state;  /* state to put availability event in */
{
    static STRG event [] = {
        "Downside ADL Is Unavailable.",
        "Downside ADL Is Available."
    };

/*
     * Mark the event time.
     * Log a message to record the event.
     */
    mark_event(AVAILABILITY_CLOCK);
    logmsg(event[state],_logfiles[_system_flags.type].logtype,STRNG);

/*
     * Set/Reset the event state.
     */
    switch(state) {
    case ON:
        /*
         * Initialize global acoustic variables.
         * Reset the states defined at this state event.
         * Adjust timers to correspond with this state event.
         *      NOTE: The power clock must be adjusted back in time.
         *
         * Set the event state variable.
         */
        initialize_acoustics();
        if((_status = reset_dnupload_state(OPENED)) != ERR_NONE) {
            error_report(ERR_RESET_AVAILABILITY,USR1,ERRCODE);
            return(ERR_RESET_AVAILABILITY);
        }
        if((_status = reset_transducer_state(UPPER_XDUCER)) != ERR_NONE) {
            error_report(ERR_RESET_AVAILABILITY,USR1,ERRCODE);
            return(ERR_RESET_AVAILABILITY);
        }
        reset_reply_state(CLOSED);

copytime(&switch_time,&availability_time);
        add_time(&switch_time,-BOOTUP_PERIOD);

_probable_availability = ON;
        break;
    case OFF:
```

```
            /*
             * Reset the event state variable.
             */
            _display[AVAILABILITY_LOC].color = LTRED;
            _probable_availability = OFF;
            break;
    }
    return(ERR_NONE);
}

/****************************************************************************
 *                                                                          *
 *                    A T T E N D   T R A N S D U C E R S                   *
 *                                                                          *
 ****************************************************************************/
static int attend_transducers()
{
    long seconds_since_last_event; /* seconds since last event state change */
    long seconds_to_change;        /* seconds until event occurs */

/*
     * Transducers can be checked only if system is available.
     */
    if(_probable_availability == OFF) {
        clrcrt(SWITCH_LOC);
        return(ERR_NONE);
    }
    /*
     * Get the number of seconds since the last event state change.
     * NOTE: A Negative value = last event occurred in the past.
     *       A Zero value     = event is happening right now.
     *       A Positive value = last event occurred in the future.
     * Calculate the number of seconds until next state change.
     */
    seconds_since_last_event = timecomp(&_current_time,&_reception_time);

/*
     * Based on the current event state.
     *     Set/Reset the event state at time of trigger.
     */
    if(long_abs(seconds_since_last_event) >= TRANSDUCER_PERIOD) {
        switch(_probable_xducer) {
        case UPPER_XDUCER:
            if((_status = reset_transducer_state(LOWER_XDUCER))
            != ERR_NONE) {
                error_report(ERR_ATTEND_XDUCERS,DAS1,ERRCODE);
                return(ERR_ATTEND_XDUCERS);
            }
            break;
        case LOWER_XDUCER:
            if((_status = reset_transducer_state(UPPER_XDUCER))
            != ERR_NONE) {
                error_report(ERR_ATTEND_XDUCERS,DAS1,ERRCODE);
                return(ERR_ATTEND_XDUCERS);
            }
            break;
        }
        return(ERR_NONE);
    }
    seconds_to_change = (seconds_since_last_event + TRANSDUCER_PERIOD);

/*
     * Display the number of seconds until next state change.
     */
    show_event(XDUCER_CLOCK,seconds_to_change);
    return(ERR_NONE);
}

/****************************************************************************
 *                                                                          *
 *              R E S E T   T R A N S D U C E R   S T A T E                 *
 *                                                                          *
 ****************************************************************************/
static int reset_transducer_state(state)
BYTE state; /* state to put transducer event in */
{
    static int color [] = {
        LTGREEN,
        GREEN
    };
```

```c
    static STRG event [] = {
        "Downside ADL Transducer Set to Upper.",
        "Downside ADL Transducer Set to Lower."
    };

/*
     * Mark the event time.
     * Log a message to record the event.
     */
    mark_event(XDUCER_CLOCK);
    logmsg(event[state],_logfiles[_system_flags.type].logtype,STRNG);

/*
     * For DOWNSIDE systems only:
     *      Shutdown ATLAB to cause subsequent receiver initialization.
     *      Set Downside Transducer.
     * Set the event state.
     */
    if(_system_flags.type == DOWNSIDE) {
        if((_status = shutdown_atlab()) != ERR_NONE) {
            error_report(ERR_RESET_XDUCER,DAST,ERRCODE);
            return(ERR_RESET_XDUCER);
        }
        _downside_link_flags.transducer = state;
    }
    _probable_xducer = state;
    _display[SWITCH_LOC].color = color[state];
    return(ERR_NONE);
}

/****************************************************************************
*                                                                           *
*                    A T T E N D   R E P L Y   W I N D O W                  *
*                                                                           *
****************************************************************************/
static void attend_reply_window()
{
    double  data_rate;              /* downside data rate */
    long    reply_period;           /* time allowed (in seconds) for reply */
    long    seconds_since_last_event; /* secs since last event state change */

/*
     * Get the number of seconds since the last event state change.
     * NOTE: A Negative value = last event occurred in the past.
     *       A Zero value     = event is happening right now.
     *       A Positive value = last event occurred in the future.
     * The reply window can be checked only if OPENED.
     */
    seconds_since_last_event = timecomp(&_current_time,&reply_time);

/*
     * Calculate the data rate of the uplink to use for reply_period.
     * Calculate the reply period to use for timeout check.
     * Based on the current event state.
     *      Reset the event state at time of trigger.
     */
    data_rate
    = (_configuration[_downside_link_flags.control_code].bit_rate
    / _speed_reduction_rx);

reply_period = (long)ceil(((2.0L * PROPAGATION_DELAY) + TURN_AROUND_DELAY
                + (((double)HEADER_BYTES + (double)DETECTION_BYTES)
                / (data_rate / (double)BITS_PER_BYTE)));

switch(reply_window) {
    case OPENED:
        if((long_abs(seconds_since_last_event) >= reply_period)
        && (_getacousticrx == EMPTY))
            reset_reply_state(CLOSED);
        break;
    case CLOSED:
        break;
    }
}

/****************************************************************************
*                                                                           *
*                    R E S E T   R E P L Y   S T A T E                      *
*                                                                           *
****************************************************************************/
void reset_reply_state(state)
BYTE state; /* state to put reply event in */
{
```

```
static STRG event [] = {
    "Reply Window Is Closed.",
    "Reply Window Is Opened."
};

/*
 * Mark the event time.
 * Log a message to record the event.
 */
mark_event(REPLY_CLOCK);
/*logmsg(event[state],_logfiles[_system_flags.type].logtype,STRNG);*/

/*
 * Set/Reset the event state.
 */
switch(state) {
case OPENED:
    reply_window = OPENED;
    set_busy_bit(_master_serial_port,ON);
    break;
case CLOSED:
    reply_window = CLOSED;
    set_busy_bit(_master_serial_port,OFF);
    break;
/****************************************************************************
 *                                                                          *
 *                         A D D   T I M E                                  *
 *                                                                          *
 ****************************************************************************/
void add_time(time,addsecs)
struct TIMEDATE* time; /* timedate structure pointer to process */
long    addsecs;       /* number of seconds to add or subtract (24 hours) */
{
    long hours;   /* hours to add or subtract */
    long minutes; /* minutes to add or subtract */
    long seconds; /* seconds to add or subtract */

/*
     * Check for valid argument.
     * Calculate time components.
     */
    if(!((addsecs >= (-(SECONDS_PER_DAY))) && (addsecs <= SECONDS_PER_DAY)))
        return;

/*
     * Check for addition or subtraction.
     * Process the components.
     */
    if(addsecs >= ZERO_SECONDS) {
        hours   = (long)(addsecs / SECONDS_PER_HOUR);
        minutes = (long)((addsecs
                - (hours * SECONDS_PER_HOUR)) / SECONDS_PER_MINUTE);
        seconds = (long)(addsecs - (hours * SECONDS_PER_HOUR)
                - (minutes * SECONDS_PER_MINUTE));

if((time->seconds += (int)seconds) >= (int)SECONDS_PER_MINUTE) {
            time->minutes++;
            time->seconds -= (int)SECONDS_PER_MINUTE;
        }
        if((time->minutes += (int)minutes) >= (int)MINUTES_PER_HOUR) {
            time->hours++;
            time->minutes -= (int)MINUTES_PER_HOUR;
        }
        if((time->hours += (int)hours) >= (int)HOURS_PER_DAY)
            time->hours -= (int)HOURS_PER_DAY;
    }
    else {
        hours   = (long)(-addsecs / SECONDS_PER_HOUR);
        minutes = (long)((-addsecs
                - (hours * SECONDS_PER_HOUR)) / SECONDS_PER_MINUTE);
        seconds = (long)(-addsecs - (hours * SECONDS_PER_HOUR)
                - (minutes * SECONDS_PER_MINUTE));

if((time->seconds -= (int)seconds) < (int)ZERO_SECONDS) {
            time->minutes--;
            time->seconds += (int)SECONDS_PER_MINUTE;
        }
        if((time->minutes -= (int)minutes) < (int)ZERO_MINUTES) {
            time->hours--;
            time->minutes += (int)MINUTES_PER_HOUR;
        }
        if((time->hours -= (int)hours) < (int)ZERO_HOURS)
            time->hours += (int)HOURS_PER_DAY;
```

```
/****************************************************************************
*                                                                           *
*                          T I M E C O M P                                  *
*                                                                           *
****************************************************************************/
static long timecomp(timedate_1,timedate_2)
struct TIMEDATE* timedate_1; /* structure containing time to compare */
struct TIMEDATE* timedate_2; /* structure containing time to compare */
{
    long hours_1;   /* local copy of number of hours in timedate_1 */
    long hours_2;   /* local copy of number of hours in timedate_2 */
    long seconds_1; /* number of seconds representing timedate_1 */
    long seconds_2; /* number of seconds representing timedate_2 */

/*
     * Initialize local copies of passed in data to assure unaffected globals.
     * Check for special cases at midnight.
     * Add the number of seconds for each structure.
     * Return the difference.
     *
     * NOTE: A Positive difference means time_2 is later in time than time_1.
     *       A Negative difference means time_1 is later in time than time_2.
     */
    hours_1 = timedate_1->hours;
    hours_2 = timedate_2->hours;

if(((hours_1 == ZERO_HOURS) && (hours_2 == (HOURS_PER_DAY - 1L)))
    || ((hours_2 == ZERO_HOURS) && (hours_1 == (HOURS_PER_DAY - 1L)))) {
        if(hours_1 == ZERO_HOURS)
            hours_1 = HOURS_PER_DAY;
        if(hours_2 == ZERO_HOURS)
            hours_2 = HOURS_PER_DAY;
    } seconds_1 = ((hours_1 * SECONDS_PER_HOUR)
               + ((long)timedate_1->minutes * SECONDS_PER_MINUTE)
               + (long)timedate_1->seconds);

seconds_2 = ((hours_2 * SECONDS_PER_HOUR)
               + ((long)timedate_2->minutes * SECONDS_PER_MINUTE)
               + (long)timedate_2->seconds);

return(seconds_2 - seconds_1);
}
/****************************************************************************
*                                                                           *
*                          M A R K   E V E N T                              *
*                                                                           *
****************************************************************************/
static void mark_event(clock)
BYTE clock; /* type of clock to mark */
{
    /*
     * Mark the appropriate clock with the current time.
     */
    switch(clock) {
    case XDUCER_CLOCK:
        copytime(&_reception_time,&_current_time);
        break;
    case AVAILABILITY_CLOCK:
        copytime(&availability_time,&_current_time);
        break;
    case DNUPLOAD_CLOCK:
        copytime(&dnupload_time,&_current_time);
        break;
    case POWER_CLOCK:
        copytime(&switch_time,&_current_time);
        break;
    case REPLY_CLOCK:
        copytime(&reply_time,&_current_time);
        break;
/****************************************************************************
*                                                                           *
*                    L O N G   A B S O L U T E   V A L U E                  *
*                                                                           *
****************************************************************************/
static long long_abs(value)
long value; /* value to take absolute value of */
{
    return((value < 0L) ? (-value) : (value));
}
```

```
/************************************************************************
 *                                                                      *
 *                         S H O W   E V E N T                          *
 *                                                                      *
 ************************************************************************/
static void show_event(clock,seconds_to_change)
BYTE clock;               /* type of clock to show */
long seconds_to_change;   /* seconds until event occurs */
{
    BYTE location;        /* screen location to use */
    BYTE state_variable;  /* state variable to use */
    STRG *string_array;   /* string array to use */
    long blink_threshold; /* threshold at which to start blinking message */
    long hours;           /* hours portion from seconds_to_change */
    long minutes;         /* minutes portion from seconds_to_change */
    long seconds;         /* seconds portion from seconds_to_change */ static STRG dwn_xducer [] = {
        "Swap to Lower XDUCR in",
        "Swap to Upper XDUCR in"
    };

static STRG availability [] = {
        "ADL is Available in ",
        "ADL is Unavailable in "
    };

/*
     * Show current event states only after first power on event.
     */
    if(_first_power_on_event == FALSE)
        return;

/*
     * Depending on the clock - set the display variables.
     */
    switch(clock) {
    case XDUCER_CLOCK:
        location        = SWITCH_LOC;
        string_array    = dwn_xducer;
        state_variable  = _probable_xducer;
        blink_threshold = XDUCER_BLINK;
        break;
    case AVAILABILITY_CLOCK:
        location        = AVAILABILITY_LOC;
        string_array    = availability;
        state_variable  = _probable_availability;
        blink_threshold = BOOTUP_PERIOD;
        break;
    }

/*
     * Calculate the time portions from seconds to change.
     * Build a display string.
     * Display the clock with the countdown before event.
     */
    hours   = (long)(seconds_to_change / SECONDS_PER_HOUR);
    minutes = (long)((seconds_to_change
              - (hours * SECONDS_PER_HOUR)) / SECONDS_PER_MINUTE);
    seconds = (long)(seconds_to_change - (hours * SECONDS_PER_HOUR)
              - (minutes * SECONDS_PER_MINUTE));

sprintf((char*)_display[location].buffer,"%s %2.2ld:%2.2ld:%2.2ld"
        ,string_array[state_variable],hours,minutes,seconds);

if(seconds_to_change <= blink_threshold)
        putmsg(location,VBLINK,STRNG);
    else
        putmsg(location,NONE,STRNG);
}
include <system.h> static BYTE  control_code         (void);
static WORD  build_codeword_array (BYTE code,WORD *word_array,BYTE *byte_array
                                  ,WORD length);
static WORD *codeword             (BYTE incode,BYTE diversity);

/************************************************************************
 *                                                                      *
 *                         F O R M C O D E                              *
 *                                                                      *
 ************************************************************************/
WORD *formcode(message_block,message_length)
```

```c
BYTE *message_block;    /* buffer containing transmission data  */
WORD *message_length;   /* passed in as # of Bytes in message   */
                        /* returned as # of Words in transmission */
{
    static WORD codeword_array [MAXCODEWORDS]; /* transmission block */

/*
     * Each Message Byte will be converted to a block of Codewords.
     * Build the codeword array from the transmission bytes.
     * Set return value of data length.
     */
    *message_length = build_codeword_array(control_code(),codeword_array
            ,message_block,*message_length);
    return(codeword_array);
}
/***************************************************************************
 *                                                                         *
 *                  B U I L D   C O D E W O R D   A R R A Y                *
 *                                                                         *
 ***************************************************************************/
static WORD build_codeword_array(code,word_array,byte_array,length)
BYTE  code;         /* control code used to set transmission parameters */
WORD* word_array;   /* pointer to Acoustic word_array block              */
BYTE* byte_array;   /* pointer to Serial byte_array block                */
WORD  length;       /* Number of Bytes in byte_array                     */
{
    BYTE codewords_per_byte; /* number of codewords generated per byte  */
    BYTE diversity;          /* diversity level to use for transmission */
    WORD array_index;        /* index into word-sized codeword array    */
    WORD block_index;        /* index into word-sized codeword block    */
    WORD byte_index;         /* index into byte-sized message buffer    */
    WORD codewords;          /* number of codewords generated           */
    WORD *block;             /* pointer for acoustic codeword block     */

/*
     * Set configuration parameters based on control_code.
     */
    codewords_per_byte = _configuration[code].codewords_per_byte;
    diversity          = _configuration[code].diversity;

/*
     * Get the codeword block for each byte_array byte.
     * Put the codeword block into the codeword array.
     *
     * NOTE: The Detection data pattern follows the transmission
     *       patterns associated with diversity_2 using the constants
     *       defined in the detection_block array.
     *       These patterns are generated under diversity_2 at all times.
     */
    for(byte_index = 0, array_index = 0; byte_index < length; byte_index++) {
        if(byte_index < DETECTION_BYTES) {
            block = codeword(byte_array[byte_index],DIV_2);
            for(block_index = 0; block_index < _4_CODEWORD_PER_BYTE;
            block_index++)
                word_array[array_index++] = block[block_index];
        }
        else {
            block = codeword(byte_array[byte_index],diversity);
            for(block_index = 0; block_index < codewords_per_byte;
            block_index++)
                word_array[array_index++] = block[block_index];
        }
    }
    /*
     * NOTE: This provides in-air testing of the transducers
     *       by zeroing out transmit tones 0 - 7 (the most significant byte).
     */
    codewords = array_index;
    if(_system_flags.channel == AIR)
        for(array_index = 0; array_index < codewords; array_index++)
            word_array[array_index] &= MSB;
    return(codewords);

/***************************************************************************
 *                                                                         *
 *                       C O N T R O L   C O D E                           *
 *                                                                         *
 ***************************************************************************/
static BYTE control_code()
{
```

```c
    switch(_system_flags.type) {
    default:
    case TOPSIDE:
        return((BYTE)_topside_link_flags.control_code);
    case DOWNSIDE:
        return((BYTE)_downside_link_flags.control_code);
    }
/************************************************************************
 *                                                                      *
 *                          C O D E W O R D                             *
 *                                                                      *
 ************************************************************************/
static WORD* codeword(incode,diversity)
BYTE    incode;   /* the byte to convert into a control word */
BYTE    diversity; /* diversity level to use for generating codewords */
{
    WORD hop, shift;
    WORD hops_per_byte;
    WORD mask, mask0, mask1;
    WORD maskfactor;
    WORD shifts_per_hop;
    WORD word0, word1;
    static WORD word_block [MAXWORDS];
    static struct generator_t {
        WORD hops_per_byte; /* Tone group hops per data byte */
        WORD word0;         /* Initial codeword for group 0 */
        WORD word1;         /* Initial codeword for group 1 */
        WORD mask0;         /* Initial mask for group 0 */
        WORD mask1;         /* Initial mask for group 1 */
        WORD maskfactor;    /* Factor mask changes by per bit */
    } generator [] = {
        {1, 0xAAAA, 0x0000, 0x0001, 0x0000, 0x0004},  /* diversity = 0 */
        {2, 0x2222, 0x8888, 0x0001, 0x0004, 0x0010},  /* diversity = 1 */
        {4, 0x2222, 0x8888, 0x0011, 0x0044, 0x0100},  /* diversity = 2 */
        {0, 0x0000, 0x0000, 0x0000, 0x0000, 0x0000},  /* dummy diversity 3 */
        {8, 0x2222, 0x8888, 0x1111, 0x4444, 0x0001}   /* diversity = 4 */
    };
    /*
     * Set codeword generator parameters
     */
    hops_per_byte = generator[diversity].hops_per_byte;
    mask0         = generator[diversity].mask0;
    mask1         = generator[diversity].mask1;
    maskfactor    = generator[diversity].maskfactor;
    word0         = generator[diversity].word0;
    word1         = generator[diversity].word1;
    /*
     * Calculate the number of shifts per hop.
     * Step through each hop.
     */
    shifts_per_hop = (SHIFTS_PER_BYTE / hops_per_byte);
    for(hop = 0; hop < hops_per_byte; hop++) {
        /*
         * The codeword and mask is initialized depending on the hop.
         * Even number hops are initialized to word0 and masked by mask0.
         * Odd number hops are initialized to word1 and masked by mask1.
         */
        if((hop % 2) == 0) {
            word_block[hop] = word0;
            mask = mask0;
        } else {
            word_block[hop] = word1;
            mask = mask1;
        }
        /*
         * Shift through each bit of the incode for this hop.
         * The range of shift values for the incode depends on the hop.
         */
        for(shift = (shifts_per_hop * hop);
            shift < (shifts_per_hop * (hop + 1));
            shift++) {
            /*
             * Check the bit for a "1" value.
             * Apply the mask for that bit to the word.
             * Change the mask for the next bit.
             */
            if(((incode >> shift) & 0x01) == 0x01)
                word_block[hop] = (word_block[hop] | mask);
            mask *= maskfactor;
        }
    }
    return(word_block);
```

```c
include <system.h>
#include <buffers.h>

/**************************************************************************
*                                                                         *
*                            G L O B A L S                                *
*                                                                         *
**************************************************************************/

/*
 * Global Variable Definitions
 */
BOOL            _asi_opened;            /* Flag = SERIAL Dev          */
BOOL            _atlab_opened;          /* Flag = ATLAB Dev           */
BOOL            _clrverbose_flag;       /* Flag = Cleared menu        */
BOOL            _das_receiver_request;  /* Flag = Request DAS         */
BOOL            _dnupload_window;       /* Flag = DnUpLoad Window     */
BOOL            _first_power_on_event;  /* Flag = First Power On?     */
BOOL            _restart;               /* Flag = Restart ADL         */
BOOL            _timedate_request;      /* Flag = Request Timedate    */
BYTE            _atlab_irq_number;      /* IRQ for ATLAB              */
BYTE            _byteb[USRBUFLEN];      /* rec() Byte Buffer          */
BYTE            _das_irq_number;        /* IRQ for DAS                */
BYTE            _downside_byte;         /* Downside Byte              */
BYTE            _getacousticrx;         /* State of Acoustic RX       */
BYTE            _getacoustictx;         /* State of Acoustic TX       */
BYTE            _menu_type;             /* Type of menu to display    */
BYTE            _probable_availability;/* Probable ADL Ready State   */
BYTE            _probable_power_state;  /* Probable ADL Power State   */
BYTE            _probable_xducer;       /* Probable Downside Xducer   */
BYTE            _topside_byte;          /* Topside Byte               */
BYTE*           _serial_broadcast;      /* Broadcast Pointer          */
WORD            _acoustic_txcount;      /* Codeword Count             */
WORD            _serial_txcount;        /* Byte Count                 */
WORD*           _acoustic_broadcast;    /* Broadcast Pointer          */
WORD*           _master_dma_buffer;     /* Master DMA Buf Ptr         */
double          _speed_reduction_rx;    /* Speed Reduced Target RX    */
double          _speed_reduction_tx;    /* Speed Reduced Target TX    */
int             _acoustic_rxcount;      /* Byte Count                 */
int             _codeword_index;        /* Codeword Index             */
int             _master_serial_port;    /* Master Serial Port         */
int             _status;                /* Status of Function         */
int             _videomode;             /* Video Mode                 */
int             _videopage;             /* Video Page                 */
long            _power_on_period;       /* Power On Period duration   */
struct TIMEDATE _current_time;          /* Current Time Pointer       */
struct TIMEDATE _programmed_time;       /* Programmed Power On Time   */
struct TIMEDATE _reception_time;        /* Last DAS Reception         */
struct link_flags_t  _downside_link_flags;  /* Downside ADL Flags     */
struct link_flags_t  _topside_link_flags;   /* Topside ADL Flags      */
struct system_flags_t _system_flags;    /* Sytem Config Flags         */

/*
 * Used to Identify Interrupt Request Stuff.
 * NOTE: Do NOT Change the order of the initialization of this
 *       structure because it is arranged to correspond with IRQ's.
 */
struct irq_table_t _irq_table [] = {
    {0x08,BIT0,PIC1,FALSE,TRUE ,15}, /* IRQ =  0 */
    {0x09,BIT1,PIC1,FALSE,TRUE ,14}, /* IRQ =  1 */
    {0x0A,BIT2,PIC1,FALSE,TRUE ,13}, /* IRQ =  2 */
    {0x0B,BIT3,PIC1,TRUE ,TRUE , 4}, /* IRQ =  3 */
    {0x0C,BIT4,PIC1,TRUE ,TRUE , 3}, /* IRQ =  4 */
    {0x0D,BIT5,PIC1,TRUE ,TRUE , 2}, /* IRQ =  5 */
    {0x0E,BIT6,PIC1,TRUE ,FALSE, 1}, /* IRQ =  6 */
    {0x0F,BIT7,PIC1,TRUE ,FALSE, 0}, /* IRQ =  7 */
    {0x70,BIT0,PIC2,FALSE,TRUE ,12}, /* IRQ =  8 */
    {0x71,BIT1,PIC2,TRUE ,TRUE ,11}, /* IRQ =  9 */
    {0x72,BIT2,PIC2,TRUE ,FALSE,10}, /* IRQ = 10 */
    {0x73,BIT3,PIC2,TRUE ,FALSE, 9}, /* IRQ = 11 */
    {0x74,BIT4,PIC2,TRUE ,FALSE, 8}, /* IRQ = 12 */
    {0x75,BIT5,PIC2,FALSE,TRUE , 7}, /* IRQ = 13 */
    {0x76,BIT6,PIC2,TRUE ,TRUE , 6}, /* IRQ = 14 */
    {0x77,BIT7,PIC2,TRUE ,FALSE, 5}  /* IRQ = 15 */
};

/*
 * Used to Identify Acoustic Transmission Stuff.
 * NOTE: Do NOT Change the order of the initialization of this
 *       structure unless the corresponding #defines are
 *       updated also. ie., CODE_0 --> _configuration[CODE_0].diversity
 */
struct configuration_t _configuration [] = {
```

```
        {DIV_4,_8_CODEWORD_PER_BYTE, 19.53125,0.0512,102400L,64,  19.53125},
        {DIV_4,_8_CODEWORD_PER_BYTE, 39.06250,0.0256, 51200L,32,  39.06250},
        {DIV_4,_8_CODEWORD_PER_BYTE, 78.12500,0.0128, 25600L,16,  78.12500},
        {DIV_4,_8_CODEWORD_PER_BYTE,156.25000,0.0064, 12800L, 8, 156.25000},
        {DIV_4,_8_CODEWORD_PER_BYTE,312.50000,0.0032,  6400L, 4, 312.50000},
        {DIV_2,_4_CODEWORD_PER_BYTE,312.50000,0.0032,  6400L, 4, 625.00000},
        {DIV_1,_2_CODEWORD_PER_BYTE,312.50000,0.0032,  6400L, 4,1250.00000},
        {DIV_0,_1_CODEWORD_PER_BYTE,312.50000,0.0032,  6400L, 4,2500.00000}
};

/*
 * Used to Identify Display Stuff.
 * NOTE: Do NOT Change the order of the initialization of this
 *       structure unless the corresponding #defines are
 *       updated also. ie., HOME_LOC -->_display[HOME_LOC].buffer
 */
struct display_t _display [] = {
        { 0, 0,GREEN   ,HOME_LEN         ,home_buf         ,NC1,ZERO ,ON  },
        { 1, 0,WHITE   ,HOWTOUSEIT_LEN   ,howtouseit_buf   ,NC1,ZERO ,OFF},
        {12, 0,YELLOW  ,RECINTR_LEN      ,recintr_buf      ,NC1,ZERO ,ON  },
        {12,40,YELLOW  ,XMTINTR_LEN      ,xmtintr_buf      ,NC1,ZERO ,ON  },
        {16, 0,LTCYAN  ,RECEIVE_LEN      ,receive_buf      ,NB4,TENTH,OFF},
        {20, 0,LTCYAN  ,TRANSMIT_LEN     ,transmit_buf     ,NA4,TENTH,OFF},
        {24, 0,LTRED   ,ERROR_LEN        ,error_buf        ,NA3,HALF ,ON  },
        {24,33,WHITE   ,CLOCK_LEN        ,clock_buf        ,NC1,ZERO ,ON  },
        { 6,19,GREEN   ,CORRELATE_LEN    ,correlate_buf    ,NC1,ZERO ,ON  },
        {24,48,LTGREEN,SWITCH_LEN        ,switch_buf       ,NC1,ZERO ,ON  },
        {15, 0,GREEN   ,ADLLOG_LEN       ,adllog_buf       ,NC1,ZERO ,ON  },
        {15,40,GREEN   ,EXTLOG_LEN       ,extlog_buf       ,NC1,ZERO ,ON  },
        {24, 0,GREEN   ,AVAILABILITY_LEN,availability_buf,NC1,ZERO ,ON  },
        {14, 0,YELLOW  ,RECINTR_LEN      ,recintr_buf      ,NC1,ZERO ,ON  },
        {14,40,YELLOW  ,XMTINTR_LEN      ,xmtintr_buf      ,NC1,ZERO ,ON  }
};

/*
 * Used to Identify Port Stuff.
 * NOTE: Do NOT Change the order of the initialization of this
 *       structure unless the corresponding #defines are
 *       updated also. ie., COM1 --> _port_stuff[COM1].name
 */
struct port_stuff_t _port_stuff [] = {
    {USRBUFLEN,com1usrbuf,"COM1:",TRUE,OFF},
    {USRBUFLEN,com2usrbuf,"COM2:",TRUE,OFF},
    {USRBUFLEN,das1usrbuf,"DAS1:",TRUE,ON },
    {USRBUFLEN,usr1usrbuf,"USR1:",TRUE,OFF}
};

/*
 * Used to identify logfiles indexed to type.
 * NOTE: Do NOT Change the order of the initialization of this
 *       array unless the corresponding #defines are
 *       updated also. ie., TOP_LOG --> "C:LOGFILE.TOP"
 */
struct logfiles_t _logfiles [] = {
    {TOP_LOG,"C:LOGFILE.TOP",CLOSED,0,O_TEXT  ,0L,"C:LOGFILE%lu.TOP",FALSE},
    {DWN_LOG,"C:LOGFILE.DWN",CLOSED,0,O_TEXT  ,0L,"C:LOGFILE%lu.DWN",FALSE},
    {SSC_LOG,"C:LOGFILE.SSC",CLOSED,0,O_BINARY,0L,"C:LOGFILE%lu.SSC",FALSE},
    {FTP_LOG,"C:LOGFILE.FTP",CLOSED,0,O_BINARY,0L,"C:LOGFILE%lu.FTP",FALSE}
};

/****************************************************************************
 *                                                                          *
 *           I N I T I A L I Z E   A C O U S T I C   R E C E I V E          *
 *                                                                          *
 ****************************************************************************/
int initialize_acoustic_receive()
{
    /*
     * Set Transmit-Receive Relay and select the Transducer
     *     (Downside:Upper/Lower or Topside:Forward/Aft).
     * Set up ATLAB for Acoustic Reception (start interrupts).
     */
    if((_status = setup_channel_for(RECEIVE)) != ERR_NONE) {
        error_report(ERR_INITACOUSTICREC,DAS1,ERRCODE);
        return(ERR_INITACOUSTICREC);
    }
    if((_status = setup_atlab_for(ACOUSTIC_RECEPTION)) != ERR_NONE) {
        error_report(ERR_INITACOUSTICREC,DAS1,ERRCODE);
        return(ERR_INITACOUSTICREC);
    }
    return(ERR_NONE);
}
```

```
/****************************************************************************
 *                                                                          *
 *   A C O U S T I C   R E C E I V E   I N T E R R U P T   F U N C T I O N  *
 *                                                                          *
 ****************************************************************************/
void acoustic_rec_intr_function()
{
    int buffer_number;               /* ATLAB buffer number */
    int unit_number = DAS_UNIT_NUMBER; /* DAS unit number */

/*
     * Attend to the keyboard.
     *      NOTE: The keyboard must be attended to prior to releasing the
     *            ATLAB buffer - in case ATLAB detects an error and the
     *            receiver needs to be turned off.
     *
     * Attend to overhead functions.
     * Check if overhead function shutdown ATLAB.
     *      NOTE: This function must occur prior to releasing the ATLAB buffer.
     *            If an event occurs - all the ATLAB buffers will be returned.
     *
     * Request a buffer release from ATLAB (release it for processing).
     * Call the acoustic receiver.
     * Return the dma buffer to ATLAB for further DMA I/O.
     *
     *      NOTE: Any error will cause ATLAB to be shut down.
     */
    if((_status = attend_keyboard()) != ERR_NONE) {
        error_report(ERR_ACOUSTICRXINTFUNCT,DAS1,ERRCODE);
        if((_status = shutdown_atlab()) != ERR_NONE)
            error_report(ERR_ACOUSTICRXINTFUNCT,DAS1,ERRCODE);
        return;
    }
    if((_status = attend_overhead()) != ERR_NONE) {
        error_report(ERR_ACOUSTICRXINTFUNCT,DAS1,ERRCODE);
        if((_status = shutdown_atlab()) != ERR_NONE)
            error_report(ERR_ACOUSTICRXINTFUNCT,DAS1,ERRCODE);
        return;
    }
    if(_system_flags.activated == OFF)
        return;

if(_port_stuff[DAS1].installed == TRUE)
        if((_status = AL_RELEASE_BUFFER(&unit_number,&buffer_number))
            != ALE_NORMAL) {
            error_report(ERR_ACOUSTICRXINTFUNCT,DAS1,ALERR);
            if((_status = shutdown_atlab()) != ERR_NONE)
                error_report(ERR_ACOUSTICRXINTFUNCT,DAS1,ERRCODE);
            return;
        }
    rec();
    if(_port_stuff[DAS1].installed == TRUE)
        if((_status = AL_RETURN_BUFFER(buffer_number)) != ALE_NORMAL) {
            error_report(ERR_ACOUSTICRXINTFUNCT,DAS1,ALERR);
            if((_status = shutdown_atlab()) != ERR_NONE)
                error_report(ERR_ACOUSTICRXINTFUNCT,DAS1,ERRCODE);
            return;
        }
}
/****************************************************************************
 *                                                                          *
 *       I N I T I A L I Z E   A C O U S T I C   T R A N S M I T            *
 *                                                                          *
 ****************************************************************************/
int initialize_acoustic_transmit()
{
    /*
     * Assert the Computer Busy Bit.
     * For DOWNSIDE systems -
     *      delay to allow external system to react to Blanking discrete.
     * Set up channel for Acoustic Transmission.
     * Set up ATLAB for Acoustic Transmission (start interrupts).
     */
    set_busy_bit(_master_serial_port,ON);
    if(_system_flags.type == DOWNSIDE)
        timer(6*TENTH);

if((_status = setup_channel_for(TRANSMIT)) != ERR_NONE) {
        error_report(ERR_INITACOUSTICXMIT,DAS1,ERRCODE);
        return(ERR_INITACOUSTICXMIT);
    }
```

```
    if((_status = setup_atlab_for(ACOUSTIC_TRANSMISSION)) != ERR_NONE) {
        error_report(ERR_INITACOUSTICXMIT,DAS1,ERRCODE);
        return(ERR_INITACOUSTICXMIT);
    }
    return(ERR_NONE);

/****************************************************************************
 *                                                                          *
 *            I N I T I A L I Z E   S E R I A L   T R A N S M I T           *
 *                                                                          *
 ****************************************************************************/
int initialize_serial_transmit(port)
int port; /* port to send data to */
{
    BYTE irq_number; /* IRQ number associated with the port */

/*
     * Serial transmission is only provided for serial ports.
     * The serial port IRQ line must be enabled to allow a transmission.
     * Clear the transmitter buffer.
     * Temporarily hold serial port transmitter interrupts.
     * Transfer the _serial_broadcast buffer to the serial transmit buffer.
     * Resume serial port transmitter interrupts.
     */
    if(is_port_serial(port) == FALSE) {
        _status = ERR_ILLEGAL_PORT;
        error_report(ERR_INITSERIALXMIT,USR1,ERRCODE);
        return(ERR_INITSERIALXMIT);
    }
    irq_number = (BYTE)((port == COM1) ? COM1_IRQ_NUMBER : COM2_IRQ_NUMBER);

if(_irq_table[irq_number].used_by_adl == FALSE) {
        _status = ERR_PORT_NOT_ENABLED;
        error_report(ERR_INITSERIALXMIT,port,ERRCODE);
        return(ERR_INITSERIALXMIT);
    }
    if((_status = asiclear(port,ASOUT)) != ASSUCCESS) {
        error_report(ERR_INITSERIALXMIT,port,GLCOMM);
        return(ERR_INITSERIALXMIT);
    }
    if((_status = asihold(port,ASOUT)) != ASSUCCESS) {
        error_report(ERR_INITSERIALXMIT,port,GLCOMM);
        return(ERR_INITSERIALXMIT);
    }
    if(asiputb(port,(char*)_serial_broadcast,_serial_txcount)
        != _serial_txcount) {
        _status = _aserror;
        error_report(ERR_INITSERIALXMIT,port,GLCOMM);
        return(ERR_INITSERIALXMIT);
    }
    if((_status = asiresume(port,ASOUT)) != ASSUCCESS) {
        error_report(ERR_INITSERIALXMIT,port,GLCOMM);
        return(ERR_INITSERIALXMIT);
    }
    return(ERR_NONE);
}

/****************************************************************************
 *                                                                          *
 * A C O U S T I C   T R A N S M I T   I N T E R R U P T   F U N C T I O N  *
 *                                                                          *
 ****************************************************************************/
void acoustic_xmit_intr_function()
{
    int buffer_number;                  /* ATLAB buffer number */
    int unit_number = DAS_UNIT_NUMBER;  /* DAS unit number */

/*
     * For non-downside systems only:
     *       Update system time.
     *       Attend power cycle function.
     *       Check if overhead function shutdown ATLAB.
     *           NOTE: This function must occur prior to releasing the ATLAB
     *                 buffer. If an event occurs - all the ATLAB buffers will
     *                 be returned.
     *
     * Request a buffer release from ATLAB (release it for processing).
     * Increment the transmitter buffer pointer.
     * Return the dma buffer to ATLAB for further DMA I/O.
     * At the end of transmission:
     *       Shutdown ATLAB to stop transmitter interrupts.
     *
     *       NOTE: Any error will cause ATLAB to be shut down.
```

```
    */
    if(_system_flags.type != DOWNSIDE) {
        putime();
        if((_status = attend_power_cycle()) != ERR_NONE) {
            error_report(ERR_ACOUSTICTXINTFUNCT,DAS1,ERRCODE);
            if((_status = shutdown_atlab()) != ERR_NONE)
                error_report(ERR_ACOUSTICTXINTFUNCT,DAS1,ERRCODE);
            return;
        }
        if(_system_flags.activated == OFF)
            return;
    }
    if(_port_stuff[DAS1].installed == TRUE)
        if((_status = AL_RELEASE_BUFFER(&unit_number,&buffer_number))
          != ALE_NORMAL) {
            error_report(ERR_ACOUSTICTXINTFUNCT,DAS1,ALERR);
            if((_status = shutdown_atlab()) != ERR_NONE)
                error_report(ERR_ACOUSTICTXINTFUNCT,DAS1,ERRCODE);
            return;
        }
    if(++_codeword_index < _acoustic_txcount) {
        if(_port_stuff[DAS1].installed == TRUE) {
            if((_status = AL_OUTPUT_DIGITAL_VALUE(BOTHPORTS,(int)ALLBITS
              ,(int)_acoustic_broadcast[_codeword_index])) != ALE_NORMAL) {
                error_report(ERR_ACOUSTICTXINTFUNCT,DAS1,ALERR);
                if((_status = shutdown_atlab()) != ERR_NONE)
                    error_report(ERR_ACOUSTICTXINTFUNCT,DAS1,ERRCODE);
                return;
            }
            if((_status = AL_RETURN_BUFFER(buffer_number)) != ALE_NORMAL) {
                error_report(ERR_ACOUSTICTXINTFUNCT,DAS1,ALERR);
                if((_status = shutdown_atlab()) != ERR_NONE)
                    error_report(ERR_ACOUSTICTXINTFUNCT,DAS1,ERRCODE);
                return;
            }
        }
    }
    else {
        if((_status = shutdown_atlab()) != ERR_NONE) {
            error_report(ERR_ACOUSTICTXINTFUNCT,DAS1,ERRCODE);
            return;
        }
    }
} static STRG strsift           (STRG destination,STRG source,STRG mask);
static int  execute_key       (WORD key);
static int  send_message      (int port);
static int  submit_header_flag (int port);
static int  submit_powerup_time (void);
static void submit_destination (void);
static void submit_speed_reduction (BYTE device);

static BYTE maxmsg_mode = OFF;
static STRG request     = "Press (+/-)|Enter to Change|Set";

/****************************************************************
 *                                                              *
 *              A T T E N D   K E Y B O A R D                   *
 *                                                              *
 ****************************************************************/
int attend_keyboard()
{
    /*
     * Check if keyboard has been struck.
     * Execute the routine indicated by the keycode.
     */
    if(!gfkbhit())
        return(ERR_NONE);
    if((_status = execute_key(getkey())) != ERR_NONE) {
        error_report(ERR_ATTEND_KEYBOARD,USR1,ERRCODE);
        return(ERR_ATTEND_KEYBOARD);
    }
    return(ERR_NONE);
}

/****************************************************************
 *                                                              *
 *                  E X E C U T E   K E Y                       *
 *                                                              *
 ****************************************************************/
static int execute_key(key)
WORD key; /* keyboard keycode to act upon */
```

```c
{
    /*
     * The State of the Acoustic RECEIVER is Toggled with the HOME key.
     * Keyboard Routines are NOT Permitted while the DAS Interrupts are ON.
     * For non-acceptable keys during interrupts:
     *       Flush the keyboard to prevent buffer overflow.
     *           NOTE: A keyboard buffer overflow will cause the system to
     *                 crash.
     */
    switch(key) {
    case CTRLHOME:
        _menu_type = (BYTE)((_menu_type == SHORT_MENU)
                ? (LONG_MENU) : (SHORT_MENU));
    case HOME:
        _das_receiver_request
            = (BOOL)((_das_receiver_request == ON) ? OFF : ON);
        return(ERR_NONE);
    default:
        if(_system_flags.activated == ON) {
            kbflush();
            return(ERR_NONE);
        }
        break;
    } switch(_menu_type) {
    case LONG_MENU:
        switch(key) {
        case SF5:
            submit_speed_reduction(RCVR);
            timer(HALF);
            submit_speed_reduction(XMTR);
            break;
        case SF6:
            submit_destination();
            break;
        case SF7:
            _system_flags.echo = ON;
            if((_status = send_message(COM1)) != ERR_NONE) {
                error_report(ERR_EXECUTE_KEY,COM1,ERRCODE);
                return(ERR_EXECUTE_KEY);
            }
            _system_flags.echo = OFF;
            break;
        case AF7:
            _system_flags.echo = ON;
            if((_status = send_message(COM2)) != ERR_NONE) {
                error_report(ERR_EXECUTE_KEY,COM2,ERRCODE);
                return(ERR_EXECUTE_KEY);
            }
            _system_flags.echo = OFF;
            break;
        case SF9:
            _timedate_request = ON;
            break;
        case F10:
            if((_status = submit_header_flag(DAS1)) != ERR_NONE) {
                error_report(ERR_EXECUTE_KEY,DAS1,ERRCODE);
                return(ERR_EXECUTE_KEY);
            }
            break;
        case SF10:
            if((_status = submit_header_flag(COM1)) != ERR_NONE) {
                error_report(ERR_EXECUTE_KEY,COM1,ERRCODE);
                return(ERR_EXECUTE_KEY);
            }
            break;
        case AF10:
            if((_status = submit_header_flag(COM2)) != ERR_NONE) {
                error_report(ERR_EXECUTE_KEY,COM2,ERRCODE);
                return(ERR_EXECUTE_KEY);
            }
            break;
        case ALTA:
            maxmsg_mode = ON;
            if((_status = send_message(DAS1)) != ERR_NONE) {
                maxmsg_mode = OFF;
                error_report(ERR_EXECUTE_KEY,DAS1,ERRCODE);
                return(ERR_EXECUTE_KEY);
            }
            maxmsg_mode = OFF;
            break;
        case ALTB:
```

```
            maxmsg_mode = ON;
            if((_status = send_message(COM1)) != ERR_NONE) {
                maxmsg_mode = OFF;
                error_report(ERR_EXECUTE_KEY,COM1,ERRCODE);
                return(ERR_EXECUTE_KEY);
            }
            maxmsg_mode = OFF;
            break;
    case ALTC:
            maxmsg_mode = ON;
            if((_status = send_message(COM2)) != ERR_NONE) {
                maxmsg_mode = OFF;
                error_report(ERR_EXECUTE_KEY,COM2,ERRCODE);
                return(ERR_EXECUTE_KEY);
            }
            maxmsg_mode = OFF;
            break;
    case ALTD:
            if((_status = send_message(DAS1)) != ERR_NONE) {
                error_report(ERR_EXECUTE_KEY,DAS1,ERRCODE);
                return(ERR_EXECUTE_KEY);
            }
            break;
    case ALTE:
            if((_status = send_message(COM1)) != ERR_NONE) {
                error_report(ERR_EXECUTE_KEY,COM1,ERRCODE);
                return(ERR_EXECUTE_KEY);
            }
            break;
    case ALTF:
            if((_status = send_message(COM2)) != ERR_NONE) {
                error_report(ERR_EXECUTE_KEY,COM2,ERRCODE);
                return(ERR_EXECUTE_KEY);
            }
            break;
    case ALTG:
            if((_status = upload_mode(ON)) != ERR_NONE) {
                error_report(ERR_EXECUTE_KEY,DAS1,ERRCODE);
                return(ERR_EXECUTE_KEY);
            }
            if((_status = send_message(DAS1)) != ERR_NONE) {
                error_report(ERR_EXECUTE_KEY,DAS1,ERRCODE);
                upload_mode(OFF);
                return(ERR_EXECUTE_KEY);
            }
            break;
    case ALTH:
            if((_status = upload_mode(ON)) != ERR_NONE) {
                error_report(ERR_EXECUTE_KEY,COM1,ERRCODE);
                return(ERR_EXECUTE_KEY);
            }
            if((_status = send_message(COM1)) != ERR_NONE) {
                error_report(ERR_EXECUTE_KEY,COM1,ERRCODE);
                upload_mode(OFF);
                return(ERR_EXECUTE_KEY);
            }
            break;
    case ALTI:
            if((_status = upload_mode(ON)) != ERR_NONE) {
                error_report(ERR_EXECUTE_KEY,COM2,ERRCODE);
                return(ERR_EXECUTE_KEY);
            }
            if((_status = send_message(COM2)) != ERR_NONE) {
                error_report(ERR_EXECUTE_KEY,COM2,ERRCODE);
                upload_mode(OFF);
                return(ERR_EXECUTE_KEY);
            }
            break;
    case ALTJ:
            if((_status = dnload_mode(ON)) != ERR_NONE) {
                error_report(ERR_EXECUTE_KEY,DAS1,ERRCODE);
                return(ERR_EXECUTE_KEY);
            }
            if((_status = send_message(DAS1)) != ERR_NONE) {
                error_report(ERR_EXECUTE_KEY,DAS1,ERRCODE);

dnload_mode(OFF);
                return(ERR_EXECUTE_KEY);
            }
            break;
    case ALTK:
            if((_status = dnload_mode(ON)) != ERR_NONE) {
                error_report(ERR_EXECUTE_KEY,COM1,ERRCODE);
                return(ERR_EXECUTE_KEY);
```

```
            }
            if((_status = send_message(COM1)) != ERR_NONE) {
                error_report(ERR_EXECUTE_KEY,COM1,ERRCODE);
                dnload_mode(OFF);
                return(ERR_EXECUTE_KEY);
            }
            break;
        case ALTL:
            if((_status = dnload_mode(ON)) != ERR_NONE) {
                error_report(ERR_EXECUTE_KEY,COM2,ERRCODE);
                return(ERR_EXECUTE_KEY);
            }
            if((_status = send_message(COM2)) != ERR_NONE) {
                error_report(ERR_EXECUTE_KEY,COM2,ERRCODE);
                dnload_mode(OFF);
                return(ERR_EXECUTE_KEY);
            }
            break;
        }
    case SHORT_MENU:
        switch(key) {
        case F1:
            _topside_link_flags.transducer++;
            break;
        case F2:
            _downside_link_flags.transducer++;
            break;
        case F3:
            switch(_system_flags.channel) {
            case AIR:
                if(--_topside_link_flags.control_code > CODE_4)
                    _topside_link_flags.control_code = CODE_4;
                break;
            case WATER:
                if(--_topside_link_flags.control_code > CODE_7)
                    _topside_link_flags.control_code = CODE_7;
                break;
            }
            break;
        case F4:
            switch(_system_flags.channel) {
            case AIR:
                if(--_downside_link_flags.control_code > CODE_4)
                    _downside_link_flags.control_code = CODE_4;
                break;
            case WATER:
                if(--_downside_link_flags.control_code > CODE_7)
                    _downside_link_flags.control_code = CODE_7;
                break;
            }
            break;
        case F5:
            if(++_system_flags.mode > OPERATE_MODE)
                _system_flags.mode = IN_AIR_TEST_MODE;
            set_operation_parameters();
            break;
        case F6:
            if((_status = submit_powerup_time()) != ERR_NONE) {
                error_report(ERR_EXECUTE_KEY,USR1,ERRCODE);
                return(ERR_EXECUTE_KEY);
            }
            break;
        case F7:
            _system_flags.echo = ON;
            if((_status = send_message(DAS1)) != ERR_NONE) {
                _system_flags.echo = OFF;
                error_report(ERR_EXECUTE_KEY,DAS1,ERRCODE);
                return(ERR_EXECUTE_KEY);
            }
            _system_flags.echo = OFF;
            execute_key(HOME);
            break;
        case F8:
            annotate_logfile();
            break;
    case F9:
        disable_irq(COM1_IRQ_NUMBER);
        disable_irq(COM2_IRQ_NUMBER);
        _irq_table[FLOPPY_IRQ_NUMBER].used_by_adl = TRUE;
        enable_irq(FLOPPY_IRQ_NUMBER);

if((_status = copy_logfile_backup_diskettes()) != ERR_NONE)
            error_report(ERR_EXECUTE_KEY,USR1,ERRCODE);
```

```c
                disable_irq(FLOPPY_IRQ_NUMBER);
                _irq_table[FLOPPY_IRQ_NUMBER].used_by_adl = FALSE;
                enable_irq(COM1_IRQ_NUMBER);
                enable_irq(COM2_IRQ_NUMBER);
                break;
            case ESC:
                _restart = TRUE;
                break;
            }
            break;
        }
    kbflush();
    update_display(MODE);
    return(ERR_NONE);

/****************************************************************************
*                                                                           *
*                        S E N D   M E S S A G E                            *
*                                                                           *
****************************************************************************/
static int send_message(port)
int port; /* port to send message through */
{
    WORD index;     /* index into buffer associated with port */
    int  msg_length; /* length of message to send */ static STRG enter_msg [] = {
        "Enter a PASS-THROUGH message to transmit on",
        "Enter an ECHO-BACK message to transmit on"
    };

static STRG log_msg [] = {
        "PASS-THROUGH message generated via KEYBOARD:",
        "ECHO-BACK message generated via KEYBOARD:",
        "TEST message generated via KEYBOARD:"
    };

/*
     * Verify port before using it.
     * For serial ports:
     *      Set the master serial port.
     * For acoustic port:
     *      Validate availability.
     */
    switch(port) {
    case COM1:
    case COM2:
        if((_status = set_master_port(port)) != ERR_NONE) {
            error_report(ERR_SEND_MESSAGE,port,ERRCODE);
            return(ERR_SEND_MESSAGE);
        }
        break;
    case DAS1:
        if(_port_stuff[DAS1].installed == FALSE) {
            _status = ERR_PORT_NOT_ENABLED;
            error_report(ERR_SEND_MESSAGE,port,ERRCODE);
            return(ERR_SEND_MESSAGE);
        }
        break;
    default:
        _status = ERR_INVALID_PORT;
        error_report(ERR_SEND_MESSAGE,USR1,ERRCODE);
        return(ERR_SEND_MESSAGE);
    }

/*
     * Generate the various messages.
     */
    if(maxmsg_mode == ON) {
        sprintf((char*)_display[TRANSMIT_LOC].buffer,"%s %s"
            ,_port_stuff[port].name,log_msg[TEST_MESSAGE]);
        logmsg(_display[TRANSMIT_LOC].buffer
            ,_logfiles[_system_flags.type].logtype,STRNG);

for(index = 0; index < MESSAGE_LIMIT; index++)
            _port_stuff[USR1].buffer[index] = (BYTE)(index + '0');
        msg_length = MESSAGE_LIMIT;
    }
    else if(is_dnload(USR1) == TRUE) {
        _port_stuff[USR1].buffer[0] = UPLOAD_CODE;
        msg_length = 1;
    }
```

```c
    else if(is_upload(USR1) == TRUE) {
        _port_stuff[USR1].buffer[0] = DNLOAD_CODE;
        msg_length = 1;
    }
    else {
        clrcrt(RECEIVE_LOC);
        clrcrt(TRANSMIT_LOC);

sprintf((char*)_display[TRANSMIT_LOC].buffer,"%s %s "
            ,enter_msg[_system_flags.echo],_port_stuff[port].name);
        putmsg(TRANSMIT_LOC,NONE,STRNG);

put_field(TRANSMIT_LOC,MESSAGE_LIMIT);
        msg_length = adl_scanf((char*)_port_stuff[USR1].buffer,MESSAGE_LIMIT
            ,TRANSMIT_LOC);

clrcrt(TRANSMIT_LOC);

if(msg_length <= 0)
            return(ERR_NONE);

sprintf((char*)_display[TRANSMIT_LOC].buffer,"%s %s"
            ,_port_stuff[port].name,log_msg[_system_flags.echo]);
        logmsg(_display[TRANSMIT_LOC].buffer
            ,_logfiles[_system_flags.type].logtype,STRNG);
    }

/*
     * Transmit the message.
     */
    if((_status = transmit_message(port,USR1,msg_length)) != ERR_NONE) {
        error_report(ERR_SEND_MESSAGE,port,ERRCODE);
        return(ERR_SEND_MESSAGE);
    }
    return(ERR_NONE);

/**************************************************************************
 *                                                                        *
 *              S U B M I T   S P E E D   R E D U C T I O N               *
 *                                                                        *
 **************************************************************************/
static void submit_speed_reduction(device)
BYTE device;    /* type of device to adjust speed for */
{
    double  speed_reduction;  /* speed reduction for device */
    unsigned key;             /* key code returned from getkey() */ static STRG devices [] = {
        "XMTR",
        "RCVR"
    };

static STRG msg = "The %s is Set to Operate at %6.2lf%% of Target Speed.";

/*
     * Initialize the local speed reduction.
     */
    switch(device) {
    default:
    case XMTR:
        speed_reduction = _speed_reduction_tx;
        break;
    case RCVR:
        speed_reduction = _speed_reduction_rx;
        break;
    }

/*
     * Prepare the screen.
     * Show the current speed reduction.
     * Request the new speed reduction value.
     * Get the new speed reduction value.
     * Set global variable accordingly.
     * Log a message.
     */
    sprintf((char*)_display[RECEIVE_LOC].buffer,msg,devices[device]
        ,(1.0L / speed_reduction * 100.0L));
    sprintf((char*)_display[TRANSMIT_LOC].buffer,"%s the Speed.",request);

clrcrt(RECEIVE_LOC);
    clrcrt(TRANSMIT_LOC);
```

```
putmsg(RECEIVE_LOC,NONE,STRNG);
putmsg(TRANSMIT_LOC,NONE,STRNG);

kbflush();

while(TRUE) {
    attend_overhead();
    if(gfkbhit()) {
        key = getkey();
        switch(key) {
        case PLUS:
            speed_reduction -= SPEED_INCREMENT;
            if(speed_reduction < MINSPEED_REDUCTION
                - (SPEED_INCREMENT / 2))
                    speed_reduction = MAXSPEED_REDUCTION;
            break;
        case MINUS:
            speed_reduction += SPEED_INCREMENT;
            if(speed_reduction > MAXSPEED_REDUCTION
                + (SPEED_INCREMENT / 2))
                    speed_reduction = MINSPEED_REDUCTION;
            break;
        }
        if(key == CR)
            break; /* break from while */ switch(device) {
        default:
        case XMTR:
            _speed_reduction_tx = speed_reduction;
            break;
        case RCVR:
            _speed_reduction_rx = speed_reduction;
            break;
        }
            update_display(MODE);
            sprintf((char*)_display[RECEIVE_LOC].buffer,msg,devices[device]
                ,(1.0L / speed_reduction * 100.0L));
            putmsg(RECEIVE_LOC,NONE,STRNG);
    }
    }
    clrcrt(RECEIVE_LOC);
    clrcrt(TRANSMIT_LOC);
    sprintf((char*)_display[RECEIVE_LOC].buffer,msg,devices[device]
        ,(1.0L / speed_reduction * 100.0L));
    putmsg(RECEIVE_LOC,NONE,STRNG);
    logmsg(_display[RECEIVE_LOC].buffer
        ,_logfiles[_system_flags.type].logtype,STRNG);
}

/****************************************************************************
 *                                                                          *
 *                    S U B M I T   H E A D E R   F L A G                   *
 *                                                                          *
 ****************************************************************************/
static int submit_header_flag(port)
int port; /* port to submit flag for */
{
    unsigned key; /* key code returned from getkey() */ static STRG msg = "%s Headers are %s";

static STRG status [] = {
        "OFF.",
        "ON.."
    };

/*
     * Check for installed port.
     * Prepare the screen.
     * Show the current flag status.
     * Request new flag status.
     * Show the current flag status.
     * Log a message.
     */
    if(_port_stuff[port].installed == FALSE) {
        _status = ERR_ILLEGAL_PORT;
        error_report(ERR_SUBMIT_HEADER_FLAG,port,ERRCODE);
        return(ERR_SUBMIT_HEADER_FLAG);
    }
```

```
      sprintf((char*)_display[RECEIVE_LOC].buffer,msg,_port_stuff[port].name
           ,status[_port_stuff[port].header]);
      sprintf((char*)_display[TRANSMIT_LOC].buffer,"%s the Header Flag."
           ,request);

clrcrt(RECEIVE_LOC);
      clrcrt(TRANSMIT_LOC);

putmsg(RECEIVE_LOC,NONE,STRNG);
      putmsg(TRANSMIT_LOC,NONE,STRNG);

kbflush();

while(TRUE) {
           attend_overhead();
           if(gfkbhit()) {
                key = getkey();
                switch(key) {
                case MINUS:
                     --_port_stuff[port].header;
                     break;
                case PLUS:
                     ++_port_stuff[port].header;
                     break;
                }
                if(key == CR)
                     break; /* break from while */
                sprintf((char*)_display[RECEIVE_LOC].buffer,msg
                     ,_port_stuff[port].name,status[_port_stuff[port].header]);
                putmsg(RECEIVE_LOC,NONE,STRNG);
           }
      }
      clrcrt(RECEIVE_LOC);
      clrcrt(TRANSMIT_LOC);
      sprintf((char*)_display[RECEIVE_LOC].buffer,msg,_port_stuff[port].name
           ,status[_port_stuff[port].header]);
      putmsg(RECEIVE_LOC,NONE,STRNG);
      logmsg(_display[RECEIVE_LOC].buffer
           ,_logfiles[_system_flags.type].logtype,STRNG);

return(ERR_NONE);
}

/****************************************************************************
 *                                                                          *
 *                  S U B M I T   D E S T I N A T I O N                     *
 *                                                                          *
 ****************************************************************************/
static void submit_destination()
{
      unsigned key; /* key code returned from getkey() */ static STRG msg = "The Destination Channel is Set to %s";

static STRG destination [] = {
           "MONITOR. ",
           "SERIAL.  ",
           "ACOUSTIC.",
           "ECHO.    "
      };

/*
       * Prepare the screen.
       * Show the current flag status.
       * Request new flag status.
       * Log a message.
       */
      sprintf((char*)_display[RECEIVE_LOC].buffer,msg
           ,destination[_system_flags.destination]);
      sprintf((char*)_display[TRANSMIT_LOC].buffer,"%s the Destination Channel."
           ,request);

clrcrt(RECEIVE_LOC);
      clrcrt(TRANSMIT_LOC);

putmsg(RECEIVE_LOC,NONE,STRNG);
      putmsg(TRANSMIT_LOC,NONE,STRNG);

kbflush();

while(TRUE) {
```

```
        attend_overhead();
        if(gfkbhit()) {
            key = getkey();
            switch(key) {
            case MINUS:
                if(--_system_flags.destination < MONITOR)
                    _system_flags.destination = ECHO;
                break;
            case PLUS:
                if(++_system_flags.destination > ECHO)
                    _system_flags.destination = MONITOR;
                break;
            }
            if(key == CR)
                break; /* break from while */
            sprintf((char*)_display[RECEIVE_LOC].buffer,msg
                ,destination[_system_flags.destination]);
            putmsg(RECEIVE_LOC,NONE,STRNG);
        }
    }
    clrcrt(RECEIVE_LOC);
    clrcrt(TRANSMIT_LOC);
    sprintf((char*)_display[RECEIVE_LOC].buffer,msg
        ,destination[_system_flags.destination]);
    putmsg(RECEIVE_LOC,NONE,STRNG);
    logmsg(_display[RECEIVE_LOC].buffer
        ,_logfiles[_system_flags.type].logtype,STRNG);

/****************************************************************************
 *                                                                          *
 *                    S U B M I T   T I M E D A T E                         *
 *                                                                          *
 ****************************************************************************/
int submit_timedate()
{
    int index;    /* general purpose index */
    int date_len; /* length of date string */
    int time_len; /* length of time string */ long hours;   /* hours to program    */
    long minutes; /* minutes to program  */
    long seconds; /* seconds to program  */ long day;     /* day to program    */
    long month;   /* month to program */
    long year;    /* year to program  */ struct dosdate_t dosdate; /* date values for _dos_setdate() */
    struct dostime_t dostime; /* time values for _dos_settime() */ static STRG dest = "??????????";
    static STRG date = "MO/DA/YEAR";
    static STRG time = "HH:MM:SS";

static STRG msg1  = "The Date is Set to %2.2d/%2.2d/%4.4d";
    static STRG msg1e = "Enter the Current DATE in MO/DA/YEAR Format %s";
    static STRG msg2  = "Enter the Current TIME in HH:MM:SS Format %s";
    static STRG msg2s = "The Time of Day is Set to %2.2d:%2.2d:%2.2d";
    static STRG msg3  = "The ADL Clock is Set to the Time Shown Below.";

/*
     * Prepare the display.
     * Show the current date.
     * Request the new date.
     * Get the new date.
     * Prepare the display.
     */
    sprintf((char*)_display[RECEIVE_LOC].buffer,msg1,_current_time.month
        ,_current_time.day,_current_time.year);
    sprintf((char*)_display[TRANSMIT_LOC].buffer,msg1e,ARROW);

clrcrt(RECEIVE_LOC);
    clrcrt(TRANSMIT_LOC);

putmsg(RECEIVE_LOC,NONE,STRNG);
    putmsg(TRANSMIT_LOC,NONE,STRNG);

put_field(TRANSMIT_LOC,DATE_LEN);
    date_len = adl_scanf(date,DATE_LEN,TRANSMIT_LOC);
    clrcrt(RECEIVE_LOC);
    clrcrt(TRANSMIT_LOC);
```

```c
/*
 * Check for valid input string.
 * Extract the date from the input string.
 * Check for valid data.
 * Convert input string to input values.
 * If input checks out:
 *      Assign the system date.
 *      Set the current date.
 *      Update the ADL clock.
 */
if((date_len > 0) && (date_len < DATE_LEN)) {
    _status = ERR_INVALID_INPUT;
    error_report(ERR_SUBMIT_TIMEDATE,USR1,ERRCODE);
    return(ERR_SUBMIT_TIMEDATE);
}
if(date_len == DATE_LEN) {
    strsift(dest,date,DATE_MASK);

for(index = 0; index < DATE_LEN; index++)
        if((isdigit(dest[index]) == FALSE) && (dest[index] != BLANK)) {
            _status = ERR_INVALID_INPUT;
            error_report(ERR_SUBMIT_TIMEDATE,USR1,ERRCODE);
            return(ERR_SUBMIT_TIMEDATE);
        } day   = atol(strsift(dest,date,DAY_MASK));
    month = atol(strsift(dest,date,MONTH_MASK));
    year  = atol(strsift(dest,date,YEAR_MASK));

if((month < MIN_MONTH) || (month > MAX_MONTH)
    || (day   < MIN_DAY)   || (day   > MAX_DAY)
    || (year  < MIN_YEAR)  || (year  > MAX_YEAR)) {
        _status = ERR_INPUT_OUT_OF_RANGE;
        error_report(ERR_SUBMIT_TIMEDATE,USR1,ERRCODE);
        return(ERR_SUBMIT_TIMEDATE);
    }
    dosdate.day   = (unsigned char)day;
    dosdate.month = (unsigned char)month;
    dosdate.year  = (unsigned int)year;
    _dos_setdate(&dosdate);
    putime();

sprintf((char*)_display[RECEIVE_LOC].buffer,msg1,_current_time.month
        ,_current_time.day,_current_time.year);

logmsg(_display[RECEIVE_LOC].buffer
        ,_logfiles[_system_flags.type].logtype,STRNG);
}

/*
 * Show the current time.
 * Request the new time.
 * Get the new time.
 * Prepare the display.
 */
sprintf((char*)_display[RECEIVE_LOC].buffer,msg3);
sprintf((char*)_display[TRANSMIT_LOC].buffer,msg2,ARROW);

putmsg(RECEIVE_LOC,NONE,STRNG);
putmsg(TRANSMIT_LOC,NONE,STRNG);

for(index = 0; index < TIME_LEN; index++)
    time[index] = '0';

put_field(TRANSMIT_LOC,TIME_LEN);
time_len = adl_scanf(time,TIME_LEN,TRANSMIT_LOC);
clrcrt(RECEIVE_LOC);
clrcrt(TRANSMIT_LOC);

/*
 * Check for valid input string.
 * Extract the time from the input string.
 * Check for valid data.
 * Convert input string to input values.
 * If input checks out:
 *      Assign the system time.
 *      Set the current time.
 *      Update the ADL clock.
 */
if(time_len > 0) {
    strsift(dest,time,TIME_MASK);
```

```c
    for(index = 0; index < strlen(dest); index++)
        if((isdigit(dest[index]) == FALSE) && (dest[index] != BLANK)) {
            _status = ERR_INVALID_INPUT;
            error_report(ERR_SUBMIT_TIMEDATE,USR1,ERRCODE);
            return(ERR_SUBMIT_TIMEDATE);
        } hours   = atol(strsift(dest,time,HOUR_MASK));
minutes = atol(strsift(dest,time,MINUTE_MASK));
seconds = atol(strsift(dest,time,SECOND_MASK));

if((hours   < ZERO_HOURS)   || (hours   >= HOURS_PER_DAY)
|| (minutes < ZERO_MINUTES) || (minutes >= MINUTES_PER_HOUR)
|| (seconds < ZERO_SECONDS) || (seconds >= SECONDS_PER_MINUTE)) {
    _status = ERR_INPUT_OUT_OF_RANGE;
    error_report(ERR_SUBMIT_TIMEDATE,USR1,ERRCODE);
    return(ERR_SUBMIT_TIMEDATE);
}
dostime.hour    = (unsigned char)hours;
dostime.minute  = (unsigned char)minutes;
dostime.second  = (unsigned char)seconds;
dostime.hsecond = (unsigned char)0;
_dos_settime(&dostime);
timer(SECOND);
putime();

sprintf((char*)_display[TRANSMIT_LOC].buffer,msg2s
    ,_current_time.hours,_current_time.minutes
    ,_current_time.seconds);

logmsg(_display[TRANSMIT_LOC].buffer
            ,_logfiles[_system_flags.type].logtype,STRNG);
    }

/*
     * Log a message.
     * Show the new system time and date setting.
     */
    sprintf((char*)_display[RECEIVE_LOC].buffer,msg1,_current_time.month
        ,_current_time.day,_current_time.year);
    sprintf((char*)_display[TRANSMIT_LOC].buffer,msg3);

putmsg(RECEIVE_LOC,NONE,STRNG);
    putmsg(TRANSMIT_LOC,NONE,STRNG);

return(ERR_NONE);
}

/****************************************************************************
 *                                                                          *
 *                     S U B M I T   P O W E R U P   T I M E                *
 *                                                                          *
 ****************************************************************************/
int submit_powerup_time()
{
    int index;        /* general purpose index */
    int duration_len; /* length of date string */
    int time_len;     /* length of time string */ long hours;   /* hours to program   */
    long minutes; /* minutes to program */
    long seconds; /* seconds to program */ static STRG dest     = "HH:MM:SS";
    static STRG time     = "HH:MM:SS";
    static STRG duration = "MMMM";

static STRG msg1  = "Time of Day for Power On is Set to %2.2d:%2.2d:%2.2d";
    static STRG msg1e = "Enter the Future Power On Time in HH:MM:SS Format %s";
    static STRG msg2  = "Duration of Power On Condition is %4ld minutes";
    static STRG msg2e = "Enter the Power On Duration in minutes %s";

/*
     * Prepare the display.
     * Show the current power-up time.
     * Request the new power-up time.
     * Get the new power-up time.
     * Prepare the display.
     */
    sprintf((char*)_display[RECEIVE_LOC].buffer,msg1,_programmed_time.hours
        ,_programmed_time.minutes,_programmed_time.seconds);
    sprintf((char*)_display[TRANSMIT_LOC].buffer,msg1e,ARROW);
```

```
clrcrt(RECEIVE_LOC);
clrcrt(TRANSMIT_LOC);

putmsg(RECEIVE_LOC,NONE,STRNG);
putmsg(TRANSMIT_LOC,NONE,STRNG);

for(index = 0; index < TIME_LEN; index++)
    time[index] = '0';

put_field(TRANSMIT_LOC,TIME_LEN);
time_len = adl_scanf(time,TIME_LEN,TRANSMIT_LOC);
clrcrt(RECEIVE_LOC);
clrcrt(TRANSMIT_LOC);

/*
 * Check for valid input string.
 * Extract the time from the input string.
 * Check for valid data.
 * Convert input string to input values.
 * If input checks out:
 *      Assign the programmed Power On Time.
 */
if(time_len > 0) {
    strsift(dest,time,TIME_MASK);

for(index = 0; index < strlen(dest); index++)
        if((isdigit(dest[index]) == FALSE) && (dest[index] != BLANK)) {
            _status = ERR_INVALID_INPUT;
            error_report(ERR_SUBMIT_POWERUP_TIME,USR1,ERRCODE);
            return(ERR_SUBMIT_POWERUP_TIME);
        } hours   = atol(strsift(dest,time,HOUR_MASK));
    minutes = atol(strsift(dest,time,MINUTE_MASK));
    seconds = atol(strsift(dest,time,SECOND_MASK));

if((hours   < ZERO_HOURS)   || (hours   >= HOURS_PER_DAY)
    || (minutes < ZERO_MINUTES) || (minutes >= MINUTES_PER_HOUR)
    || (seconds < ZERO_SECONDS) || (seconds >= SECONDS_PER_MINUTE)) {
        _status = ERR_INPUT_OUT_OF_RANGE;
        error_report(ERR_SUBMIT_POWERUP_TIME,USR1,ERRCODE);
        return(ERR_SUBMIT_POWERUP_TIME);
    }
    _programmed_time.hours   = (int)hours;
    _programmed_time.minutes = (int)minutes;
    _programmed_time.seconds = (int)seconds;

_first_power_on_event = FALSE;
        clrcrt(AVAILABILITY_LOC);
        clrcrt(SWITCH_LOC);

sprintf((char*)_display[RECEIVE_LOC].buffer,msg1
            ,_programmed_time.hours,_programmed_time.minutes
            ,_programmed_time.seconds);

logmsg(_display[RECEIVE_LOC].buffer
            ,_logfiles[_system_flags.type].logtype,STRNG);
}

/*
 * Calculate the current power-on duration.
 * Show the current power-on duration.
 * Request the new power-on duration.
 * Get the new power-on duration.
 * Prepare the display.
 */
minutes = (_power_on_period / SECONDS_PER_MINUTE);
if(minutes == ONE_MINUTE)
    sprintf((char*)_display[RECEIVE_LOC].buffer,msg2,minutes,".");
else
    sprintf((char*)_display[RECEIVE_LOC].buffer,msg2,minutes,"s.");

sprintf((char*)_display[TRANSMIT_LOC].buffer,msg2e,ARROW);

putmsg(RECEIVE_LOC,NONE,STRNG);
putmsg(TRANSMIT_LOC,NONE,STRNG);

put_field(TRANSMIT_LOC,DURATION_LEN);
duration_len = adl_scanf(duration,DURATION_LEN,TRANSMIT_LOC);
clrcrt(RECEIVE_LOC);
clrcrt(TRANSMIT_LOC);
```

```
    /*
     * Check for valid input.
     * If input checks out:
     *      Convert input string to input values.
     *      Assign the programmed Power On Duration.
     */
    if(duration_len > 0) {
        for(index = 0; index < duration_len; index++)
            if(!isdigit(duration[index])) {
                _status = ERR_INVALID_INPUT;
                error_report(ERR_SUBMIT_POWERUP_TIME,USR1,ERRCODE);
                return(ERR_SUBMIT_POWERUP_TIME);
            } minutes = atol(duration);

if((minutes < ZERO_MINUTES)
        || (minutes >= (HOURS_PER_DAY * MINUTES_PER_HOUR))) {
            _status = ERR_INPUT_OUT_OF_RANGE;
            error_report(ERR_SUBMIT_POWERUP_TIME,USR1,ERRCODE);
            return(ERR_SUBMIT_POWERUP_TIME);
        }
        _power_on_period = (minutes * SECONDS_PER_MINUTE);

minutes = (_power_on_period / SECONDS_PER_MINUTE);
        if(minutes == ONE_MINUTE)
            sprintf((char*)_display[RECEIVE_LOC].buffer,msg2,minutes,".");
        else
            sprintf((char*)_display[RECEIVE_LOC].buffer,msg2,minutes,"s.");

logmsg(_display[RECEIVE_LOC].buffer
            ,_logfiles[_system_flags.type].logtype,STRNG);
    }

/*
     * Show the current power-up time and duration.
     * Log a message for the power on time and duration.
     */
    sprintf((char*)_display[RECEIVE_LOC].buffer,msg1,_programmed_time.hours
        ,_programmed_time.minutes,_programmed_time.seconds);

minutes = (_power_on_period / SECONDS_PER_MINUTE);
    if(minutes == ONE_MINUTE)
            sprintf((char*)_display[TRANSMIT_LOC].buffer,msg2,minutes,".");
    else
            sprintf((char*)_display[TRANSMIT_LOC].buffer,msg2,minutes,"s.");

putmsg(RECEIVE_LOC,NONE,STRNG);

putmsg(TRANSMIT_LOC,NONE,STRNG);

return(ERR_NONE);
}

/****************************************************************************
 *                                                                          *
 *                      S T R I N G   S I F T                               *
 *                                                                          *
 ****************************************************************************/
static STRG strsift(destination,source,mask)
STRG destination;  /* destination string */
STRG source;       /* source string */
STRG mask;         /* mask to apply to source to create destination string */
{
    WORD index;   /* general purpose index */
    WORD length;  /* length of mask */

/*
     * Initialize length.
     * Clear out destination string.
     * Sift through the source string according to the mask.
     * Make it a string.
     */
    length = strlen(mask);
    for(index = 0; index < length; index++)
        destination[index] = BLANK;

for(index = 0; index < length; index++)
        if(mask[index] == '1')
            destination[index] = source[index];

destination[length] = NUL;
    return(destination);
}
```

```c
include <system.h> static void   close_logfile           (unsigned      logtype);
static void   filesizeof              (unsigned long *file);
static void   make_backup_logfile     (unsigned      logtype);
static void   open_logfile            (unsigned      logtype);
static void   set_how_many_logfiles_used (void);
static double calc_percent_remaining  (unsigned      logtype
                                      ,unsigned long filesize_threshold);

static unsigned long dwnlog_threshold;
static unsigned long ftplog_threshold;
static unsigned long hardisk_space;
static unsigned long max_log_number;
static unsigned long minimum_filesize;
static unsigned long ssclog_threshold;
static unsigned long toplog_threshold;
static unsigned long total_logfiles = MAX_LOGFILES;

/***************************************************************************
 *                                                                         *
 *                        L O G   M E S S A G E                            *
 *                                                                         *
 ***************************************************************************/
void logmsg(msgtolog,logtype,msgtype)
BYTE    *msgtolog; /* message to log in appropriate logfile */
unsigned logtype;  /* type of logfile to use                */
unsigned msgtype;  /* type of message to log (STRNG/BINARY) */
{
    BYTE          log_buffer [BUFSIZ]; /* buffer to hold log message */
    unsigned long filesize_threshold;  /* threshold of logfilesize   */

/*
     * Check for validity of logtype.
     * Based on the type of logfile:
     *      Assign threshold for logtype.
     * Don't log messages when there is no room for them.
     */
    switch(logtype) {
    case TOP_LOG:
        filesize_threshold = toplog_threshold;
        break;
    case DWN_LOG:
        filesize_threshold = dwnlog_threshold;
        break;
    case SSC_LOG:
        filesize_threshold = ssclog_threshold;
        break;
    case FTP_LOG:
        filesize_threshold = ftplog_threshold;
        break;
    default:
        return;
    } if(filesize_threshold < minimum_filesize)
        return;

/*
     * Shutdown ATLAB during disk access.
     * Open the logfile.
     * If successfully opened - get the current time and log the message.
     * Close the logfile.
     * Show current status of the logfile.
     */
    shutdown_atlab();
    open_logfile(logtype);
    if(_logfiles[logtype].state == CLOSED)
        return;
    switch(msgtype) {
    case STRNG:
        if(strlen(msgtolog) == 0)
            break;
        copytime(&_current_time,sgettime(TIME_FORMAT));
        sprintf((char*)log_buffer,"%s%s\n",_current_time.dateline,msgtolog);
        write(_logfiles[logtype].handle,(char*)log_buffer,strlen(log_buffer));
        break;
    case BINARY:
        write(_logfiles[logtype].handle,msgtolog,USRBUFLEN);
        break;
    }
    close_logfile(logtype);

show_file_status(logtype);
}
```

```c
/***********************************************************************
*                                                                      *
*                    SET  LOGFILE  THRESHOLDS                          *
*                                                                      *
***********************************************************************/
void set_logfile_thresholds()
{
    double          combo_logsize;       /* size of logfile combo        */
    double          logfile_portions;    /* number of logfile portions   */
    double          logfiles_remaining;  /* logfiles remaining           */
    double          portions_per_logfile;/* integer portion of double    */
    struct diskfree_t drive;             /* structure for drive data     */
    struct stat     file_information;    /* structure to hold file data  */
    unsigned long   logsize;             /* bytes used by logfiles       */

/*
     * Initialize the size of all logfiles.
     * Determine the amount of space available on drive C.
     * Calculate the minimum file size.
     */
    logsize = 0L;

_dos_getdiskfree(DRIVE_C,&drive);
    hardisk_space = ((unsigned long)drive.avail_clusters
               *   (unsigned long)drive.sectors_per_cluster
               *   (unsigned long)drive.bytes_per_sector);

minimum_filesize = ((unsigned long)drive.sectors_per_cluster
                    *   (unsigned long)drive.bytes_per_sector);

/*
     * Depending on the type of system:
     *      Determine the total amount of disk space used by the existing
     *          system type logfiles in multiples of "minimum file size".
     *      Adjust the amount of hard disk space by adding the logsize.
     *          NOTE: If the logfile size is not taken into account
     *              - the available diskspace will diminish and cause
     *                the logfiles to be deleted prematurely. In other words,
     *                the logfile space is reused.
     */
    if(_system_flags.type != DOWNSIDE) {
        if(stat(_logfiles[TOP_LOG].name,&file_information) == 0) {
            logsize += file_information.st_size;
            filesizeof(&logsize);
        }
        if(stat(_logfiles[SSC_LOG].name,&file_information) == 0) {
            logsize += file_information.st_size;
            filesizeof(&logsize);
        }
        hardisk_space += logsize;

/*
         * Set how many logfiles used prior to using their values.
         * Calculate the number of logfile combinations remaining.
         * Calculate the size of a combination logfile,
         *      limited by the hardisk size and the minimum file size.
         * Check if the floppy disk size is a limit to the logfiles.
         * Set the logfile thresholds based on 75% & 25% use.
         * Round off thresholds.
         */
        set_how_many_logfiles_used();
        logfiles_remaining = ((double)total_logfiles
                        - (((double)_logfiles[TOP_LOG].used
                        +   (double)_logfiles[SSC_LOG].used) / 2.0));

logfile_portions = ((double)hardisk_space / (double)minimum_filesize);
        modf((logfile_portions / logfiles_remaining),&portions_per_logfile);
        combo_logsize = ((double)minimum_filesize * portions_per_logfile);

#ifdef _360KB
#define FLOPPYDISK_SPACE 362496L   /* Bytes in formatted 360KB TOP disk */
#else
#define FLOPPYDISK_SPACE 1213952L  /* Bytes in formatted 1.2MB TOP disk */
endif if((hardisk_space = (unsigned long)combo_logsize) > FLOPPYDISK_SPACE)
            hardisk_space = FLOPPYDISK_SPACE;

if(hardisk_space <= (2L * minimum_filesize))
            ssclog_threshold = 0L;
        else
            ssclog_threshold = (unsigned long)ceil((3.0 / 4.0)
```

```
                          * (double)(hardisk_space
                                - (2L * minimum_filesize)));

toplog_threshold = (unsigned long)ceil((1.0 / 3.0)
                          * (double)ssclog_threshold);

filesizeof(&ssclog_threshold);
        filesizeof(&toplog_threshold);

if((ssclog_threshold == 0L) || (toplog_threshold == 0L))
            if(total_logfiles > MIN_LOGFILES) {
                --total_logfiles;
                set_logfile_thresholds();
            }
    }
    else {
        if(stat(_logfiles[DWN_LOG].name,&file_information) == 0) {
            logsize += file_information.st_size;
            filesizeof(&logsize);
        }
        if(stat(_logfiles[FTP_LOG].name,&file_information) == 0) {
            logsize += file_information.st_size;
            filesizeof(&logsize);
        }
        hardisk_space += logsize;

/*
         * Set the logfile thresholds based on 75% & 25% use.
         * Round off thresholds.
         */
        if(hardisk_space <= (2L * minimum_filesize))
            ftplog_threshold = 0L;
        else
            ftplog_threshold = (unsigned long)ceil((3.0 / 4.0)
                             * (double)(hardisk_space
                                - (2L * minimum_filesize)));

dwnlog_threshold = (unsigned long)ceil((1.0 / 3.0)
                          * (double)ftplog_threshold);
        /*
         * Temporary until FTP Logfile is used.
         */
        if(hardisk_space <= (2L * minimum_filesize))
            dwnlog_threshold = 0L;
        else
            dwnlog_threshold = (unsigned long)ceil((1.0 / 1.0)
                             * (double)(hardisk_space
                                - (2L * minimum_filesize)));

filesizeof(&ftplog_threshold);
        filesizeof(&dwnlog_threshold);
    }
}
/****************************************************************************
 *                                                                          *
 *                      A N N O T A T E   L O G F I L E                     *
 *                                                                          *
 ****************************************************************************/
void annotate_logfile()
{
    /*
     * Prepare the screen.
     * Request the annotation message.
     * Supply a field to show limit of message.
     * Set the cursor position.
     */
    clrcrt(RECEIVE_LOC);
    clrcrt(TRANSMIT_LOC);

sprintf((char*)_display[TRANSMIT_LOC].buffer,"Enter annotation %s",ARROW);
    putmsg(TRANSMIT_LOC,NONE,STRNG);

/*
     * Put the input field on screen.
     * Flush any excess characters from keyboard.
     * Get the logfile annotation string from the keyboard.
     * Convert to upper case to help distinguish it in the logfile.
     * Log it.
     */
    put_field(TRANSMIT_LOC,ANNOTATION_LEN);
    flushall();
    adl_scanf(_display[TRANSMIT_LOC].buffer,ANNOTATION_LEN,TRANSMIT_LOC);
    clrcrt(TRANSMIT_LOC);
    strupr(_display[TRANSMIT_LOC].buffer);
    logmsg(_display[TRANSMIT_LOC].buffer,_logfiles[_system_flags.type].logtype
        ,STRNG);
}
```

```
/****************************************************************************
*                                                                           *
*         C O P Y   L O G F I L E   B A C K U P   D I S K E T T E S         *
*                                                                           *
****************************************************************************/
int copy_logfile_backup_diskettes()
{
    char command_buffer     [MAX_COMMAND]; /* command buffer                  */
    char logfile_description [_MAX_FNAME]; /* logfile descriptor              */
    long file_number = 0L;                 /* filename number                 */
    long max_file_number;                  /* maximum file number to backup   */ static STRG answer = "Y";
    static STRG msg    = "will be required to back up the logfiles.";

/*
     * Set how many logfiles used prior to using their values.
     * Determine the number of logfile sets to back up.
     * Prepare the screen.
     * Show the number of logfiles to back up.
     * Ask about continuing.
     * Log a message.
     */
    set_how_many_logfiles_used();
    max_file_number = ((_logfiles[TOP_LOG].used > _logfiles[SSC_LOG].used)
                ? (_logfiles[TOP_LOG].used - 1L)
                : (_logfiles[SSC_LOG].used - 1L));

clrcrt(RECEIVE_LOC);
    clrcrt(TRANSMIT_LOC);

if((max_file_number + 2L) == 1L)
        sprintf((char*)_display[RECEIVE_LOC].buffer,"1 diskette %s",msg);
    else
        sprintf((char*)_display[RECEIVE_LOC].buffer,"%ld diskettes %s"
        ,(max_file_number + 2L),msg);

putmsg(RECEIVE_LOC,NONE,STRNG);
    sprintf((char*)_display[TRANSMIT_LOC].buffer
        ,"Would you like to continue with the backup procedure [Y/N]? ");
    putmsg(TRANSMIT_LOC,NONE,STRNG);

flushall();
    put_field(TRANSMIT_LOC,1);
    adl_scanf(answer,1,TRANSMIT_LOC);

if(strncmp(strupr(answer),"Y",1) == MATCH) {
        logmsg("Logfile Backup Procedure Invoked."
            ,_logfiles[_system_flags.type].logtype,STRNG);
        update_display(CLSHOME);
    }
    else {
        clrcrt(RECEIVE_LOC);
        clrcrt(TRANSMIT_LOC);
        return(ERR_NONE);
    }

/*
     * Back up each logfile set onto its own disk.
     * Build a logfile set name.
     * Build a sequence for the command processor.
     * Make the logfile backup diskette via the command processor.
     */
    if(max_file_number >= 0L) {
        for(file_number = 0L; file_number <= max_file_number; file_number++) {
            sprintf(logfile_description,"logfile%lu",file_number);
            sprintf(command_buffer,"command /c make_log %s\n"
                ,logfile_description);
            set_cursor(VNORMAL);
            if(system(command_buffer) == (-1)) {
                set_cursor(BLANK);
                _status = ERR_SYSTEM_CALL;
                error_report(ERR_COPY_LOGFILE,USR1,ERRCODE);
                return(ERR_COPY_LOGFILE);
            }
            printf("Diskette #%lu of %ld is done!",(file_number + 1L)
                ,(max_file_number + 2L));
            printf("\n\nStrike a key when ready . . .");
            while(gfkbhit() == 0)
                continue;
            update_display(CLSHOME);
        }
```

```c
}
/*
 * Back up the active logfile set onto its own disk.
 * Build a sequence for the command processor.
 * Make the logfile backup diskette via the command processor.
 */
sprintf(command_buffer,"command /c make_log logfile\n");
set_cursor(VNORMAL);
if(system(command_buffer) == (-1)) {
     set_cursor(BLANK);
     _status = ERR_SYSTEM_CALL;
     error_report(ERR_COPY_LOGFILE,USR1,ERRCODE);
     return(ERR_COPY_LOGFILE);
}
printf("\nDiskette #%ld of %lu is done!",(file_number + 1L)
     ,(max_file_number + 2L));
printf("\n\nStrike any key to return to ADATS . . .");
while(gfkbhit() == 0)
     continue;

set_cursor(BLANK);
update_display(CLSHOME);
set_logfile_thresholds();
return(ERR_NONE);
}

/*****************************************************************************
 *                                                                           *
 *                   S H O W   F I L E   S T A T U S                         *
 *                                                                           *
 *****************************************************************************/
void show_file_status(logtype)
unsigned logtype; /* type of logfile to show status for */
{
     BYTE          location;           /* location for logfile status    */
     double        percent_remaining;  /* percent remaining in logfile   */
     unsigned long filesize_threshold; /* threshold of logfilesize to allow */

/*
      * Check for validity of logtype.
      * Based on the type of logfile:
      *      Assign threshold for logtype.
      *      Assign screen location for logtype.
      */
     switch(logtype) {
     case TOP_LOG:
          filesize_threshold = toplog_threshold;
          location           = ADLLOG_LOC;
          break;
     case DWN_LOG:
          filesize_threshold = dwnlog_threshold;
          location           = ADLLOG_LOC;
          break;
     case SSC_LOG:
          filesize_threshold = ssclog_threshold;
          location           = EXTLOG_LOC;
          break;
     case FTP_LOG:
          filesize_threshold = ftplog_threshold;
          location           = EXTLOG_LOC;
          break;
     default:
          return;
     }

/*
      * Calculate percent remaining in logfile.
      * Display warning about impending los of logfile data.
      * Display percent remaining in the logfile.
      */
     percent_remaining = calc_percent_remaining(logtype,filesize_threshold);

if(_logfiles[logtype].data_loss == TRUE) {
          _display[location].color = LTRED;
          sprintf((char*)_display[location].buffer
               ," Logfile capacity has been exceeded! ");
          putmsg(location,VBLINK,STRNG);
     }
```

```
    else {
        _display[location].color = YELLOW;
        sprintf((char*)_display[location].buffer
            ,"%5.1f%% of %s is available.",percent_remaining
            ,_logfiles[logtype].name);
        if(percent_remaining <= LOGFILE_BLINK)
            putmsg(location,VBLINK,STRNG);
        else
            putmsg(location,NONE,STRNG);
    }
}

/****************************************************************************
*                                                                           *
*              C A L C   P E R C E N T   R E M A I N I N G                  *
*                                                                           *
****************************************************************************/
static double calc_percent_remaining(logtype,filesize_threshold)
unsigned        logtype;            /* type of logfile to process       */
unsigned long filesize_threshold;   /* threshold of logfilesize to allow */
{
    double      percent_remaining; /* percentage of logfile available */
    struct stat file_information;  /* structure to hold status data    */

/*
     * Get logfile information.
     * Make a backup logfile once the threshold has been exceeded.
     * Calculate the percent remaining.
     */
    if(stat(_logfiles[logtype].name,&file_information) == 0) {
        if((unsigned long)file_information.st_size > filesize_threshold) {
            if((unsigned long)file_information.st_size >= minimum_filesize)
                make_backup_logfile(logtype);
            unlink(_logfiles[logtype].name);
            file_information.st_size = 0L;
        }
        if((unsigned long)file_information.st_size < filesize_threshold)
            percent_remaining = ((1.0 - ((double)file_information.st_size
                                / (double)filesize_threshold)) * 100.0);
        else
            percent_remaining = 0.0;
    }
    else
        percent_remaining = 100.0;

/*
     * Set the percent remaining when no space is available for any logfiles.
     * For Non-Downside systems:
     *      Set how many logfiles used prior to using their values.
     *      Adjust percent remaining for multiple logfile types.
     */
    if(hardisk_space <= (2L * minimum_filesize))
        percent_remaining = 0.0;
    else if(_system_flags.type != DOWNSIDE) {
        set_how_many_logfiles_used();
        percent_remaining = (100.0 * (1.0 - (((double)_logfiles[logtype].used
                            + (1.0 - (percent_remaining / 100.0)))
                            / (double)total_logfiles)));
    }
    return(percent_remaining);
}
```

```c
/***********************************************************************
 *                                                                     *
 *                 M A K E   B A C K U P   L O G F I L E               *
 *                                                                     *
 ***********************************************************************/
static void make_backup_logfile(logtype)
unsigned logtype; /* type of logfile to back up */
{
    char        new_pathname [_MAX_PATH]; /* pathname of backup logfile   */
    char        old_pathname [_MAX_PATH]; /* pathname of logfile to backup */
    unsigned long file_number;             /* filename number              */

/*
     * Only Non-Downside systems can have multiple logfiles.
     * Rename the logfile to the first available backup filename.
     */
    if(_system_flags.type == DOWNSIDE)
        return;

max_log_number = (total_logfiles - MIN_LOGFILES);

for(file_number = MIN_LOG_NUMBER; file_number <= max_log_number;
    file_number++) {
        sprintf(new_pathname,_logfiles[logtype].format,file_number);
        if(access(new_pathname,EXISTANCE) != 0)
            break;
    }

/*
     * After filling up all available backup logfiles - rename the
     *      entire group by decrementing their respective file numbers.
     * Rename the current logfile.
     */
    if(file_number > max_log_number) {
        _logfiles[logtype].data_loss = TRUE;
        for(file_number = MIN_LOG_NUMBER; file_number <= max_log_number;
        file_number++) {
            sprintf(new_pathname,_logfiles[logtype].format,file_number);
            if(file_number < max_log_number)
                sprintf(old_pathname,_logfiles[logtype].format
                    ,(file_number + 1L));
            else
                sprintf(old_pathname,_logfiles[logtype].name);
            unlink(new_pathname);
            rename(old_pathname,new_pathname);
        }
    }
    rename(_logfiles[logtype].name,new_pathname);
}

/***********************************************************************
 *                                                                     *
 *                      O P E N   L O G F I L E                        *
 *                                                                     *
 ***********************************************************************/
static void open_logfile(logtype)
unsigned logtype; /* type of logfile to open */
{
    /*
     * Check for valid type before using it.
     */
    switch(logtype) {
    case TOP_LOG:
    case DWN_LOG:
    case SSC_LOG:
    case FTP_LOG:
        if(_logfiles[logtype].state == OPENED)
            return;
        break;
    default:
        return;
    }
    /*
     * Open or Create a logfile for appending if it exists.
     * Otherwise open for appending.
     * Position file pointer to last write position.
     * Set flag to indicate logfile is opened.
     */
```

```c
    if((_logfiles[logtype].handle = open(_logfiles[logtype].name
       ,(O_WRONLY|O_CREAT|O_APPEND|_logfiles[logtype].oflag),(S_IREAD|S_IWRITE)))
       == (-1)) {
            _status = errno;
            error_report(ERR_OPEN_LOGFILE,USR1,ERRNO);
            return;
    }
    _logfiles[logtype].state = OPENED;
}

/****************************************************************************
*                                                                           *
*                      C L O S E    L O G F I L E                           *
*                                                                           *
****************************************************************************/
static void close_logfile(logtype)
unsigned logtype; /* type of logfile to close */
{
    /*
     * Check for valid type before using it.
     */
    switch(logtype) {
    case TOP_LOG:
    case DWN_LOG:
    case SSC_LOG:
    case FTP_LOG:
            if(_logfiles[logtype].state == CLOSED)
                    return;
            break;
    default:
            return;
    }
    /*
     * Close the logfile.
     * Set flag to indicate logfile is closed.
     */
    if(close(_logfiles[logtype].handle) == (-1)) {
            _status = errno;
            error_report(ERR_CLOSELOGFILE,USR1,ERRNO);
            return;
    }
    _logfiles[logtype].state = CLOSED;
}

/****************************************************************************
*                                                                           *
*         S E T    H O W    M A N Y    L O G F I L E S    U S E D           *
*                                                                           *
****************************************************************************/
static void set_how_many_logfiles_used()
{
    char         pathname [_MAX_PATH]; /* pathname of backup logfile */
    unsigned long file_number;          /* filename number           */

/*
     * For Non-Downside type systems:
     *      Initialize the number of logfiles used.
     *      Scan all logfile?.typ names for counting files.
     */
    if(_system_flags.type == DOWNSIDE)
            return;

_logfiles[TOP_LOG].used = 0L;
    _logfiles[SSC_LOG].used = 0L;

max_log_number = (total_logfiles - MIN_LOGFILES);

for(file_number = MIN_LOG_NUMBER; file_number <= max_log_number;
        file_number++) {
            sprintf(pathname,_logfiles[TOP_LOG].format,file_number);
            if(access(pathname,EXISTANCE) == 0)
                    _logfiles[TOP_LOG].used++;

sprintf(pathname,_logfiles[SSC_LOG].format,file_number);
            if(access(pathname,EXISTANCE) == 0)
                    _logfiles[SSC_LOG].used++;
    }
    if(_logfiles[TOP_LOG].used < (max_log_number + 1L))
            _logfiles[TOP_LOG].data_loss = FALSE;

if(_logfiles[SSC_LOG].used < (max_log_number + 1L))
            _logfiles[SSC_LOG].data_loss = FALSE;
}
```

```
/************************************************************************
 *                                                                      *
 *                       F I L E S I Z E   O F                          *
 *                                                                      *
 ************************************************************************/
static void filesizeof(file)
unsigned long *file; /* file size to round up to multiple of minimum size */
{
    *file = ((unsigned long)(ceil((double)*file
          / (double)minimum_filesize)) * (unsigned long)minimum_filesize);
} include <system.h> static int  control_loop     (void);
static int  validate_executive (void);
static void exit_adats       (int exit_code);

/************************************************************************
 *                                                                      *
 *                           M A I N                                    *
 *                                                                      *
 ************************************************************************/
void main(argc,argv)
int  argc;    /* main argument count */
char *argv[]; /* main argument pointer array */
{
    /*
     * Initialize system.
     * Enter primary control loop.
     * Exit ADATS.
     */
    if((_status = initialize(argc,argv)) == ERR_NONE)
        if((_status = control_loop()) == ERR_NONE)
            if((_status = validate_executive()) == ERR_NONE)
                if((_status = kill_system()) == ERR_NONE)
                    exit_adats(AOK);

error_report(ERR_MAIN,USR1,ERRCODE);
    exit_adats(ABORT);
}

/************************************************************************
 *                                                                      *
 *                     C O N T R O L   L O O P                          *
 *                                                                      *
 ************************************************************************/
static int control_loop()
{
    int        port; /* port to attend */
    union REGS regs; /* registers for int86() */

/*
     * Check for events.
     * Check for message on the acoustic port.
     * Check for message on the serial ports.
     * Check for download/upload request on the serial port(s).
     * When the DAS is not installed: simulate via software int.
     * Repeat until a restart is requested.
     */
    while(_restart == FALSE) {
        if((_status = attend_events()) != ERR_NONE)
            error_report(ERR_CONTROL_LOOP,USR1,ERRCODE);

if((_status = attend_message(DAS1)) != ERR_NONE)
            error_report(ERR_CONTROL_LOOP,DAS1,ERRCODE);

if(_master_serial_port == DEFAULT_MASTER_PORT) {
            for(port = COM1; port <= COM2; port++)
                if(is_port_serial(port) == TRUE)
                    if((_status = attend_message(port)) != ERR_NONE)
                        error_report(ERR_CONTROL_LOOP,port,ERRCODE);
        }
        else
            if((_status = attend_message(_master_serial_port)) != ERR_NONE)
                error_report(ERR_CONTROL_LOOP,port,ERRCODE);

if(_dnupload_window == OPENED) {
            for(port = COM1; port <= COM2; port++) {
                if((_status = attend_download(port)) != ERR_NONE) {
                    error_report(ERR_CONTROL_LOOP,port,ERRCODE);
                    dnload_mode(OFF);
                }
```

```
                    if((_status = attend_upload(port)) != ERR_NONE) {
                        error_report(ERR_CONTROL_LOOP,port,ERRCODE);
                        upload_mode(OFF);
                    }
                }
            }
            if((_port_stuff[DAS1].installed == FALSE)
            && (_das_receiver_request == ON))
                int86(_irq_table[_das_irq_number].interrupt_number,®s,®s);
        }
        return(ERR_NONE);
}

/****************************************************************************
 *                                                                          *
 *                      V A L I D A T E   E X E C U T I V E                 *
 *                                                                          *
 ****************************************************************************/
static int validate_executive()
{
    struct stat file_info; /* structure to store results */

/*
     * Make sure adats.exe is an executive type file.
     */
    if(stat("C:adats.exe",&file_info) != 0) {
        _status = errno;
        error_report(ERR_VALIDATE_EXEC,USR1,ERRNO);
        return(ERR_VALIDATE_EXEC);
    }
    if((file_info.st_mode & S_IEXEC) != S_IEXEC) {
        _status = ERR_NOT_EXECUTIVE;
        error_report(ERR_VALIDATE_EXEC,USR1,ERRNO);
        return(ERR_VALIDATE_EXEC);
    }
    return(ERR_NONE);
}

/****************************************************************************
 *                                                                          *
 *                           E X I T   A D A T S                            *
 *                                                                          *
 ****************************************************************************/
static void exit_adats(exit_code)
int exit_code; /* code to exit adats with */
{
    static STRG msg[] = {
        "End",
        "Abort"
    };

/*
     * Act on the type of exit.
     * Log a message before exiting.
     */
    switch(exit_code) {
    case AOK:
        break;
    case ABORT:
        kill_system();
        break;
    }
    sprintf(_display[ERROR_LOC].buffer,"%s ADL Session.",msg[exit_code]);
    logmsg((STRG)_display[ERROR_LOC].buffer
        ,_logfiles[_system_flags.type].logtype,STRNG);
    exit(exit_code);
}
```

```c
include <system.h> static int handle_message   (int inport,WORD bytes_to_transmit);
static int destination_port (int port,BYTE destination);

/****************************************************************************
 *                                                                          *
 *                       A T T E N D   M E S S A G E                        *
 *                                                                          *
 ****************************************************************************/
int attend_message(inport)
int inport; /* port to attend */
{
    WORD bytes_received; /* number of bytes received */

/*
     * Test the Receiver at the inport.
     * Handle the Message.
     */
    if((_status = receive(inport,&bytes_received)) != ERR_NONE) {
        error_report(ERR_ATTEND_MESSAGE,inport,ERRCODE);
        return(ERR_ATTEND_MESSAGE);
    }
    if((_status = handle_message(inport,bytes_received)) != ERR_NONE) {
        error_report(ERR_ATTEND_MESSAGE,inport,ERRCODE);
        return(ERR_ATTEND_MESSAGE);
    }
    return(ERR_NONE);
}

/****************************************************************************
 *                                                                          *
 *                       H A N D L E   M E S S A G E                        *
 *                                                                          *
 ****************************************************************************/
static int handle_message(inport,bytes_to_transmit)
int  inport;             /* port containing message */
WORD bytes_to_transmit;  /* Number of bytes to transmit */
{
    BYTE destination; /* destination of message */ if(bytes_to_transmit == 0)
        return(ERR_NONE);

/*
     * Set up the destination for the message.
     */
    switch(_system_flags.echo) {
    case ON:
        _system_flags.echo = OFF;
        destination = ECHO;
        timer(SECOND);
        break;
    case OFF:
        if((destination = (BYTE)_system_flags.destination) == ECHO)
            timer(SECOND);
        break;
    }

/*
     * Transmit the message to its destination.
     */
    switch(destination) {
    case MONITOR:
        break;
    case ECHO:
        if((_status = transmit_message(inport,inport,bytes_to_transmit))
           != ERR_NONE) {
            error_report(ERR_HANDLE_MESSAGE,inport,ERRCODE);
            return(ERR_HANDLE_MESSAGE);
        }
        break;
    case SERIAL:
    case ACOUSTIC:
        /*
         * If the master serial port has not been determined -
         *      send the message to both serial ports.
         */
        if(_master_serial_port != DEFAULT_MASTER_PORT) {
            if((_status = transmit_message(destination_port(inport
               ,destination),inport,bytes_to_transmit)) != ERR_NONE) {
                error_report(ERR_HANDLE_MESSAGE,inport,ERRCODE);
                return(ERR_HANDLE_MESSAGE);
```

```c
        }
    }
    else {
        if((bytes_to_transmit < 0)
        || (bytes_to_transmit > _port_stuff[USR1].bufsiz)) {
            _status = ERR_MEMMOVE;
            error_report(ERR_HANDLE_MESSAGE,inport,ERRCODE);
            return(ERR_HANDLE_MESSAGE);
        }
        memmove((char*)_port_stuff[USR1].buffer
            ,(char*)_port_stuff[inport].buffer,bytes_to_transmit);
        if((_status = transmit_message(COM1,inport,bytes_to_transmit))
        != ERR_NONE) {
            error_report(ERR_HANDLE_MESSAGE,inport,ERRCODE);
            return(ERR_HANDLE_MESSAGE);
        }
        clrcrt(TRANSMIT_LOC);
        if((bytes_to_transmit < 0)
        || (bytes_to_transmit > _port_stuff[inport].bufsiz)) {
            _status = ERR_MEMMOVE;
            error_report(ERR_HANDLE_MESSAGE,inport,ERRCODE);
            return(ERR_HANDLE_MESSAGE);
        }
        memmove((char*)_port_stuff[inport].buffer
            ,(char*)_port_stuff[USR1].buffer,bytes_to_transmit);
        if((_status = transmit_message(COM2,inport,bytes_to_transmit))
        != ERR_NONE) {
            error_report(ERR_HANDLE_MESSAGE,inport,ERRCODE);
            return(ERR_HANDLE_MESSAGE);
        }
        }
        break;
    }
    return(ERR_NONE);
}

/****************************************************************************
*                                                                           *
*                     D E S T I N A T I O N   P O R T                       *
*                                                                           *
****************************************************************************/
static int destination_port(port,destination)
int  port;          /* port data arrived on */
BYTE destination;   /* destination channel */
{
    switch(destination) {
    case SERIAL:
        switch(port) {
        case COM1:
            set_master_port(COM2);
            return(COM2);
        case COM2:
            set_master_port(COM1);
            return(COM1);
        case DAS1:
            return(_master_serial_port);
        }
        break;
    case ACOUSTIC:
        switch(port) {
        case COM1:
        case COM2:
            return(DAS1);
        case DAS1:
            return(_master_serial_port);
        }
        break;
    }
}
```

```c
include <system.h> static int   loadfiles  (STRG rosetta,WORD *number_of_files);
static int   show_delay (WORD mode);
static void  freeup     (WORD number_of_files);

static STRG* filenames;

/****************************************************************************
 *                                                                          *
 *                            N E T W O R K                                 *
 *                                                                          *
 ****************************************************************************/
int network(mode,rosetta,port)
WORD mode;     /* UPLOAD or DOWNLOAD option */
STRG rosetta;  /* Rosetta filename to access */
int  port;     /* port to Upload/Download to/from */
{
    WORD file_count;      /* file counter */
    WORD number_of_files; /* number of files to transfer */

/*
     * Load the filenames from the "d:\adats\rosetta" file into
     * the "filenames" array.
     * These are the files to be transfered
     */
    if((_status = loadfiles(rosetta,&number_of_files)) != ERR_NONE) {
        error_report(ERR_NETWORK,port,ERRCODE);
        return(ERR_NETWORK);
    }
    /*
     * UPLOAD/DOWNLOAD all files listed in the filenames array.
     * Delay between files to allow screen message to be read.
     */
    for(file_count = 0; file_count < number_of_files; file_count++) {
        timer(2*SECOND);
        if((_status = transfer(mode,(char*)filenames[file_count],port))
           != ERR_NONE) {
            freeup(number_of_files);
            error_report(ERR_NETWORK,port,ERRCODE);
            return(ERR_NETWORK);
        }
    }

/*
     * Show a message.
     * Free the allocated memory from loadfiles();
     */
    clrcrt(TRANSMIT_LOC);
    sprintf((char*)_display[TRANSMIT_LOC].buffer,"%s %s %s %s"
        ,_port_stuff[port].name
        ,"All Files in",rosetta,"Transferred Successfully.");
    putmsg(TRANSMIT_LOC,NONE,STRNG);
    timer(SECOND);
    freeup(number_of_files);

/*
     * Show a Restart Delay message to allow external systems to remove
     *    download discrete.
     */
    if((_status = show_delay(mode)) != ERR_NONE) {
        error_report(ERR_NETWORK;port,ERRCODE);
        return(ERR_NETWORK);
    }
    return(ERR_NONE);
}
```

```
/****************************************************************************
 *                                                                          *
 *                         L O A D   F I L E S                              *
 *                                                                          *
 * All the file names are loaded up from the rosetta file into the array    *
 * 'filenames' which then will be used as a guide for downloading.          *
 *                                                                          *
 * Dynamic memory allocation is used to allocate the filenames array        *
 * and the filenames themselves.  This is done to allow program             *
 * independance from the number of download files to transfer.  If the     *
 * "filenames" array is not allocated dynamically - the number of files    *
 * would have to be presumed at compile time.                               *
 *                                                                          *
 * Double Checked 10/1/87. LJB                                              *
 *                                                                          *
 ****************************************************************************/
static int loadfiles(rosetta,number_of_files)
STRG  rosetta;          /* Rosetta file to read filenames from */
WORD* number_of_files;  /* number of files read from the Rosetta file */
{
    FILE* stream;            /* Rosetta file stream */
    WORD  index;             /* general use index */
    char  filename [BUFSIZ]; /* buffer to temporarily hold filename in */

/*
     * Open the Rosetta file for reading.
     */
    if((stream = fopen((char*)rosetta,"r")) == NULL) {
        _status = ERR_FOPEN;
        error_report(ERR_LOADFILES,USR1,ERRCODE);
        return(ERR_LOADFILES);
    }
    /*
     * Count the number of files in the Rosetta file.
     */
    *number_of_files = 0;
    while((_status = fscanf(stream,"%s\n",filename)) != EOF) {
        if(_status != 1) {
            _status = ERR_FSCANF;
            error_report(ERR_LOADFILES,USR1,ERRCODE);
            return(ERR_LOADFILES);
        }
        (*number_of_files)++;
    }

/*
     * Allocate memory for the array of filename pointers
     * and assign the "filenames" pointer to the block
     */
    if((filenames = (STRG*)malloc((unsigned)
    (*number_of_files * sizeof(STRG)))) == NULL) {
        _status = ERR_MALLOC;
        error_report(ERR_LOADFILES,USR1,ERRCODE);
        return(ERR_LOADFILES);
    }
    /*
     * Rewind the file.
     * Read a filename into a buffer.
     * Allocate memory for permanent storage of each filename.
     * Save the filename in the allocated memory.
     */
    rewind(stream);
    for(index = 0; index < *number_of_files; index++) {
        if(fscanf(stream,"%s\n",filename) != 1) {
            free((void*)filenames);
            _status = ERR_FSCANF;
            error_report(ERR_LOADFILES,USR1,ERRCODE);
            return(ERR_LOADFILES);
        }
        if((filenames[index] = (STRG)malloc((unsigned)
        ((strlen(filename) + 1) * sizeof(char)))) == NULL) {
            freeup(index);
            _status = ERR_MALLOC;
            error_report(ERR_LOADFILES,USR1,ERRCODE);
            return(ERR_LOADFILES);
        }
        strcpy((char*)filenames[index],filename);
    }
    if(fclose(stream) == EOF) {
        freeup(*number_of_files);
        _status = ERR_FCLOSE;
        error_report(ERR_LOADFILES,USR1,ERRCODE);
```

```
            return(ERR_LOADFILES);
    }
    return(ERR_NONE);
}

/****************************************************************************
 *                                                                          *
 *                          F R E E U P                                     *
 *                                                                          *
 ****************************************************************************/
static void freeup(number_of_files)
WORD number_of_files; /* number of filenames to free */
{
    int index; /* general use index */

/*
     * Deallocate memory from the array of filename pointers.
     * Also free the "filenames" array pointer.
     */
    for(index = ((int)number_of_files - 1); index >= 0; index--)
        free((void*)filenames[index]);
    free((void*)filenames);
}

/****************************************************************************
 *                                                                          *
 *                       S H O W   D E L A Y                                *
 *                                                                          *
 ****************************************************************************/
static int show_delay(mode)
WORD mode; /* Upload or Download mode */
{
    int tick; /* timer tick */ static STRG delay_msg [] = {
        "The remote ADATS program will restart in",
        "The ADATS program will restart in"
    };

/*
     * Show delay period for restart.
     */
    switch(mode) {
    case UPLOAD:
        timer(SECOND);
    case DOWNLOAD:
        clrcrt(TRANSMIT_LOC);
        for(tick = RESTART_DELAY; tick > 0; tick--) {
            if(tick == 1)
                sprintf((char*)_display[TRANSMIT_LOC].buffer,"%s %d %s"
                    ,delay_msg[mode],tick,"second. ");
            else
                sprintf((char*)_display[TRANSMIT_LOC].buffer,"%s %d %s"
                    ,delay_msg[mode],tick,"seconds. ");

putmsg(TRANSMIT_LOC,NONE,STRNG);
            timer(8*TENTH);
        }
        break;

default:
        _status = ERR_INVALID_ARGUMENT;
        error_report(ERR_SHOW_DELAY,USR1,ERRCODE);
        return(ERR_SHOW_DELAY);
    }
    clrcrt(TRANSMIT_LOC);
    if((_status = reset_availability_state(ON)) != ERR_NONE) {
        error_report(ERR_SHOW_DELAY,USR1,ERRCODE);
        return(ERR_SHOW_DELAY);
    }
    return(ERR_NONE);
}
```

```c
include <system.h> static BYTE original_mask_1;         /* Original PIC1 Mask */
static BYTE original_mask_2;         /* Original PIC2 Mask */
static BYTE pic_initialized = FALSE; /* FLAG = Has PIC been initialized? */

/*
 * Structure Used to Identify PIC Ports.
 * NOTE: Do NOT Change the order of the initialization of this
 *       structure unless the corresponding #defines are
 *       updated also. ie., PIC1 --> _pic_port[PIC1].lo_address
 */
static struct pic_port_t {
        BYTE lo_address; /* Low Port address of PIC */
        BYTE hi_address; /* High Port address of PIC */
} _pic_port [] = {
        {PIC1_LO,PIC1_HI},
        {PIC2_LO,PIC2_HI}
};

/****************************************************************************
 *                                                                          *
 *                       I N I T I A L I Z E   P I C                        *
 *                                                                          *
 ****************************************************************************/
void initialize_pic()
{
    BYTE irq_number; /* IRQ number to access */

/*
     * Save the original PIC masks for restoration at exit.
     * Delay after each PIC command as required.
     */
    _disable();
    original_mask_1 = (BYTE)inp(PIC1_HI);
    delay(TENTH);
    original_mask_2 = (BYTE)inp(PIC2_HI);
    delay(TENTH);

/*
     * Disable All IRQ's which are not used by the ADL.
     * Enable All IRQ's which are used by the ADL.
     * Set the pic initialized flag.
     */
    for(irq_number = MIN_IRQ_NUMBER; irq_number < MAX_IRQ_NUMBER; irq_number++)
        if(_irq_table[irq_number].used_by_adl == FALSE)
            disable_irq(irq_number);

for(irq_number = MIN_IRQ_NUMBER; irq_number < MAX_IRQ_NUMBER; irq_number++)
        if(_irq_table[irq_number].used_by_adl == TRUE)
            enable_irq(irq_number);

pic_initialized = TRUE;
    _enable();
}

/****************************************************************************
 *                                                                          *
 *                         R E S T O R E   P I C                            *
 *                                                                          *
 ****************************************************************************/
void restore_pic()
{
    /*
     * Reprogram the PIC with the original mask.
     * Delay after each PIC command as required.
     */
    if(pic_initialized == TRUE) {
        _disable();
        outp(PIC1_HI,(int)original_mask_1);
        delay(TENTH);
        outp(PIC2_HI,(int)original_mask_2);
        delay(TENTH);
        pic_initialized = FALSE;
        _enable();
    }
}
```

```
/****************************************************************
 *                                                              *
 *              D I S A B L E   I R Q   L I N E                 *
 *                                                              *
 ****************************************************************/
void disable_irq(irq_number)
BYTE irq_number; /* IRQ number to disable */
{
    BYTE bit_mask; /* current bit mask from PIC */
    BYTE new_mask; /* desired bit mask          */
    BYTE pic_numb; /* PIC to program            */
    BYTE pic_port; /* PIC port to send mask to  */

/*
     * Maskout the IRQ line.
     */
    bit_mask = _irq_table[irq_number].bit_mask;
    pic_numb = _irq_table[irq_number].pic_number;
    pic_port = _pic_port[pic_numb].hi_address;

_disable();
    new_mask = (BYTE)(inp(pic_port) | bit_mask);
    outp(pic_port,(int)new_mask);
    _enable();
}

/****************************************************************
 *                                                              *
 *                    E N A B L E   I R Q                       *
 *                                                              *
 ****************************************************************/
void enable_irq(irq_number)
BYTE irq_number; /* IRQ number to enable */
{
    BYTE bit_mask; /* current bit mask from PIC */
    BYTE new_mask; /* desired bit mask          */
    BYTE pic_numb; /* PIC to program            */
    BYTE pic_port; /* PIC port to send mask to  */

/*
     * Unmask the IRQ line if its used by the ADL.
     */
    if(_irq_table[irq_number].used_by_adl == FALSE)
         return;

bit_mask = _irq_table[irq_number].bit_mask;
    pic_numb = _irq_table[irq_number].pic_number;
    pic_port = _pic_port[pic_numb].hi_address;

_disable();
    new_mask = (BYTE)(inp(pic_port) & ~bit_mask);
    outp(pic_port,(int)new_mask);
    _enable();
} include <system.h> static int  extract_links     (int port,WORD *msg_length);
static int  get_message       (int port,WORD *bytes_received);
static int  strip_header      (int port,WORD *msg_length);
static int  transfer_message  (int port,WORD *bytes);
static int  verify_checksum   (int port,WORD length);
static int  verify_length     (int port,WORD length);
static int  wait_for_message  (int port,WORD *bytes_received);
static void clrport           (int port);
static void wait_for_acoustic_rx (void);

/****************************************************************
 *                                                              *
 *                      R E C E I V E                           *
 *                                                              *
 ****************************************************************/
int receive(port,count)
int   port;  /* port to receive from */
WORD* count; /* return value of the number of bytes received */
{
```

```c
/*
 * Verify that the port is valid before using it.
 * Switch on the port to check for received message.
 */
if(is_port_valid(port) == FALSE) {
    _status = ERR_INVALID_PORT;
    error_report(ERR_RECEIVE,USR1,ERRCODE);
    return(ERR_RECEIVE);
}
switch(port) {
case COM1:
case COM2:
    /*
     * Check if serial port is available.
     * Return immediately if the serial port is empty (nothing arrived).
     * Shutdown ATLAB to prevent loss of Serial Data.
     * Set the master serial port to the current port.
     *
     *       NOTE: DAS interrupts must be shutdown because when a DAS
     *             interrupt occurs the COM port interrupts are masked by
     *             the interrupt handler for a brief period of time. This
     *             masking will cause incomming serial data to be lost
     *             upon the next DAS interrupt. The DAS interrupts must be
     *             shut off before that happens.
     */
    if(is_port_serial(port) == FALSE) {
        _status = ERR_ILLEGAL_PORT;
        error_report(ERR_RECEIVE,port,ERRCODE);
        return(ERR_RECEIVE);
    }
    if(isrxempty(port)) {
        *count = 0;
        return(ERR_NONE);
    }
    if((_status = shutdown_atlab()) != ERR_NONE) {
        error_report(ERR_RECEIVE,port,ERRCODE);
        return(ERR_RECEIVE);
    }
    if((_status = set_master_port(port)) != ERR_NONE) {
        error_report(ERR_RECEIVE,port,ERRCODE);
        return(ERR_RECEIVE);
    }
    break;
case DAS1:
    /*
     * Return immediately if the acoustic port is empty (nothing arrived).
     * Otherwise, assert the Computer Busy Bit.
     */
    if(_getacousticrx == EMPTY) {
        *count = 0;
        return(ERR_NONE);
    }
    set_busy_bit(_master_serial_port,ON);
    break;

default:
    _status = ERR_ILLEGAL_PORT;
    error_report(ERR_RECEIVE,USR1,ERRCODE);
    return(ERR_RECEIVE);
}

/*
 * Receive the whole message before proceeding any further.
 * Verify the message for length and checksum.
 * Extract the System Configuration Data in the Header.
 * Show the message on screen.
 * For Downside systems turn off blanking bit.
 * For Non-Downside systems reset reply state to end reply period.
 * Delay to allow the external system to prepare for serial data.
 */
if((_status = get_message(port,count)) != ERR_NONE) {
    error_report(ERR_RECEIVE,port,ERRCODE);
    return(ERR_RECEIVE);
}
if((_status = verify_length(port,*count)) != ERR_NONE) {
    error_report(ERR_RECEIVE,port,ERRCODE);
    return(ERR_RECEIVE);
}
if((_status = verify_checksum(port,*count)) == ERR_NONE)
    if((_status = extract_links(port,count)) != ERR_NONE) {
        error_report(ERR_RECEIVE,port,ERRCODE);
        return(ERR_RECEIVE);
```

```c
    }
    if((_status = strip_header(port,count)) != ERR_NONE) {
        error_report(ERR_RECEIVE,port,ERRCODE);
        return(ERR_RECEIVE);
    }
    if((_status = showmsg(RECEIVE,port,*count)) != ERR_NONE) {
        error_report(ERR_RECEIVE,port,ERRCODE);
        return(ERR_RECEIVE);
    }
    if(port == DAS1) {
        if(_system_flags.type == DOWNSIDE)
            set_busy_bit(_master_serial_port,OFF);
        else
            reset_reply_state(CLOSED);
        timer(2*TENTH);
    }
    return(ERR_NONE);
}

/****************************************************************************
 *                                                                          *
 *                    G E T   M E S S A G E                                 *
 *                                                                          *
 ****************************************************************************/
static int get_message(port,bytes_received)
int     port;              /* port to get data from */
WORD*   bytes_received;    /* return value of the number of bytes received */
{
    /*
     * Wait for the entire message to be received.
     * Transfer the received message into the user buffer.
     */
    if((_status = wait_for_message(port,bytes_received)) != ERR_NONE) {
        error_report(ERR_GETMESSAGE,port,ERRCODE);
        return(ERR_GETMESSAGE);
    }
    if((_status = transfer_message(port,bytes_received)) != ERR_NONE) {
        error_report(ERR_GETMESSAGE,port,ERRCODE);
        return(ERR_GETMESSAGE);
    }
    return(ERR_NONE);
}

/****************************************************************************
 *                                                                          *
 *                  W A I T   F O R   M E S S A G E                         *
 *                                                                          *
 ****************************************************************************/
static int wait_for_message(port,bytes_received)
int     port;              /* port to wait at for message */
WORD*   bytes_received;    /* return value of the number of bytes received */
{
    int      previous_rxcnt; /* previous count in wait loop */
    unsigned rxdelay;        /* number of delay ticks in wait loop */

/*
     * A Message Is Comming In!
     * Switch on the port to wait at.
     */
    switch(port) {
    case COM1:
    case COM2:
        /*
         * Check if serial port is available.
         * Calculate a delay time for testing receiver count.
         * Wait until message stops comming in by delaying
         * to receive one character during each loop.
         */
        if(is_port_serial(port) == FALSE) {
            _status = ERR_ILLEGAL_PORT;
            error_report(ERR_WAITFORMESSAGE,port,ERRCODE);
            return(ERR_WAITFORMESSAGE);
        }
        if((_status = calculate_delay(port,&rxdelay)) != ERR_NONE) {
            error_report(ERR_WAITFORMESSAGE,port,ERRCODE);
            return(ERR_WAITFORMESSAGE);
```

```
            }
            previous_rxcnt = (-1);
            while((*bytes_received = (WORD)getrxcnt(port)) != previous_rxcnt) {
                delay(rxdelay);
                previous_rxcnt = (int)*bytes_received;
            }
            break;
    case DAS1:
            /*
             * Wait until message stops comming in.
             * Set the number of bytes received.
             * Disable the DAS I/O operations when the message stops comming in.
             *
             *      NOTE: The DAS must be shutdown to prevent further DMA
             *            data collection - possibly destroying existing data.
             */
            wait_for_acoustic_rx();
            *bytes_received = _acoustic_rxcount;
            if((_status = shutdown_atlab()) != ERR_NONE) {
                error_report(ERR_WAITFORMESSAGE,port,ERRCODE);
                return(ERR_WAITFORMESSAGE);
            }
            break;

default:
            _status = ERR_ILLEGAL_PORT;
            error_report(ERR_WAITFORMESSAGE,USR1,ERRCODE);
            return(ERR_WAITFORMESSAGE);
    }
    return(ERR_NONE);
}
```

```
/***********************************************************************
 *                                                                     *
 *                    T R A N S F E R   M E S S A G E                  *
 *                                                                     *
 ***********************************************************************/
static int transfer_message(port,bytes)
int   port;  /* port from which to transfer data */
WORD* bytes; /* Passed in as the number of bytes to transfer */
             /* Returned as the number of bytes actually transferred */
{
    unsigned bytes_transferred; /* bytes actually transferred */ if(*bytes == 0)
        return(ERR_NONE);
    /*
     * Clear the port buffer.
     * Switch on the port to transfer data from.
     */
    clrport(port);
    switch(port) {
    case COM1:
    case COM2:
            /*
             * Check if serial port is available.
             * Temporarily hold serial port receiver interrupts.
             * Transfer the serial port interrupt driven receive buffer.
             * Clear receiver buffer.
             * Resume serial port receiver interrupts.
             */
            if(is_port_serial(port) == FALSE) {
                _status = ERR_ILLEGAL_PORT;
                error_report(ERR_TRANSFERECMSG,port,ERRCODE);
                return(ERR_TRANSFERECMSG);
            }
            if((_status = asihold(port,ASIN)) != ASSUCCESS) {
                _status = _aserror;
                error_report(ERR_TRANSFERECMSG,port,GLCOMM);
                return(ERR_TRANSFERECMSG);
            }
            if((bytes_transferred = asigetb(port,(char*)_port_stuff[port].buffer
              ,*bytes)) != *bytes) {
                _status = _aserror;
                error_report(ERR_TRANSFERECMSG,port,GLCOMM);
                return(ERR_TRANSFERECMSG);
            }
            if((_status = asiresume(port,ASIN)) != ASSUCCESS) {
                _status = _aserror;
                error_report(ERR_TRANSFERECMSG,port,GLCOMM);
                return(ERR_TRANSFERECMSG);
```

```c
            }
            break;
        case DAS1:
            _getacousticrx = EMPTY;
            if((bytes_transferred = (HEADER_BYTES + *bytes)) > USRBUFLEN) {
                _status = ERR_RECEIVER_OVERFLOW;
                error_report(ERR_TRANSFERECMSG,port,ERRCODE);
                return(ERR_TRANSFERECMSG);
            }
            if((bytes_transferred < 0)
            || (bytes_transferred > _port_stuff[port].bufsiz)) {
                _status = ERR_MEMCPY;
                error_report(ERR_TRANSFERECMSG,port,ERRCODE);
                return(ERR_TRANSFERECMSG);
            }
            memcpy((char*)_port_stuff[port].buffer,(char*)_byteb
                ,bytes_transferred);
            break;
        default:
            _status = ERR_ILLEGAL_PORT;
            error_report(ERR_TRANSFERECMSG,USR1,ERRCODE);
            return(ERR_TRANSFERECMSG);
    }
    *bytes = bytes_transferred;
    return(ERR_NONE);
}

/****************************************************************************
 *                                                                          *
 *                     V E R I F Y   C H E C K S U M                        *
 *                                                                          *
 ****************************************************************************/
static int verify_checksum(port,length)
int  port;    /* port from which data originates */
WORD length;  /* length of data in buffer associated with port */
{
    BYTE checksum_index;    /* index to write checksum data at */
    BYTE checksum_start;    /* starting index into data for checksum */
    BYTE expected_checksum; /* expected checksum of message_block */
    BYTE received_checksum; /* calculated checksum of received message_block */
    WORD checksum_length;   /* length of data to checksum */

/*
     * Verify that the port is valid before using it.
     * Switch on the port to verify checksum of received message.
     */
    if(is_port_valid(port) == FALSE) {
        _status = ERR_INVALID_PORT;
        error_report(ERR_VERIFYCHECKSUM,USR1,ERRCODE);
        return(ERR_VERIFYCHECKSUM);
    }
    if(length == 0)
        return(ERR_NONE);

switch(port) {
    case COM1:
    case COM2:
        /*
         * Check if serial port is available.
         * Calculate the Checksum on the: up/dnlink bytes and message.
         * Extract the received check-um value from the mesage header.
         * Check the calculated checksum and the received checksum.
         * If they are not equal - put a message in the logfile.
         */
        if(is_port_serial(port) == FALSE) {
            _status = ERR_ILLEGAL_PORT;
            error_report(ERR_VERIFYCHECKSUM,USR1,ERRCODE);
            return(ERR_VERIFYCHECKSUM);
        }
        if(_port_stuff[port].header == ON) {
            checksum_start = (DETECTION_BYTES + START_BYTES + BLKLENGTH_BYTES
                        + CHECKSUM_BYTES);
            checksum_length = (length - checksum_start);

if((_status = checksum(&_port_stuff[port].buffer[checksum_start]
                ,checksum_length,&received_checksum)) != ERR_NONE) {
                error_report(ERR_VERIFYCHECKSUM,port,ERRCODE);
                return(ERR_VERIFYCHECKSUM);
            }
            checksum_index = (DETECTION_BYTES + START_BYTES + BLKLENGTH_BYTES);
            expected_checksum = _port_stuff[port].buffer[checksum_index];
```

```
                if(received_checksum != expected_checksum) {
                    _status = ERR_BAD_CHECKSUM;
                    error_report(ERR_VERIFYCHECKSUM,port,ERRCODE);
                    /*if((_status = asiclear(port,ASIN)) != ASSUCCESS)
                        error_report(ERR_VERIFYCHECKSUM,port,GLCOMM);*/
                    return(ERR_VERIFYCHECKSUM);
                }
            }
            break;
        case DAS1:
            /*
             * Calculate the Checksum on the: up/dnlink bytes and message.
             * Extract the received checksum value from the mesage header.
             * Check the calculated checksum and the received checksum.
             * If they are not equal - put a message in the logfile.
             */
            if(_port_stuff[port].header == ON) {
                checksum_start = (START_BYTES + BLKLENGTH_BYTES
                                + CHECKSUM_BYTES);
                checksum_length = (length - checksum_start);

if((_status = checksum(&_port_stuff[port].buffer[checksum_start]
                    ,checksum_length,&received_checksum)) != ERR_NONE) {
                    error_report(ERR_VERIFYCHECKSUM,port,ERRCODE);
                    return(ERR_VERIFYCHECKSUM);
                }
                checksum_index = (START_BYTES + BLKLENGTH_BYTES);
                expected_checksum = _port_stuff[port].buffer[checksum_index];

if(received_checksum != expected_checksum) {
                    _status = ERR_BAD_CHECKSUM;
                    error_report(ERR_VERIFYCHECKSUM,port,ERRCODE);
                    /*_getacousticrx = EMPTY;*/
                    return(ERR_VERIFYCHECKSUM);
                }
            }
            break;
        default:
            _status = ERR_ILLEGAL_PORT;
            error_report(ERR_VERIFYCHECKSUM,USR1,ERRCODE);
            return(ERR_VERIFYCHECKSUM);
    }
    return(ERR_NONE);
}

/****************************************************************************
 *                                                                          *
 *                      V E R I F Y   L E N G T H                           *
 *                                                                          *
 ****************************************************************************/
static int verify_length(port,length)
int  port;    /* port from which data originates */
WORD length;  /* length of data in buffer associated with port */
{
    WORD max_length; /* maximum length permitted */

/*
     * Verify that the port is valid before using it.
     */
    if(is_port_valid(port) == FALSE) {
        _status = ERR_INVALID_PORT;
        error_report(ERR_VERIFYLENGTH,USR1,ERRCODE);
        return(ERR_VERIFYLENGTH);
    }
    if(length == 0)
        return(ERR_NONE);

/*
     * Set the maximum length based upon the header.
     */
    switch(_port_stuff[port].header) {
    case ON:
        if(is_port_serial(port) == TRUE)
            max_length = (DETECTION_BYTES + HEADER_BYTES + MESSAGE_LIMIT);
        else
            max_length = (HEADER_BYTES + MESSAGE_LIMIT);
        break;
    case OFF:
        max_length = MESSAGE_LIMIT;
        break;
    }
```

```c
    /*
     * Check if serial port is available.
     * Check the received message for length.
     * If its not within bounds - trash it!
     */
    switch(port) {
    case COM1:
    case COM2:
        if(is_port_serial(port) == FALSE) {
            _status = ERR_ILLEGAL_PORT;
            error_report(ERR_VERIFYLENGTH,USR1,ERRCODE);
            return(ERR_VERIFYLENGTH);
        }
        if(length > max_length) {
            _status = ERR_RECEIVER_OVERFLOW;
            error_report(ERR_VERIFYLENGTH,port,ERRCODE);
            if((_status = asiclear(port,ASIN)) != ASSUCCESS)
                error_report(ERR_VERIFYLENGTH,port,GLCOMM);
            return(ERR_VERIFYLENGTH);
        }
        break;
    case DAS1:
        if(length > max_length) {
            _getacousticrx = EMPTY;
            _status = ERR_RECEIVER_OVERFLOW;
            error_report(ERR_VERIFYLENGTH,port,ERRCODE);
            return(ERR_VERIFYLENGTH);
        }
        break;
    default:
        _status = ERR_ILLEGAL_PORT;
        error_report(ERR_VERIFYLENGTH,USR1,ERRCODE);
        return(ERR_VERIFYLENGTH);
    }
    return(ERR_NONE);
}

/****************************************************************************
 *                                                                          *
 *                       E X T R A C T   L I N K S                          *
 *                                                                          *
 ****************************************************************************/
static int extract_links(port,msg_length)
int   port;       /* port from which message originated */
WORD* msg_length; /* length of message */
{
    WORD header_bytes;  /* Number of bytes in header */
    WORD message_index; /* index into message buffer */

/*
     * Verify that the port is valid before using it.
     */
    if(is_port_valid(port) == FALSE) {
        _status = ERR_INVALID_PORT;
        error_report(ERR_EXTRACT_LINKS,USR1,ERRCODE);
        return(ERR_EXTRACT_LINKS);
    }
    if(*msg_length == 0)
        return(ERR_NONE);

/*
     * Check if serial port is available.
     * Check for header flag.
     * Determine the number of header bytes.
     */
    if(_port_stuff[port].header == OFF)
        return(ERR_NONE);

switch(port) {
    case COM1:
    case COM2:
        if(is_port_serial(port) == FALSE) {
            _status = ERR_ILLEGAL_PORT;
            error_report(ERR_EXTRACT_LINKS,USR1,ERRCODE);
            return(ERR_EXTRACT_LINKS);
        }
        header_bytes = (DETECTION_BYTES + HEADER_BYTES);
        break;
    case DAS1:
        header_bytes = HEADER_BYTES;
        break;
```

```
        default:
            _status = ERR_ILLEGAL_PORT;
            error_report(ERR_EXTRACT_LINKS,USR1,ERRCODE);
            return(ERR_EXTRACT_LINKS);
    }

/*
     * Extract Uplink/Dnlink Bytes from the received message.
     * Set up NEW system configuration based on data in the header.
     */
    message_index = (header_bytes - TOPSIDE_BYTES - DOWNSIDE_BYTES);
    _topside_byte = _port_stuff[port].buffer[message_index];
    message_index += TOPSIDE_BYTES;
    _downside_byte = _port_stuff[port].buffer[message_index];

/*
     * Assign system configuration data from the
     * Extracted Downside Byte.
     * Calculate the data rate of the uplink to use for reply_period.
     */
    _downside_link_flags.transducer
        = (_downside_byte & XDUCER_MASK);

_downside_link_flags.upload_mode
        = ((_downside_byte & UPLOAD_MASK) >> XDUCER_BITS);

_downside_link_flags.dnload_mode
        = ((_downside_byte & DNLOAD_MASK) >> (XDUCER_BITS + UPLOAD_BITS));

_system_flags.channel
        = ((_downside_byte & CHANNEL_MASK) >> (XDUCER_BITS + UPLOAD_BITS
            + DNLOAD_BITS));

_downside_link_flags.control_code
        = ((_downside_byte & CODE_MASK) >> (XDUCER_BITS + UPLOAD_BITS
            + DNLOAD_BITS + CHANNEL_BITS));

/*
     * Assign system configuration data from the
     * Extracted Dnlink Bytes.
     */
    _topside_link_flags.transducer
        = (_topside_byte & XDUCER_MASK);

_topside_link_flags.upload_mode
        = ((_topside_byte & UPLOAD_MASK) >> XDUCER_BITS);

_topside_link_flags.dnload_mode
        = ((_topside_byte & DNLOAD_MASK) >> (XDUCER_BITS + UPLOAD_BITS));

_system_flags.echo
        = ((_topside_byte & ECHO_MASK) >> (XDUCER_BITS + UPLOAD_BITS
            + DNLOAD_BITS));

_topside_link_flags.control_code
        = ((_topside_byte & CODE_MASK) >> (XDUCER_BITS + UPLOAD_BITS
            + DNLOAD_BITS + ECHO_BITS));

/*
     * Establish the probable transducer setting.
     */
    _probable_xducer = (BYTE)_downside_link_flags.transducer;
    update_display(MODE);
    return(ERR_NONE);
}

/****************************************************************************
 *                                                                          *
 *                      S T R I P   H E A D E R                             *
 *                                                                          *
 ****************************************************************************/
static int strip_header(port,msg_length)
int   port;        /* port from which message originated */
WORD* msg_length;  /* length of message */
{
    WORD header_bytes; /* Number of bytes in header */

/*
     * Verify that the port is valid before using it.
     */
```

```c
    if(is_port_valid(port) == FALSE) {
        _status = ERR_INVALID_PORT;
        error_report(ERR_STRIP_HEADER,USR1,ERRCODE);
        return(ERR_STRIP_HEADER);
    }
    if(*msg_length == 0)
        return(ERR_NONE);

/*
     * Check if serial port is available.
     * Check for header flag.
     * Determine the number of header bytes.
     */
    if(_port_stuff[port].header == OFF)
        return(ERR_NONE);

switch(port) {
    case COM1:
    case COM2:
        if(is_port_serial(port) == FALSE) {
            _status = ERR_ILLEGAL_PORT;
            error_report(ERR_EXTRACT_LINKS,USR1,ERRCODE);
            return(ERR_EXTRACT_LINKS);
        }
        header_bytes = (DETECTION_BYTES + HEADER_BYTES);
        break;
    case DAS1:
        header_bytes = HEADER_BYTES;
        break;
    default:
        _status = ERR_ILLEGAL_PORT;
        error_report(ERR_STRIP_HEADER,port,ERRCODE);
        return(ERR_STRIP_HEADER);
    }
    /*
     * Adjust received message count to reflect stripping.
     * Strip Header.
     */
    *msg_length -= header_bytes;

if((*msg_length < 0)
    || (*msg_length > _port_stuff[port].bufsiz)) {
        _status = ERR_MEMMOVE;
        error_report(ERR_STRIP_HEADER,port,ERRCODE);
        return(ERR_STRIP_HEADER);
    }
    memmove((char*)_port_stuff[port].buffer
        ,(char*)&_port_stuff[port].buffer[header_bytes],*msg_length);

return(ERR_NONE);
}

/****************************************************************************
 *                                                                          *
 *                          C L R P O R T                                   *
 *                                                                          *
 ****************************************************************************/
static void clrport(port)
int port; /* port buffer to clear */
{
    WORD index; /* general use index */

/*
     * Put BLANK characters in the location buffer.
     */
    for(index = 0; index < _port_stuff[port].bufsiz; index++)
        _port_stuff[port].buffer[index] = BLANK;
}
```

```
/****************************************************************************
 *                                                                          *
 *          WAIT   FOR   ACOUSTIC   RECEPTION                               *
 *                                                                          *
 ****************************************************************************/
static void wait_for_acoustic_rx()
{
    /*
     * Wait for acoustic reception to finish.
     */
    while(_getacousticrx == FILLING)
        continue;
} include <system.h>

/****************************************************************************
 *                                                                          *
 *                          C H E C K S U M                                 *
 *                                                                          *
 ****************************************************************************/
int checksum(data_block,data_length,chksum)
BYTE* data_block;  /* buffer containing data to checksum */
WORD  data_length; /* number of bytes in data */
BYTE* chksum;      /* returned as checksum value */
{
    WORD         index;          /* index into data block buffer */
    unsigned long total_checksum; /* total sum of data */ if(data_length <= 0) {
        _status = ERR_INVALID_ARGUMENT;
        error_report(ERR_CHECKSUM,USR1,ERRCODE);
        return(ERR_CHECKSUM);
    }
    total_checksum = 0L;
    for(index = 0; index < data_length; index++)
        total_checksum += (unsigned long)data_block[index];
    *chksum = (BYTE)total_checksum;
    return(ERR_NONE);
}

/****************************************************************************
 *                                                                          *
 *                      S E T   B U S Y   B I T                             *
 *                                                                          *
 ****************************************************************************/
void set_busy_bit(port,state)
int port;  /* port to set */
int state; /* state of port */
{
    /*
     * Assert the DTR line on the serial port to the selected state.
     */
    switch(port) {
    case DEFAULT_MASTER_PORT:
        set_busy_bit(COM1,state);
        set_busy_bit(COM2,state);
        break;
    default:
        if(is_port_serial(port) == TRUE)
            asdtr(port,state);
        break;
    }
}

/****************************************************************************
 *                                                                          *
 *                       I S   P O R T   V A L I D                          *
 *                                                                          *
 ****************************************************************************/
BOOL is_port_valid(port)
int port; /* port to check */
{
    switch(port) {
    case COM1:
    case COM2:
    case DAS1:
    case USR1:
        return(TRUE);
    default:
        return(FALSE);
    }
}
```

```
/****************************************************************
 *                                                              *
 *                    I S   P O R T   S E R I A L              *
 *                                                              *
 ****************************************************************/
BOOL is_port_serial(port)
int port; /* port to check */
{
    switch(port) {
    case COM1:
        return(_port_stuff[COM1].installed);
    case COM2:
        return(_port_stuff[COM2].installed);
    default:
        return(FALSE);
    }
}

/****************************************************************
 *                                                              *
 *                    I S   P O R T   A C O U S T I C          *
 *                                                              *
 ****************************************************************/
BOOL is_port_acoustic(port)
int port; /* port to check */
{
    switch(port) {
    case DAS1:
        return(_port_stuff[DAS1].installed);
    default:
        return(FALSE);
    }
}

/****************************************************************
 *                                                              *
 *                    I S   A D A T S   S Y S T E M            *
 *                                                              *
 ****************************************************************/
BOOL is_adats_system()
{
    switch(_system_flags.type) {
    case TOPSIDE:
    case DOWNSIDE:
        return(TRUE);
    default:
        return(FALSE);
    }
}

/****************************************************************
 *                                                              *
 *                    K I L L   S Y S T E M                    *
 *                                                              *
 ****************************************************************/
int kill_system()
{
    if((_status = shutdown_atlab()) != ERR_NONE) {
        error_report(ERR_KILL_SYSTEM,DAS1,ERRCODE);
        return(ERR_KILL_SYSTEM);
    }
    shutdown_das_handler(_irq_table[_das_irq_number].interrupt_number);
    restore_pic();

if(_atlab_opened == OPENED)
        if((_status = AL_TERMINATE()) != ALE_NORMAL) {
            error_report(ERR_KILL_SYSTEM,DAS1,ALERR);
            return(ERR_KILL_SYSTEM);
        }
    _atlab_opened = CLOSED;

if(_asi_opened == OPENED)
        if((_status = asiquit(ALLPORTS)) != ASSUCCESS) {
            error_report(ERR_KILL_SYSTEM,DAS1,GLCOMM);
            return(ERR_KILL_SYSTEM);
        }
    _asi_opened = CLOSED;
    update_display(SHUTDOWN);
    return(ERR_NONE);
}
```

/****************************************************************************
*                                                                          *
*                       S E T   M A S T E R   P O R T                      *
*                                                                          *
****************************************************************************/
```c
int set_master_port(port)
int port; /* serial port to set master port to */
{
    char buffer [BUFSIZ]; /* general purpose buffer */

/*
     * Check that the port is a serial port.
     */
    if(is_port_serial(port) == FALSE) {
        _status = ERR_ILLEGAL_PORT;
        error_report(ERR_SET_MASTER_PORT,USR1,ERRCODE);
        return(ERR_SET_MASTER_PORT);
    }
    /*
     * Check if the master serial port has changed.
     *      Set the new master serial port.
     *      Enable/Disable the other serial port.
     *      Put a message in the logfile.
     */
    if(port != _master_serial_port) {
        _master_serial_port = port;
        switch(port) {
        case COM1:
            _irq_table[COM1_IRQ_NUMBER].used_by_adl = TRUE;
            _irq_table[COM2_IRQ_NUMBER].used_by_adl = FALSE;
            enable_irq(COM1_IRQ_NUMBER);
            disable_irq(COM2_IRQ_NUMBER);
            break;
        case COM2:
            _irq_table[COM1_IRQ_NUMBER].used_by_adl = FALSE;
            _irq_table[COM2_IRQ_NUMBER].used_by_adl = TRUE;
            enable_irq(COM2_IRQ_NUMBER);
            disable_irq(COM1_IRQ_NUMBER);
            break;
        }
        sprintf(buffer,"Master Serial Port Set to %s",_port_stuff[port].name);
        logmsg((STRG)buffer,_logfiles[_system_flags.type].logtype,STRNG);
    }
    return(ERR_NONE);
}
```

/****************************************************************************
*                                                                          *
*                       C A L C U L A T E   D E L A Y                      *
*                                                                          *
****************************************************************************/
```c
int calculate_delay(port,delay)
int      port;  /* serial port to calculate delay for */
unsigned* delay; /* return value of delay in number of ticks */
{
    int baud;      /* serial port baud rate */
    int databits;  /* serial port number of databits */
    int paritybit; /* serial port parity bit type */
    int stopbits;  /* serial port number of stop bits */

/*
     * Check that the port is a serial port.
     * Get the port configuration parameters.
     */
    if(is_port_serial(port) == FALSE) {
        _status = ERR_ILLEGAL_PORT;
        error_report(ERR_CALC_DELAY,USR1,ERRCODE);
        return(ERR_CALC_DELAY);
    }
    if((_status = asigetparms(port,&baud,&databits,&paritybit,&stopbits
    ,NULL,NULL)) != ASSUCCESS) {
        error_report(ERR_CALC_DELAY,port,GLCOMM);
        return(ERR_CALC_DELAY);
    }
    /*
     * Check Parity Bit.
     * Calculate Delay.
     *
     * NOTE: Delay must be no less than 1.
     */
```

```
            if(paritybit > P_NONE)
                paritybit = 1;
            if(baud != 0)
                *delay = ((databits + stopbits + paritybit) * TICKS_PER_SECOND
                        / baud);
            else {
                _status = ERR_ZERO_DENOMINATOR;
                error_report(ERR_CALC_DELAY,port,ERRCODE);
                return(ERR_CALC_DELAY);
            }
            if(*delay < 1)
                *delay = 1;
            return(ERR_NONE);
}

/****************************************************************************
 *                                                                          *
 *                       S E T   C U R S O R                                *
 *                                                                          *
 ****************************************************************************/
void set_cursor(type)
int type; /* type of cursor to set */
{
    switch(_videomode) {
    default:
    case CO_80X25:
    case BW_80X25:
        /*
         * Set Normal DOS cursor for Color and B/W Adapter.
         * Set Blank cursor for Color and B/W Adapter.
         */
        switch(type) {
        case VNORMAL:
            curtype(VNORMAL,6,7);
            break;
        case BLANK:
            curtype(BLANK,0,7);
            break;
        }
        break;
    case MONO_80X25:
        /*
         * Set Normal DOS cursor for Monochrome Adapter.
         * Set Blank cursor for Monochrome Adapter.
         */
        switch(type) {
        case VNORMAL:
            curtype(VNORMAL,12,13);
            break;
        case BLANK:
            curtype(BLANK,0,13);
            break;
        }
        break;
    }
}

/****************************************************************************
 *                                                                          *
 *                       A D L   S C A N F                                  *
 *                                                                          *
 ****************************************************************************/
int adl_scanf(buffer,maxchars,location)
char *buffer; /* buffer to place scanned data into (maxchars + NUL) */
int  maxchars; /* maximum number of characters to scan */
BYTE location; /* screen location */
{
    int      count;      /* current number of characters entered */
    unsigned cursor_col; /* cursor column position */
    unsigned cursor_row; /* cursor row position */
    unsigned key;        /* key code */

/*
     * Initialize character counter.
     * Save original cursor position.
     * Flush the keyboard of any stray characters.
     * Until the maximum number of characters are entered
     * or a Carriage Return is hit:
     *      Save the current cursor position.
     *      Attend to overhead functions.
     *      Check keyboard for a hit.
     *          Switch on the key code.
```

```
    */
    count = 0;
    cursor_row = ((getcur(_videopage) & CURSOR_ROW) >> SHIFTS_PER_BYTE);
    cursor_col = (getcur(_videopage) & CURSOR_COL);
    kbflush();

while(count <= maxchars) {
        attend_overhead();
        fflush(stdout);
        curset(cursor_row,cursor_col,_videopage);
        fflush(stdout);
        direct_pch(BLOCK,(BYTE)(_display[location].color|VBLINK));

if(gfkbhit()) {
            switch(key = getkey()) {
            case ESC:
                buffer[0] = NUL;
                return(-1);
            case CR:
                buffer[count] = NUL;
                return(count);
            case BS:
                if(count <= 0) {
                    sound(_display[location].frequency
                        ,_display[location].duration);
                    break;
                }
                direct_pch(BLOCK,(BYTE)_display[location].color);
                if(cursor_col == 1) {
                    cursor_col = MAXCOLS;
                    cursor_row--;
                }
                else
                    cursor_col--;
                curset(cursor_row,cursor_col,_videopage);
                direct_pch(BLOCK,(BYTE)(_display[location].color|VBLINK));
                count--;
                buffer[count] = NUL;
                break;
            default:
                if((isprint(key) == FALSE) || (count == maxchars)) {
                    sound(_display[location].frequency
                        ,_display[location].duration);
                    break;
                }
                direct_putcinc((BYTE)key,(BYTE)_display[location].color);
                if(cursor_col == MAXCOLS) {
                    cursor_col = 1;
                    cursor_row++;
                }
                else
                    cursor_col++;
                buffer[count] = (char)key;
                count++;
                buffer[count] = NUL;
                break;
            }
            continue;
        }
    }
    buffer[count] = NUL;
    return(count);
}
#ifdef _80386
#define COUNTS_PER_SECOND    288996    /* Loops in a Second on 80386    */
#else
#define COUNTS_PER_SECOND    136665    /* Loops in a Second on 80286    */
#endif
#pragma loop_opt(off)
/**********************************************************************
*                                                                     *
*                           D E L A Y                                 *
*                                                                     *
**********************************************************************/
void delay(ticks)
unsigned ticks;
{
    unsigned long count;     /* loop counter to effect delay */
    unsigned long max_count; /* maximum count */ max_count = ((ticks * COUNTS_PER_SECOND) / TICKS_PER_SECOND);
    if(max_count < 1L)
        max_count = 1L;
```

```
        for(count = 0L; count < max_count; count++)
            continue;
} include <system.h> static int   initialize_atlab        (void);
static int   initialize_serial_port  (int port);
static int   set_computer_type       (int argc,char * *argv);
static void  initialize_globals      (void);
static void  putusage                (BYTE abort_code);

/****************************************************************************
 *                                                                          *
 *                          I N I T I A L I Z E                             *
 *                                                                          *
 ****************************************************************************/
int initialize(argc,argv)
int  argc;     /* main argument count */
char *argv[];  /* main argument pointer array */
{
    /*
     * Initialize startup global variables.
     * Set the logfile thresholds according to the default system type.
     * Set the computer type.
     * Set system startup mode for the type of ADL computer.
     * Set operation parameters corresponding to the current mode.
     * Initialize the RS-2332C Serial Ports.
     * Initialize the ATLAB driver.
     * Set availability system state condition.
     * Initialize the 8259A-2 Programmable Interrupt Controller (PIC).
     */
    initialize_globals();
    set_logfile_thresholds();

if((_status = set_computer_type(argc,argv)) != ERR_NONE) {
        error_report(ERR_SYSINIT,USR1,ERRCODE);
        return(ERR_SYSINIT);
    }
    if(_system_flags.type == DOWNSIDE) {
        _das_receiver_request = ON;
        _system_flags.mode    = OPERATE_MODE;
        _timedate_request     = OFF;
    }
    else {
        _das_receiver_request = OFF;
        _system_flags.mode    = IN_AIR_TEST_MODE;
        _timedate_request     = ON;
    }
    set_operation_parameters();

if((_status = initialize_serial_port(COM1)) != ERR_NONE) {
        error_report(ERR_SYSINIT,COM1,ERRCODE);
        return(ERR_SYSINIT);
    }
    if((_status = initialize_serial_port(COM2)) != ERR_NONE) {
        error_report(ERR_SYSINIT,COM2,ERRCODE);
        return(ERR_SYSINIT);
    }
    if((_status = initialize_atlab()) != ERR_NONE) {
        error_report(ERR_SYSINIT,DAS1,ERRCODE);
        return(ERR_SYSINIT);
    }
    if((_status = reset_availability_state(ON)) != ERR_NONE) {
        error_report(ERR_SYSINIT,USR1,ERRCODE);
        return(ERR_SYSINIT);
    }
    initialize_pic();
    update_display(MODE);
    return(ERR_NONE);
}
```

```c
/************************************************************************
 *                                                                      *
 *                    SET   COMPUTER   TYPE                             *
 *                                                                      *
 ************************************************************************/
static int set_computer_type(argc,argv)
int  argc;     /* main argument count */
char *argv[]; /* main argument pointer array */
{
    BYTE abort_code;   /* reason code for aborting startup */
    BYTE das_priority; /* priority of DAS IRQ Level */
    int  index;        /* general purpose index */
    int  port;         /* master serial port to use */
    int  type;         /* type of computer */
    int  valid_irqs;   /* number of valid irqs in array */ static BYTE valid_irq [] = {0x0A,0x0F,0x03,0x05,0x07};
    static STRG computer  [] = {"TOP","DWN","SSC","PAS"};

/*
     * Switch on the number of arguments.
     */
    switch(argc) {
    default:
        if(argc < REQUIRED_ARGUMENTS) {
            abort_code = INCORRECT_ARGUMENTS;
            break; /* break from switch() */
        }
    case REQUIRED_ARGUMENTS:
        /*
         * Set the computer type when validated.
         */
        for(type = TOPSIDE; type <= PASS_THROUGH; type++) {
            if(strcmp(strupr(argv[TYPE_ARGUMENT]),(char*)computer[type])
               == MATCH) {
                _system_flags.type = type;
                break; /* break from for() */
            }
        }
        if(type > PASS_THROUGH) {
            abort_code = INVALID_TYPE;
            break; /* break from switch() */
        }

/*
         * Set the Atlab Interrupt Number (IRQ) when validated.
         *
         *    NOTE: It is the operators' responsibility to pass in a valid
         *          ATLAB IRQ Level with the initiation of the adats
         *          executive. The configured ATLAB driver Interrupt Level
         *          must correspond with the value passed for the system to
         *          operate at all.
         */
        valid_irqs = (sizeof(valid_irq) / sizeof(BYTE));
        _atlab_irq_number = (BYTE)atoi(argv[ATLAB_ARGUMENT]);

for(index = 0; index < valid_irqs; index++)
            if(_atlab_irq_number == valid_irq[index])
                break; /* break from for() */ if(index == valid_irqs) {
            abort_code = INVALID_ATLAB_IRQ;
            break; /* break from switch() */
        }

/*
         * Set the Data Acquisition System (DAS) Interrupt Number (IRQ) when
         *      its been validated.
         *
         *    NOTE: It is the operators' responsibility to pass in a valid
         *          DAS IRQ Level with the initiation of the adats
         *          executive. The configured DAS Interrupt Level (jumper
         *          setting) must correspond with the value passed in for
         *          the system to operate at all.
         *
         */
        _das_irq_number = (BYTE)atoi(argv[DAS_ARGUMENT]);

for(index = 0; index < valid_irqs; index++)
            if(_das_irq_number == valid_irq[index])
                break; /* break from for() */
```

```
        if(index == valid_irqs) {
            abort_code = INVALID_DAS_IRQ;
            break; /* break from switch() */
        }

/*
         * Compare the ATLAB and DAS IRQ Levels for correctness.
         *
         *      NOTE: Correctness means:
         *              (1) The DAS Interrupt Level must be accessable on the
         *                  PC-Bus connector.
         *              (2) The ATLAB and DAS IRQ Levels must not be the same.
         *              (3) The DAS IRQ Level must be LOWER in priority than
         *                  both of the COM port IRQ Levels.
         */
        if(_irq_table[_das_irq_number].bus_access == FALSE) {
            abort_code = IRQ_NOT_ACCESSIBLE;
            break; /* break from switch() */
        }
        if(_das_irq_number == _atlab_irq_number) {
            abort_code = SAME_IRQS;
            break; /* break from switch() */
        }
        das_priority = _irq_table[_das_irq_number].priority;
        if((das_priority > _irq_table[COM1_IRQ_NUMBER].priority)
        || (das_priority > _irq_table[COM2_IRQ_NUMBER].priority)) {
            abort_code = INVALID_IRQ_PRIORITY;
            break; /* break from switch() */
        }

/*
         * Initialize the Display.
         * Set the logfile thresholds according to the system type.
         * Log a startup message.
         * Set the keyboard enable/disable feature.
         * Set the master serial port.
         *
         *      NOTE: Invalid keyboard enables "TRUE"
         *            Invalid DAS Installation flag enables "TRUE"
         *            Invalid master serial port enables "DEFAULT_MASTER_PORT"
         */
        update_display(INITIALIZE);
        set_logfile_thresholds();
        logmsg("Start ADL Session.",_logfiles[_system_flags.type].logtype
            ,STRNG);

if(argc >= (REQUIRED_ARGUMENTS + 1)) {
            port = (atoi(argv[PORT_ARGUMENT]) - 1);
            if((port == COM1) || (port == COM2))
                set_master_port(port);
        } if(argc >= (REQUIRED_ARGUMENTS + 2))
            if(strcmp(strupr(argv[KEYBOARD_ARGUMENT]),"OFF") == MATCH)
                _irq_table[KEYBOARD_IRQ_NUMBER].used_by_adl = FALSE;

return(ERR_NONE);
    }

/*
     * Show a usage message and reason for abort.
     */
    putusage(abort_code);
    return(ERR_SETCOMPUTERTYPE);
}

/****************************************************************************
 *                                                                          *
 *                    I N I T I A L I Z E   G L O B A L S                   *
 *                                                                          *
 ****************************************************************************/
static void initialize_globals()
{
    /*
     * Initialize global variables only ONCE at POWERUP.
     */
    _asi_opened           = CLOSED;
    _atlab_opened         = CLOSED;
    _clrverbose_flag      = ON;
    _first_power_on_event = FALSE;
```

```
        _master_serial_port     = DEFAULT_MASTER_PORT;
        _menu_type              = SHORT_MENU;
        _power_on_period        = POWER_ON_PERIOD;
        _probable_power_state   = ON;
        _restart                = FALSE;
        _status                 = ERR_NONE;
        _system_flags.activated = OFF;
        _system_flags.destination = ACOUSTIC;
        _system_flags.echo      = OFF;
        _system_flags.type      = TOPSIDE;
        _videomode              = BW_80X25;
        _videopage              = VISUAL_PAGE;

#ifdef _80386
        _speed_reduction_rx = SPEED_REDUCTION_RX386;
        _speed_reduction_tx = SPEED_REDUCTION_RX286;
#else
        _speed_reduction_rx = SPEED_REDUCTION_RX286;
        _speed_reduction_tx = SPEED_REDUCTION_RX386;
endif /*
         * Initialize acoustic globals.
         * Update the ADL clock.
         * Set the programmed powerup time to correspond with first powerup.
         */
        initialize_acoustics();
        putime();
        copytime(&_programmed_time,&_current_time);
        add_time(&_programmed_time,BOOTUP_PERIOD);
}

/****************************************************************************
 *                                                                          *
 *              I N I T I A L I Z E   A C O U S T I C S                     *
 *                                                                          *
 ****************************************************************************/
void initialize_acoustics()
{
        /*
         * Set global variables associated with the acoustic system.
         */
        _acoustic_rxcount  = 0;
        _acoustic_txcount  = 0;
        _codeword_index    = (-1);
        _getacousticrx     = EMPTY;
        _getacoustictx     = DONE_TRANSMITTING;
}

/****************************************************************************
 *                                                                          *
 *              S E T   O P E R A T I O N   P A R A M E T E R S             *
 *                                                                          *
 ****************************************************************************/
void set_operation_parameters()
{
        /*
         * Set operation parameters at power up condition for
         *      the mode of opeation.
         */
        switch(_system_flags.mode) {
        case IN_AIR_TEST_MODE:
                _topside_link_flags.control_code  = CODE_3;
                _topside_link_flags.transducer    = AFT_XDUCER;
                _downside_link_flags.control_code = CODE_3;
                _downside_link_flags.transducer   = UPPER_XDUCER;
                _system_flags.channel             = AIR;
                _system_flags.audio               = OFF;
                break;
        case TOWBODY_TEST_MODE:
                _topside_link_flags.control_code  = CODE_4;
                _topside_link_flags.transducer    = AFT_XDUCER;
                _downside_link_flags.control_code = CODE_4;
                _downside_link_flags.transducer   = UPPER_XDUCER;
                _system_flags.channel             = WATER;
                _system_flags.audio               = ON;
                break;
        case OPERATE_MODE:
                _topside_link_flags.control_code  = CODE_4;
                _topside_link_flags.transducer    = AFT_XDUCER;
                _downside_link_flags.control_code = CODE_4;
                _downside_link_flags.transducer   = UPPER_XDUCER;
```

```
            _system_flags.channel       = WATER;
            _system_flags.audio         = OFF;
            break;
        }
}

/****************************************************************************
 *                                                                          *
 *                        P U T   U S A G E                                 *
 *                                                                          *
 ****************************************************************************/
static void putusage(abort_code)
BYTE abort_code; /* reason code for aborting startup */
{
        BYTE line; /* line number of static data */ static STRG syntax [] = {
              "<<<<< Usage Syntax >>>>>",
              "_____",
              "Command Line: <drive:path>ADATS <Type> <ATLAB> <DAS> <COM> <KYBD>",
              "_____",
              " Argument      Description              Choices            Default",
              "_____",
              "ADATS ···· ADATS Executive ····· ADATS ··················· None   ",
              "Type  ····· Type of System ······· TOP,DWN,SSC,PAS ·········· None   ",
              "ATLAB ···· ATLAB IRQ Number ···· 10,15,3,5,7 ·············· None   ",
              "DAS   ······ DAS IRQ Number ······· 10,15,3,5,7 ·············· None   ",
              "COM   ······ Serial Port ··········· 0:Adapt,1:COM1,2:COM2 ··· 0      ",
              "KYBD  ····· Keyboard ············· On,Off ··················· On     ",
              "_____",
        };

static STRG rules [] = {
              "            <<<<< Usage Rules >>>>>                              ",
              "_____",
              "1 - The DAS IRQ must be accessible from the hardware bus.",
              "2 - The DAS and ATLAB IRQ's must be different.           ",
              "3 - The DAS IRQ must be lower priority than COM1 & COM2. ",
              "_____",
              "            <<<<< Reason For Abort >>>>>                         ",
              "_____",
        };

static STRG reason [] = {
              "Incorrect number of arguments.",
              "Invalid ADATS type.",
              "Invalid ATLAB IRQ number.",
              "Invalid DAS IRQ number.",
              "The DAS IRQ must be accessible from the hardware bus.",
              "The DAS and ATLAB IRQ's must be different.",
              "The DAS IRQ must be lower priority than COM1 & COM2."
        };

/*
         * Show the usage of adats.
         * Show the rules of usage.
         * Show a reason for abort.
         */
        update_display(CLSHOME);
        for(line = 0; line < (sizeof(syntax) / sizeof(STRG)); line++) {
                prints("\n");
                cprints(MAXCOLS,syntax[line]);
        }
        for(line = 0; line < (sizeof(rules) / sizeof(STRG)); line++) {
                prints("\n");
                cprints(MAXCOLS,rules[line]);
        }
        prints("\n");
        sprintf((char*)_display[ERROR_LOC].buffer,"%s %s",reason[abort_code]
                ,"Try again!\n");
        cprints(MAXCOLS,_display[ERROR_LOC].buffer);
}

/****************************************************************************
 *                                                                          *
 *              I N I T I A L I Z E   S E R I A L   P O R T                 *
 *                                                                          *
 ****************************************************************************/
static int initialize_serial_port(port)
int port; /* port to initialize */
{
```

```c
        BYTE irq_number;  /* serial port irq number */
        int baud;         /* serial port baud rate */
        int databits;     /* serial port number of databits */
        int paritybit;    /* serial port parity bit type */
        int stopbits;     /* serial port number of stop bits */

/*
         * Set up parameters for initializing serial port.
         */
        switch(port) {
        case COM1:
                baud       = COM1BAUD;
                paritybit  = COM1PRTY;
                stopbits   = COM1STOP;
                databits   = COM1DATA;
                irq_number = COM1_IRQ_NUMBER;
                break;
        case COM2:
                baud       = COM2BAUD;
                paritybit  = COM2PRTY;
                stopbits   = COM2STOP;
                databits   = COM2DATA;
                irq_number = COM2_IRQ_NUMBER;
                break;
        default:
                _status = ERR_INVALID_PORT;
                error_report(ERR_INIT_SERIAL_PORT,USR1,ERRCODE);
                return(ERR_INIT_SERIAL_PORT);
        }

/*
         * Open the port.
         * Establish if port can be used.
         */
        _status = asiopen(port,(ASINOUT | BINARY | NORMALRX),INTRXLEN,INTTXLEN
                ,baud,paritybit,stopbits,databits,OFF,OFF);

switch(_status) {
        case ASNO8250:
                _port_stuff[port].installed = FALSE;
                _asi_opened = FALSE;
                if(_master_serial_port == port) {
                        _status = ERR_INVALID_MASTERPORT;
                        error_report(ERR_INIT_SERIAL_PORT,port,ERRCODE);
                        return(ERR_INIT_SERIAL_PORT);
                }
                break;
        case ASSUCCESS:
                _port_stuff[port].installed = TRUE;
                _asi_opened = OPENED;
                if((_status = asicheck(port,IGMSTAT,OFF)) != ASSUCCESS) {
                        error_report(ERR_INIT_SERIAL_PORT,port,GLCOMM);
                        return(ERR_INIT_SERIAL_PORT);
                }
                if((_status = asicheck(port,IGLSTAT,OFF)) != ASSUCCESS) {
                        error_report(ERR_INIT_SERIAL_PORT,port,GLCOMM);
                        return(ERR_INIT_SERIAL_PORT);
                }
                break;
        default:
                error_report(ERR_INIT_SERIAL_PORT,port,GLCOMM);
                return(ERR_INIT_SERIAL_PORT);
        }
        return(ERR_NONE);
}

/****************************************************************************
 *                                                                          *
 *                    I N I T I A L I Z E   A T L A B                       *
 *                                                                          *
 ****************************************************************************/
static int initialize_atlab()
{
        /*
         * Check for the existance of ATLAB.
         *
         *      NOTE: If the ATLAB driver is not installed via the config.sys
         *            and AL_INITIALIZE() is called - the system will halt!
         *
         * Turn ON Error Reporting by ATLAB to detect error in AL_INITIALIZE().
         * Initialize the ATLAB device driver.
         * Set the ATLAB opened flag.
```

```c
 * Turn OFF Error Reporting by ATLAB for the remainder of the program.
 * Select the DAS board.
 * Set the DAS Installed flag for an installed or not installed DAS.
 * Set Data Acquisition System to power-up condition.
 * Set the All the Digital Output Lines to ZERO.
 * Enable the Digital Output Lines.
 * Initialize Atlab DMA Buffers.
 */
    if((_status = AL_SET_ERROR_CONTROL_WORD(ON)) != ON) {
        error_report(ERR_INIT_ATLAB,DAS1,ALERR);
        return(ERR_INIT_ATLAB);
    }
    putcur(ERROR_LOC,ZERO_OFFSET);
    if((_status = AL_INITIALIZE()) != ALE_NORMAL) {
        error_report(ERR_INIT_ATLAB,DAS1,ALERR);
        return(ERR_INIT_ATLAB);
    }
    _atlab_opened = OPENED;

if((_status = AL_SET_ERROR_CONTROL_WORD(OFF)) != ON) {
        error_report(ERR_INIT_ATLAB,DAS1,ALERR);
        return(ERR_INIT_ATLAB);
    } if((_status = AL_SELECT_BOARD(DAS_UNIT_NUMBER)) != ALE_NORMAL)
        _port_stuff[DAS1].installed = FALSE;
    else {
        _port_stuff[DAS1].installed = TRUE;
        if((_status = AL_RESET()) != ALE_NORMAL) {
            error_report(ERR_INIT_ATLAB,DAS1,ALERR);
            return(ERR_INIT_ATLAB);
        }
        if((_status = AL_ENABLE_FOR_OUTPUT(BOTHPORTS)) != ALE_NORMAL) {
            error_report(ERR_INIT_ATLAB,DAS1,ALERR);
            return(ERR_INIT_ATLAB);
        }
    }
    if((_status = initialize_atlab_buffers()) != ERR_NONE) {
        error_report(ERR_INIT_ATLAB,DAS1,ERRCODE);
        return(ERR_INIT_ATLAB);
    }
    return(ERR_NONE);
} include <system.h> static BOOL islogfile        (char *filename, BYTE* logtype);
static int  check_for_timeout (char character,int port);
static int  filesize         (char *filename,WORD blocksize,long *blocks
                              ,int port);
static int  prtstr           (char *string);
static int  upload           (int port,char *up_filename);
static void setrts           (int port,BYTE state);

/****************************************************************************
 *                                                                          *
 *                        T R A N S F E R                                   *
 *                                                                          *
 ****************************************************************************/
int transfer(action,filename,port)
WORD action;    /* UPLOAD or DOWNLOAD */
STRG filename;  /* Name of file to Upload or Download */
int  port;      /* Port to Upload/Download to/from */
{
    BYTE logtype; /* type of logfile returned from islogfile() */

/*
     * Transfers are only permitted via serial ports.
     * Shut down ATLAB before Uploading or Downloading.
     * Set Ready To Send (RTS) Line #4.
     * NOTE: This line must be jumpered to the Carrier Detect (CD) line #8.
     *       This will provide the necesary connection for the xmodem routines.
     */
    if(is_port_serial(port) == FALSE) {
        _status = ERR_ILLEGAL_PORT;
        error_report(ERR_TRANSFER,USR1,ERRCODE);
        return(ERR_TRANSFER);
    }
    if((_status = shutdown_atlab()) != ERR_NONE) {
        error_report(ERR_TRANSFER,port,ERRCODE);
        return(ERR_TRANSFER);
    }
    clrcrt(RECEIVE_LOC);
```

```c
      clrcrt(TRANSMIT_LOC);
      clrcrt(ERROR_LOC);
      setrts(port,ON);
      timer(HALF);

/*
       * UPLOAD/DOWNLOAD the filename via port.
       */
      switch(action) {
      case UPLOAD:
            /*
             * Upload the file
             * Delete the logfile after successful upload.
             */
            if((_status = upload(port,filename)) != ERR_NONE) {
                  error_report(ERR_TRANSFER,port,ERRCODE);
                  setrts(port,OFF);
                  return(ERR_TRANSFER);
            }
            if(islogfile(filename,&logtype) == TRUE) {
                  if(unlink(filename) != 0) {
                        _status = errno;
                        error_report(ERR_TRANSFER,port,ERRNO);
                        return(ERR_TRANSFER);
                  }
                  update_display(FILESTATUS);
            }
            break;
      case DOWNLOAD:
            /*
             * Download the file.
             */
            if((_status = asixdnload(port,(char*)filename,prtstr,ABORTCODE))
            != ASSUCCESS) {
                  error_report(ERR_TRANSFER,port,GLCOMM);
                  setrts(port,OFF);
                  return(ERR_TRANSFER);
            }
            break;
      }
      setrts(port,OFF);
      return(ERR_NONE);
}

/****************************************************************************
 *                                                                          *
 *                              U P L O A D                                 *
 *                                                                          *
 ****************************************************************************/
static int upload(port,up_filename)
int   port;          /* Port to Upload to */
STRG  up_filename;   /* Filename to Upload */
{
      long blocks; /* number of file blocks to upload */

/*
       * Uploading is only permitted on serial ports.
       * Check that the file to upload exists.
       * Determine its size in blocks. .
       */
      if(is_port_serial(port) == FALSE) {
            _status = ERR_ILLEGAL_PORT;
            error_report(ERR_UPLOAD,USR1,ERRCODE);
            return(ERR_UPLOAD);
      }
      if(access((char*)up_filename,EXISTANCE) == (-1)) {
            _status = errno;
            error_report(ERR_UPLOAD,port,ERRNO);
            return(ERR_UPLOAD);
      }
      if((_status = filesize(up_filename,BLOCKSIZE,&blocks,port)) != ERR_NONE) {
            error_report(ERR_UPLOAD,port,ERRCODE);
            return(ERR_UPLOAD);
      }

/*
       * Clear Receiver buffer before testing for NAKs.
       * Wait until Receiver starts NAKing.
       */
      if((_status = asiclear(port,ASIN)) != ASSUCCESS) {
            error_report(ERR_UPLOAD,port,GLCOMM);
            return(ERR_UPLOAD);
```

```
        }
        if((_status = check_for_timeout(NAK,port)) != ERR_NONE) {
            error_report(ERR_UPLOAD,port,ERRCODE);
            return(ERR_UPLOAD);
        }
        /*
         * Indicate entrance to XMODEM UPLOAD routine.
         * Upload the file.
         * Wait for Receiver to send last ACK.
         */
        sprintf((char*)_display[TRANSMIT_LOC].buffer
            ,"%s %s: %ld block(s) (^X to abort).",_port_stuff[port].name
            ,up_filename,blocks);
        putmsg(TRANSMIT_LOC,NONE,STRNG);
        timer(SECOND);

if((_status = asixupload(port,(char*)up_filename,blocks,prtstr,ABORTCODE))
            != ASSUCCESS) {
            error_report(ERR_UPLOAD,port,GLCOMM);
            return(ERR_UPLOAD);
        }
        if((_status = check_for_timeout(ACK,port)) != ERR_NONE) {
            error_report(ERR_UPLOAD,port,ERRCODE);
            return(ERR_UPLOAD);
        }
        return(ERR_NONE);
}

/****************************************************************************
 *                                                                          *
 *                         F I L E S I Z E                                  *
 *                                                                          *
 ****************************************************************************/
static int filesize(filename,blocksize,blocks,port)
STRG   filename; /* filename to get information on */
WORD   blocksize; /* size of block to divide size by */
long*  blocks;    /* number of block */
int    port;     /* port being used for transfer */
{
        struct stat stat_buf; /* structure to fill with status data */ if(stat(filename,&stat_buf) != 0) {
            _status = errno;
            error_report(ERR_FILESIZE,port,ERRNO);
            return(ERR_FILESIZE);
        }
        if(blocksize != 0)
            *blocks = ((stat_buf.st_size / (long)blocksize) + 1L);
        else {
            _status = ERR_ZERO_DENOMINATOR;
            error_report(ERR_FILESIZE,port,ERRCODE);
            return(ERR_FILESIZE);
        }
        return(ERR_NONE);
}

/****************************************************************************
 *                                                                          *
 *                      P R I N T   S T R I N G                             *
 *                                                                          *
 ****************************************************************************/
static int prtstr(string)
char *string; /* string to print */
{
        static STRG xmodem_header [] = {
            "XMODEM - Sent Block",
            "XMODEM - Received Block"
        };

sprintf((char*)_display[TRANSMIT_LOC].buffer,"%s (^X to abort.)"
            ,string);
        clrcrt(TRANSMIT_LOC);
        putmsg(TRANSMIT_LOC,NONE,STRNG);

/*
         * Log message to file if not headed by any in the list above.
         */
        if((strncmp(string,xmodem_header[0],strlen(xmodem_header[0])) != MATCH)
            && (strncmp(string,xmodem_header[1],strlen(xmodem_header[1])) != MATCH))
            logmsg((char*)_display[TRANSMIT_LOC].buffer
                ,_logfiles[_system_flags.type].logtype,STRNG);

return(ERR_NONE);
}
```

```
/**************************************************************************
 *                                                                        *
 *                          S E T R T S                                   *
 *                                                                        *
 **************************************************************************/
static void setrts(port,state)
int  port;  /* port to set */
BYTE state; /* state of port */
{
    /*
     * For a valid serial port set the RTS line to state.
     * If the port is not valid - show an error.
     */
    if(is_port_serial(port) == TRUE)
        asrts(port,(int)state);
    else {
        _status = ERR_ILLEGAL_PORT;
        error_report(ERR_SETRTS,USR1,ERRCODE);
    }
}

/**************************************************************************
 *                                                                        *
 *                   C H E C K   F O R   T I M E O U T                    *
 *                                                                        *
 **************************************************************************/
static int check_for_timeout(character,port)
char character; /* character to wait for */
int port;       /* port to wait at */
{
    WORD tick = UPLOADTIMEOUT;

/*
     * Transfers are only permitted via serial ports.
     * Wait until the character is received or until timeout occurs.
     */
    if(is_port_serial(port) == FALSE) {
        _status = ERR_ILLEGAL_PORT;
        error_report(ERR_CHECKFORTIMEOUT,USR1,ERRCODE);
    }
    clrcrt(TRANSMIT_LOC);

while(asigetc(port) != character) {
        if(tick == 1)
            sprintf((char*)_display[TRANSMIT_LOC].buffer,"%s %c %s %d %s"
                ,"Waiting to receive a",character,"for",tick
                ,"more second.  ");
        else
            sprintf((char*)_display[TRANSMIT_LOC].buffer,"%s %c %s %d %s"
                ,"Waiting to receive a",character,"for",tick
                ,"more seconds. ");

putmsg(TRANSMIT_LOC,NONE,STRNG);
        timer(8*TENTH);
        if(--tick == 0) {
            clrcrt(TRANSMIT_LOC);
            switch(character) {
            case ACK:
                _status = ERR_NO_ACK_FROMRECEIVER;
                break;
            case NAK:
                _status = ERR_NO_NAK_FROMRECEIVER;
                break;
            }
            error_report(ERR_CHECKFORTIMEOUT,port,ERRCODE);
            return(ERR_CHECKFORTIMEOUT);
        }
    }
    return(ERR_NONE);
}

/**************************************************************************
 *                                                                        *
 *                         I S L O G F I L E                              *
 *                                                                        *
 **************************************************************************/
static BOOL islogfile(filename,logtype)
STRG  filename; /* filename to check against logfiles */
BYTE* logtype;  /* returned type of logfile */
{
```

```c
    for(*logtype = TOP_LOG; *logtype <= FTP_LOG; (*logtype)++)
        if(strcmp(strupr(filename),strupr(_logfiles[*logtype].name)) == MATCH)
            return(TRUE);
    return(FALSE);
} include <system.h> static int  transmit            (int outport,int inport,WORD txcount);
static void wait_for_acoustic_tx (void);

/****************************************************************************
*                                                                           *
*                       T R A N S M I T   M E S S A G E                     *
*                                                                           *
****************************************************************************/
int transmit_message(outport,inport,bytes_to_transmit)
int  outport;           /* port to transmit through */
int  inport;            /* port from which data originated */
WORD bytes_to_transmit; /* number of bytes to transmit */
{
    if(bytes_to_transmit == 0)
        return(ERR_NONE);

if(bytes_to_transmit < 0) {
        _status = ERR_INVALID_ARGUMENT;
        error_report(ERR_TRANSMIT_MESSAGE,outport,ERRCODE);
        return(ERR_TRANSMIT_MESSAGE);
    }
    /*
     * Transmit the message.
     */
    if((_status = transmit(outport,inport,bytes_to_transmit)) != ERR_NONE) {
        error_report(ERR_TRANSMIT_MESSAGE,outport,ERRCODE);
        return(ERR_TRANSMIT_MESSAGE);
    }
    return(ERR_NONE);
}

/****************************************************************************
*                                                                           *
*                           T R A N S M I T                                 *
*                                                                           *
****************************************************************************/
static int transmit(outport,inport,txcount)
int  outport; /* port to transmit through */
int  inport;  /* port from which data originated */
WORD txcount; /* Number of bytes in the message from inport */
{
    int      previous_txfree; /* previous value of txfree */
    int      txfree;          /* bytes available in TX buffer */
    unsigned txdelay;         /* number of ticks in wait loop */

/*
     * Assemble a message.
     *
     * Initialize the _serial_txcount to number of bytes to assemble.
     * Set the _serial_broadcast pointer to the assembled broadcast.
     */
    _serial_txcount = txcount;
    if((_serial_broadcast = assemble(outport,inport,&_serial_txcount))
       == NULL) {
        _status = ERR_ASSEMBLE;
        error_report(ERR_TRANSMIT,outport,ERRCODE);
        return(ERR_TRANSMIT);
    }
    txcount = _serial_txcount;

/*
     * Broadcast an assembled message via the outport.
     * Wait for Serial Transmitter Buffer to Empty.
     * Show the message.
     */
    switch(outport) {
    case COM1:
    case COM2:
        /*
         * Check if serial port is available.
         * Start transmitting serial message.
         * Calculate a delay time for testing transmitter count.
         * Wait until message is completely sent by delaying to transmit one
         *      character during each loop.
```

```
        */
        if(is_port_serial(outport) == FALSE) {
            _status = ERR_ILLEGAL_PORT;
            error_report(ERR_TRANSMIT,outport,ERRCODE);
            return(ERR_TRANSMIT);
        }
        if((_status = initialize_serial_transmit(outport)) != ERR_NONE) {
            error_report(ERR_TRANSMIT,outport,ERRCODE);
            return(ERR_TRANSMIT);
        }
        if((_status = calculate_delay(outport,&txdelay)) != ERR_NONE) {
            error_report(ERR_TRANSMIT,outport,ERRCODE);
            return(ERR_TRANSMIT);
        }
        previous_txfree = (-1);
        while((txfree = (int)gettxfree(outport)) != INTTXLEN) {
            if(txfree == previous_txfree)
                break;
            previous_txfree = txfree;
            attend_overhead();
            delay(txdelay);
        }
        if((_status = showmsg(TRANSMIT,outport,txcount)) != ERR_NONE) {
            error_report(ERR_TRANSMIT,outport,ERRCODE);
            return(ERR_TRANSMIT);
        }
        break;
    case DAS1:
        /*
         * Validate availability.
         * Check that the Downside ADL is ON before transmitting.
         * Form the Codeword array for an assembled message.
         *
         * Initialize the acoustic_txcount to number of bytes to assemble.
         * Set the _acoustic_broadcast pointer to the formed broadcast.
         * Show the message.
         * Start transmitting the acoustic broadcast codewords.
         * Wait for Acoustic Transmitter Buffer to Empty.
         */
        if(_port_stuff[DAS1].installed == FALSE) {
            _status = ERR_PORT_NOT_ENABLED;
            error_report(ERR_TRANSMIT,outport,ERRCODE);
            return(ERR_TRANSMIT);
        }
        if((_probable_availability == OFF) && (_system_flags.type != DOWNSIDE)
            && (_first_power_on_event == TRUE)) {
            _status = ERR_DOWNSIDE_ADL_OFF;
            error_report(ERR_TRANSMIT,outport,ERRCODE);
            /*return(ERR_TRANSMIT);*/
        }
        _acoustic_txcount = txcount;
        if((_acoustic_broadcast = formcode(_serial_broadcast
            ,&_acoustic_txcount)) == NULL) {
            _status = ERR_FORMCODE;
            error_report(ERR_TRANSMIT,outport,ERRCODE);
            return(ERR_TRANSMIT);
        }
        if((_status = showmsg(TRANSMIT,outport,txcount)) != ERR_NONE) {
            error_report(ERR_TRANSMIT,outport,ERRCODE);
            return(ERR_TRANSMIT);
        }
        if((_status = initialize_acoustic_transmit()) != ERR_NONE) {
            error_report(ERR_TRANSMIT,outport,ERRCODE);
            return(ERR_TRANSMIT);
        }
        wait_for_acoustic_tx();

/*
         * For Downside systems turn off blanking bit.
         * For Non-Downside systems set reply state to start reply timeout.
         */
        if(_system_flags.type == DOWNSIDE)
            set_busy_bit(_master_serial_port,OFF);
        else
            reset_reply_state(OPENED);
        break;
    }
    return(ERR_NONE);
}
```

```
/****************************************************************************
 *                                                                          *
 *          W A I T   F O R   A C O U S T I C   T R A N S M I S S I O N     *
 *                                                                          *
 ****************************************************************************/
static void wait_for_acoustic_tx()
{
    /*
     * If the DAS system is installed:
     *      Disable the keyboard interrupts.
     *
     *          NOTE: The keyboard generates an external device interrupt at
     *                the highest priority (next to the timer INTR). This
     *                interrupt would cause a delay in the execution of the
     *                interrupt function - thereby creating a nesting of
     *                interrupts until a stack overflow occurs. Therefore,
     *                to protect this function, the keyboard is disabled
     *                during its execution.
     *
     *      Wait for reception to finish.
     *      Renable the Keyboard.
     */
    if(_port_stuff[DAS1].installed == TRUE) {
        disable_irq(KEYBOARD_IRQ_NUMBER);
        while(_getacoustictx == TRANSMITTING)
            continue;
        enable_irq(KEYBOARD_IRQ_NUMBER);
    }
}

/****************************************************************************
 *                                                                          *
 *                              T U R B O C                                 *
 *                                                                          *
 *          This module must be compiled with Borland TurboC                *
 *                 due to the interrupt setup functions.                    *
 *                                                                          *
 *                    See "Makefile" for specifics.                         *
 *                                                                          *
 ****************************************************************************/
#include <tc.h> /* Borland TurboC Functions & Headers */

/*
 * Static Function & Variable Declarations
 *
 * NOTE: Make some local variables because TurboC cannot access global data
 *       from MSC modules.
 */
static void interrupt das_rx_intr_handler (void);
static void interrupt das_tx_intr_handler (void);

static int  atlab_intr_number;
static int  original_das_vector_flag = OFF;
static void interrupt (*original_das_vector)();

/****************************************************************************
 *                                                                          *
 *                       S E T U P   D A S   H A N D L E R                  *
 *                                                                          *
 ****************************************************************************/
int setup_das_handler(handler_to_install,intr_to_intercept,intr_to_generate)
BYTE handler_to_install; /* the type of handler to install */
BYTE intr_to_intercept;  /* interrupt number to install handler at */
BYTE intr_to_generate;   /* interrupt to generate on entry to handler */
{
    /*
     * Assign the ATLAB interrupt number to a local variable.
     * Assign the DAS IRQ number to a local variable.
     * Install the interrupt handler only if is wasn't previously installed.
     * During installation of the interrupt vector - disable external
     * interrupts.
     *
     *      NOTE: MSC data must be passed to TURBOC via function calls.
     *            TURBOC cannot access global data from MSC modules.
     *            Therefore local variables are used to hold data passed
     *            in by MSC modules.
     */
    atlab_intr_number = intr_to_generate;
    if(original_das_vector_flag == OFF) {
        disable();
        original_das_vector = getvect(intr_to_intercept);
        enable();
```

```
            original_das_vector_flag = ON;
    }
    switch(handler_to_install) {
    case TRANSMIT:
        disable();
        setvect(intr_to_intercept,das_tx_intr_handler);
        enable();
        break;
    case RECEIVE:
        disable();
        setvect(intr_to_intercept,das_rx_intr_handler);
        enable();
        break;
    default:
        return(ERR_SETUPINTRHNDLR);
    }
    return(ERR_NONE);
}

/****************************************************************************
 *                                                                          *
 *              S H U T D O W N   D A S   H A N D L E R                     *
 *                                                                          *
 ****************************************************************************/
void shutdown_das_handler(intercepted_interrupt)
BYTE intercepted_interrupt;   /* interrupt number to deinstall from */
{
    /*
     * Deinstall the interrupt handler only if is wasn't previously installed.
     */
    if(original_das_vector_flag == ON) {
        disable();
        setvect(intercepted_interrupt,original_das_vector);
        enable();
        original_das_vector_flag = OFF;
    }
}

/****************************************************************************
 *                                                                          *
 *      D A S   T R A N S M I T   I N T E R R U P T   H A N D L E R         *
 *                                                                          *
 ****************************************************************************/
static void interrupt das_tx_intr_handler()
{
    /*
     * This function is used to intercept the Data Acquisition System hardware
     * interrupt during the Acoustic TRANSMIT operation.
     *
     * Call ATLAB (via software interrupt).
     *     NOTE: ATLAB must be called via a secondary interrupt by generating
     *           an interrupt to the ATLAB device driver (chaining).
     *
     * Enable interrupts in case the return from ATLAB left them disabled.
     * Call the Acoustic Transmit Interrupt Function.
     */
    geninterrupt(atlab_intr_number);
    enable();
    acoustic_xmit_intr_function();
}

/****************************************************************************
 *                                                                          *
 *      D A S   R E C E I V E   I N T E R R U P T   H A N D L E R           *
 *                                                                          *
 ****************************************************************************/
static void interrupt das_rx_intr_handler()
{
    /*
     * This function is used to intercept the Data Acquisition System hardware
     * interrupt during the Acoustic RECEIVE operation.
     *
     * Call ATLAB (via software interrupt).
     *     NOTE: ATLAB must be called via a secondary interrupt by generating
     *           an interrupt to the ATLAB device driver (chaining).
     *
     * Enable interrupts in case the return from ATLAB left them disabled.
     * Call the Acoustic Receive Interrupt Function.
     */
    geninterrupt(atlab_intr_number);
```

```
        enable();
        acoustic_rec_intr_function();
} include <system.h>
/***************************************************************************
 *                                                                         *
 *                        A T T E N D   U P L O A D                        *
 *                                                                         *
 ***************************************************************************/
int attend_upload(port)
int port;  /* port to attend for upload */
{
    static STRG rosetta_ul [] = {
        "D:ROSETTA.ULT",
        "D:ROSETTA.ULD"
    };

/*
     * UPLOAD is only provided for ADATS computers.
     *
     * NOTE: UPLOAD can be triggered by a command message from any port.
     */
    if((is_adats_system() == FALSE) || (is_upload(port) == FALSE))
        return(ERR_NONE);

/*
     * Check for valid master serial port.
     * Check if calling function is using the master serial port.
     * Clear display for upload messages.
     *
     * NOTE: When an Upload is requested by means of a command message - the
     *       master serial port may not be configured.
     */
    if(is_port_serial(_master_serial_port) == FALSE) {
        _status = ERR_INVALID_MASTERPORT;
        error_report(ERR_ATTEND_UPLOAD,port,ERRCODE);
        return(ERR_ATTEND_UPLOAD);
    }
    if(port != _master_serial_port)
        return(ERR_NONE);

/*
     * Proceed to UPLOAD.
     *
     * UPLOAD all files listed in "d:rosetta.ul?".
     */
    if((_status = network(UPLOAD,rosetta_ul[_system_flags.type],port))
    != ERR_NONE) {
        error_report(ERR_ATTEND_UPLOAD,port,ERRCODE);
        return(ERR_ATTEND_UPLOAD);
    }
    /*
     * DONE with Upload.
     *
     * Turn Upload Mode OFF.
     */
    upload_mode(OFF);
    return(ERR_NONE);
}

/***************************************************************************
 *                                                                         *
 *                        U P L O A D   M O D E                            *
 *                                                                         *
 ***************************************************************************/
int upload_mode(state)
BOOL state;  /* state of upload process */
{
    /*
     * Generate error report for closed download/upload window.
     * Initialize variables to invoke mode.
     */
    switch(_system_flags.type) {
    default:
    case TOPSIDE:
        switch(state) {
        case ON:
            if(_dnupload_window == CLOSED) {
```

```
                _status = ERR_DNLOAD_UPLOAD_CLOSED;
                error_report(ERR_UPLOAD_MODE,USR1,ERRCODE);
                return(ERR_UPLOAD_MODE);
            }
            _topside_link_flags.upload_mode  = ON;
            _downside_link_flags.dnload_mode = ON;
            break;
        case OFF:
            _topside_link_flags.upload_mode  = OFF;
            _downside_link_flags.dnload_mode = OFF;
            break;
        }
        break;
    case DOWNSIDE:
        switch(state) {
        case ON:
            if(_dnupload_window == CLOSED) {
                _status = ERR_DNLOAD_UPLOAD_CLOSED;
                error_report(ERR_UPLOAD_MODE,USR1,ERRCODE);
                return(ERR_UPLOAD_MODE);
            }
            _downside_link_flags.upload_mode = ON;
            _topside_link_flags.dnload_mode  = ON;
            break;
        case OFF:
            _downside_link_flags.upload_mode = OFF;
            _topside_link_flags.dnload_mode  = OFF;
            break;
        }
        break;
    }
    return(ERR_NONE);
}

/****************************************************************************
 *                                                                          *
 *                          I S   U P L O A D                               *
 *                                                                          *
 ****************************************************************************/
BOOL is_upload(port)
int port; /* port to check */
{
    /*
     * The Master computer goes into an "upload mode" to send files to
     *      the Slave system.
     * The Slave system goes into a "download mode" to receive files
     *      from the Master system.
     *
     * UPLOAD is activated in either of two ways:
     *      (1) When this computers Data Set Ready [Line #6] is set ON.
     *      (2) When this computer receives a message with the UPLOAD
     *          command header.
     */

/*
     * Check for the command message header.
     */
    switch(_system_flags.type) {
    default:
    case TOPSIDE:
        if((_topside_link_flags.upload_mode == ON)
        && (_downside_link_flags.dnload_mode == ON)) {
            logmsg("Upload Triggered By Command."
                ,_logfiles[_system_flags.type].logtype,STRNG);
            return(TRUE);
        }
        break;
    case DOWNSIDE:
        if((_downside_link_flags.upload_mode == ON)
        && (_topside_link_flags.dnload_mode == ON)) {
            logmsg("Upload Triggered By Command."
                ,_logfiles[_system_flags.type].logtype,STRNG);
            return(TRUE);
        }
        break;
    }

/*
     * Only Serial ports can be checked.
     * Check for the Data Set Ready Trigger.
     *
     * NOTE:In case of noise on the Data Set Ready line,
```

```
    *       wait a couple of seconds and check again.
    *
    * Set master serial port just as if a message arrived.
    */
    return(FALSE); /* <<< Temporary until fully implemented >>> */ if(is_port_serial(port) == FALSE)
        return(FALSE);

if(isdsr(port,DIRECT) == FALSE)
        return(FALSE);

timer(2*SECOND);
    if(isdsr(port,DIRECT) == FALSE)
        return(FALSE);

logmsg("Upload Triggered By Discrete."
        ,_logfiles[_system_flags.type].logtype,STRNG);
    set_master_port(port);
    return(TRUE);
}

/*
 * ATLAB Funtion Headers
 */
#include <atlerrs.c>

/*
 * Device Flags Bit Field Definitions
 */
typedef struct {
    unsigned DMA_mode       :2;
    unsigned SE_DI          :1;
    unsigned unipolar       :1;
    unsigned encoding       :2;
    unsigned sign_extended  :1;
    unsigned                :9;
} DEV_FLAGS;

/*
 * Definition of the Information Returned by AL_GET_CONFIGURATION
 */
typedef struct {
    int       base_address;      /* base I/O address of the device */
    int       device_id;         /* DT28xx device identifier */
    DEV_FLAGS device_flags;      /* configuration options */
                                 /* see bit definitions above */
    int       scan_count;        /* number of channels in scan list */
    int       channel_count;     /* number of A/D channels */
    int       reserved[11];      /* reserved for future use */
} AL_CONFIGURATION;

typedef struct {
    int       reserved[2];       /* reserved */
    int       device_id;         /* DT28xx device identifier */
    DEV_FLAGS device_flags;      /* configuration options */
                                 /* see bit definitions above */
    int       scan_count;        /* number of channels in scan list */
    int       channel_list[16];  /* channel scan list */
    int       gain_list[16];     /* channel gain list */
    char      channel_comment[16][40];
                                 /* channel annotation */
    char      acq_date[10];      /* acquisition date */
    char      acq_time[12];      /* acquisition time */
    int       timing_source;     /* A/D timing source */
    long      clock_period;      /* clock period in ticks */
    long      sample_count;      /* sample count */
    long      read_count;        /* samples read so far */
    char      acq_comment[80];   /* file annotation */
} AL_FILE_HEADER;

/*
 * ATLAB Library Functions
 */
extern int AL_ADC_ON_TRIGGER       (int,int,int*);
extern int AL_ADC_SERIES           (int);
extern int AL_ADC_VALUE            (int,int,int*);
extern int AL_ALLOCATE_XM_BUFFER   (int*,unsigned);
extern int AL_BURST_ADC            (void);
extern int AL_BURST_DAC            (void);
extern int AL_CONTINUOUS_ADC       (void);
extern int AL_CONTINUOUS_DAC       (void);
```

```c
extern int AL_COPY_BUFFER           (int,int,unsigned,unsigned,unsigned);
extern int AL_DAC_ON_TRIGGER        (int,unsigned*);
extern int AL_DAC_SERIES            (int);
extern int AL_DAC_VALUE             (int,unsigned*);
extern int AL_DECLARE_BUFFER        (int*,unsigned*,unsigned);
extern int AL_DISABLE_SYSTEM_CLOCK  (void);
extern int AL_ENABLE_FOR_INPUT      (int);
extern int AL_ENABLE_FOR_OUTPUT     (int);
extern int AL_ENABLE_SYSTEM_CLOCK   (void);
extern int AL_FILE_CLOSE            (AL_FILE_HEADER*);
extern int AL_FILE_FLUSH            (AL_FILE_HEADER*);
extern int AL_FILE_OPEN             (char*,int,AL_FILE_HEADER*);
extern int AL_FILE_READ             (int,AL_FILE_HEADER*);
extern int AL_FILE_REWIND           (AL_FILE_HEADER*);
extern int AL_FILE_WRITE            (int,AL_FILE_HEADER*);
extern int AL_FIND_DMA_LENGTH       (unsigned*,unsigned*);
extern int AL_GET_CONFIGURATION     (AL_CONFIGURATION*);
extern int AL_INITIALIZE            (void);
extern int AL_INPUT_DIGITAL_VALUE   (int,int,int*);
extern int AL_LINK_BUFFER           (int);
extern int AL_OUTPUT_DIGITAL_VALUE  (int,int,int);
extern int AL_RELEASE_BUFFER        (int*,int*);
extern int AL_RESET                 (void);
extern int AL_RESET_BUFFERS         (void);
extern int AL_RETURN_AS_LAST        (int);
extern int AL_RETURN_BUFFER         (int);
extern int AL_RETURN_CLOCK          (long*);
extern int AL_SELECT_BOARD          (int);
extern int AL_SETUP_ADC             (int,int,int*,int*);
extern int AL_SETUP_DAC             (int,int);
extern int AL_SET_CLOCK             (long);
extern int AL_SET_ERROR_CONTROL_WORD (int);
extern int AL_SET_FREQUENCY         (float);
extern int AL_SET_PERIOD            (float);
extern int AL_SET_TIMEOUT           (int);
extern int AL_STOP                  (void);
extern int AL_TERMINATE             (void);
extern int AL_TEST_BUFFER           (int*,unsigned*);
extern int AL_UNLINK_BUFFERS        (void);
extern int AL_WAIT_FOR_COMPLETION   (int);

/*
 * ATLAB Data File Acquisition Information Structure
 */
#define PROGRAMMED_IO   0
#define SINGLE_CHANNEL  1
#define DUAL_CHANNEL    2
#define OFFSET_BINARY   0
#define STRAIGHT_BINARY 1
#define TWOS_COMPLEMENT 2

/*
 * Bit definitions for the A/D timing source
 */
#define INTERNAL_CLOCK   0
#define EXTERNAL_CLOCK   1
#define INTERNAL_TRIGGER 0
#define EXTERNAL_TRIGGER 2
#define TRIGGERED_SCAN   4

/*
 * Direction Indicators for ATLAB File Opens
 */
#define AL_WRITE 1 /* AL_FILE_OPEN for writing */
#define AL_READ  0 /* AL_FILE_OPEN for reading */

/*
 * Device Identifiers
 */
#define UNUSED      0
#define DT2828      1
#define DT2827      2
#define DT2821_DI   4
#define DT2821_SE   8
#define DT2821     16

/*
 * Digital I/O Ports
 */
#define DIOPORT0    0
#define DIOPORT1    1
#define BOTHPORTS (-1)
```

```c
/*
 * Digital to Analog Channels
 */
#define DAC_CHANNEL0    0
#define DAC_CHANNEL1    1
#define BOTHCHANNELS (-1)
```

```
/***************************************************************************
 *                                                                         *
 *                          B U F F E R S                                  *
 *                                                                         *
 ***************************************************************************/
```

```c
    /*
     * Display Buffers.
     */
    static BYTE adllog_buf        [2 * ADLLOG_LEN];
    static BYTE availability_buf  [2 * AVAILABILITY_LEN];
    static BYTE clock_buf         [2 * CLOCK_LEN];
    static BYTE correlate_buf     [2 * CORRELATE_LEN];
    static BYTE error_buf         [2 * ERROR_LEN];
    static BYTE extlog_buf        [2 * EXTLOG_LEN];
    static BYTE home_buf          [2 * HOME_LEN];
    static BYTE howtouseit_buf    [2 * HOWTOUSEIT_LEN];
    static BYTE receive_buf       [2 * RECEIVE_LEN];
    static BYTE recintr_buf       [2 * RECINTR_LEN];
    static BYTE switch_buf        [2 * SWITCH_LEN];
    static BYTE transmit_buf      [2 * TRANSMIT_LEN];
    static BYTE xmtintr_buf       [2 * XMTINTR_LEN];

/*
     * User Receiver Buffers.
     */
    static BYTE com1usrbuf [USRBUFLEN];
    static BYTE com2usrbuf [USRBUFLEN];
    static BYTE das1usrbuf [USRBUFLEN];
    static BYTE usr1usrbuf [USRBUFLEN];
```

```
/***************************************************************************
 *                                                                         *
 *              E R R O R   C O D E S   H E A D E R   F I L E              *
 *                                                                         *
 ***************************************************************************/
```

```c
/*
 * Add the corresponding error string for each error code to globals.c!
 */
#define ERR_NONE                      0
#define ERR_ACOUSTICRXINTFUNCT      (-201)
#define ERR_ACOUSTICTXINTFUNCT      (-202)
#define ERR_ASSEMBLE                (-203)
#define ERR_ATLAB_TIMEOUT           (-204)
#define ERR_ATTEND_AVAILABILITY     (-205)
#define ERR_ATTEND_DNUPLOAD         (-206)
#define ERR_ATTEND_DOWNLOAD         (-207)
#define ERR_ATTEND_EVENTS           (-208)
#define ERR_ATTEND_KEYBOARD         (-209)
#define ERR_ATTEND_MESSAGE          (-210)
#define ERR_ATTEND_POWER            (-211)
#define ERR_ATTEND_UPLOAD           (-212)
#define ERR_ATTEND_XDUCERS          (-213)
#define ERR_BAD_CHECKSUM            (-214)
#define ERR_BUILD_TRANSMISSION      (-215)
#define ERR_CALC_DELAY              (-216)
#define ERR_CHECKFORCRITICAL        (-217)
#define ERR_CHECKFORTIMEOUT         (-218)
#define ERR_CHECKSUM                (-219)
#define ERR_CHECK_FOR_ATLAB         (-220)
#define ERR_CLOSELOGFILE            (-221)
#define ERR_CONTROL_LOOP            (-222)
#define ERR_COPY_LOGFILE            (-223)
#define ERR_DNLOAD_MODE             (-224)
#define ERR_DNLOAD_UPLOAD_CLOSED    (-225)
#define ERR_DOWNSIDE_ADL_OFF        (-226)
#define ERR_ERROR_REPORT            (-227)
#define ERR_EXECUTE_KEY             (-228)
#define ERR_EXTRACT_LINKS           (-229)
#define ERR_FCLOSE                  (-230)
#define ERR_FILESIZE                (-231)
#define ERR_FOPEN                   (-232)
#define ERR_FORMCODE                (-233)
```

```c
#define ERR_FSCANF                  (-234)
#define ERR_GETMESSAGE              (-235)
#define ERR_HANDLE_MESSAGE          (-236)
#define ERR_ILLEGAL_PORT            (-237)
#define ERR_INITACOUSTICREC         (-238)
#define ERR_INITACOUSTICXMIT        (-239)
#define ERR_INITATLABUFFERS         (-240)
#define ERR_INITSERIALXMIT          (-241)
#define ERR_INIT_ATLAB              (-242)
#define ERR_INIT_SERIAL_PORT        (-243)
#define ERR_INPUT_OUT_OF_RANGE      (-244)
#define ERR_INVALID_ARGUMENT        (-245)
#define ERR_INVALID_MASTERPORT      (-246)
#define ERR_INVALID_PORT            (-247)
#define ERR_KILL_SYSTEM             (-248)
#define ERR_LOADFILES               (-249)
#define ERR_MAIN                    (-250)
#define ERR_MAKE_DMA                (-251)
#define ERR_MALLOC                  (-252)
#define ERR_MEMCPY                  (-253)
#define ERR_MEMMOVE                 (-254)
#define ERR_MESSAGE_COUNT           (-255)
#define ERR_NETWORK                 (-256)
#define ERR_NOT_EXECUTIVE           (-257)
#define ERR_NO_ACK_FROMRECEIVER     (-258)
#define ERR_NO_NAK_FROMRECEIVER     (-259)
#define ERR_OPEN_LOGFILE            (-260)
#define ERR_PORT_NOT_ENABLED        (-261)
#define ERR_REALLOC                 (-262)
#define ERR_RECEIVE                 (-263)
#define ERR_RECEIVER_OVERFLOW       (-264)
#define ERR_RESETXMTR               (-265)
#define ERR_RESET_AVAILABILITY      (-266)
#define ERR_RESET_DNUPLOAD          (-267)
#define ERR_RESET_POWER             (-268)
#define ERR_RESET_XDUCER            (-269)
#define ERR_SEND_MESSAGE            (-270)
#define ERR_SETCOMPUTERTYPE         (-271)
#define ERR_SETRTS                  (-272)
#define ERR_SETUPCHANNEL            (-273)
#define ERR_SETUPINTRHNDLR          (-274)
#define ERR_SETUP_ATLAB             (-275)
#define ERR_SET_MASTER_PORT         (-276)
#define ERR_SHOWMESSAGE             (-277)
#define ERR_SHOW_DELAY              (-278)
#define ERR_SHUTDN_ATLAB            (-279)
#define ERR_STRIP_HEADER            (-280)
#define ERR_SUBMIT_HEADER_FLAG      (-281)
#define ERR_SUBMIT_POWERUP_TIME     (-282)
#define ERR_SUBMIT_SPEED_REDUCTION  (-283)
#define ERR_SYSINIT                 (-284)
#define ERR_SYSTEM_CALL             (-285)
#define ERR_TRANSFER                (-286)
#define ERR_TRANSFERECMSG           (-287)
#define ERR_TRANSMIT                (-288)
#define ERR_TRANSMIT_MESSAGE        (-289)
#define ERR_UNLINK_BUFFERS          (-290)
#define ERR_UPLOAD                  (-291)
#define ERR_UPLOAD_MODE             (-292)
#define ERR_VALIDATE_EXEC           (-293)
#define ERR_VERIFYCHECKSUM          (-294)
#define ERR_VERIFYLENGTH            (-295)
#define ERR_WAITFORMESSAGE          (-296)
#define ERR_ZERO_DENOMINATOR        (-297)
#define ERR_ATTEND_OVERHEAD         (-298)
#define ERR_INVALID_INPUT           (-299)
#define ERR_SUBMIT_TIMEDATE         (-300)

/*
 * ERROR OFFSETS
 */
#define ERRNO_OFFSET      0
#define ALERR_OFFSET      0
#define GLCOMM_OFFSET  (-100)
#define ERRCODE_OFFSET (-200)

/************************************************************************
 *                                                                      *
 *                    E R R N O   S T R I N G S                         *
 *                                                                      *
 ************************************************************************/
```

```c
static STRG errno_strings [] = {
    "EPERM              ",
    "ENOENT             ",
    "ESRCH              ",
    "EINTR              ",
    "EIO                ",
    "ENXIO              ",
    "E2BIG              ",
    "ENOEXEC            ",
    "EBADF              ",
    "ECHILD             ",
    "EAGAIN             ",
    "ENOMEM             ",
    "EACCES             ",
    "EFAULT             ",
    "ENOTBLK            ",
    "EBUSY              ",
    "EEXIST             ",
    "EXDEV              ",
    "ENODEV             ",
    "ENOTDIR            ",
    "EISDIR             ",
    "EINVAL             ",
    "ENFILE             ",
    "EMFILE             ",
    "ENOTTY             ",
    "ETXTBSY            ",
    "EFBIG              ",
    "ENOSPC             ",
    "ESPIPE             ",
    "EROFS              ",
    "EMLINK             ",
    "EPIPE              ",
    "EDOM               ",
    "ERANGE             ",
    "EUCLEAN            ",
    "EDEADLOCK          "
};
```

/****************************************************************************
 *                                                                          *
 *      G R E E N L E A F   C O M M   L I B R A R Y   E R R O R S           *
 *                                                                          *
 ****************************************************************************/

```c
static STRG glcomm_strings [] = {
    "ASGENERALERROR     ",
    "ASINVPORT          ",
    "ASINUSE            ",
    "ASINVBUFSIZE       ",
    "ASNOMEMORY         ",
    "ASNOTSETUP         ",
    "ASINVPAR           ",
    "ASBUFREMPTY        ",
    "ASBUFRFULL         ",
    "ASTIMEOUT          ",
    "ASNOCTS            ",
    "ASNOCD             ",
    "ASNODSR            ",
    "ASNO8250           ",
    "ASXMSTATUS         ",
    "ASUSERABORT        ",
    "ASFILERR           ",
    "ASXMERROR          ",
    "ASNOWIDERX         ",
    "ASCONFLICT         "
};
```

/****************************************************************************
 *                                                                          *
 *              A T L A B   E R R O R   S T R I N G S                       *
 *                                                                          *
 ****************************************************************************/

```c
static STRG alerr_strings [] = {
    "Over/Underrun during I/O ",
    "D/A error detected       ",
    "A/D error detected       ",
    "Timeout exceeded on output",
    "Timeout exceeded on input ",
    "Dummy error place holder  ",
    "Dummy error place holder  ",
```

```
"Dummy error place holder ",
"Dummy error place holder ",
"Dummy error place holder ",
"Dummy error place holder ",
"Device driver not found  ",
"Too many files open      ",
"Dummy error place holder ",
"Dummy error place holder ",
"Dummy error place holder ",
"Dummy error place holder ",
"DMA channel not assigned ",
"Dummy error place holder ",
"Dummy error place holder ",
"Illegal gain specification",
"Dummy error place holder ",
"Dummy error place holder ",
"DMA buffer crosses 64K   ",
"Dummy error place holder ",
"Dummy error place holder ",
"Negative argument        ",
"Dummy error place holder ",
"Dummy error place holder ",
"Illegal timing src value ",
"Dummy error place holder ",
"Dummy error place holder ",
"Frequency too high       ",
"Frequency too low        ",
"Requested period too small",
"Requested period too large",
"Dummy error place holder ",
"Illegal digital port     ",
"Dummy error place holder ",
"Illegal channel number   ",
"Dummy error place holder ",
"Illegal board number     ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"No Buffer Control Blocks ",
"No extended memory buffer",
"Illegal buffer boundary  ",
"Invalid buffer number    ",
"Illegal buffer length    ",
"Dummy error place holder ",
"I/O in progress          ",
"Buffer already linked    ",
"Buffer already released  ",
"Buffer not linked        ",
"Buffer already returned  ",
"File does not exist      ",
"Can't open requested file",
"Error reading data file  ",
"Error writing data file  ",
"Not an ATLAB data file   ",
"EOF found in data file   ",
"I/O not in progress      ",
"Illegal Transfer List    ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
"Dummy error place holder ",
```

```
        "Dummy error place holder  ",
...     "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Unexpected error          ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place.holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Dummy error place holder  ",
        "Unexpected error          "
};

/*******************************************************************************
*                                                                              *
*               A D A T S   E R R O R   S T R I N G S                          *
*                                                                              *
*******************************************************************************/
    static STRG errcode_strings [] = {
        "ERR_ACOUSTICRXINTFUNCT    ",
        "ERR_ACOUSTICTXINTFUNCT    ",
        "ERR_ASSEMBLE              ",
        "ERR_ATLAB_TIMEOUT         ",
        "ERR_ATTEND_AVAILABILITY   ",
        "ERR_ATTEND_DNUPLOAD       ",
        "ERR_ATTEND_DOWNLOAD       ",
        "ERR_ATTEND_EVENTS         ",
        "ERR_ATTEND_KEYBOARD       ",
        "ERR_ATTEND_MESSAGE        ",
        "ERR_ATTEND_POWER          ",
        "ERR_ATTEND_UPLOAD         ",
        "ERR_ATTEND_XDUCERS        ",
        "ERR_BAD_CHECKSUM          ",
        "ERR_BUILD_TRANSMISSION    ",
        "ERR_CALC_DELAY            ",
        "ERR_CHECKFORCRITICAL      ",
        "ERR_CHECKFORTIMEOUT       ",
        "ERR_CHECKSUM              ",
        "ERR_CHECK_FOR_ATLAB       ",
        "ERR_CLOSELOGFILE          ",
        "ERR_CONTROL_LOOP          ",
        "ERR_COPY_LOGFILE          ",
        "ERR_DNLOAD_MODE           ",
        "ERR_DNLOAD_UPLOAD_CLOSED  ",
```

```
"ERR_DOWNSIDE_ADL_OFF    ",
"ERR_ERROR_REPORT        ",
"ERR_EXECUTE_KEY         ",
"ERR_EXTRACT_LINKS       ",
"ERR_FCLOSE              ",
"ERR_FILESIZE            ",
"ERR_FOPEN               ",
"ERR_FORMCODE            ",
"ERR_FSCANF              ",
"ERR_GETMESSAGE          ",
"ERR_HANDLE_MESSAGE      ",
"ERR_ILLEGAL_PORT        ",
"ERR_INITACOUSTICREC     ",
"ERR_INITACOUSTICXMIT    ",
"ERR_INITATLABUFFERS     ",
"ERR_INITSERIALXMIT      ",
"ERR_INIT_ATLAB          ",
"ERR_INIT_SERIAL_PORT    ",
"ERR_INPUT_OUT_OF_RANGE  ",
"ERR_INVALID_ARGUMENT    ",
"ERR_INVALID_MASTERPORT  ",
"ERR_INVALID_PORT        ",
"ERR_KILL_SYSTEM         ",
"ERR_LOADFILES           ",
"ERR_MAIN                ",
"ERR_MAKE_DMA            ",
"ERR_MALLOC              ",
"ERR_MEMCPY              ",
"ERR_MEMMOVE             ",
"ERR_MESSAGE_COUNT       ",
"ERR_NETWORK             ",
"ERR_NOT_EXECUTIVE       ",
"ERR_NO_ACK_FROMRECEIVER ",
"ERR_NO_NAK_FROMRECEIVER ",
"ERR_OPEN_LOGFILE        ",
"ERR_PORT_NOT_ENABLED    ",
"ERR_REALLOC             ",
"ERR_RECEIVE             ",
"ERR_RECEIVER_OVERFLOW   ",
"ERR_RESETXMTR           ",
"ERR_RESET_AVAILABILITY  ",
"ERR_RESET_DNUPLOAD      ",
"ERR_RESET_POWER         ",
"ERR_RESET_XDUCER        ",
"ERR_SEND_MESSAGE        ",
"ERR_SETCOMPUTERTYPE     ",
"ERR_SETRTS              ",
"ERR_SETUPCHANNEL        ",
"ERR_SETUPINTRHNDLR      ",
"ERR_SETUP_ATLAB         ",
"ERR_SET_MASTER_PORT     ",
"ERR_SHOWMESSAGE         ",
"ERR_SHOW_DELAY          ",
"ERR_SHUTDN_ATLAB        ",
"ERR_STRIP_HEADER        ",
"ERR_SUBMIT_HEADER_FLAG  ",
"ERR_SUBMIT_POWERUP_TIME ",
"ERR_SUBMIT_SPEED_REDUCTION",
"ERR_SYSINIT             ",
"ERR_SYSTEM_CALL         ",
"ERR_TRANSFER            ",
"ERR_TRANSFERECMSG       ",
"ERR_TRANSMIT            ",
"ERR_TRANSMIT_MESSAGE    ",
"ERR_UNLINK_BUFFERS      ",
"ERR_UPLOAD              ",
"ERR_UPLOAD_MODE         ",
"ERR_VALIDATE_EXEC       ",
"ERR_VERIFYCHECKSUM      ",
"ERR_VERIFYLENGTH        ",
"ERR_WAITFORMESSAGE      ",
"ERR_ZERO_DENOMINATOR    ",
"ERR_ATTEND_OVERHEAD     ",
"ERR_INVALID_INPUT       ",
"ERR_SUBMIT_TIMEDATE     "
};

/**********************************************************************
*                                                                     *
*                          E X T E R N S                              *
*                                                                     *
**********************************************************************/
```

```
/*
 * User-Defined Global Function Declarations written in MicroSoft C 5.00
 */
extern BOOL    is_adats_system                (void);
extern BOOL    is_dnload                      (int port);
extern BOOL    is_port_acoustic               (int port);
extern BOOL    is_port_serial                 (int port);
extern BOOL    is_port_valid                  (int port);
extern BOOL    is_upload                      (int port);
extern BYTE    *assemble                      (int outport,int inport,WORD *message_length);
extern WORD    *formcode                      (BYTE *message_block,WORD *message_length);
extern int     adl_scanf                      (char *buffer,int maxchars,BYTE location);
extern int     attend_download                (int port);
extern int     attend_events                  (void);
extern int     attend_keyboard                (void);
extern int     attend_message                 (int inport);
extern int     attend_overhead                (void);
extern int     attend_power_cycle             (void);
extern int     attend_upload                  (int port);
extern int     calculate_delay                (int port,unsigned int *delay);
extern int     checksum                       (BYTE *data_block,WORD data_length,BYTE *chksum);
extern int     copy_logfile_backup_diskettes  (void);
extern int     dnload_mode                    (BYTE state);
extern int     initialize                     (int argc,char **argv);
extern int     initialize_acoustic_receive    (void);
extern int     initialize_acoustic_transmit   (void);
extern int     initialize_atlab_buffers       (void);
extern int     initialize_serial_transmit     (int port);
extern int     kill_system                    (void);
extern int     network                        (WORD mode,STRG rosetta,int port);
extern int     receive                        (int port,WORD *count);
extern int     reset_availability_state       (BYTE state);
extern int     set_master_port                (int port);
extern int     setup_atlab_for                (BYTE process);
extern int     setup_channel_for              (BYTE process);
extern int     setup_das_handler              (BYTE handler_to_install,BYTE intr_to_intercept,BYTE intr_to_generate);
extern int     showmsg                        (BYTE type,int port,WORD count);
extern int     shutdown_atlab                 (void);
extern int     submit_timedate                (void);
extern int     transfer                       (WORD action,char *filename,int port);
extern int     transmit_message               (int outport,int inport,WORD bytes_to_transmit);
extern int     upload_mode                    (BYTE state);
extern void    acoustic_rec_intr_function     (void);
extern void    acoustic_xmit_intr_function    (void);
extern void    add_time                       (struct TIMEDATE *time,long addsecs);
extern void    annotate_logfile               (void);
extern void    clrcrt                         (BYTE location);
extern void    delay                          (unsigned int ticks);
extern void    direct_pch                     (BYTE character,BYTE attribute);
extern void    direct_putcinc                 (BYTE character,BYTE attribute);
extern void    disable_irq                    (BYTE irq_number);
extern void    enable_irq                     (BYTE irq_number);
extern void    error_report                   (int errcode,int port,BYTE errtype);
extern void    initialize_acoustics           (void);
extern void    initialize_pic                 (void);
extern void    initialize_rec                 (void);
extern void    logmsg                         (BYTE *msgtolog,unsigned logtype,unsigned msgtype);
extern void    main                           (int argc,char **argv);
extern void    put_field                      (BYTE location,int length);
extern void    putbox                         (BYTE location);
extern void    putcur                         (BYTE location,int offset);
extern void    putime                         (void);
extern void    putmsg                         (BYTE location,int attribute,BYTE msgtype);
extern void    rec                            (void);
extern void    reset_reply_state              (BYTE state);
extern void    restore_pic                    (void);
extern void    set_busy_bit                   (int port,int state);
extern void    set_cursor                     (int type);
extern void    set_logfile_thresholds         (void);
extern void    set_operation_parameters       (void);
extern void    show_das                       (int state,BYTE process);
extern void    show_file_status               (unsigned logtype);
extern void    shutdown_das_handler           (BYTE intercepted_interrupt);
extern void    update_display                 (WORD verbosity);

/*
 * User-Defined Global Variable Declarations
 */
extern BOOL                    _asi_opened;
extern BOOL                    _atlab_opened;
extern BOOL                    _clrverbose_flag;
extern BOOL                    _das_receiver_request;
```

```
extern BOOL                            _dnupload_window;
extern BOOL                            _first_power_on_event;
extern BOOL                            _restart;
extern BOOL                            _timedate_request;
extern BYTE                            *_serial_broadcast;
extern BYTE                            _atlab_irq_number;
extern BYTE                            _byteb [];
extern BYTE                            _das_irq_number;
extern BYTE                            _downside_byte;
extern BYTE                            _getacousticrx;
extern BYTE                            _getacoustictx;
extern BYTE                            _menu_type;
extern BYTE                            _probable_availability;
extern BYTE                            _probable_power_state;
extern BYTE                            _probable_xducer;
extern BYTE                            _topside_byte;
extern WORD                            *_acoustic_broadcast;
extern WORD                            *_master_dma_buffer;
extern WORD                            _acoustic_txcount;
extern WORD                            _serial_txcount;
extern double                          _speed_reduction_rx;
extern double                          _speed_reduction_tx;
extern int                             _acoustic_rxcount;
extern int                             _codeword_index;
extern int                             _master_serial_port;
extern int                             _status;
extern int                             _videomode;
extern int                             _videopage;
extern long                            _power_on_period;
extern struct   TIMEDATE               _current_time;
extern struct   TIMEDATE               _programmed_time;
extern struct   TIMEDATE               _reception_time;
extern struct   configuration_t        _configuration [];
extern struct   display_t              _display [];
extern struct   irq_table_t            _irq_table [MAX_IRQ_NUMBER];
extern struct   link_flags_t           _downside_link_flags;
extern struct   link_flags_t           _topside_link_flags;
extern struct   logfiles_t             _logfiles [];
extern struct   port_stuff_t           _port_stuff [];
extern struct   system_flags_t         _system_flags;

/*
 * Greenleaf COMMUNICATION Funtion Headers
 */
#include <asiports.h>
#include <xmodem.h>

/*
 * Greenleaf COMMUNICATION Function Declarations
 */
extern int                _isstat      (int,int,int);
extern int                _iswhat      (int,int);
extern int                asdtr        (int,int);
extern int                asicheck     (int,int,int);
extern int                asiclear     (int,int);
extern int                asifirst     (int,unsigned int,unsigned,unsigned);
extern int                asigetc      (int);
extern int                asigetd      (int,int);
extern int                asigetparms  (int,int*,int*,int*,int*,int*,int*);
extern int                asihold      (int,unsigned);
extern int                asiinit      (int,int,int,int,int);
extern int                asiopen      (int,unsigned,unsigned,unsigned,int,int,int,int,int,int);
extern int                asiputc      (int,int);
extern int                asiquit      (int);
extern int                asiresume    (int,unsigned);
extern int                asistart     (int,unsigned int);
extern int                asixack      (int,int);
extern int                asixdnload   (int,char*,PFRI,int);
extern int                asixnak      (int,int,int,int);
extern int                asixrecvbuf  (int,char*,struct XMBUF*,int);
extern int                asixupload   (int,char*,long,PFRI,int);
extern int                asrts        (int,int);
extern struct PORT_TABLE *_aschkcnl    (int);
extern unsigned           asigetb      (int,char*,unsigned);
extern unsigned           asiputb      (int,char*,unsigned);
extern unsigned           getrxcnt     (int);
extern unsigned           gettxfree    (int);
extern void               _asiexit     (int);
extern void               timer        (unsigned);

/*
 * Greenleaf FUNCTION Headers
 */
```

```c
#include <ibmkeys.h>
#include <color.h>
#include <timedate.h>
#include <music.h>
#include <disk.h>
#include <glstring.h>

/*
 * Greenleaf FUNCTION Declarations
 */
extern bool              gfkbhit    (void);
extern bool              iscolor    (void);
extern bool              ismono     (void);
extern int               fetchtime  (struct TIMEDATE*);
extern struct TIMEDATE  *sgettime   (int);
extern unsigned          getcur     (int);
extern unsigned          getkey     (void);
extern unsigned          vstate     (struct GFREGS*);
extern void              centers    (char*,char*,int);
extern void              cls        (void);
extern void              copytime   (struct TIMEDATE*,struct TIMEDATE*);
extern void              cprints    (int,char*);
extern void              curset     (int,int,int);
extern void              curtype    (int,int,int);
extern void              kbflush    (void);
extern void              prints     (char*);
extern void              rcprints   (int,int,int,char*);
extern void              sound      (int,int);
extern void              tocolor    (void);
extern void              tomono     (void);
extern void              vmode      (int);
extern void              vpage      (int);

/*
 * Greenleaf Global Error Code Return
 */
extern int _aserror;

/*
 * Microsoft Headers
 */
#include <conio.h>
#include <ctype.h>
#include <dos.h>
#include <fcntl.h>
#include <io.h>
#include <math.h>
#include <memory.h>
#include <process.h>
#include <stdio.h>
#include <stdlib.h>
#include <string.h>
#include <sys\types.h>
#include <sys\stat.h>

/*
 * Microsoft Library Functions
 */
extern FILE    *fopen     (const char*,const char*);
extern char    *strcpy    (char*,const char*);
extern char    *strupr    (char*);
extern double   ceil      (double);
extern double   modf      (double,double*);
extern int      abs       (int);
extern int      access    (char*,int);
extern int      atoi      (const char*);
extern int      fclose    (FILE*);
extern int      fflush    (FILE*);
extern int      fscanf    (FILE*,const char*,...);
extern int      inp       (unsigned);
extern int      int86     (int,union REGS*,union REGS*);
extern int      open      (char*,int,...);
extern int      outp      (unsigned,int);
extern int      printf    (const char*,...);
extern int      rename    (const char*,const char*);
extern int      sprintf   (char*,const char*,...);
extern int      stat      (char*,struct stat*);
extern int      strcmp    (const char*,const char*);
extern int      strncmp   (const char*,const char*,size_t);
extern int      unlink    (const char*);
extern long     atol      (const char*);
extern size_t   strlen    (const char*);
```

```
extern unsigned _dos_setdate (struct dosdate_t*);
extern unsigned _dos_settime (struct dostime_t*);
extern void     *malloc     (size_t);
extern void     *memcpy     (void*,const void*,size_t);
extern void     *memmove    (void*,const void*,size_t);
extern void     _disable    (void);
extern void     _enable     (void);
extern void     free        (void*);
extern void     rewind      (FILE*);

/*
 * Microsoft Global Error Code Return
 */
extern unsigned int _amblksiz;

/*
 * System Funtion Headers
 */
#include <usrdefs.h> /* User Definitions (defines & typedefs)      */
#include <externs.h> /* User-Defined Functions & Variables         */
#include <ms.h>      /* MicroSoft Functions & Headers              */
#include <gf.h>      /* Greenleaf General Purpose Header           */
#include <glc.h>     /* Greenleaf Communication Functions & Headers */
#include <glf.h>     /* Greenleaf Functions & Headers              */
#include <atlab.h>   /* ATLAB Functions and Definitions            */

/*
 * System Headers
 * Turboc is not compatible with the MSC headers - so system.h cannot be
 * included. Only the following inclusions are needed.
 */
#include <timedate.h> /* Greenleaf Stuff for externs.h file */
#include <usrdefs.h>  /* User Definitions (defines & typedefs) */
#include <externs.h>  /* User-Defined Functions & Variables */

/*
 * Borland TurboC Headers
 * The search path is specified in the command line of TCC
 */
#include <dos.h>
#include <stdio.h>

/*
 * Borland TurboC Library Functions
 */
extern void             geninterrupt (int);
extern void             setvect      (int,void interrupt(*isr)());
extern void interrupt (*getvect(int))();

#define ON  1 /* Obvious */
#define OFF 0 /* Obvious */
#include <errcodes.h>

/***************************************************************************
 *                                                                         *
 *         U S E R   D E F I N I T I O N S   H E A D E R   F I L E         *
 *                                                                         *
 ***************************************************************************/
/*
 * DO NOT CHANGE THIS BLOCK OF DEFINES - THEY ARE TIED TO ARRAY INDEXES!
 */
#define INCORRECT_ARGUMENTS     0   /* Reason Code for Startup Failure  */
#define INVALID_TYPE            1   /* Reason Code for Startup Failure  */
#define INVALID_ATLAB_IRQ       2   /* Reason Code for Startup Failure  */
#define INVALID_DAS_IRQ         3   /* Reason Code for Startup Failure  */
#define IRQ_NOT_ACCESSIBLE      4   /* Reason Code for Startup Failure  */
#define SAME_IRQS               5   /* Reason Code for Startup Failure  */
#define INVALID_IRQ_PRIORITY    6   /* Reason Code for Startup Failure  */
#define UPLOAD                  0   /* Flag for Uploading a File        */
#define DOWNLOAD                1   /* Flag for Downloading a File      */
#define TRANSMIT                0   /* Flag for Transmit Handler        */
#define RECEIVE                 1   /* Flag for Receive Handler         */
#define MONITOR                 0   /* Flag = Monitor Mode              */
#define SERIAL                  1   /* Flag = Serial Mode               */
#define ACOUSTIC                2   /* Flag = Acoustic Mode             */
#define ECHO                    3   /* Flag = Echo Mode                 */
#define AIR                     0   /* Flag = In-Air Transmission       */
#define IN_AIR_TEST_MODE        0   /* Flag = In-Air Test Operation     */
#define TOWBODY_TEST_MODE       1   /* Flag = Towbody Test Operation    */
#define OPERATE_MODE            2   /* Flag = Operational Mode          */
#define WATER                   1   /* Flag = In-Water Transmission     */
#define TOPSIDE                 0   /* Flag = "Topside" System          */
```

```
#define DOWNSIDE              1       /* Flag = "Downside" System             */
#define SSC_FTP               2       /* Flag = "SSC/FTP" System              */
#define PASS_THROUGH          3       /* Flag = "PASS-THROUGH" System         */
#define UPPER_XDUCER          0       /* Flag = "Upper" Transducer Selection  */
#define LOWER_XDUCER          1       /* Flag = "Lower" Transducer Selection  */
#define AFT_XDUCER            0       /* Flag = Aft Transducer Selection      */
#define FORWARD_XDUCER        1       /* Flag = Forward Transducer Selection  */
#define RELAY_CHANNEL         0       /* Channel Number for XMIT/REC Relay    */
#define XDCER_CHANNEL         1       /* Channel Number for XDUCER Selection  */
#define TRANSMITTING          0       /* Transmitting Acoustically            */
#define DONE_TRANSMITTING     1       /* Done Transmitting Acoustically       */
#define DAS1                  2       /* Port Number of DAS (COM1/COM2)       */
#define USR1                  3       /* Empty User Port                      */
#define GLCOMM                0       /* Index into error code array          */
#define ERRNO                 1       /* Index into error code array          */
#define ERRCODE               2       /* Index into error code array          */
#define ALERR                 3       /* Index into error code array          */
#define CODE_0                0       /* Index into configuration array       */
#define CODE_1                1       /* Index into configuration array       */
#define CODE_2                2       /* Index into configuration array       */
#define CODE_3                3       /* Index into configuration array       */
#define CODE_4                4       /* Index into configuration array       */
#define CODE_5                5       /* Index into configuration array       */
#define CODE_6                6       /* Index into configuration array       */
#define CODE_7                7       /* Index into configuration array       */
#define HOME_LOC              0       /* Index into display locations         */
#define HOWTOUSEIT_LOC        1       /* Index into display locations         */
#define RECINTR_LOC           2       /* Index into display locations         */
#define XMTINTR_LOC           3       /* Index into display locations         */
#define RECEIVE_LOC           4       /* Index into display locations         */
#define TRANSMIT_LOC          5       /* Index into display locations         */
#define ERROR_LOC             6       /* Index into display locations         */
#define TIME_LOC              7       /* Index into display locations         */
#define CORRELATE_LOC         8       /* Index into display locations         */
#define SWITCH_LOC            9       /* Index into display locations         */
#define ADLLOG_LOC            10      /* Index into display locations         */
#define EXTLOG_LOC            11      /* Index into display locations         */
#define AVAILABILITY_LOC      12      /* Index into display locations         */
#define ALT_RECINTR_LOC       13      /* Index into display locations         */
#define ALT_XMTINTR_LOC       14      /* Index into display locations         */
#define PIC1                  0       /* 8259A-2 PIC #1                       */
#define PIC2                  1       /* 8259A-2 PIC #2                       */
#define LONG_MENU             0       /* Type of menu to use                  */
#define SHORT_MENU            1       /* Type of menu to use                  */
#define CLOSED                0       /* State                                */
#define OPENED                1       /* State                                */
#define TOP_LOG               0       /* Flag = Topside Logfile type          */
#define DWN_LOG               1       /* Flag = Downside Logfile type         */
#define SSC_LOG               2       /* Flag = SSC Logfile type              */
#define FTP_LOG               3       /* Flag = FTP Logfile type              */
#define TEST_MESSAGE          2       /* Index into array for send_message()  */
#define AOK                   0       /* Exit code and index for exiting ADL  */
#define ABORT                 1       /* Exit code and index for exiting ADL  */
#define RCVR                  1       /* Device code for Acoustic Receiver    */
#define XMTR                  0       /* Device code for Acoustic Receiver    */

/*
 * User-Defined Constants
 */
#define COM1BAUD              9600    /* Baud Rate for COM1:                  */
#define COM1DATA              8       /* Number of Data Bits for COM1:        */
#define COM1PRTY              P_ODD   /* Parity for COM1:                     */
#define COM1STOP              1       /* Number of Stop Bits for COM1:        */
#define COM2BAUD              9600    /* Baud Rate for COM2:                  */
#define COM2DATA              8       /* Number of Data Bits for COM2:        */
#define COM2PRTY              P_ODD   /* Parity for COM2:                     */
define COM2STOP              1       /* Number of Stop Bits for COM2:        */ define ABORTCODE             0x18    /* Abort keyboard code for transfer()   */
define ALL                   1       /* Unlink All ATLAB Buffers             */
#define ALLBITS               0xFFFF  /* All 16 bits are a binary "1"         */
#define ALLPORTS              (-1)    /* Quit All Serial Ports for asiquit()  */
#define ANNOTATION_LEN        58      /* Length of logfile annotation field   */
#define ARROW                 "—\x010 " /* Arrow character string             */
#define BEGINNING             0L      /* File pointer at beginning of a file  */
#define BINARY                0       /* Type of data                         */
#define BITS_PER_BYTE         8       /* Obvious                              */
#define BLOCKSIZE             128     /* Size of Block for XMODEM Protocol    */
#define BW_80X25              2       /* Color Adapter Using 80x25 B&W Mode   */
#define COLOR_SCREEN          0xB8000000L /* Address of Color Screen Memory   */
#define CO_80X25              3       /* Color Adapter Using 80x25 Color Mode */
#define CURSOR_COL            0x00FF  /* Mask for cursor col                  */
```

```c
#define CURSOR_ROW              0xFF00      /* Mask for cursor row                     */
#define DEFAULT_MASTER_PORT     (-1)        /* Default for Master Serial Port          */
#define DNLOAD_CODE             0x019       /* Dummy Code to transmit on Dnload        */
#define DRIVE_C                 3           /* Drive C:                                */
#define EMPTY                   0           /* State of Acoustic Receive Buffer        */
#define ENDOFDATA_BITS          13          /* Number of bits in end of data field     */
#define EXISTANCE               00          /* Mode for access() to check file         */
#define FILLING                 1           /* State of Acoustic Receive Buffer        */
#define FLAG_BITS               1           /* # of bits for a flag                    */
#define FULL                    2           /* State of Acoustic Receive Buffer        */
#define MATCH                   0           /* Obvious                                 */
#define MAXSPEED_REDUCTION      20.00L      /* Maximum speed reduction from target     */
#define MAX_COMMAND             128         /* Maximum command length                  */
#define MAX_RANGE               1000.0L     /* Maximum Operating Range in Meters       */
#define MINSPEED_REDUCTION      1.00L       /* Minimum speed reduction from target     */
#define MODE_BITS               2           /* Number of bits in system mode code      */
#define MONO_80X25              7           /* Monochrome Adapter Using 80x25 Mode     */
#define MONO_SCREEN             0xB0000000L /* Address of Monochrome Screen Memory     */
#define MSB                     0xFF00      /* First 8 of 16 bits are a binary "1"     */
#define NONE                    0           /* Obvious                                 */
#define NO_ADJUST               0L          /* No Adjustment for add_time()            */
#define PASSTHROUGHDELAY        9           /* Seconds to Delay for asixrecv()         */
#define PRINT_MASK              0xFF        /* Printable Characters are 8 Bits         */
#define RESTART_DELAY           60          /* Restart Delay in Seconds                */
#define SEND_BITS               2           /* Number of bits in destination code      */
#define SHIFTS_PER_BYTE         8           /* Number of Shifts for a Byte             */
#define SOUND_SPEED             1500.0L     /* Sound Speed in Meters Per Second        */
#define SPEED_INCREMENT         0.02L       /* Speed reduction increment               */
#define SPEED_REDUCTION_RX286   3.00L       /* Speed reduction for 80286 Receiver      */
#define SPEED_REDUCTION_RX386   3.00L       /* Speed reduction for 80386 Receiver      */
#define START_BYTE_1            0x53        /* First start byte                        */
#define START_BYTE_2            0xAC        /* Second start byte                       */
#define STRNG                   1           /* Type of data to log                     */
#define TIME_FORMAT             4           /* Option for sgettime()                   */
#define TURN_AROUND_DELAY       5.0L        /* Echo Back + Turn Around Delay           */
#define TYPE_BITS               2           /* Number of bits in ADATS Type code       */
#define UPLOADTIMEOUT           20          /* Upload NAKing Timeout in Seconds        */
#define UPLOAD_CODE             0x18        /* Dummy Code to transmit on Upload        */
#define VISUAL_PAGE             0           /* Visual Page                             */
#define WRONG_d                 8           /* Used by Acoustic Receiver               */
#define XMIT_BUFFERS            2           /* Number of Buffers for Acoustic XMIT     */
#define ZERO                    0x0000      /* All 16 bits are a binary "0"            */
#define ZERO_OFFSET             0           /* Offset from location for putcur()       */
                                            /* Propagation Delay */
#define PROPAGATION_DELAY (MAX_RANGE / SOUND_SPEED)

#define BELL                    0x007       /* Bell Key Code                           */
#define BS                      0x008       /* Back Space Key Code                     */
#define MINUS                   0x02D       /* Minus (-) Key Code                      */
#define PLUS                    0x02B       /* Plus (+) Key Code                       */
define SP                      0x020       /* Space Key Code                          */ define FIVE_HUNDREDTHS         1           /* Number of Ticks in 5/100 Second         */
define TENTH                   2           /* Number of Ticks in 1/10 Second          */
#define HALF                    9           /* Number of Ticks in 1/2 Second           */
#define TICKS_PER_SECOND        18          /* Number of Ticks in 1 Second             */
#define DATE_MASK           "11011011111"   /* Mask string for strsift()               */
#define MONTH_MASK          "1100000000"    /* Mask string for strsift()               */
#define DAY_MASK            "0001100000"    /* Mask string for strsift()               */
#define YEAR_MASK           "0000001111"    /* Mask string for strsift()               */
#define TIME_MASK           "11011011"      /* Mask string for strsift()               */
#define HOUR_MASK           "11000000"      /* Mask string for strsift()               */
#define MINUTE_MASK         "00011000"      /* Mask string for strsift()               */
define SECOND_MASK         "00000011"      /* Mask string for strsift()               */ define AVAILABILITY_CLOCK      1           /* Switch flag for events                  */
define BOOTUP_PERIOD           30L         /* Seconds for ADL to Boot Up              */
#define DNUPLOAD_CLOCK          2           /* Switch flag for events                  */
#define DNUPLOAD_ON_PERIOD      180L        /* Seconds for ADL DnUpLoad Window ON      */
#define HOURS_PER_DAY           24L         /* Hours to Days Conversion Factor         */
#define MAX_DAY                 31L         /* Maximum Day                             */
#define MAX_MONTH               12L         /* Maximum Month                           */
#define MAX_YEAR                2099L       /* Maximum Year                            */
#define MINUTES_PER_HOUR        60L         /* Minutes to Hours Conversion Factor      */
#define MIN_DAY                 1L          /* Minimum Day                             */
#define MIN_MONTH               1L          /* Minimum Month                           */
#define MIN_YEAR                1980L       /* Minimum Year                            */
#define ONE_MINUTE              1L          /* One Minute                              */
#define ONE_SECOND              1L          /* One Second                              */
#define POWER_CLOCK             3           /* Switch flag for events                  */
#define POWER_OFF_PERIOD        60L         /* Seconds for ADL Power Off State         */
#define POWER_ON_PERIOD         1740L       /* Seconds for ADL Power On State          */
```

```
#define REPLY_CLOCK              4          /* Switch flag for events              */
#define SECONDS_PER_DAY          86400L     /* Second to Days Conversion Factor    */
#define SECONDS_PER_HOUR         3600L      /* Second to Hours Conversion Factor   */
#define SECONDS_PER_MINUTE       60L        /* Second to Minutes Conversion Factor */
#define TRANSDUCER_PERIOD        600L       /* Seconds for ADL Transducer Swapping */
#define XDUCER_BLINK             15L        /* Blink When this is Remaining        */
#define XDUCER_CLOCK             0          /* Switch flag for events              */
#define ZERO_HOURS               0L         /* Zero Hours                          */
#define ZERO_MINUTES             0L         /* Zero Minutes                        */
#define ZERO_SECONDS             0L         /* Zero Seconds                        */

/* Seconds for ADL DnUpLoad Window OFF */
#define DNUPLOAD_OFF_PERIOD ((SECONDS_PER_DAY) - (DNUPLOAD_ON_PERIOD))

#define BLOCK                    0xDB       /* Character for a Block text cell     */
#define LINE                     0xCD       /* Character for Drawing a Box         */
#define LOWER_LEFT_CORNER        0xC8       /* Character for Drawing a Box         */
#define LOWER_RIGHT_CORNER       0xBC       /* Character for Drawing a Box         */
#define SIDE                     0xBA       /* Character for Drawing a Box         */
#define UPPER_LEFT_CORNER        0xC9       /* Character for Drawing a Box         */
define UPPER_RIGHT_CORNER       0xBB       /* Character for Drawing a Box         */ define FIRST_COL                0          /* First column of display             */
define FIRST_ROW                0          /* First row of display                */
#define LAST_COL                 79         /* Last column of display              */
define LAST_ROW                 24         /* Last row of display                 */ define REQUIRED_ARGUMENTS       4          /* Number Arguments Required by ADATS  */
define TYPE_ARGUMENT            1          /* Type Argument for ADATS             */
#define ATLAB_ARGUMENT           2          /* ATLAB Argument for ADATS            */
#define DAS_ARGUMENT             3          /* DAS Argument for ADATS              */
#define PORT_ARGUMENT            4          /* Serial Port Argument                */
define KEYBOARD_ARGUMENT        5          /* Keyboard Argument                   */ define MIN_IRQ_NUMBER           0          /* Minimum Hardware IRQ Number         */
define TIMER_IRQ_NUMBER         0          /* Timer IRQ Number                    */
#define KEYBOARD_IRQ_NUMBER      1          /* Keyboard IRQ Number                 */
#define COM2_IRQ_NUMBER          3          /* COM Port #2 IRQ Number              */
#define COM1_IRQ_NUMBER          4          /* COM Port #1 IRQ Number              */
#define FLOPPY_IRQ_NUMBER        6          /* Floppy Disk Drive IRQ Number        */
#define REALTIMECLK_IRQ_NUMBER   8          /* Real Time Clock IRQ Number          */
#define HARDISK_IRQ_NUMBER       14         /* Hard Disk IRQ Number                */
define MAX_IRQ_NUMBER           16         /* Maximum Hardware IRQ Number         */ define PIC1_HI                  0x21       /* Hi Port Address for Master PIC #1   */
define PIC1_LO                  0x20       /* Lo Port Address for Master PIC #1   */
#define PIC2_HI                  0xA1       /* Hi Port Address for Slave PIC #2    */
define PIC2_LO                  0xA0       /* Lo Port Address for Slave PIC #2    */ define INTRXLEN                 1024       /* Size of Interrupt Receive Buffer    */
define INTTXLEN                 1024       /* Size of Interrupt Transmit Buffer   */
#define MESSAGE_LIMIT            253        /* Maximum Length of a Message (bytes) */
#define USRBUFLEN                320        /* Size of User Buffer                 */
#define LOGFILE_BLINK            5.0        /* Blink When this % is Remaining      */
#define MAX_LOGFILES             11L        /* Maximum Number of logfiles          */
#define MIN_LOGFILES             2L         /* Minimum Number of logfiles          */
define MIN_LOG_NUMBER           0L         /* Minimum Logfile Number              */ define INITIALIZE               0          /* Flag = Initialize Display           */
define CLSHOME                  1          /* Flag = Clear Display & Home Cursor  */
#define MODE                     2          /* Flag = Display Mode Of Operation    */
#define HOWTOUSEIT               3          /* Flag = Display How To Use It        */
#define VERBOSE                  4          /* Flag = Display Mode & How To Use It */
#define SHUTDOWN                 5          /* Flag = Shutdown Display             */
#define CLRVERBOSE               6          /* Flag = Clear Mode & How To Use It   */
define FILESTATUS               7          /* Flag = Show File Status             */ define DIV_0                    0          /* Diversity 0                         */
define DIV_1                    1          /* Diversity 1                         */
#define DIV_2                    2          /* Diversity 2                         */
#define DIV_4                    4          /* Diversity 4                         */
#define MAXWORDS                 8          /* Maximum codewords needed for a byte */
#define _1_CODEWORD_PER_BYTE     1          /* 1 Codeword per byte                 */
#define _2_CODEWORD_PER_BYTE     2          /* 2 Codewords per byte                */
#define _4_CODEWORD_PER_BYTE     4          /* 4 Codewords per byte                */
#define _8_CODEWORD_PER_BYTE     8          /* 8 Codewords per byte                */

/* Maximum codewords in a max message  */
#define MAXCODEWORDS ((((MESSAGE_LIMIT) + (HEADER_BYTES)) * (MAXWORDS)) \
                    + ((DETECTION_BYTES) * (_4_CODEWORD_PER_BYTE)))
```

```c
#define BIT0                0x01        /* Mask for bit 0 of a byte              */
#define BIT1                0x02        /* Mask for bit 1 of a byte              */
#define BIT2                0x04        /* Mask for bit 2 of a byte              */
#define BIT3                0x08        /* Mask for bit 3 of a byte              */
#define BIT4                0x10        /* Mask for bit 4 of a byte              */
#define BIT5                0x20        /* Mask for bit 5 of a byte              */
#define BIT6                0x40        /* Mask for bit 6 of a byte              */
define BIT7                0x80        /* Mask for bit 7 of a byte              */ define HEADER_BYTES        7           /* Header Bytes                          */
define DETECTION_BYTES     5           /* Number of Detection Bytes             */
#define START_BYTES         2           /* Number of Start Bytes                 */
#define BLKLENGTH_BYTES     2           /* Number of Block Length Bytes          */
#define CHECKSUM_BYTES      1           /* Number of Checksum Bytes              */
#define TOPSIDE_BYTES       1           /* Number of Topside Bytes               */
define DOWNSIDE_BYTES      1           /* Number of Downside Bytes              */ define CHANNEL_BITS        1           /* # of channel bits in command byte     */
define CODE_BITS           4           /* # of code bits in command byte        */
#define DNLOAD_BITS         1           /* # of dnload bits in command byte      */
#define ECHO_BITS           1           /* # of echo bits in command byte        */
#define UPLOAD_BITS         1           /* # of upload bits in command byte      */
#define XDUCER_BITS         1           /* # of xducer bits in command byte      */

/* Mask for code in command byte         */
#define CODE_MASK    ((BIT7)|(BIT6)|(BIT5)|(BIT4))
#define CHANNEL_MASK        (BIT3)      /* Mask for channel in command byte      */
#define DNLOAD_MASK         (BIT2)      /* Mask for dnload in command byte       */
#define ECHO_MASK           (BIT3)      /* Mask for echo in command byte         */
#define UPLOAD_MASK         (BIT1)      /* Mask for upload in command byte       */
define XDUCER_MASK         (BIT0)      /* Mask for xducer in command byte       */ define ADLLOG_LEN          40          /* Length of display buffer for type     */
define AVAILABILITY_LEN    32          /* Length of display buffer for type     */
#define CLOCK_LEN           15          /* Length of display buffer for type     */
#define CORRELATE_LEN       45          /* Length of display buffer for type     */
#define ERROR_LEN           80          /* Length of display buffer for type     */
#define EXTLOG_LEN          40          /* Length of display buffer for type     */
#define HOME_LEN            80          /* Length of display buffer for type     */
#define HOWTOUSEIT_LEN      1120        /* Length of display buffer for type     */
#define RECEIVE_LEN         320         /* Length of display buffer for type     */
#define RECINTR_LEN         40          /* Length of display buffer for type     */
#define SWITCH_LEN          33          /* Length of display buffer for type     */
#define TRANSMIT_LEN        320         /* Length of display buffer for type     */
define XMTINTR_LEN         40          /* Length of display buffer for type     */ define DATE_LEN            10          /* Length of Date Format                 */
define DURATION_LEN        4           /* Length of Duration Format             */
#define TIME_LEN            8           /* Length of Time Format                 */

/*
 * DAS Stuff
 */
#define ACOUSTIC_RECEPTION      1       /* Flag for setting up ATLAB             */
#define ACOUSTIC_TRANSMISSION   0       /* Flag for setting up ATLAB             */
#define ATLAB_STATUS_ADJUST     11      /* Error code adjustment for ATLAB       */
#define AUDIO_RELAY         0x0000      /* D/A value for Audio relay             */
#define BYTES_PER_CHANNEL   2.0L        /* Bytes generated by DAS Channel Scan   */
#define DAS_UNIT_NUMBER     1           /* Unit number of DAS                    */
#define DA_AFT_XDUCER       0xOFFF      /* D/A value for Aft Xducer relay        */
#define DA_CHANNELS         2           /* Number of Digital/Analog channels     */
#define DA_FORWARD_XDUCER   0x0000      /* D/A value for Forward Xducer relay    */
#define DA_LOWER_XDUCER     0xOFFF      /* D/A value for Lower Xducer relay      */
#define DA_UPPER_XDUCER     0x0000      /* D/A value for Upper Xducer relay      */
#define RECEIVE_RELAY       0xOFFF      /* D/A value for Receiver relay          */
#define RECEIVE_SAMPLE_RATE 1250        /* Sample rate for acoustic receiver     */
#define RECEIVE_TICK_RATE   12800L      /* Clock rate for acoustic receiver      */
#define REC_AD_CHANNELS     8           /* Number of A/D Channels for RECEIVER   */
#define REC_BUFFERS         4           /* Number of Buffers REC() uses          */
#define SAMPLES_PER_TONE_PERIOD 4       /* Number of Samples per Tone Period     */
#define SECONDS_PER_TICK    0.6L        /* Number of Seconds per clock tick      */
#define TOTAL_REC_SCANS     8192        /* Number of Scans for acoustic REC      */
#define TOTAL_XMT_SCANS     1           /* Number of Scans for acoustic XMT      */
#define TRANSMIT_RELAY      0x099A      /* D/A value for Transmit relay          */
#define XMIT_AD_CHANNELS    1           /* Number of A/D Channels for XMTR       */
#define RECEIVE_TICKS       400L        /* RECEIVE_TICK_RATE / REC_AD_CHANNELS   */
                                        /*      / SAMPLES_PER_TONE_PERIOD        */
/*
 * User-Defined Storage Class Specifiers
 */
    typedef char*           STRG;  /* Array of characters                        */
    typedef unsigned char   BOOL;  /* Boolian TRUE/FALSE ON/OFF YES/NO etc.      */
```

```
typedef unsigned char  BYTE; /* 8-Bits. Range: 0 - 255      */
typedef unsigned short WORD; /* 16-Bits. Range: 0 - 65535   */ typedef struct videochar_t {
    BYTE character; /* character portion of videochar */
    BYTE attribute; /* attribute portion of videochar */
} VIDEOCHAR;

struct link_flags_t {
    unsigned control_code:CODE_BITS;   /* Diversity code       */
    unsigned dnload_mode :DNLOAD_BITS; /* Download mode select */
    unsigned upload_mode :UPLOAD_BITS; /* Upload mode select   */
    unsigned transducer  :XDUCER_BITS; /* Dnlink transducer    */
};

struct system_flags_t {
    unsigned activated  :FLAG_BITS;       /* System activation flag       */
    unsigned destination:SEND_BITS;       /* Send incoming messages       */
    unsigned channel    :CHANNEL_BITS;    /* Chnl: passed in Dnside byte  */
    unsigned echo       :ECHO_BITS;       /* Echo: passed in Tpside byte  */
    unsigned type       :TYPE_BITS;       /* Type of system               */
    unsigned audio      :FLAG_BITS;       /* Audio operation flag         */
    unsigned mode       :MODE_BITS;       /* Mode of operation flag       */
    unsigned end_of_data:ENDOFDATA_BITS;  /* Index for end of data        */
                                          /* In the acoustic RX buffer    */
};

struct irq_table_t {
    BYTE interrupt_number; /* Interrupt associated with IRQ */
    BYTE bit_mask;         /* 8259A-2 (PIC) bit_mask        */
    BYTE pic_number;       /* PIC 1 or PIC 2                */
    BOOL bus_access;       /* Flag = Is IRQ accessable at bus? */
    BOOL used_by_adl;      /* Flag = Is IRQ used by the ADL?   */
    BYTE priority;         /* Priority of IRQ set by PIC hardware */
};

struct configuration_t {
    BYTE   diversity;          /* Diversity to communicate with */
    BYTE   codewords_per_byte; /* # of codewords per data byte  */
    double sample_rate;        /* Sample rate (frequency)       */
    double tone_period;        /* Tone period for data rate     */
    long   clock_ticks;        /* # of clock ticks for data rate */
    int    samples_per_tone;   /* # of samples per tone         */
    double bit_rate;           /* Bits per second (data rate Hz) */
};

struct display_t {
    int    row;       /* Row to place display message         */
    int    column;    /* Column to place display message      */
    int    color;     /* Color of text for a display type     */
    int    bufsiz;    /* Size of display buffer for a display type */
    BYTE*  buffer;    /* Display buffer for a display type    */
    int    frequency; /* Frequency of sound upon display      */
    int    duration;  /* Duration of sound upon display       */
    BOOL   center;    /* Flag = Center sting within the limits */
};

struct port_stuff_t {
    int    bufsiz;           /* Size of port buffer */
    BYTE*  buffer;           /* Port buffer         */
    STRG   name;             /* Port name           */
    BOOL   installed;        /* Is port installed ? */
    unsigned header:FLAG_BITS; /* Header flag       */
};

struct logfiles_t {
    unsigned logtype;   /* Type of logfile for system type    */
    STRG     name;      /* Logfile path name                  */
    BOOL     state;     /* State (opened/closed)              */
    int      handle;    /* File handle                        */
    WORD     oflag;     /* Type of operations allowed         */
    long     used;      /* number of logfiles already used    */
    STRG     format;    /* Logfile format for making backups  */
    BOOL     data_loss; /* Has data loss occured on the logfiles? */
};
```

What is claimed is:

1. A method for communicating comprising the steps of:

transmitting a string of individual signals simultaneously over a plurality of frequency diverse transmission channels with each of said individual signals being transmitted over at least one of said plurality of frequency diverse transmission channels;

receiving said string of individual signals including detecting the beginning of said string of individual signals;

detecting the length of said individual signals;

identifying the number of frequence of diverse transmission channels used per individual signal transmitted during said simultaneous transmission; and reading said individual signals.

2. A method as defined in claim 1 in which said step of receiving further includes:

calculating Doppler shifts affecting the transmission of said string of individual signals by measuring a time difference between a predicted individual signal starting time and an actual individual signal starting time and making a new predicted individual signal starting time by adding said time difference to said predicted individual signal starting time.

3. A method as defined in claim 2 in which said individual signals are acoustic signals.

4. A method as defined in claim 3 in which said step of transmitting includes the use of frequency shift keying.

5. A method as defined in claim 4 in which each of said individual signals represents an individual digital data bit.

6. A method as defined in claim 5 in which said digital data bits are binary data bits.

7. A method as defined in claim 6 in which said steps of transmitting and receiving include the use of omnidirectional transducers.

8. A method for communicating comprising the steps of:

transmitting acoustically a string of individual signals through water, a portion of said string of individual signals being transmitted first, simultaneously over a plurality of frequency diverse transmission channels, with a second portion of said string of individual signals being transmitted second, simultaneously over a second plurality of frequency diverse transmission channels, so that said string of signals is collectively transmitted over a range of transmission frequencies, individual signals of said string of individual signals being transmitted over at least one transmission channel of the transmission channels comprising said plurality of frequency diverse transmission channels and said second plurality of frequency diverse transmission channels;

receiving said string of individual signals including detecting the beginning of said string of individual signals;

detecting the length of said individual signals;

identifying the number of frequency diverse transmission channels used per individual signal of said string of individual signals;

calculating Doppler shifts affecting the transmission of said string of individual signals by measuring a time difference between a predicted individual signal starting time between a predicted individual signal starting time and making a new predicted individual signal starting time by adding said time difference to said predicted individual signal starting time; and reading said individual signals.

9. A method as defined in claim 8 in which said step of transmitting includes the use of frequency shift keying.

10. A method as defined in claim 9 in which said individual signals each represent an individual digital data bit.

11. A method as defined in claim 10 in which said digital data bits are binary data bits.

12. A method as defined in claim 11 in which said steps of transmitting and receiving include the use of omnidirectional transducers.

13. A method for communicating comprising the steps of:

transmitting acoustically a string of individual signals through water, a portion of said string of individual signals being transmitted first, simultaneously over a plurality of frequency diverse transmission channels, with a second portion of said string of individual signals being transmitted second, simultaneously over a second plurality of frequency diverse transmission channels, so that said string of signals is collectively transmitted over a range of transmission frequencies, individual signals of said string of individual signals being transmitted over at least one transmission channel of the transmission channels comprising said plurality of frequency diverse transmission channels and said second plurality of frequency diverse transmission channels, said string of individual signal tones including transmission-reception synchronization data indicating the beginning of message data and indicating individual signal transmission length, transmission parameter data indicating the number of frequency diverse transmission channels that are used per said individual signals of said string of individual signals, and message data;

receiving said string of individual signals including determining the beginning of said message data and interpreting said individual signal transmission length each by correlating said transmission-reception synchronization data with a predetermined pattern;

identifying the number of frequency diverse transmission channels used per said individual signals of said string of individual signals by matching said signals with a second predetermined pattern;

calculating Doppler shifts affecting the transmission of said string of individual signals by measuring a time difference between a predicted individual signal starting time and an actual individual signal starting time and making a new predicted individual signal starting time by adding said time difference to said predicted individual signal starting time; and reading said message data.

14. A method as defined in claim 13 in which said step of transmitting includes the use of frequency shift keying.

15. A method as defined in claim 14 in which said individual signals each represent an individual digital data bit.

16. A method as defined in claim 15 in which said digital data bits are binary data bits.

17. A method as defined in claim 16 in which said steps of transmitting and receiving include the use of omnidirectional transducers.

18. A method for communicating through water comprising the steps of:

selecting a desired tone transmission length for individual acoustic signals to be transmitted from a first station to a second station and selecting a desired number of transmission channels at which an individual acoustic signal will be transmitted simultaneously from said first station to said second station;

transmitting to said second station from said first station a string of individual acoustic signals, at least a portion of said string of individual acoustic signals being transmitted simultaneously over a plurality of frequency diverse transmission channels, said transmission being in accordance with said first to second station selected tone transmission length and said first to second station selected number of transmission channels at which an individual acoustic signal will be transmitted simultaneously, said string of individual acoustic signals including signals indicating when a message begins, signals indicating said first to second station selected tone transmission length and said first to second station selected number of transmission channels at which an individual acoustic signal will be transmitted simultaneously, and message signals;

receiving said string of signals at said second station from said first station, said step of receiving including determining when said message data begins from said signals indicative thereof;

determining said first to second station selected tone transmission length, from said signals indicative thereof;

determining said first to second station selected number of transmission channels, from said signals indicative thereof;

calculating Doppler shifts affecting the transmission of said string of individual acoustic signals by measuring a time difference between a predicted individual acoustic signal starting time and an actual individual acoustic signal starting time and making a new predicted individual acoustic signal starting time by adding said time difference to said predicted individual acoustic signal starting time; and reading said message data.

19. A method of communicating according to claim 18 in which prior to the step of transmitting is the step of:

selected a desired tone transmission length for individual acoustic signals to be transmitted from said second station to said first station and selecting a desired number of transmission channels at which an individual acoustic signal will be transmitted simultaneously from said second station to said first station, and in which said string of individual acoustic signals transmitted includes:

signals indicating said second to first station selected tone transmission length and said second to first station selected number of transmission channels at which an individual acoustic signal will be transmitted simultaneously.

20. A method of communicating according to claim 19 in which the step of receiving further includes:

reading said signals indicative of said second to first station selected tone transmission length, from said signals indicative thereof and reading said signals indicative of said second to first station selected number of transmission channels, from said signals indicative thereof; and transmitting to said first station from said second station a predetermined message signal, at least a portion of said predetermined message signal being transmitted simultaneously over a plurality of frequency diverse transmission channels, said transmission being in accordance with the second to first station selected tone transmission length and the second to first station selected number of transmission channels at which an individual acoustic signal will be transmitted simultaneously.

21. A method as defined in claim 20 further including:

receiving at said first station from said second station said predetermined message signals as received by said first station; and determining the degree of similarity between said predetermined message signals as sent from said second station and said predetermined message signals as received by said first station.

22. A method as defined in claim 21 in which the combination of:

said selected tone transmission length for individual acoustic signals transmitted from said second station to said second station;

said selected tone transmission length for individual acoustic signals transmitted from said second station to said first station;

said selected number of transmission channels at which an individual acoustic signal will be transmitted simultaneously from said first station to said second station; and said selected number of transmission channels at which an individual acoustic signal will be transmitted simultaneously from said second station to said first station is altered to alter the similarity between said predetermined message signals as sent from said second station and said predetermined message signals as received by said first station.

* * * * *